United States Patent [19]

Hosaka et al.

[11] Patent Number: 5,896,292
[45] Date of Patent: Apr. 20, 1999

[54] AUTOMATED SYSTEM FOR PRODUCTION FACILITY

[75] Inventors: Kotaro Hosaka; Hiroyuki Ohtsuka, both of Ushiku; Masaru Matsuhisa, Ryugasaki; Nobuyuki Yoshida, Tsukuba, all of Japan

[73] Assignee: Canon Kabushiki Kaisha, Tokyo, Japan

[21] Appl. No.: 08/660,051

[22] Filed: May 31, 1996

[30] Foreign Application Priority Data

| | | | |
|---|---|---|---|
| Jun. 5, 1995 | [JP] | Japan | 7-137926 |
| Jun. 5, 1995 | [JP] | Japan | 7-137927 |
| Jun. 5, 1995 | [JP] | Japan | 7-137928 |
| Apr. 22, 1996 | [JP] | Japan | 8-099867 |
| Apr. 22, 1996 | [JP] | Japan | 8-099868 |
| Apr. 22, 1996 | [JP] | Japan | 8-099869 |

[51] Int. Cl.$^6$ .............................................. G05B 23/00
[52] U.S. Cl. .................... 364/468.15; 340/825.06; 340/825.15; 340/870.01; 395/200.43; 702/182; 702/188
[58] Field of Search ................ 340/825.06, 825.15, 340/870.01; 364/131, 132, 133, 134, 191, 192, 468.15, 468.16, 468.17, 550; 395/200.42, 200.43, 200.46, 309; 702/182, 188

[56] References Cited

U.S. PATENT DOCUMENTS

| | | | |
|---|---|---|---|
| 3,522,588 | 8/1970 | Clarke, Jr. et al. | 340/825.06 |
| 3,582,621 | 6/1971 | Lawler | 364/138 |
| 4,280,060 | 7/1981 | Kure-Jensen et al. | 290/40 R |
| 4,346,446 | 8/1982 | Erbstein et al. | 364/551.01 |
| 4,517,637 | 5/1985 | Cassell | 364/138 |
| 4,591,967 | 5/1986 | Mattes et al. | 364/132 |
| 4,679,148 | 7/1987 | Wood | 364/473 |
| 4,747,060 | 5/1988 | Sears, III et al. | 364/481 |
| 4,751,648 | 6/1988 | Sears, III et al. | 364/422 |
| 5,134,574 | 7/1992 | Beaverstock et al. | 364/551.01 |
| 5,283,869 | 2/1994 | Adams et al. | 395/200.67 |
| 5,452,420 | 9/1995 | Engdhal et al. | 395/285 |
| 5,787,021 | 7/1998 | Samaha | 702/84 |
| 5,805,442 | 9/1998 | Crater et al. | 364/138 |

FOREIGN PATENT DOCUMENTS

| | | |
|---|---|---|
| 0 023 266 B1 | 2/1981 | European Pat. Off. . |
| 0 408 094 A2 | 1/1991 | European Pat. Off. . |
| 0 412 666 A2 | 2/1991 | European Pat. Off. . |
| 2 276 953 | 10/1994 | United Kingdom . |

*Primary Examiner*—Edward R. Cosimano
*Attorney, Agent, or Firm*—Morgan & Finnegan, LLP

[57] ABSTRACT

An automated system has a monitor computer, which is for remote monitoring and/or analysis of control information of an input/output control device connected to a production facility, a control computer for controlling the processes of operation of the production facility via the input/output control device, and a dual-port memory as an information transmission unit capable of transmitting the control information between the monitor computer and the control computer at a timing that is independent of control of the processes of operation, which is capable of real-time reading/writing to/from all or a part of a memory of the control computer and is written, workpiece-related data, such as status of operation, results of measurement and flags representing the sequence flow information on a per-workpiece basis or per-process basis.

41 Claims, 75 Drawing Sheets

F I G. 1
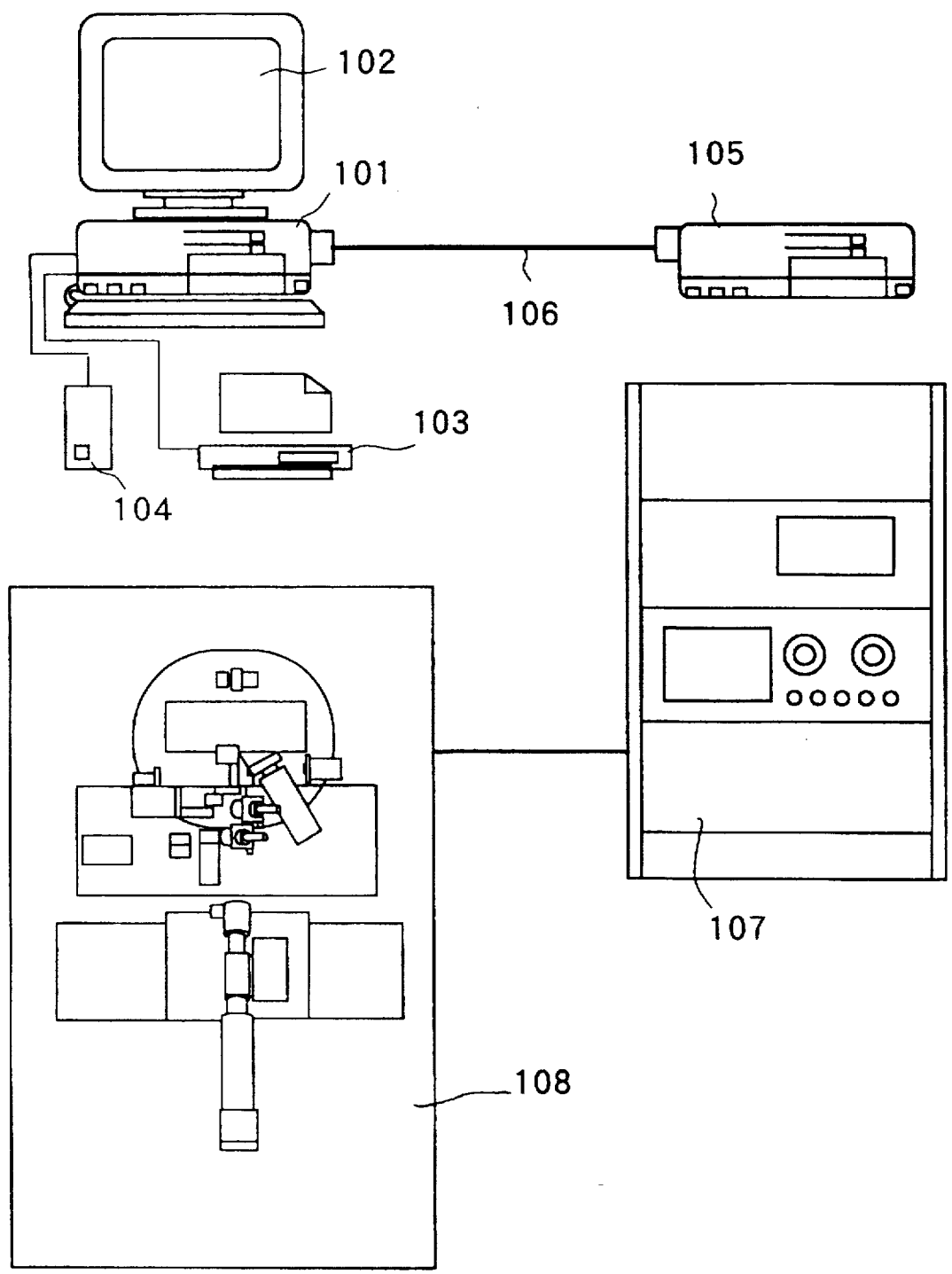

502

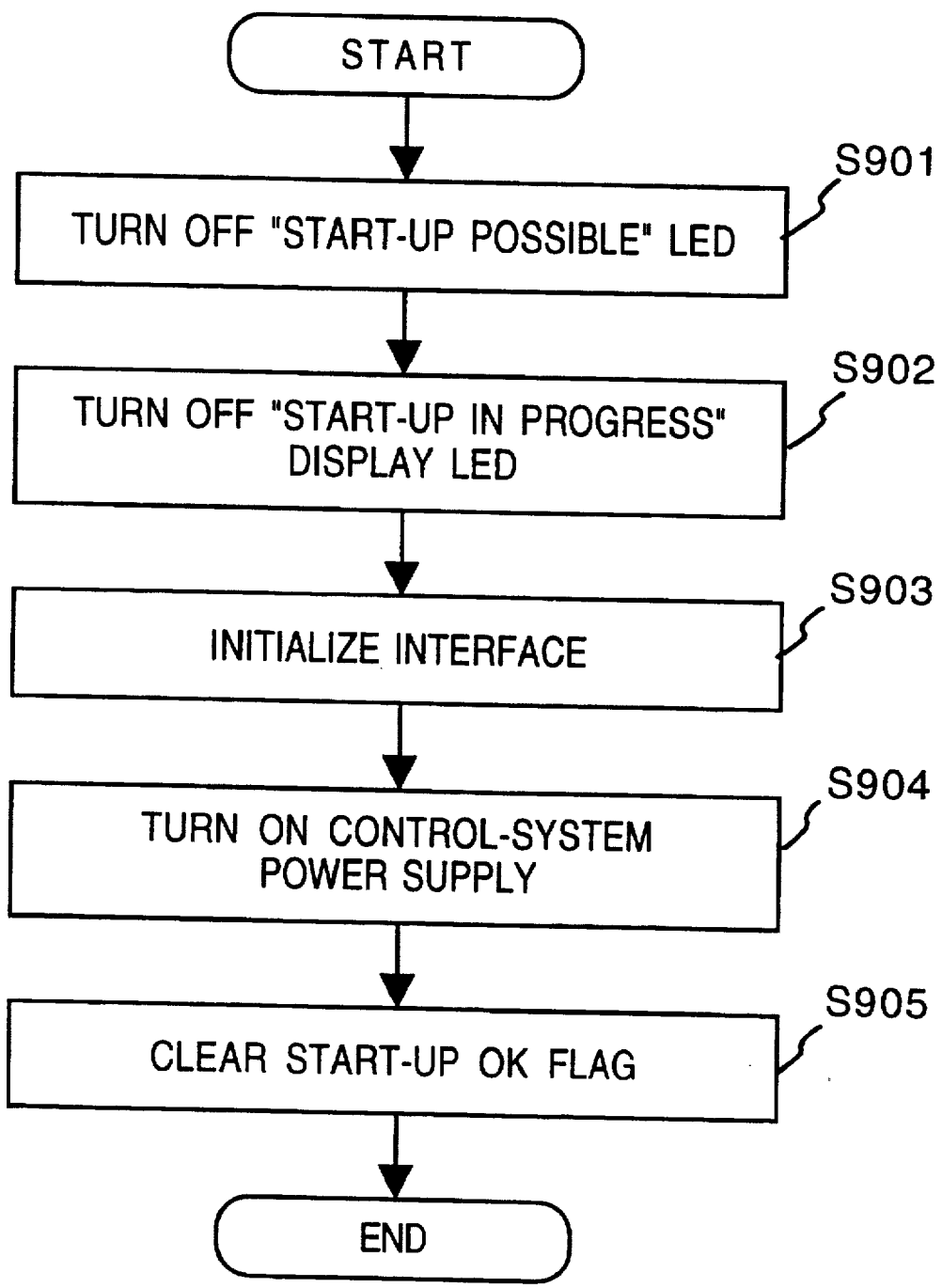

F I G. 49
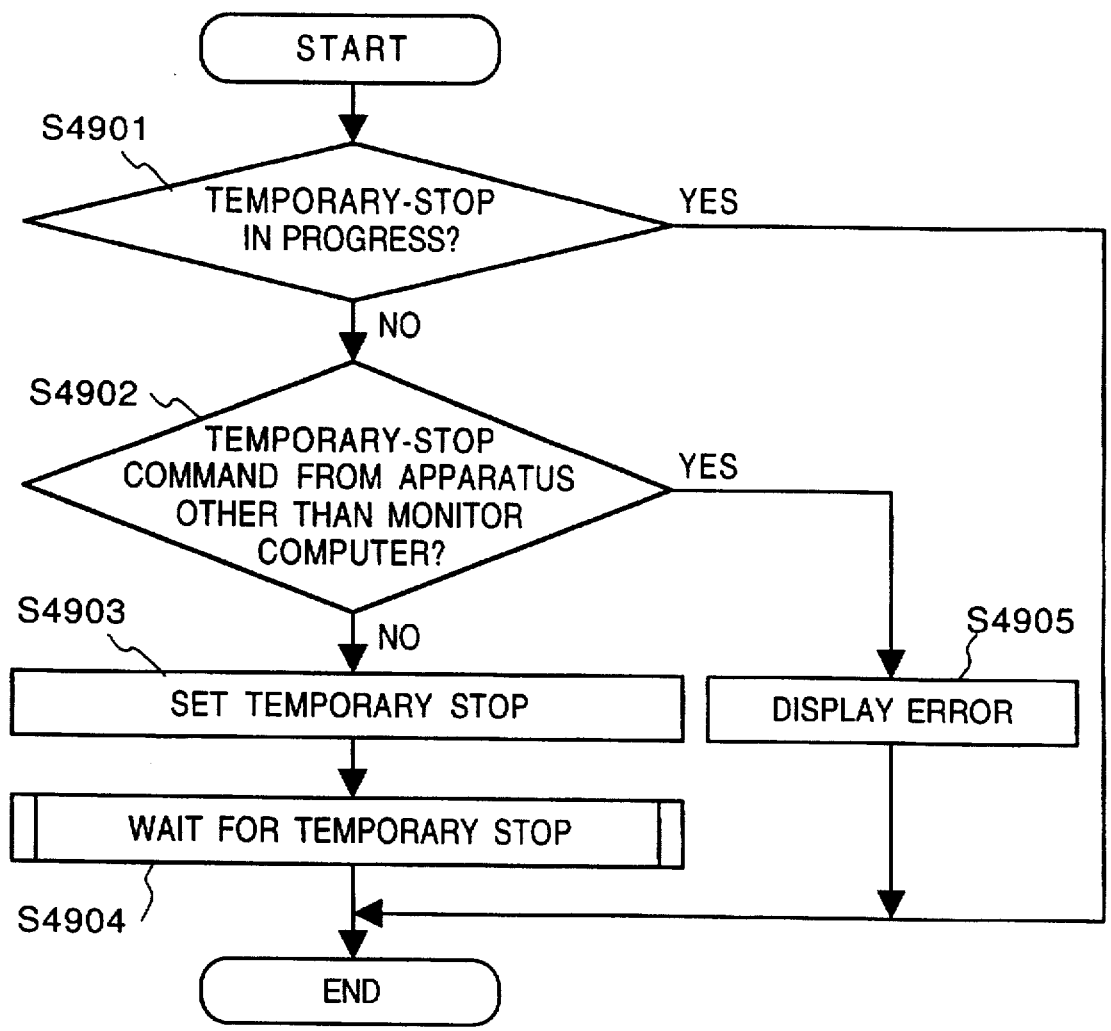

AUTOMATED SYSTEM FOR PRODUCTION FACILITY

BACKGROUND OF THE INVENTION

This invention relates to an automated system for monitoring and controlling a production facility.

In an automated system which controls a production facility for such operations as inspection, machining and assembly, the system is equipped with means by which the facility per se discloses information when it is required that information relating to the facility be collected and the information be utilized to analyze the status of the facility. According to this method, which has recently been put into use, the information relating to the production facility is subjected to management processing during the operation of the facility. Further, a system for monitoring the facility information has been put into use and operates separately of the automated system that controls the production facility. These systems collect information via a communication or other interface and make it possible to remotely monitor the production facility and its information.

FIG. 66 is a block diagram showing an overview of the architecture of an automated system according to the prior art.

As shown in FIG. 66, the system includes a monitor controller 6604 for monitoring and analyzing a production facility. The monitor controller 6604 includes a floppy disk device 6601, a printer 6602, an external storage device 6603 for storing a large quantity of data, a communication interface 6605, a keyboard 6606 and a color display 6607.

A control computer 6609, which controls the production facility, effects such control by actuating a number of actuators 6610 based upon information acquired from a group of sensors 6611. The information acquired by the control computer 6609 is sent to the side of the monitor controller 6604 via a communication interface 6608 and a communication line 6612 so that the information is outputted as processed results by being displayed on the color display 6607 or printed out by the printer 6602.

However, the automated system according to the prior art described above has a number of shortcomings, which will now be set forth.

(1) It is required that information needed by the user be communicated to the controlled production facility in the form of a data request. Depending upon the particular information required, the original sequence of line control may change or actual line (process) control of the production facility may develop an operating loss, the latter occurring during the time that the apparatus controlling the line occupies the CPU in order to process the response to the request for facility information.

Furthermore, since the program for data communication between the monitor computer and control computer is necessary during the apparatus drive sequence, a data delivery instruction for displaying data on the monitor computer must also be described in the control computer sequence. If the monitor computer becomes unnecessary or if it should happen to fail for some reason, it will be necessary to alter the program of the control computer or to leave the unnecessary monitor computer connected. Altering the program is complicated and leaving the monitor computer connected is wasteful.

(2) The assignment of functions to the monitor computer serving as a monitoring apparatus and to the control computer serving as a control apparatus is ambiguous. Owing to the relationship to the control operation performed by the control computer, a limitation is imposed upon the data collection and data analysis by the monitor computer.

More specifically, though it is possible to assemble an article automatically and to put together parts automatically, the state of the art is such that no accommodations are made for dealing with the adjustment of parts, especially while measurements are being taken, the process whereof is more difficult than the process through which parts are put together. In particular, when analysis of data is performed in real-time in parallel with control of the production facility, analysis is simply the counting of acceptable parts or defective parts. Consequently, analysis of the type of defect or analysis of such particulars as deviation from a standard value is inevitably performed by batch processing after the raw data is acquired in lot units. In addition, since the adjustment process is carried out manually regardless of the fact that the assembly process has been automated, a problem arises in terms of improving production efficiency.

(3) In a case where an item of equipment in the production facility ceases operating for some reason, it is required that the cause be investigated. In order to determine the particular process through which the equipment halted operation, it is necessary for the operator to monitor the equipment, take video of the equipment, etc. In such case the operator must perform monitoring constantly for problems which can occur at any time and is required to continue shooting video. This is time-consuming and costly.

Further, monitoring performed by an operator is prone to human error, such as the overlooking of problems. In a case where reliance is placed upon video photography, it is difficult to discover phenomena which occur at locations not under surveillance (i.e., at locations where the video camera is not pointed).

(4) In a case where the control software of the control computer is adjusted and revised on-site before the sequence operation of the production line is established, a problem arises in terms of operability. Specifically, in a case where use is made of software having different functions such as control program development, control program debugging or data analysis, it is required that the software currently being run stop being executed and that other software be started up anew each time. This means that operation is complicated in a case where, say, a data analyzing function is utilized in the debugging of the control program.

Accordingly, an object of the present invention is to provide an automated system for monitoring and controlling a production facility in which a monitor computer for monitoring and a control program for control are made functionally independent of each other and facility information used is acquired and analyzed in real-time in the monitor computer, and the analyzed facility information is transmitted to the control computer.

Another object of the present invention is to provide an automated system in which the operating status of a production facility can be identified with ease even when the production facility has developed a problem.

A further object of the present invention is to provide an automated system having an environment that enables such operations as creation of the control program and the analysis of data to be performed with ease.

SUMMARY OF THE INVENTION

The foregoing objects are attained by providing an automated system having a monitor computer, which is for remote monitoring and/or analysis of control information of an input/output control device connected to a production facility which performs machining, assembly, inspection and 10r adjustment of a workpiece, and a control computer for controlling the processes of operation of the production facility via the input/output control device, the system comprising information transmission means capable of transmitting the control information between the monitor computer and the control computer at a timing that is independent of control of the processes of operation.

In a preferred embodiment, the information transmission means is a cycle stealing system for accessing a memory, with which the control computer or monitor computer is provided, in accordance with a CPU clock of the control computer or monitor computer.

Further, the information transmission means has a dual-port memory capable of real-time reading/writing to/from all or part of a memory provided within the control computer or monitor computer.

Further, all or part of the software in the control computer is described by a combination of a group of instructions prepared in advance exclusively for control of automated systems. Further, in execution of control of the control computer, the portion of the program described by the combination of the group of instructions prepared in advance exclusively for control of automated systems is run by the control computer while it is being translated to an executable format.

Further, the system is characterized by non-resident software of the monitor computer for displaying all or part of the processes of operation of the control computer by the monitor computer. The system is further characterized by non-resident software of the monitor computer for executing, temporarily stopping and re-starting the entirety of operation of the control computer, or of a designated part thereof, from the monitor computer.

Further, according to the present invention, the foregoing objects are attained by providing an automated system having a monitor computer, which is for remote monitoring and/or analysis of control information of an input/output control device connected to a production facility which performs machining, assembly, inspection and 10r adjustment of a workpiece, and a control computer for controlling the processes of operation of the production facility via the input/output control device, the system comprising data communication means for communicating workpiece data, which has been acquired by the control computer via the input/output control device, to the monitor computer, and storage means for storing the workpiece data, which has been acquired by the data communication means, at the monitor computer.

In a preferred embodiment, the data transmission means has a dual-port memory capable of real-time reading/writing to/from all or part of a memory provided within the control computer or monitor computer.

In a preferred embodiment, the data communication means performs communication at a timing that is independent of the monitoring/analysis operation of the monitor computer or of the control operation of the control computer. More specifically, the data communication means transmits the workpiece data to the monitor computer, on a per-workpiece basis, when one process in the operation of the production facility ends or when all processes in the operation of the production facility are completed.

In a preferred embodiment, the control computer is equipped with a dual-port memory.

Further, the foregoing objects are attained by providing an automated system having a monitor controller, which is for remote monitoring and/or analysis of control information of an input/output control device connected to a production facility which performs machining, assembly, inspection and 10r adjustment of a workpiece, and a control computer for controlling the processes of operation of the production facility via the input/output control device, the system comprising information transmission means capable of transmitting the control information between the monitor computer and the control computer at a timing that is independent of control of the processes of operation, wherein the monitor computer has an editor program for creating the software of the monitor computer and/or control computer, a compiler program for compiling the software of the monitor computer and/or control computer, a debugger program for debugging the software of the monitor computer and/or control computer, a data analyzing program for analyzing the data of the input/output control device, and a menu program for managing start-up/shut-down of a monitoring program which monitors operation of the control computer.

In a preferred embodiment, the information transmission means performs communication at a timing that is independent of the monitoring/analysis operation of the monitor computer or of the control operation of the control computer.

Further, the information transmission means is a dual-port memory capable of real-time reading/writing to/from all or part of a memory provided within the control computer or monitor computer.

Further, all or part of the program managed by the menu program is a program described by a combination of a group of instructions prepared in advance exclusively for control of the automated system.

Further, in a preferred embodiment, functions possessed by the program managed by the menu program are assigned in advance to a plurality of keys provided on data input means possessed by the monitor computer.

Further, the automatic system is a system for adjusting/measuring a laser-beam printer, which is the above-mentioned workpiece, characterized in that a value relating to production performance of the laser-beam printer is analyzed based upon the workpiece data that has been stored in the memory. More specifically, the workpiece is an image forming apparatus which forms an image by exposing a photoreceptor material to a pulse-width modulated light beam, characterized in that the production facility has adjusting means, which includes an optical system, for adjusting a reflective mirror which adjusts scanning position when the light beam of the image forming apparatus scans the photoreceptor material.

In a preferred embodiment, the adjusting means for adjusting the reflective mirror includes moving means for moving the optical system, which is interior to or exterior to the production facility, within a predetermined range, and photometric means for measuring quantity of light obtained by moving the optical system, wherein the optical system is moved to a position at which the quantity of light is maximized.

Further, the adjusting means includes varying means for varying a reflecting angle of the reflective mirror of the production facility, timekeeping means for measuring time required to for the light beam to scan the predetermined range owing to rotation of a scan mirror provided in the workpiece, comparison means for comparing the time required with a predetermined value, and calculating means which, if the time required is outside a predetermined range, calculates amount of varying of the reflecting angle of the reflective mirror from the difference between the time required and the predetermined value, wherein the reflecting angle of the reflective mirror is varied in dependence upon the amount of varying of the reflecting angle calculated.

Other objects and advantages besides those discussed above shall be apparent to those skilled in the art from the description of a preferred embodiment of the invention which follows. In the description, reference is made to the accompanying drawings, which form a part thereof, and which illustrate an example of the invention. Such example, however, is not exhaustive of the various embodiments of the invention, and therefore reference is made to the claims which follow the description of the scope of the invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram showing the system architecture of a system, to which the present invention is applied, for automatically adjusting and measuring a laser-beam printer;

FIG. 9 is a flowchart showing the processing of an initialization step in an embodiment of the invention;

Figures 41, 42:
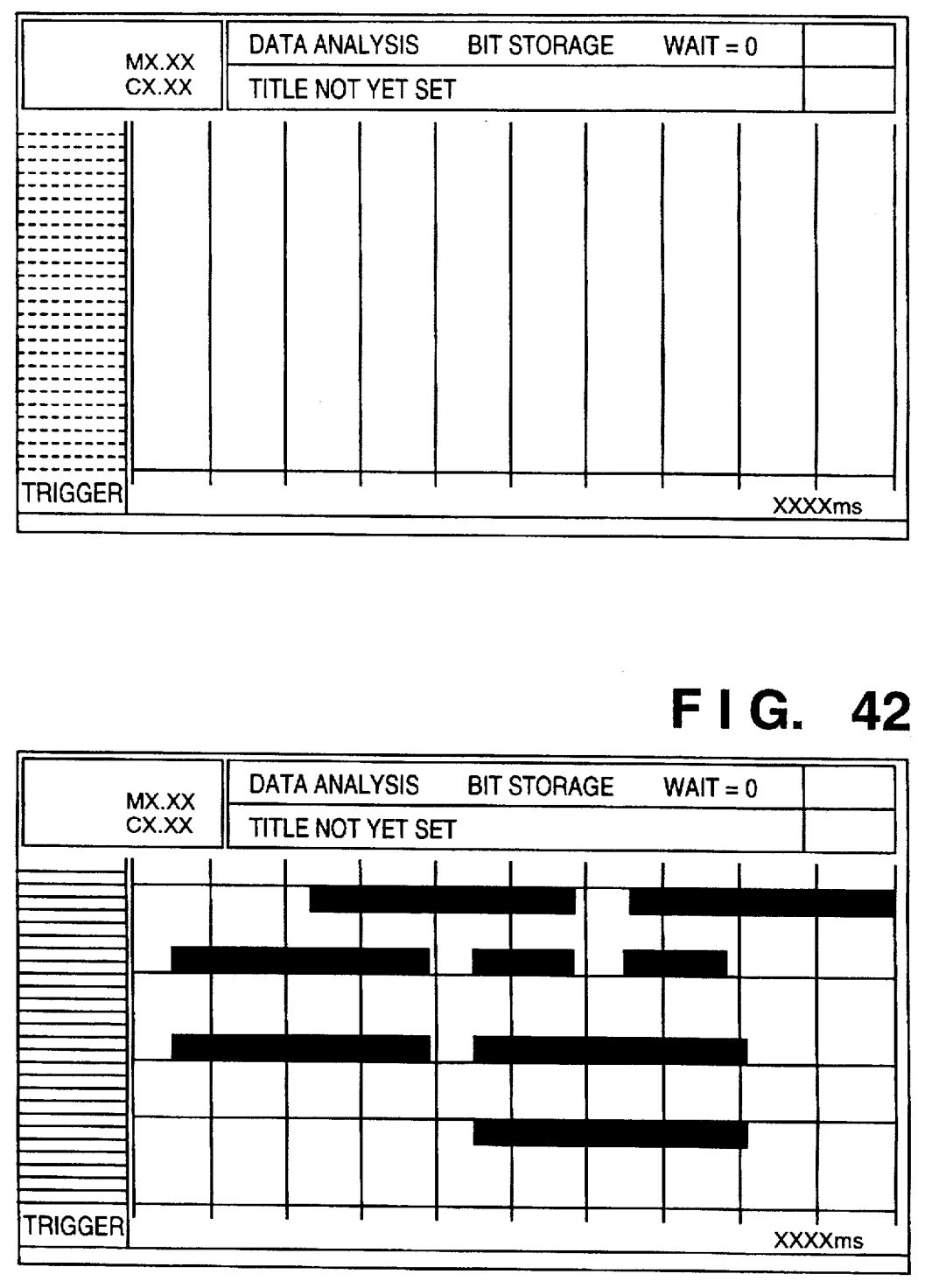

FIG. 41 is a diagram showing an example of a display on a screen (a fixed display) at execution of a resident monitor in an embodiment of the invention;

FIG. 42 is a diagram showing an example of a display on a screen for data analysis processing at execution of a resident monitor in an embodiment of the invention;

FIG. 49 is a flowchart showing pause processing for a temporary stop according to an embodiment of the invention;

DESCRIPTION OF THE PREFERRED EMBODIMENT

A preferred embodiment of the present invention will be described in detail in accordance with the accompanying drawings.

The embodiment of the invention will be described in detail with reference to FIGS. 1 through 64.

1. Hardware architecture

The architecture of the hardware of an embodiment to which the invention is applied will be described with reference to FIGS. 1 through 7 and FIGS. 45 and 46.

Figure 65:
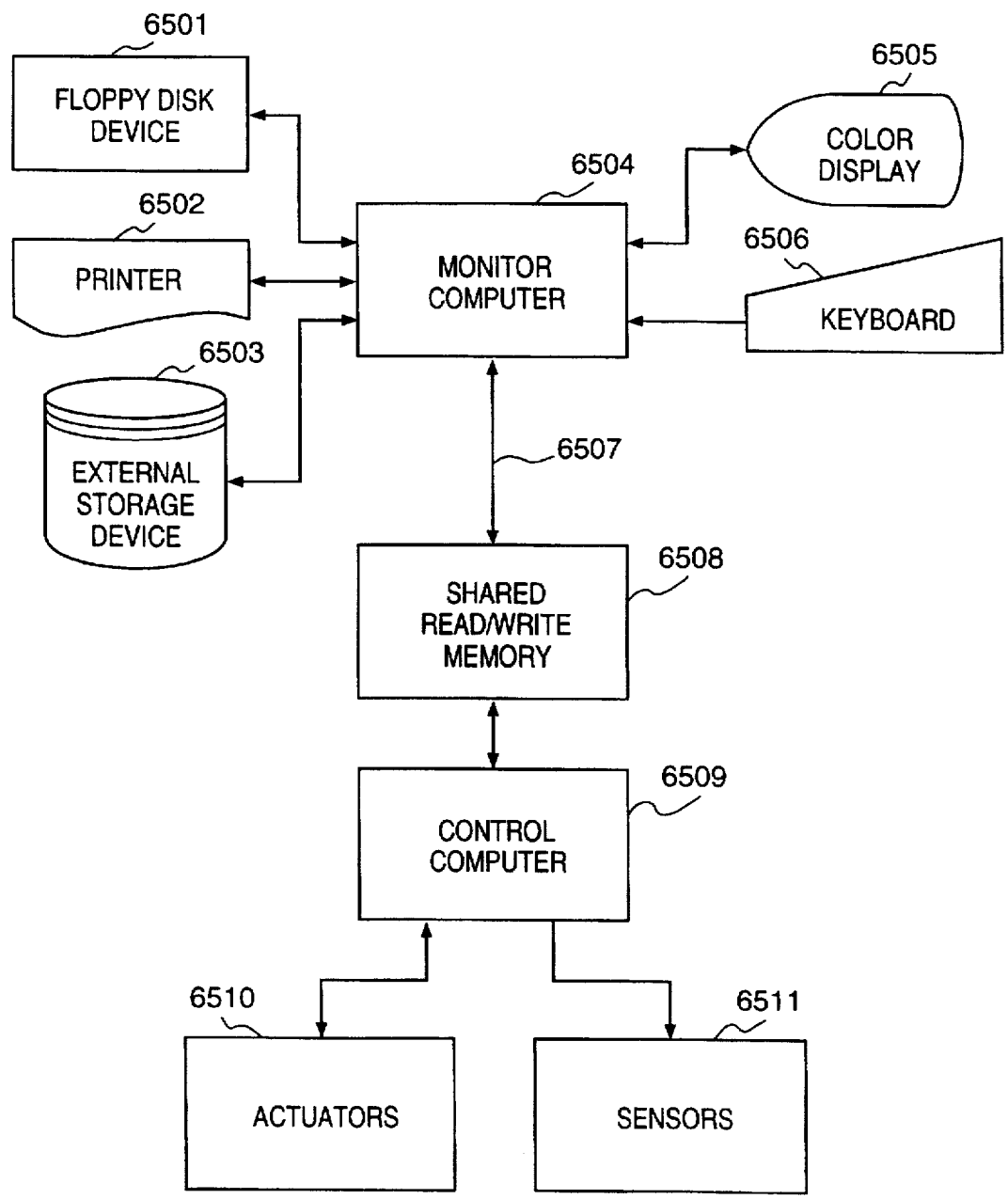
FIG. 65 is a block diagram showing an overview of the architecture of an automated system to which the present invention is applicable.

FIG. 65 is a block diagram showing an overview of the architecture of an automated system to which the present invention is applicable.

As shown in FIG. 65, the system includes a floppy disk device 6501 serving as memory means, a printer 6502, an external storage device 6503 for storing a large quantity of data, a monitor computer 6504 for performing data totalization, apparatus monitoring and software creation, a display 6505, a keyboard 6506, a signal line 6507, and a data communication device 6508 capable of communicating information without impeding the operation of the monitor computer 6504 and a control computer 6509 or, more specifically, the execution cycle of the CPU. For example, the device 6508 is a so-called cycle-stealing system memory by which the monitor computer 6504 accesses the internal memory of the control computer 6509, in conformity with the CPU clock of the control computer 6509, at a time when the CPU of the control computer 6509 is not accessing the internal memory. Alternatively, the device 6508 may be a dual-port memory, namely a memory capable of being read and written in two directions. The system further includes apparatus actuators 6510 and apparatus sensors 6511.

The overall architecture of a system, to which the present invention is applied, for automatically adjusting and measuring a laser-beam printer will be described with reference to FIG. 1. Here the laser-beam printer is an image recording apparatus which records an image by exposing a photoreceptor to a pulse-width modulated light beam.

FIG. 1 is a diagram showing the system architecture of a system, to which the present invention is applied, for automatically adjusting and measuring a laser-beam printer.

As shown in FIG. 1, the system includes a monitor computer 101 for performing data totalization, apparatus monitoring and software creation. The monitor computer 101 has a monitor 102, a printer 103 for printing out the results of data totalization, and a non-volatile external storage device 104 for storing data and programs. (It should be noted that the device 104 may be an internal-type memory device incorporated within the monitor computer 101.) The system further includes a control computer 105 for executing programs that control the apparatus proper, and a data communication device 106 capable of communicating information without impeding the processing (the execution cycle of the CPU) of the monitor computer 101 and a control computer 105. One example of the device is a so-called cycle-stealing system line by which the monitor computer 101 accesses the internal memory of the control computer 105 in sync with the CPU clock of the control computer 105 when the control computer 105 is not accessing its internal memory (not shown). Another example is a line connecting the monitor computer 101 and control computer 105 via a memory (a dual-port memory described later) capable of being read and written in two directions. In this case, the memory capable of being read and written in two directions is provided in the monitor computer 101 or control computer 105. A control panel 107, which incorporates drivers and the like, is for outputting and inputting various data to and from the control computer 105, for driving the apparatus proper, etc. The "apparatus proper" is an apparatus 108 which adjusts and measures a laser-beam printer.

The apparatus 108 for adjusting and measuring a laser-beam printer will now be described in detail.

Figure 2:
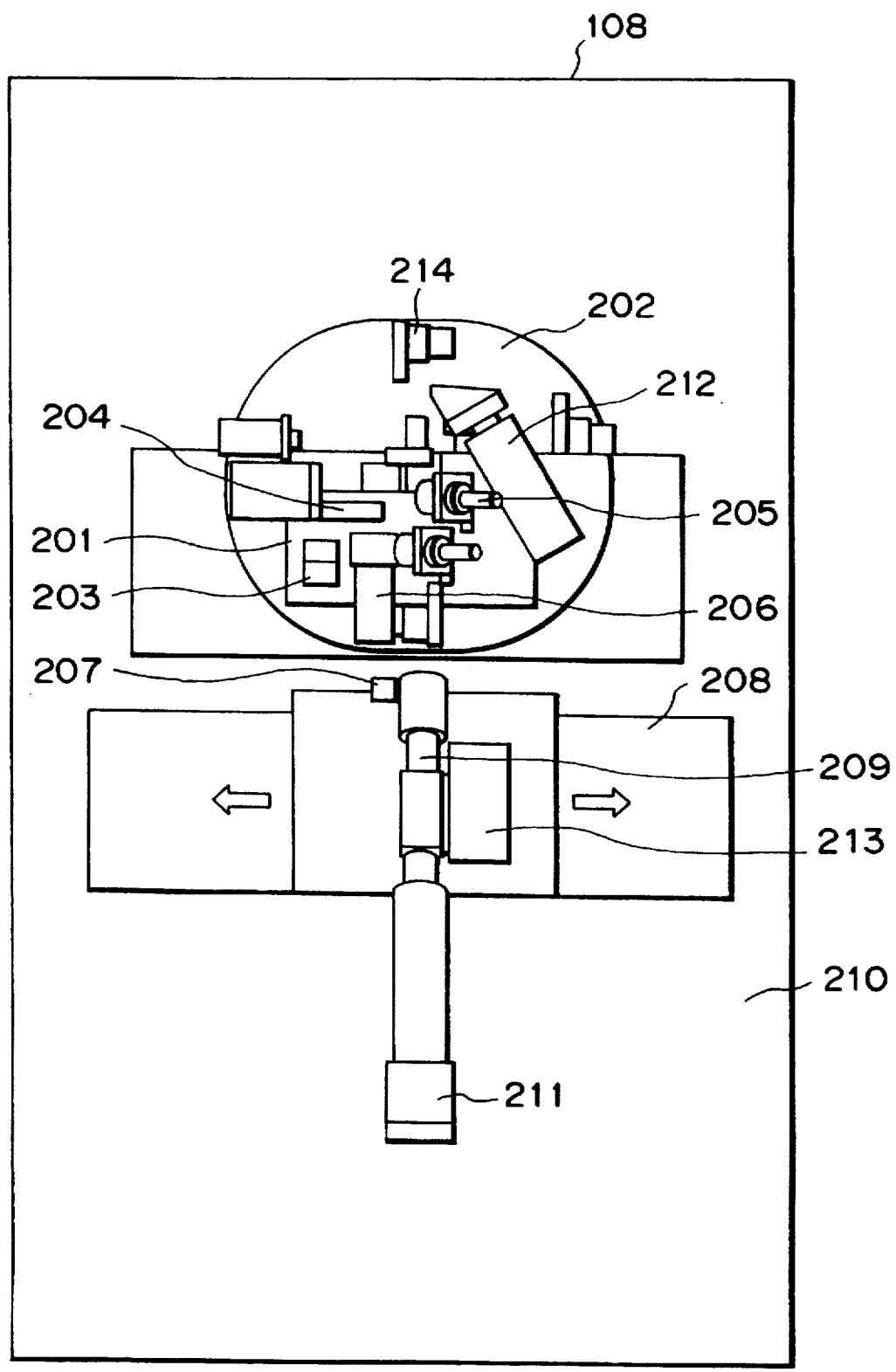
FIG. 2 is a diagram showing the details of an apparatus, to which the present invention is applied, for automatically adjusting and measuring a laser-beam printer.

FIG. 2 is a diagram showing the details of the apparatus 108, to which the present invention is applied, for automatically adjusting and measuring a laser-beam printer.

Shown at 201 is a workpiece that is to undergo adjustment and measurement. The workpiece 201, which has been brought into position by a conveyor (not shown), is placed on the side of the apparatus by a table 202. (FIG. 2 shows the workpiece 201 placed on the side of the apparatus.) A contact probe 203 supplies electric power to the workpiece 201 and also writes and reads data to and from the workpiece. A lens adjusting mechanism 204 adjusts the laser optical system of the workpiece 201, and a fiber cable 205 with a converging lens which irradiates the adjustment portion with ultraviolet light for the purpose of UV-bonding the adjustment portion. A mirror adjusting mechanism 206 adjusts the laser reflecting mirror of the workpiece. A light-receiving mechanism 207 is provided with a V-shaped slit for reading the scanning position or beam position of laser light emitted by the laser source of the workpiece. An X-axis slide table 208 is for moving the mechanisms (the light-receiving mechanism 207, an optical system 209, an image sensing device 211 and a Z-axis moving mechanism 213, etc.), which are carried on it, to the left and right in FIG. 2. The optical system 209 is for forming an image of the state of the laser beam emitted by the workpiece 201. The image sensing device 211 converts the image formed by the optical system 209 to an electric signal. In this embodiment, the image sensing device has a high-speed shutter function through which the image of the scanning beam can be captured at high speed. A stand 210 supports the entire apparatus and has a vibration-proof function which prevents unwanted vibration from being transmitted to the apparatus. The Z-axis moving mechanism 213 moves the light-receiving mechanism 207, the optical system 209 and the image sensing device 211 up and down. A clamping mechanism 214 clamps the workpiece 201. Since two workpieces are placed on the table 202, a plurality of the clamping mechanisms 214 are provided.

The details of the mirror adjusting mechanism 206 for adjusting the laser reflecting mirror of the workpiece will now be described.

Figure 3:
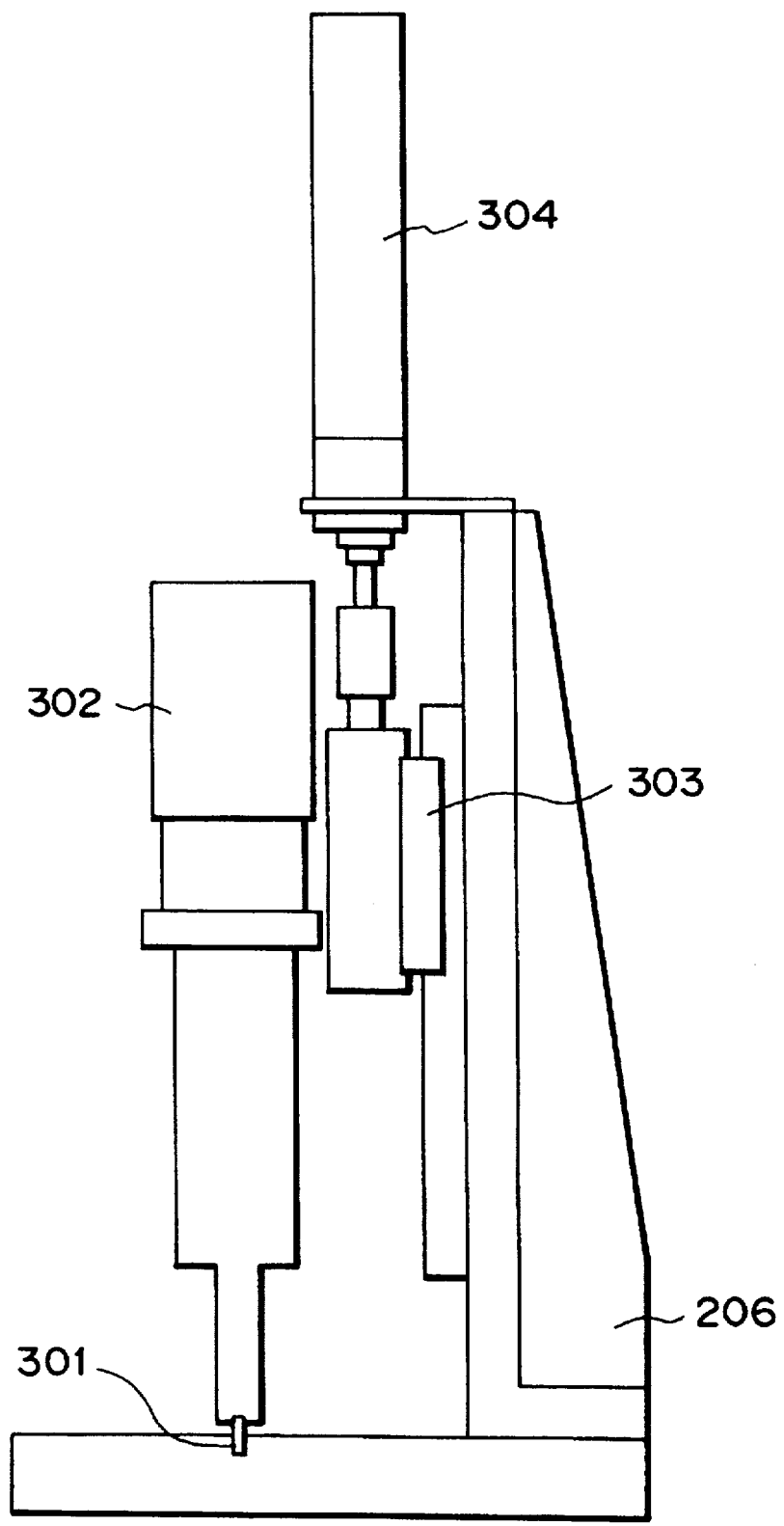
FIG. 3 is a diagram showing the details of a mechanism, to which the present invention is applied, for adjusting a laser reflecting mirror.

FIG. 3 is a diagram showing the details of the mechanism 206, to which the present invention is applied, for adjusting the laser reflecting mirror.

As shown in FIG. 3, a bit 301 is inserted into an adjustment groove provided in the mirror of the workpiece 201. A pulse motor 302 rotates the bit 301 to adjust the mirror. A slider 303 moves the bit 301 and the pulse motor 302 up and down. An air cylinder 304 urges the slider 303 to position the bit 301 and the pulse motor 302 at the mirror adjustment groove of the workpiece 201.

Next, the details of the lens adjusting mechanism for adjusting the optical system of the laser light source of the workpiece will be described.

Figure 4:
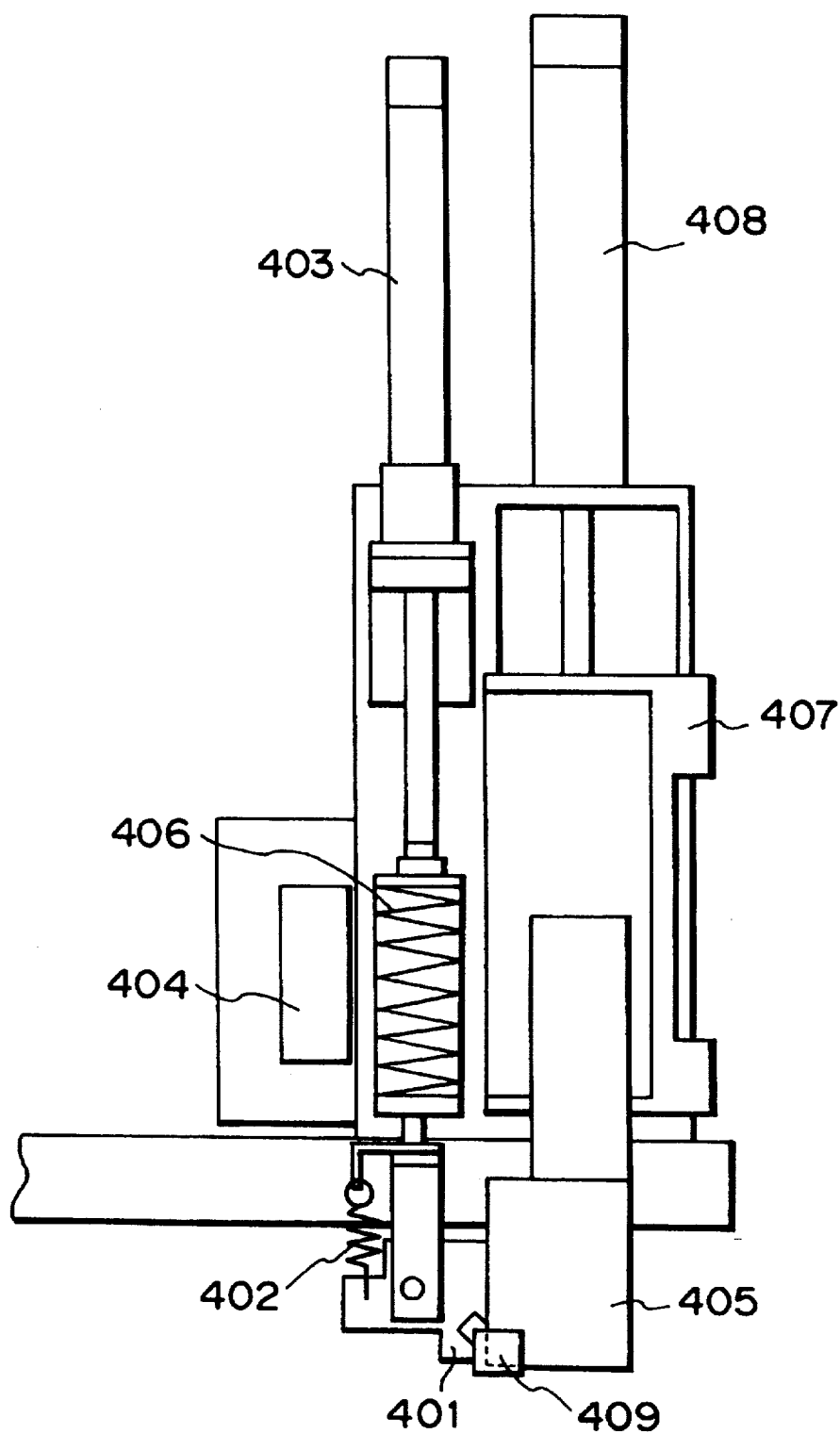
FIG. 4 is a diagram showing the details of a lens adjusting mechanism, to which the present invention is applied, for adjusting the optical system of a laser light source.

FIG. 4 is a diagram showing the details of the lens adjusting mechanism, to which the present invention is applied, for adjusting the optical system of the laser light source.

As shown in FIG. 4, the laser light source has an optical system 409 restrained (clamped) by a mechanism 401. A retaining spring 402 checks the optical system 409 of the laser light source in the lateral direction in such a manner that a gap will not be formed when the clamping mechanism 401 clamps the optical system 409, and a retaining spring 406 checks up-and-down movement of the optical system 409 of the laser light source. A drive cylinder 403 moves the clamping mechanism 401 up and down. Two embracing mechanisms 405 embrace the optical system 409 from the front and back. A guide 407 is for moving the embracing mechanism 405 up and down, and a cylinder 408 drives the embracing mechanism 405 up and down. A slide mechanism 404 moves the clamping mechanism 401, the retaining spring 402, the drive cylinder 403, the embracing mechanism 405, the retaining spring 406, the guide 407 and the drive cylinder 408, and the optical system 409 embraced by the embracing mechanisms 405 is moved by the clamping mechanism 401. The slide mechanism 404 is equipped with a pulse motor (not shown) for drive.

The details of the light-receiving mechanism 207 equipped with the V-shaped groove will now be described.

Figure 5A:
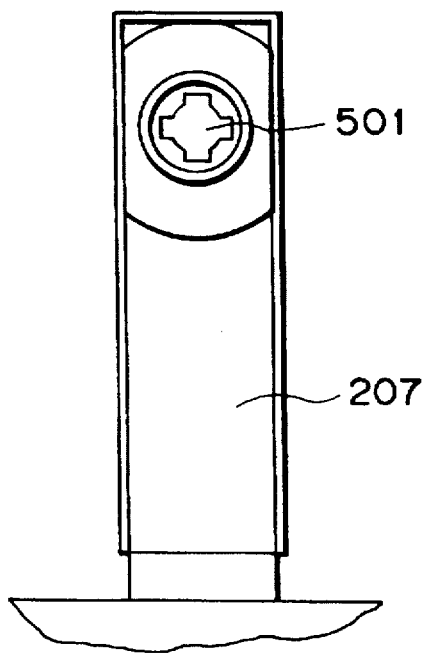
FIG. 5A is a diagram (a front view) showing the details of a light-receiving mechanism to which the present invention is applied, the mechanism having a V-shaped slit.
Figure 5C:
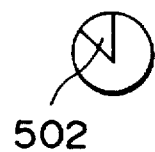
FIG. 5C is a diagram (a V-slit chart) showing the details of a light-receiving mechanism to which the present invention is applied, the mechanism having a V-shaped slit.
Figure 5B:
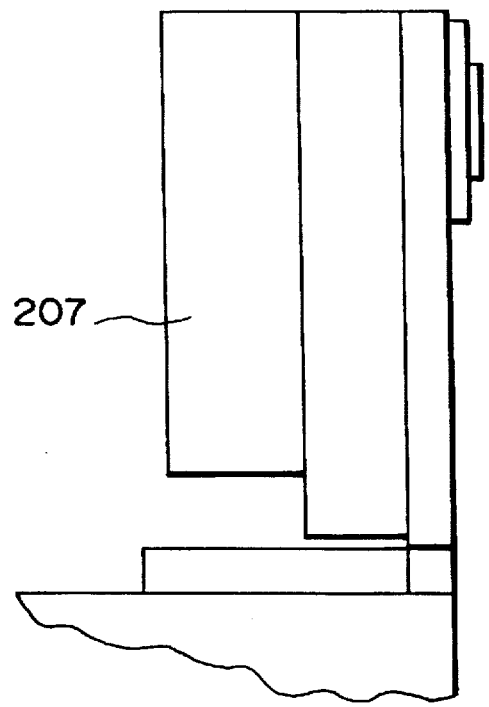
FIG. 5B is a diagram (a side view) showing the details of a light-receiving mechanism to which the present invention is applied, the mechanism having a V-shaped slit.

FIGS. 5A, 5B and 5C are diagrams showing the details of the light-receiving mechanism to which the present invention is applied, the mechanism having a V-shaped slit. FIG. 5A is a front view and FIG. 5B a side view. FIG. 5C illustrates a V-slit chart, in which numeral 502 denotes a portion cut away to a V-shaped configuration. In FIG. 5A, numeral 501 denotes a light-receiving portion at which a light-receiving element and the V-slit (FIG. 5C) are attached, with the V-slit being disposed in front of the light-receiving element. When a laser beam impinges upon the V-shaped portion 502, the light is incident upon the light-receiving element as well.

Next, the functional architecture internally of the system for automatically adjusting and measuring the laser-beam printer will be described.

Figure 7:
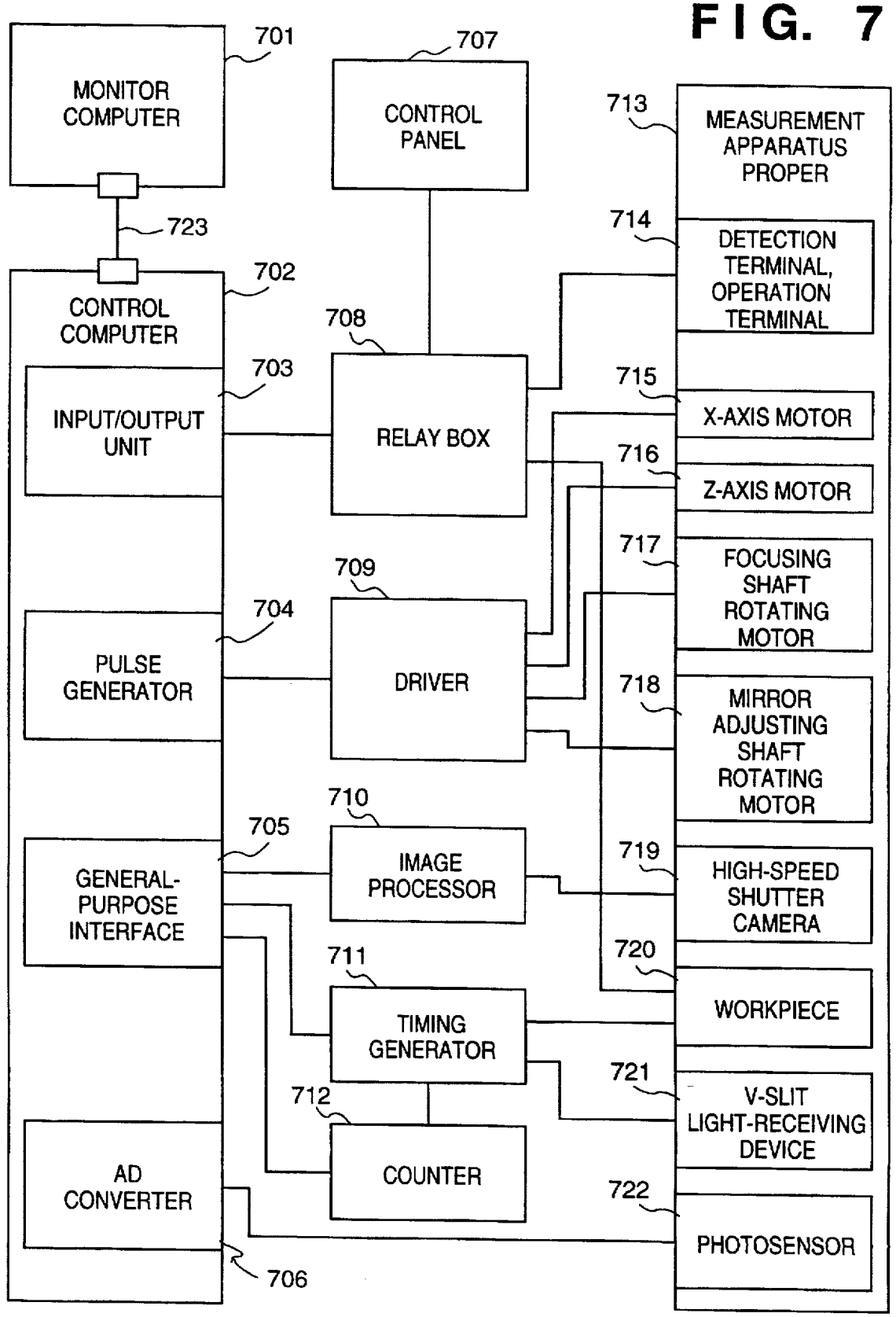
FIG. 7 is a block diagram showing the functional architecture of the system, to which the present invention is applied, for automatically adjusting and measuring a laser-beam printer.

FIG. 7 is a block diagram showing the functional architecture of the system, to which the present invention is applied, for automatically adjusting and measuring the laser-beam printer.

Numeral 701 in FIG. 7 denotes a monitor computer identical with the monitor computer 101 shown in FIG. 1, numeral 702 denotes a control computer identical with the control computer 105 shown in FIG. 1, and numeral 723 denotes a data communication device identical with the data communication device 106 shown in FIG. 1. A group of input/output units 703 through 706 are mounted on the control computer 702 for managing the same. Specifically, the input/output unit 703 is connected to the apparatus proper and to the control panel via a relay box 708, enters various sensor information from the apparatus proper, reads the status of the apparatus into the control computer 702, outputs signal to electromagnetic valves to drive cylinders or the like, and controls the cylinders in accordance with the program in the control computer 702. The input/output unit 704 is a pulse generator which, in accordance with the program in the control computer 702, sends a driver 709 pulses for moving pulse motors 715 through 718 to appropriate positions. The input/output unit 705 is a general-purpose interface for a computer, such as an RS-232C or GP-IB interface. The interface 705 is connected to an image processing unit 710, a timing generating circuit 711 and a counter 712 and reads the results of image processing by the image processing unit 710 and time-keeping data from the counter 712 into the control computer. The input/output unit 706 is an analog/digital converter. Numeral 713 denotes the apparatus proper, which is for adjusting and measuring the laser-beam printer. This apparatus is identical with the apparatus proper 108 shown in FIG. 1. A detection terminal and operation terminal 714 such as a sensor or cylinder valve is mounted on the adjusting/measuring apparatus 713. The pulse motor 715 is an X-axis motor for driving the mechanisms (light-receiving mechanism 207, optical system 209, image sensing device 211 and Z-axis moving mechanism 213) mounted on the slider 208 in FIG. 2. The pulse motor 716 is a Z-axis motor for moving the light-receiving system 209 and image sensing device 211 in FIG. 2 up and down. The pulse motor 717 is a bit-shaft rotating motor for driving the lens of the optical system. Specifically, the pulse motor 717 drives the clamping mechanism 401, the retaining spring 402 and the drive cylinder 403 mounted on the slide mechanism 404 in FIG. 4. The pulse motor 718, which is the same as the pulse motor 302 in FIG. 3, rotates a mirror adjustment shaft for adjusting the laser reflecting mirror. A high-speed shutter camera 719 is the same as the image sensing element 211 in FIG. 2. A workpiece 720 to be adjusted and measured is the same as the workpiece 201 in FIG. 2. A light-receiving device 721 having a V-shaped slip is the same as the device 501 in FIG. 5A. A control panel 707 is used to change over various modes and, at the time of manual operation, allows the apparatus to perform individual operations. A relay box 708 collects various input/output signals from the detection and operation terminals 714, control panel 707 and workpiece 720 of the apparatus proper. In accordance with command pulses, the driver 709 drives the motors from the X-axis motor 715 to the motor 718 that rotates mirror adjustment shaft. The image processing unit 710 the position and shape of the beam image based upon the video signal from the high-speed shutter camera 719. The timing generator circuit 711 generates timing signals for the purpose of measuring time from the moment a light-receiving sensor (not shown) within the workpiece receives the beam reflected by the laser-beam reflecting mirror. The counter 712 measures time by accepting the signal from the timing generator circuit 711.

Figure 6:
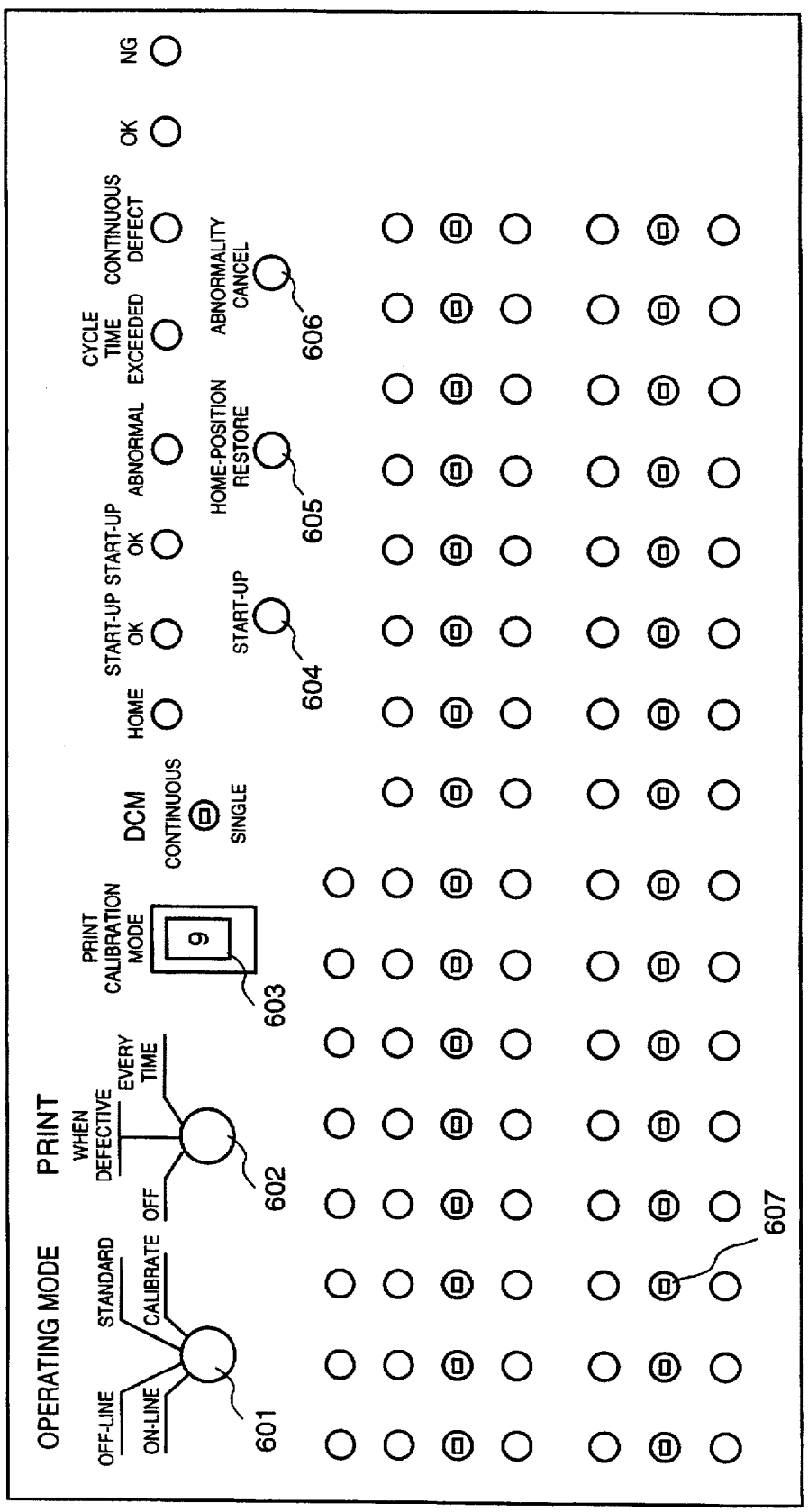
FIG. 6 is a diagram showing the control panel of the apparatus, to which the present invention is applied, for automatically adjusting and measuring a laser-beam printer.

FIG. 6 is a diagram showing the control panel of the apparatus, to which the present invention is applied, for automatically adjusting and measuring the laser-beam printer.

A switch 601 for switching the operating mode. The operating modes include an on-line mode for control from the conveyor, an off-line mode in which the apparatus is capable of operating as a stand-alone apparatus, a standard mode for entering standards, and a calibration mode for executing a calibration program. A switch 602 is for selecting whether results of measurement are to be printed out by the printer. It is possible to select a mode in which results are printed for each measurement, a mode in which results are not printed and a mode in which results are printed only when the results are faulty. A digital switch 603 is used to select a calibration mode. A start switch 604 is used to start the apparatus as a stand-alone apparatus in the off-line mode and in the manual mode. A home-position restoration switch 605 restores all moving mechanisms of the apparatus to the home position. An abnormality cancellation switch 606 outputs a signal indicating that an abnormal state has been canceled when the apparatus is shut down in an abnormal state. Numeral 607 denotes a group of manual switches. When a switch is closed, the corresponding operation starts. The switch information from the control panel is accepted by the control computer 702 via the relay box 708 and input/output unit 703.

Figure 45:
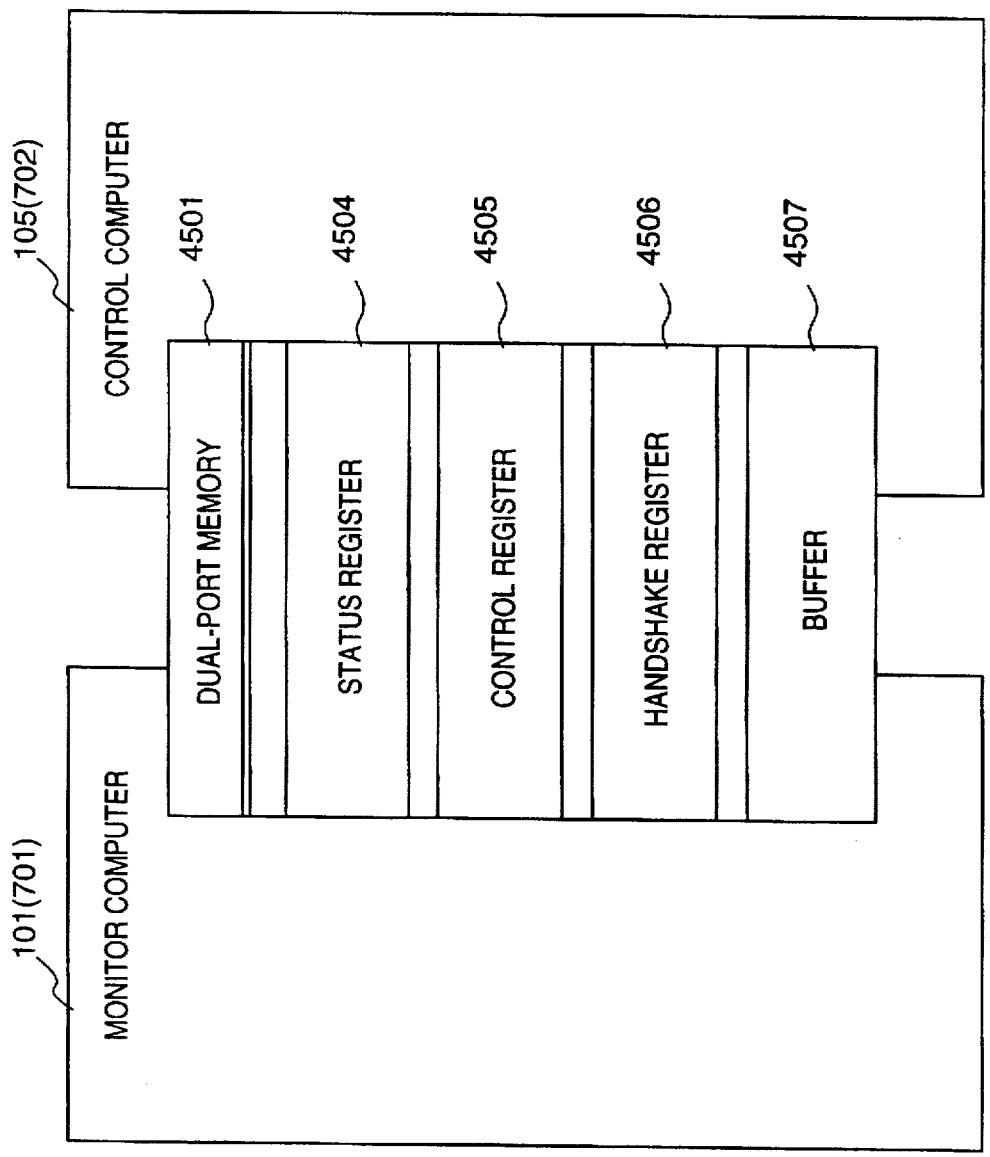
FIG. 45 is a diagram visually illustrating the content of a dual-port memory in an embodiment of the invention.

FIG. 45 is a diagram visually illustrating the content of a dual-port memory in an embodiment of the invention.

A dual-port memory 4501 is capable of reading and writing in two directions. Numerals 4504 through 4507 denote the contents of the dual-port memory 4501 on a role-by-role basis and the roles need not be assigned in the order shown. Numeral 4504 denotes a status register, namely such particulars as the apparatus mode (on-line automatic, off-line automatic) of the control computer 702, operating state, data indicative of measured results, flags and information (referred to as "sequence flow information" below) such as tasks being executed, processes and program line, etc. Primarily, this data is transmitted from the control computer 702 to the monitor computer 701. Numeral 4505 denotes a control register for sending data, which controls the state of execution of the control computer 702, mainly from the monitor computer 701 to the control computer 702. The data include sequence trace mode (continuous, trace, etc.), sequence control (temporary stop, resume, end), sequence execution cycle (for changing execution time), a break pointer and a repeat pointer. Numeral 4506 denotes a handshake register for data according to which a special-purpose language program is created and compiled by the monitor computer 701 and sent to the control computer 701, and according to which the execution program internally of the control computer 702 is sent to the monitor computer 701 for reverse compilation, and for data which require that handshaking be performed positively in two directions. Numeral 4507 denotes a buffer capable of being allocated later at will. Primarily, various data generated during measurement and adjustment are written in the buffer by the control computer 702 and the data is analyzed and totalized by the monitor computer 701. In principle, the units 4504–4507, with the exception of the unit 4506 requiring a communication format, do not have a time limitation imposed on them for reading/writing with regard to the monitor computer and control computer. In other words these can transmit information while being read and written freely in terms of time. Incorporating the dual-port memory 4501 in either the monitor computer 701 or control computer 702 is useful electrically and in terms of space but providing it in a separate case is possible as well. In this embodiment, the dual-port memory 4501 is incorporated in the control computer 702 and is connected to the monitor computer 701 by a cable. It is possible to establish a memory content similar to that of FIG. 45 even in a case where this embodiment is practiced using a memory other than the dual-port memory (i.e., through a cycle-stealing operation whereby the internal memory of the other computer is accessed utilizing the time during which the CPU of the computer is not accessing its own memory).

2. Software architecture

The architecture of the software according to an embodiment of the invention will now be described with reference to FIGS. 8A–39 and FIGS. 49–64.

2.1 Software architecture of control computer 702

The architecture of the software executed in the control computer 702 according to the embodiment of the invention will be described with reference to FIGS. 8A–21.

First, an overview of the flow of processing of the program executed in the control computer 702 will be described with reference to FIGS. 8A–8D.

FIGS. 8A–8D illustrate a main flowchart of the software of the control computer according to an embodiment of the invention.

Steps S804, S808, S812, S816, S819, S823, S826, S828, S830, S833, S836, S840, S843, S845, S847, S850, S855, S856, S860, S861 constitute a program group (hereinafter referred to as a "special-purpose language program") described by a combination of command groups prepared beforehand exclusively for control of the automated system. Descriptions, simple pictures or graphics based upon sophisticated language are used. This group of special-purpose language programs represents processes whose operations are described by the programs and each process is composed of one or more steps. By altering these sections, the invention can be simply applied to an apparatus other than an apparatus which adjusts and measures a laser-beam printer.

Steps S803, S807, S811, S815, S818, S822, S825, S827, S829, S832, S835, S839, S842, S844, S846, S849, S854, S859 constitute a translation program used to translate the group of above-mentioned special-purpose language programs to a state in which they can be analyzed and executed by the control computer 702.

Described next will be the timing at which the control computer 702 writes data in the dual-port memory 4501 in order to perform data communication with the monitor computer 701. When the translation program performs translation in order to execute the above-mentioned special-purpose language program, the writing of the data is executed in a case where a data-write instruction for writing results of execution in the dual-port memory 4501 is present in the instructions being executed. More specifically, in this embodiment, this is carried out when the corresponding special-purpose language programs are analyzed and executed a steps S818, S822, S827, S829, S832, S835, S839 S844, S846, S849.

The flow of processing will now be described. Step S801 calls for the introduction of power to the control computer 702. This indicates the start of processing (or reset by pressing a reset button, not shown). The operating system (OS) of the control computer 702 is initialized at step S802, which is an initialization routine. Processing for initializing adjusting/measuring apparatus 713 is executed at step S804, and whether an abnormality has occurred is determined at step S805. If an abnormality occurs in the step S805, processing branches to an abnormality processing routine, that is, the control computer 702 sets an error code in accordance with the occurred abnormality (step S806).

Abnormality processing for effecting recovery from the abnormal state is executed in accordance with the set error code at step S808. After that, the control computer 702 clears the error code (step S809), and proceeds to step S810.

If an abnormality does not occur in the step S805, processing for reading in the switch states of the control panel (707 in FIG. 7, the details of which are shown in FIG. 6) is executed at step S810. The home position is checked at step S812. Processing for determining whether a home-position restoration switch is ON is executed at step S813. This is processing to determine whether the home-position restoration switch on the control panel has been pressed. If the switch is not ON at step S813, processing is proceeded to step S817.

If the switch is ON at step S813, it is determined at step S814 whether the switch for changing over the operating mode on the control panel is in the off-line position. If the switch is in the off-line position at step S814, restoration to the home position is performed at the home-position restoration step S816. If the switch is not in the off-line position at step S814, it is determined at step S817 whether the switch for changing over the operating mode on the control panel is in the on-line position. In the on-line automatic mode, real-time monitoring of facility information by the monitor computer 701 and the data obtained by analyzing the information are used to execute the sequence of the adjusting/measuring apparatus 713 by the control computer 702. If the on-line automatic mode is not in effect at step S817, the program proceeds to step S834. If the on-line automatic mode is in effect at step S817, a first on-line pre-processing is executed at step S819.

It is determined at step S820 whether a start-up flag is OK. If the answer is "NO" at step S820, then on-line post-processing is executed at step S833. If the answer is "YES" at step S820, OK/NG LED extinguishing processing for extinguishing an LED that indicates the acceptability of the results of the previous measurement is executed at step S821. A second on-line pre-processing is executed at step S823. Main processing is executed at step S828, namely each of the processes of the adjusting/measuring apparatus 713 for adjusting and measuring, on-line, the laser-beam printer embodying the present invention. Monitoring is performed at step S824 to determine, at the end of each process, whether a process defect has occurred during the execution of the second on-line pre-processing step S823 or on-line main processing step S828. When it is found at step S824 that a fault has occurred in a process, on-line fault (reject) processing is executed at the defect monitoring step S826. More specifically, the on-line main processing step S828 is composed of a plurality of steps. When a defect occurs in the course of execution of these steps, the remaining steps are ignored, the on-line defect processing step S826 is executed and then the program proceeds to a first on-line post-processing step S830, which is the next step. On-line post-processing is executed at this step. Step S831 calls for the setting of the state (OK or NG) of the LED representing results of measurement and the setting of the state of an LED which gives notification of whether consecutive defects have occurred. A second on-line post-processing is executed at step S833.

It is determined at step S834 whether the switch on the control panel for changing over the operating mode is in the off-line mode position. In the off-line mode, the sequence of the adjusting/measuring apparatus 713 is executed by the control computer 702 without using the real-time monitoring of the facility information by the monitor computer 701 and the resulting analytical data. If the prevailing mode is not the off-line mode at step S834, the program proceeds to step S851. If the prevailing mode is the off-line mode at step S834, a first off-line pre-processing is executed at step S836. It is determined at step S837 whether the start-up flag is OK. If the start-up flag is not OK at step S837, the program proceeds to the second off-line post-processing of step S850. If the start-up flag is OK at step S837, the program proceeds to step S838. Step S838 calls for execution of OK/NG LED extinguishing processing for extinguishing the LED that indicates the acceptability of the results of the previous measurement. A second off-line pre-processing is executed at step S840. Main processing is executed at step S845, namely each of the processes of the adjusting/measuring apparatus 713 for adjusting and measuring, off-line, the laser-beam printer embodying the present invention. Monitoring is performed at step S841 to determine, at the end of each process, whether a process defect has occurred during the execution of the first off-line pre-processing step S840 or off-line main processing step S845. When it is found at step S841 that a fault has occurred in a process, off-line fault (reject) processing is executed at the defect monitoring step S843. More specifically, the off-line main processing step S845 is composed of a plurality of steps. When a defect occurs in the course of execution of these steps, the remaining steps are ignored, the off-line defect processing step S843 is executed and then the program proceeds to a first off-line post-processing step S847, which is the next step. Step S848 calls for the setting of the state (OK or NG) of the LED representing results of measurement and the setting of the state of an LED which gives notification of whether consecutive defects have occurred. The above-mentioned second off-line post-processing is executed at step S850.

It is determined at step S851 whether the switch on the control panel for changing over the operating mode is in the calibration mode position. If the prevailing mode is not the calibration mode at step S851, the program proceeds to step S857. In the calibration mode at step S851, it is determined at step S852 whether the start-up flag is OK. If the start-up flag is not OK at step S852, the program returns to step S805. If the start-up flag is OK at step S852, the current number of the digital switch 603 on the control panel in FIG. 6 is read in at step S853 and calibration processing is executed at steps S855 and S856. A plurality of calibration processes can be provided and any calibration process can be executed by changing over the switch 603 on the control panel at step S853.

It is determined at step S857 whether the switch on the control panel for changing over the operating mode is in the on-line manual mode position. If the prevailing mode is not the on-line manual mode at step S857, the program returns to step S805. If the prevailing mode is the on-line manual mode at step S857, a search is performed at step S858 to determine which switch of the manual switch group 607 on the control panel of FIG. 6 has been pressed. Manual processing is executed at steps S860 and S861. If a plurality of manual processes are provided and the manual processes are assigned to the switches of the manual switch group 607 on the control panel, which switch among these switches has been pressed can be determined at step S853 and the corresponding manual process can be executed. As a result, any operation can be executed rapidly in a manner that resembles the turning of electromagnetic valves ON and OFF, even if the processing involved is actually complicated.

The details of the processing of each of these steps will now be described.

FIG. 9 is a flowchart showing the processing of the initialization step in the embodiment of the invention. This flowchart illustrates the details of the processing of step S804 in FIG. 8A.

An LED display indicating that start-up is allowed is turned OFF at step S901, and an LED display indicating that start-up is in progress is turned OFF at step S902, each interface is initialized at step S903, the power supply of each control system is activated at step S904 and start-up OK flag is cleared at step S905.

Figure 10:
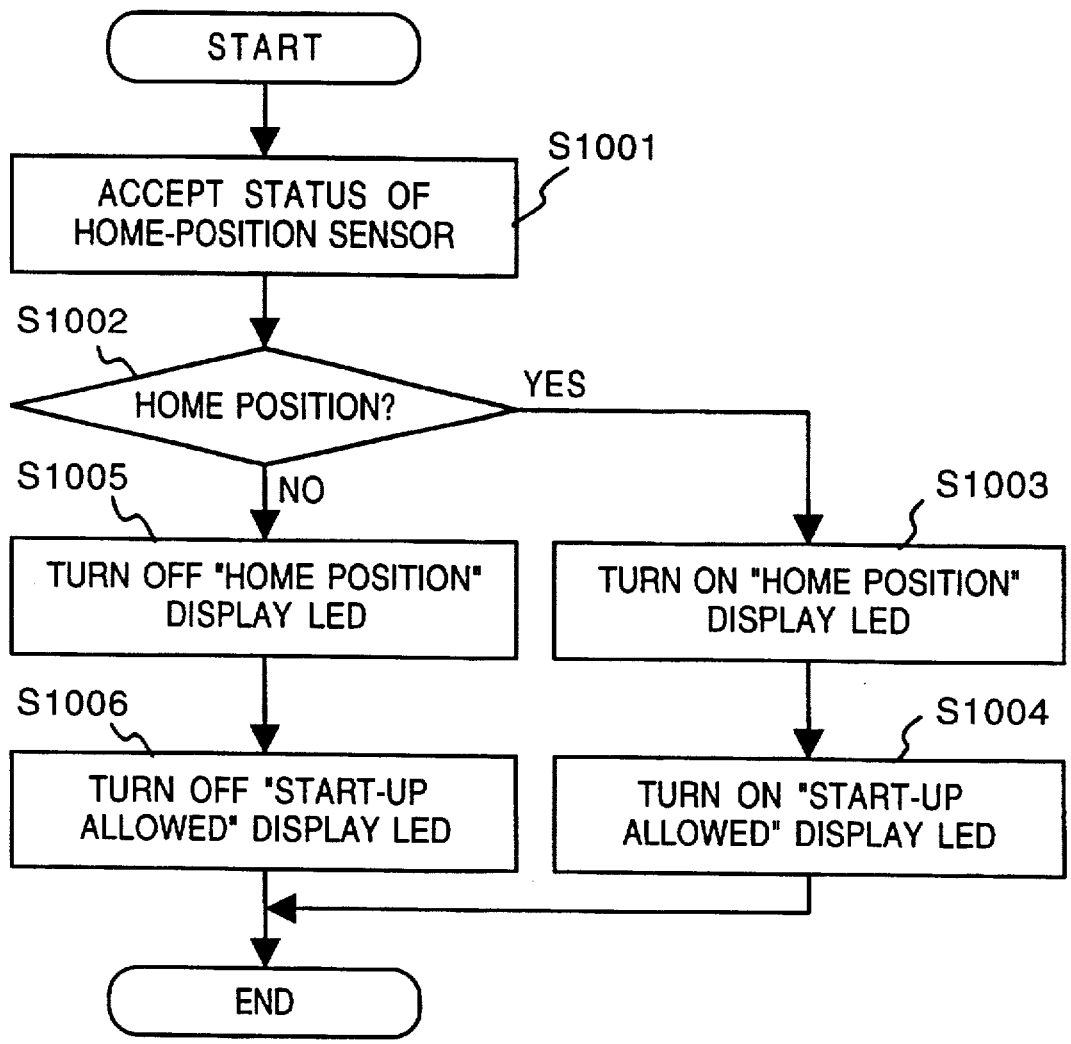
FIG. 10 is a flowchart showing the processing of a home-position check processing step in an embodiment of the invention.

FIG. 10 is a flowchart showing the processing of the home-position check processing step in the embodiment of the invention. This flowchart illustrates the details of the processing of step S812 in FIG. 8A.

The status of the home-position sensor of each control system in the adjusting/measuring apparatus 713 is read in at step S1001, at it is determined at step S1002 whether each drive system is at the home position, this determination being based upon the information accepted from the home-position sensors at step S1001. If the position is the home position, an LED display indicating the home position is turned ON at step S1003 and an LED display indicating that start-up is allowed is turned ON at step S1004. If the position is not the home position, the LED display indicative of the home position is turned OFF at step S1005. Start-up is not allowed and the LED display indicating that start-up is allowed is turned OFF at step S1006

Figure 11:
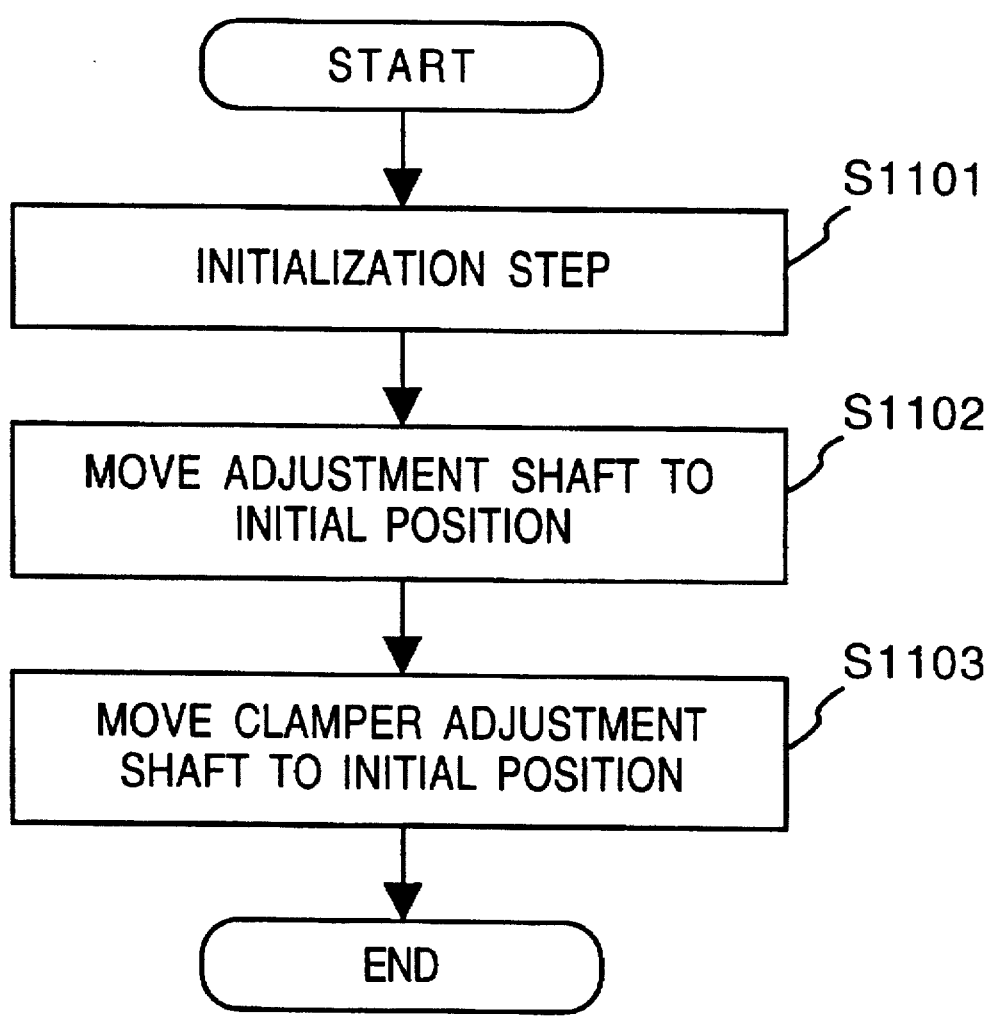
FIG. 11 is a flowchart showing the processing of a home-position restoration step in an embodiment of the invention.

FIG. 11 is a flowchart showing the processing of the home-position restoration step in an embodiment of the invention. This flowchart illustrates the details of the processing of step S816 in FIG. 8A.

Initialization to prepare for movement to the home position is performed at step S1101, the adjustment shafts (e.g., the axes of movement in FIGS. 3 and 4) are moved to their initial positions at step S1102, and the contact probe and workpiece clamper are moved to their initial positions at step S1103.

Figure 12:
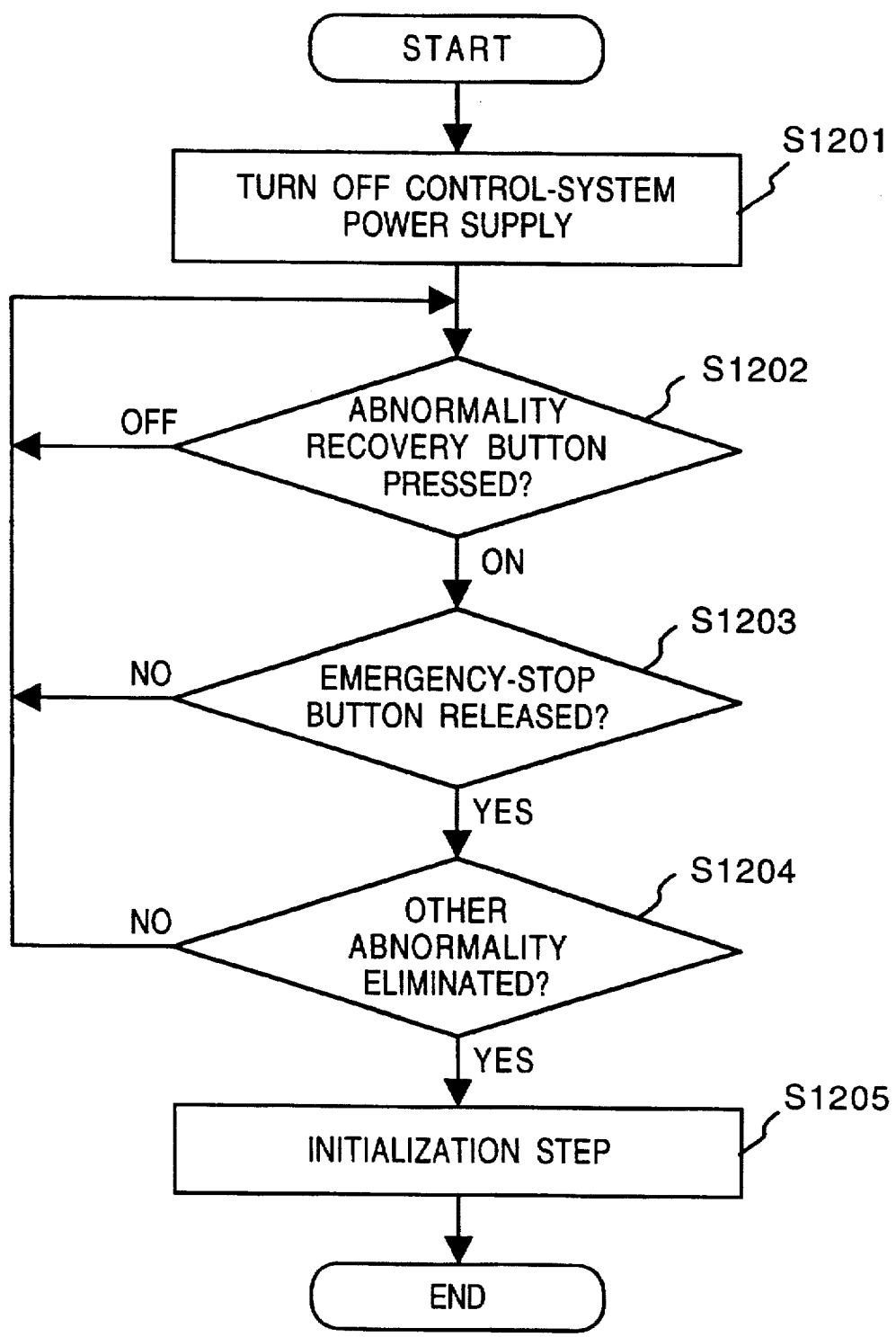
FIG. 12 is a flowchart showing the processing of an abnormality processing step in an embodiment of the invention.

FIG. 12 is a flowchart showing the processing of the abnormality processing step in the embodiment of the invention. This flowchart illustrates the details of the processing of step S808 in FIG. 8A.

The power supply of the control system is turned off at step S1201, it is determined at step S1202 whether an abnormality recovery button has been pressed. If the abnormality recovery button has not been pressed at step S1202, the program returns to step S1202 to determined whether an abnormality the recovery button has been pressed again. If the abnormality recovery button has been pressed at step S1202, it is determined at step S1203 whether an emergency-stop has been released. If the answer is "NO" at step S1203, the program returns to step S1202. If the answer is "YES" at step S1203, it is determined at step S1204 whether the abnormality has been eliminated. If the answer is "NO" at step S1204, the program returns to step S1202. If the answer is "YES" at step S1204, initialization following elimination of the abnormality is performed at step S1205.

Figure 13:
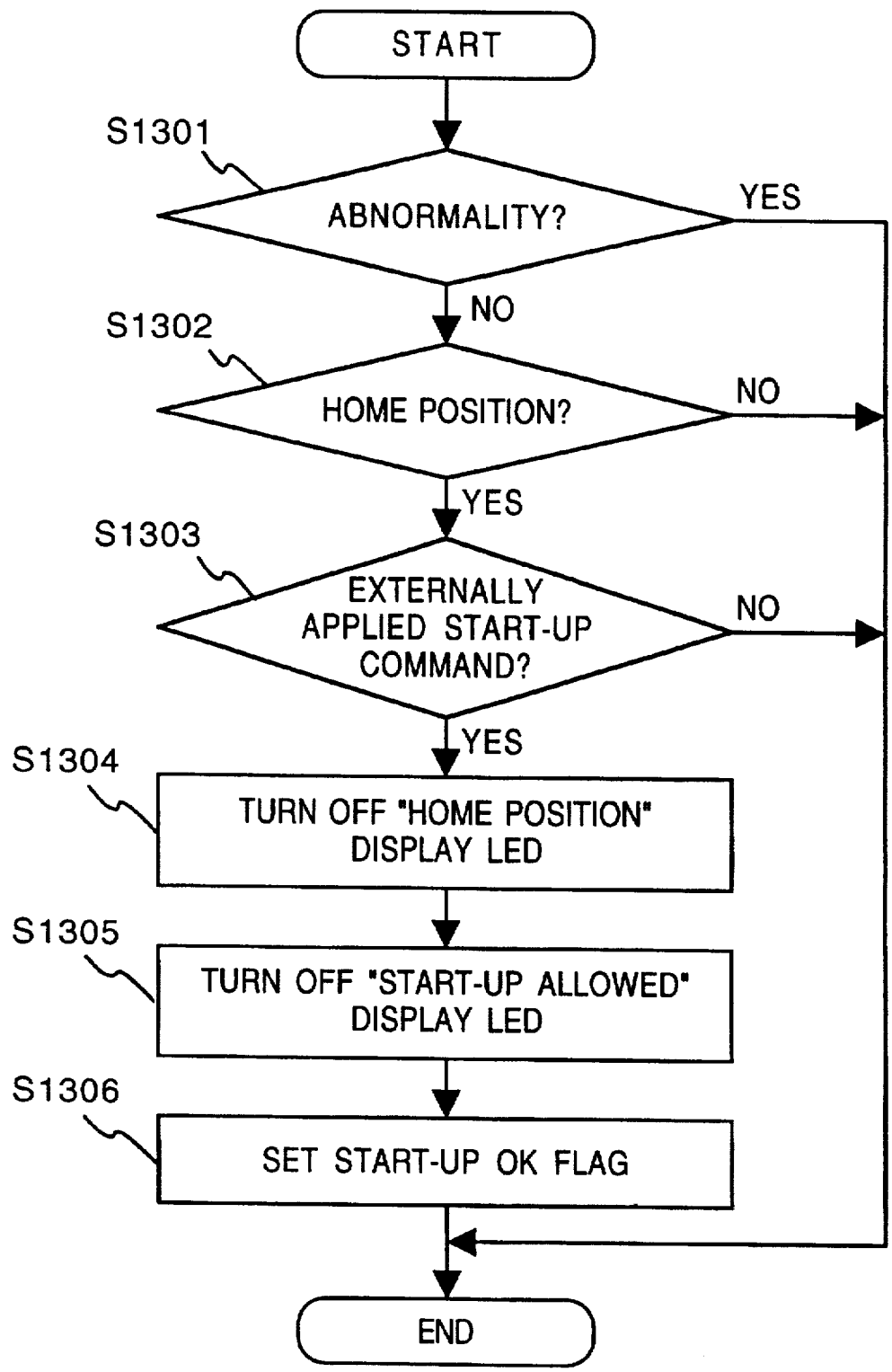
FIG. 13 is a flowchart showing an on-line pre-processing step in an embodiment of the invention.

FIG. 13 is a flowchart showing the first on-line pre-processing step in an embodiment of the invention. This flowchart illustrates the details of the processing of step S819 in FIG. 8B.

It is determined at step S1301 whether an abnormality exists, with processing being terminated if the answer is "YES". If the answer is "NO" at step S1301, it is determined at step S1302 whether each shaft of the adjusting/measuring apparatus 713 is at its home position. If the position is not the home position at step S1302, the processing is terminated. If the position is the home position at step S1302, it is determined at step S1303 whether a start-up command has been externally applied (e.g., from the conveyor side). If the start-up command has not been externally applied at step S1303, the processing is terminated. If the start-up command has been externally applied at step S1303, the an LED display indicative of the home position is turned OFF at step S1304, a display indicating that start-up is allowed is turned OFF at step S1305, and a start-up OK flag is set to OK at step S1306.

Figure 14:
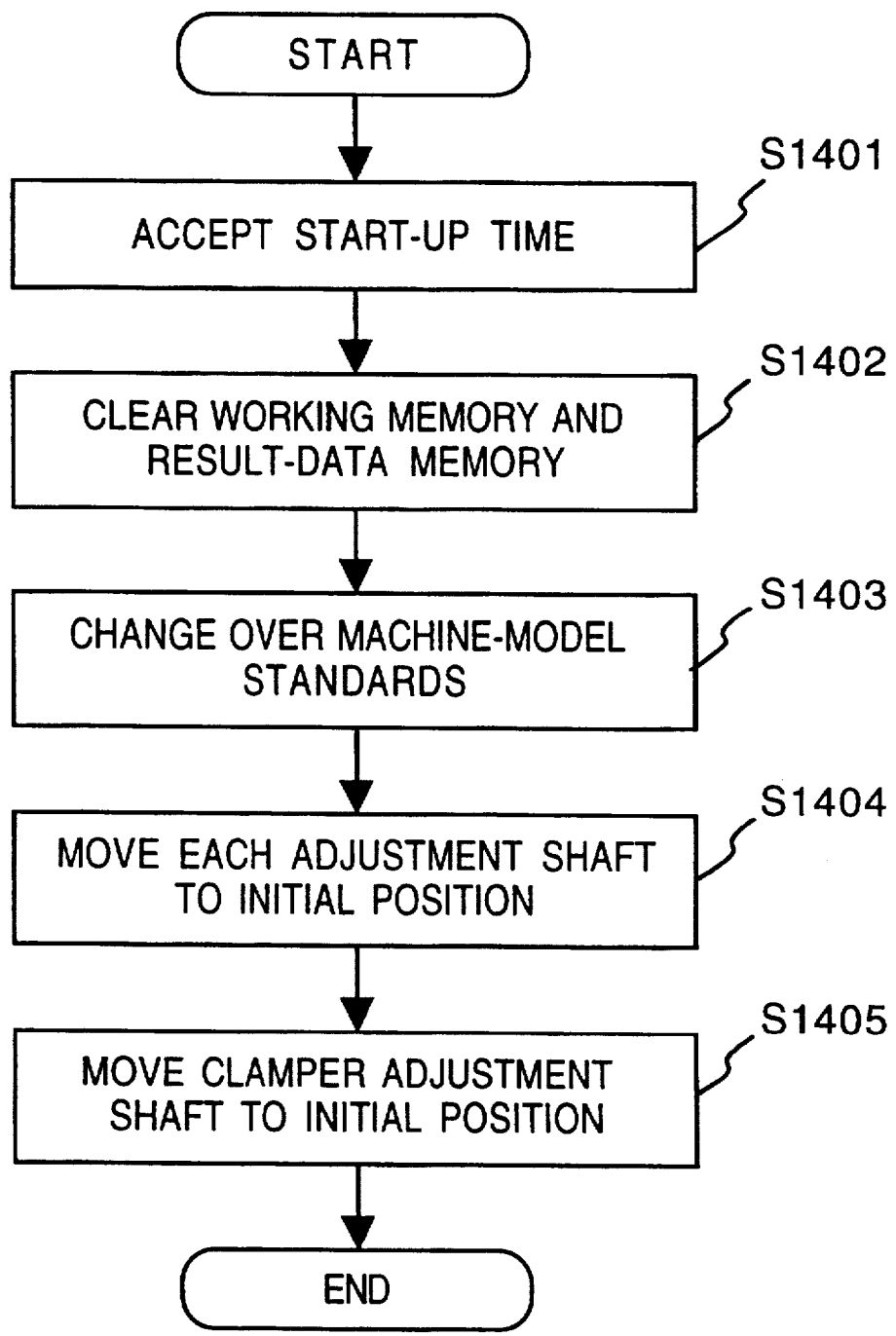
FIG. 14 is a flowchart showing an on-line pre-processing step in an embodiment of the invention.

FIG. 14 is a flowchart showing the second on-line preprocessing step in the embodiment of the invention. This flowchart illustrates the details of the processing of step S823 in FIG. 8B.

The time at which start-up was made is read in at step S1401, the buffer memory and the memory storing the result data is cleared at step S1402, the value of the standard is changed over depending upon the machine model data at step S1403, each adjustment shaft, e.g., each axis of movement in FIGS. 3 or 4, is moved to its initial position at step S1404, and the contact probe and workpiece clamper are moved to their initial positions at step S1405.

Figure 15:
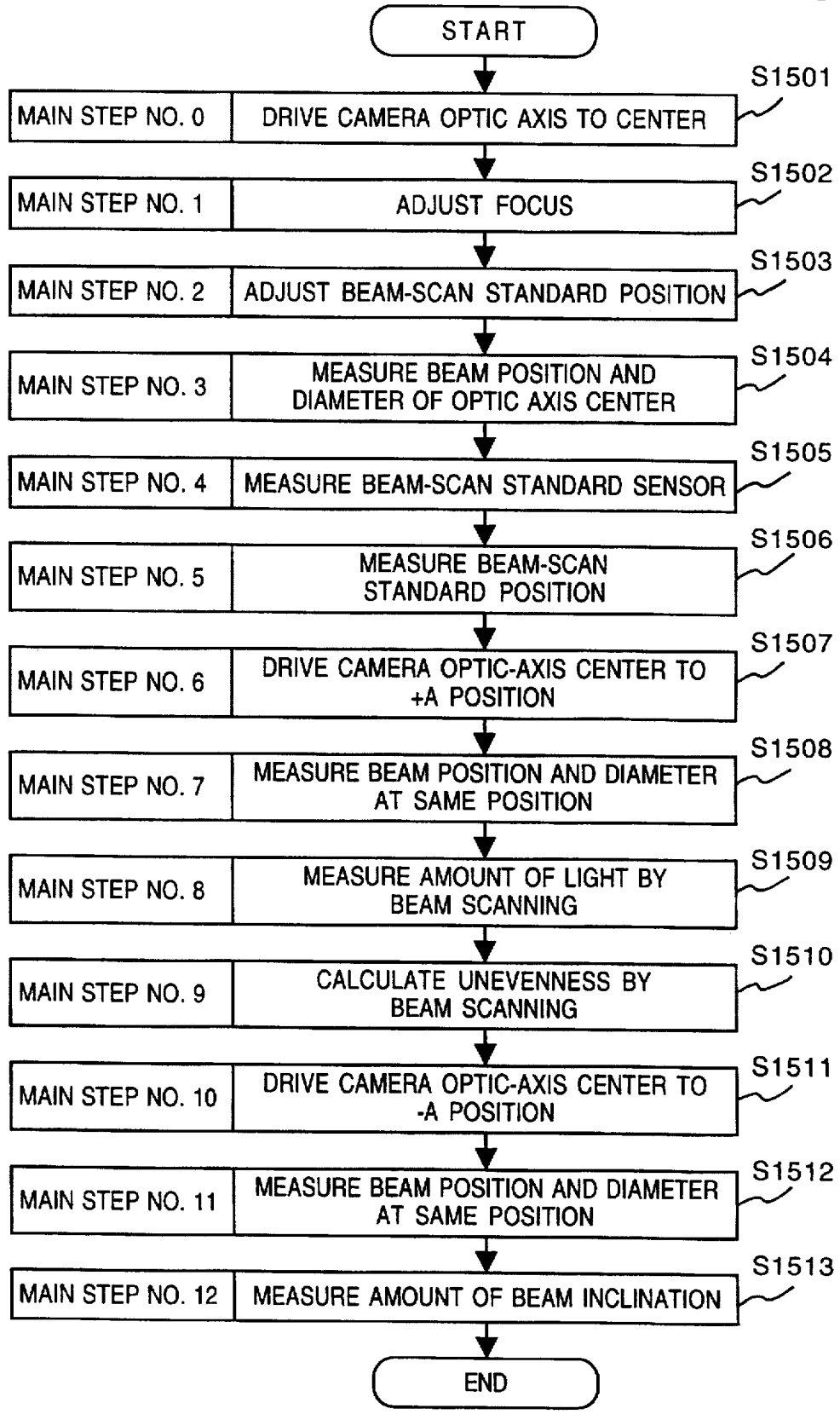
FIG. 15 is a flowchart showing on-line main processing steps in an embodiment of the invention.

FIG. 15 is a flowchart showing the on-line main processing steps in the embodiment of the invention. This flowchart illustrates the details of the processing of step S828 in FIG. 8B.

Step S1501 in FIG. 15 is a Main Step No. 0 for driving the optic axis of a camera to the center. Step S1502 is a Main Step No. 1 for adjusting focus. Step S1503 in FIG. 15 is a Main Step No. 2 for adjusting the beam scan to the standard position. Step S1504 in FIG. 15 is a Main Step No. 3 for measuring beam position and diameter at the center position of the optic axis. Step S1505 in FIG. 15 is a Main Step No. 4 for measuring the reference position at which beam scanning is performed. Step S1506 in FIG. 15 is a Main Step No. 5 for measuring a beam scan standard position is performed. Step S1507 in FIG. 15 is a Main Step No. 6 for driving camera focus to the plus A position relative to the center of the optic axis. Step S1508 in FIG. 15 is a Main Step No. 7 for measuring beam position and diameter at the position to which the camera has been moved at step S1507. Step S1509 in FIG. 15 is a Main Step No. 8 for measuring quantity of light by beam scanning. Step S1510 in FIG. 15 is a Main Step No. 9 for measuring unevenness in the quantity of light by beam scanning. Step S1511 in FIG. 15 is a Main Step No. 10 for driving camera focus to the minus A position relative to the center of the optic axis. Step S1512 in FIG. 15 is a Main Step No. 11 for measuring beam position and diameter at the position to which the camera has been moved at step S1511. Step S1513 in FIG. 15 is a Main Step No. 12 for measuring the amount of inclination of each surface of a polygon which reflects the laser beam when the beam is made to scan. Inclination is measured by changing the surface of the polygon and measuring a change in the height of the camera image.

Figure 16:
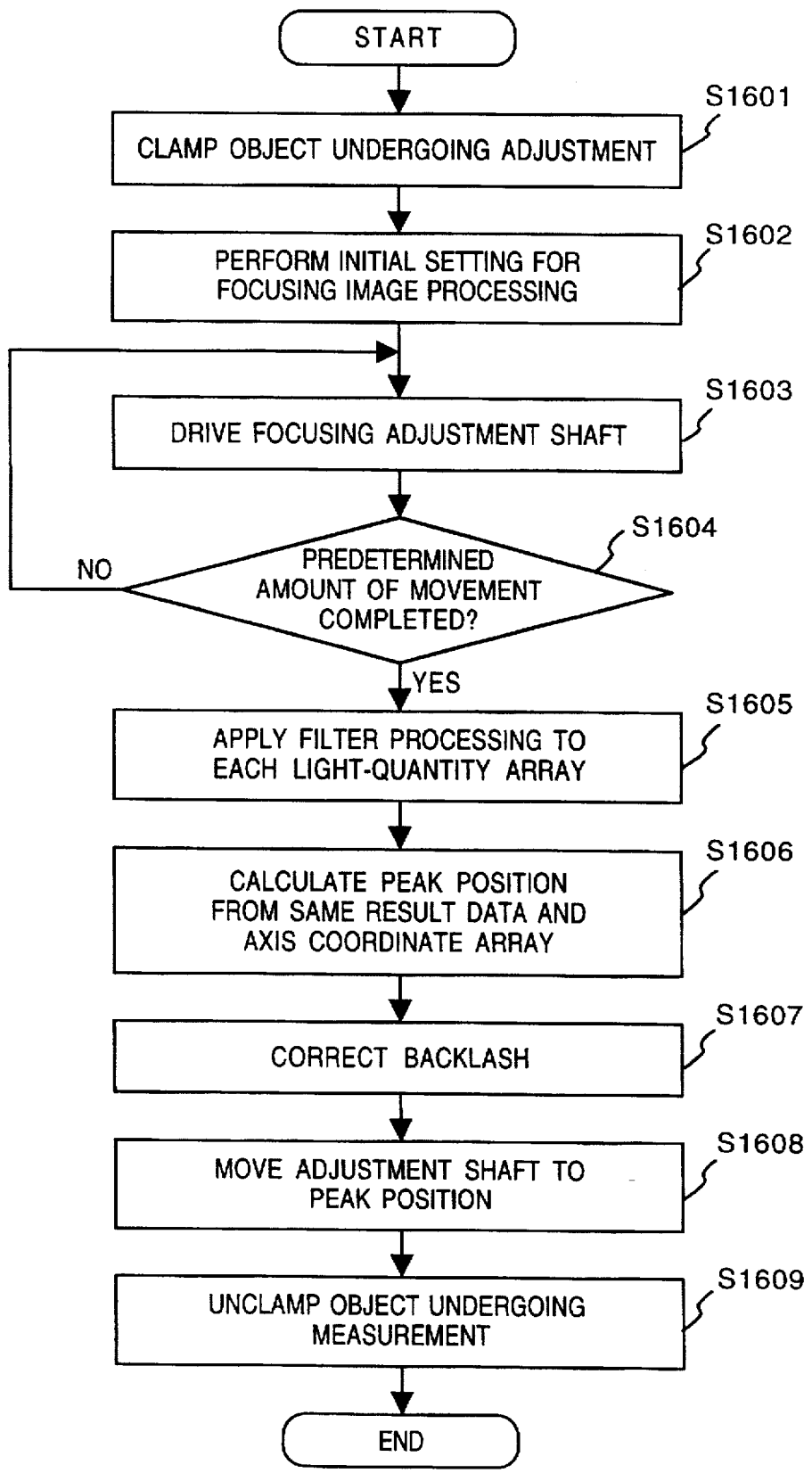
FIG. 16 is a flowchart showing a focusing processing routine (Main Step No. 1) in an embodiment of the invention.

FIG. 16 is a flowchart showing the focusing processing routine (Main Step No. 1) in an embodiment of the invention. This flowchart illustrates the details of the processing of step S1502 in FIG. 15.

The optical system 409 of the laser light source is clamped at step S1601. Initial setting of image processing for focusing is performed at step S1602. This is followed by step S1603, at which the shaft 404 for adjusting focus is driven a determined amount, the quantity of light prevailing at this time is measured, data representing position to which the focusing shaft is moved and data representing the quantity of light are stored in a variable memory array. It is determined at step S1604 whether the focus adjusting shaft has been moved a set amount. Next, at step S1605, the light-quantity data array measured at step S1603 is subjected to filter processing. This is followed by step S1606, at which the peak value is obtained from the light-quantity array data measured at step S1603 and the corresponding position on the focus coordinate axis is calculated. Backlash of the focusing drive shaft is corrected at step S1607. Next, at step S1608, the focus adjusting shaft 404 is moved to the position at which the peak of light quantity was obtained at step S1606. The optical system 409 of the laser light source is unclamped at step S1609.

Figure 17:
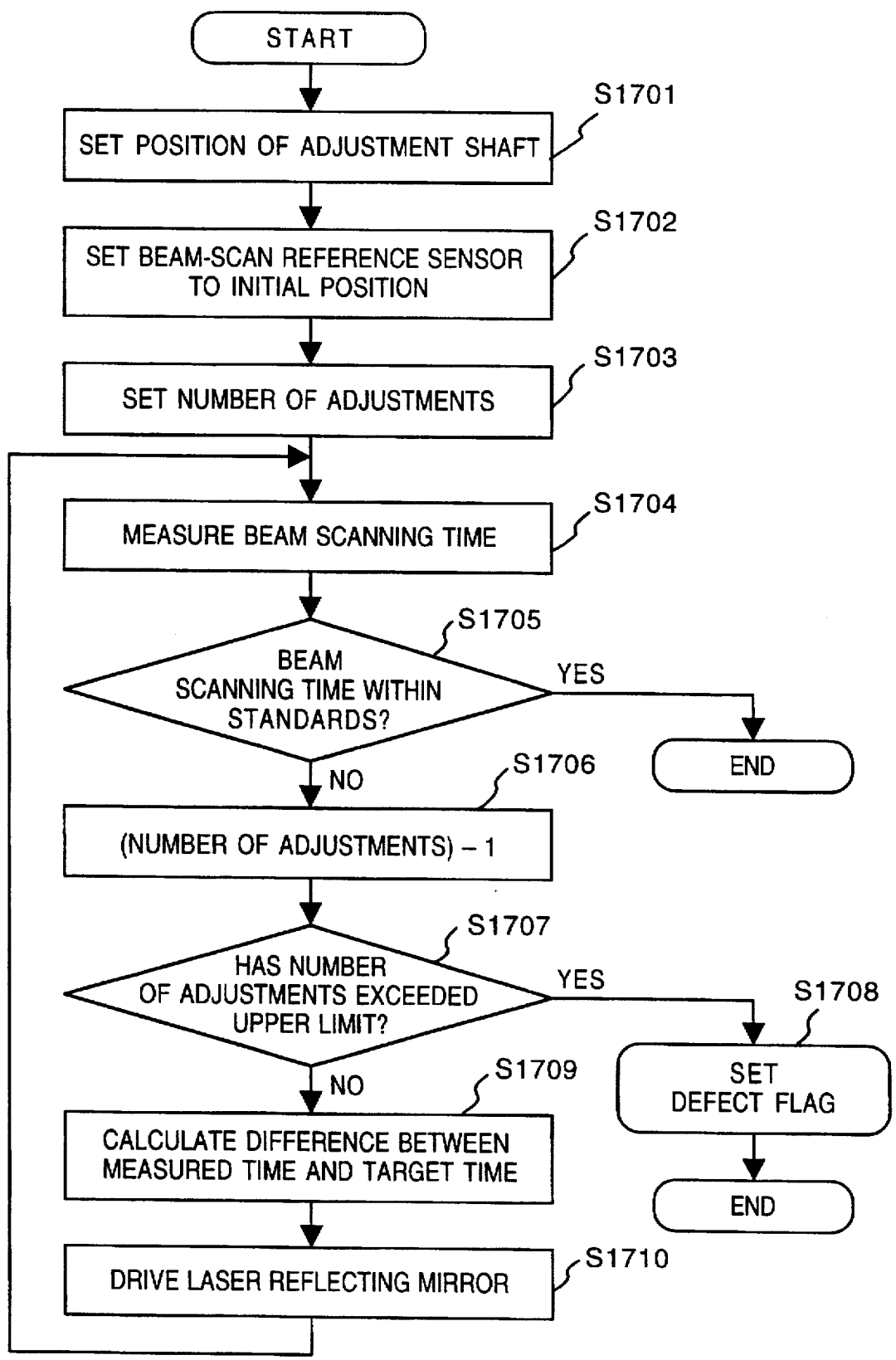
FIG. 17 is a flowchart showing a processing routine (Main Step No. 2) for adjusting the standard position of beam scanning in an embodiment of the invention.

FIG. 17 is a flowchart showing the processing routine (Main Step No. 2) for adjusting the standard position of beam scanning in an embodiment of the invention. This flowchart illustrates the details of the processing of step S1503 in FIG. 15.

Before the bit 301 is inserted into the mirror adjusting groove, the bit 301 is rotated to a position at which such insertion is possible at step S1701. The laser reflecting mirror serving as a sensor of the beam scanning reference position is moved to the initial position at step S1702. The upper limit of the number of adjustments is set at step S1703, and time required for scanning from the reference position to a predetermined position is measured at step S1704. It is determined at step S1705 whether the time measured at step S1704 falls within standards, and processing is terminated if the answer is "YES". The set number of adjustments is decremented at step S1706, and it is determined at step S1707 has exceeded the upper limit. If the upper limit is exceeded, a defect flag is set as the flag variable at step S1708 and processing is terminated. The difference between the time measured a step S1704 and a target time is calculated at step S1709. This is followed by step S1710, at which the amount of movement of the laser reflecting mirror corresponding to the time difference calculated at step S1709 is calculated and the mirror is driven by thisamount.

Figure 18:
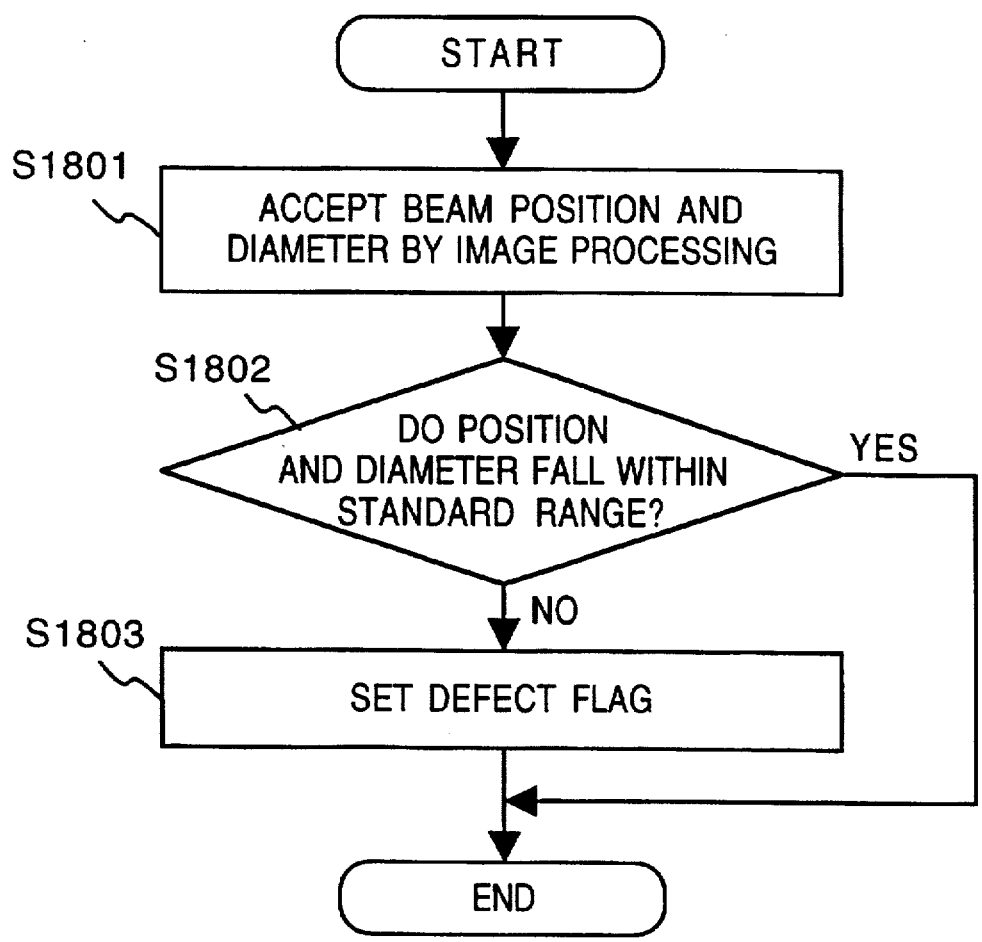
FIG. 18 is a flowchart showing a processing routine (Main Step No. 3) for measuring the beam position and diameter at the center position of the optic axis in an embodiment of the invention.

FIG. 18 is a flowchart showing a processing routine (Main Step No. 3) for measuring the beam position and diameter at the center position of the optic axis in an embodiment of the invention. This flowchart illustrates the details of the processing of step S1504 in FIG. 15.

At step S1801 in FIG. 18, numerical values of the beam position and diameter are read in upon applying image processing to the beam image captured by the camera 211. It is determined at step S1802 whether the data representing the position and diameter of the beam read in at step S1801 fall within the range of the standard, and processing is terminated if the answer is "YES". In a case where it is found at step S1802 that the data representing the position and diameter of the beam accepted at step S1802 are outside the range of the standard, flags indicating position and diameter defects are set in a prescribed memory.

Figure 19:
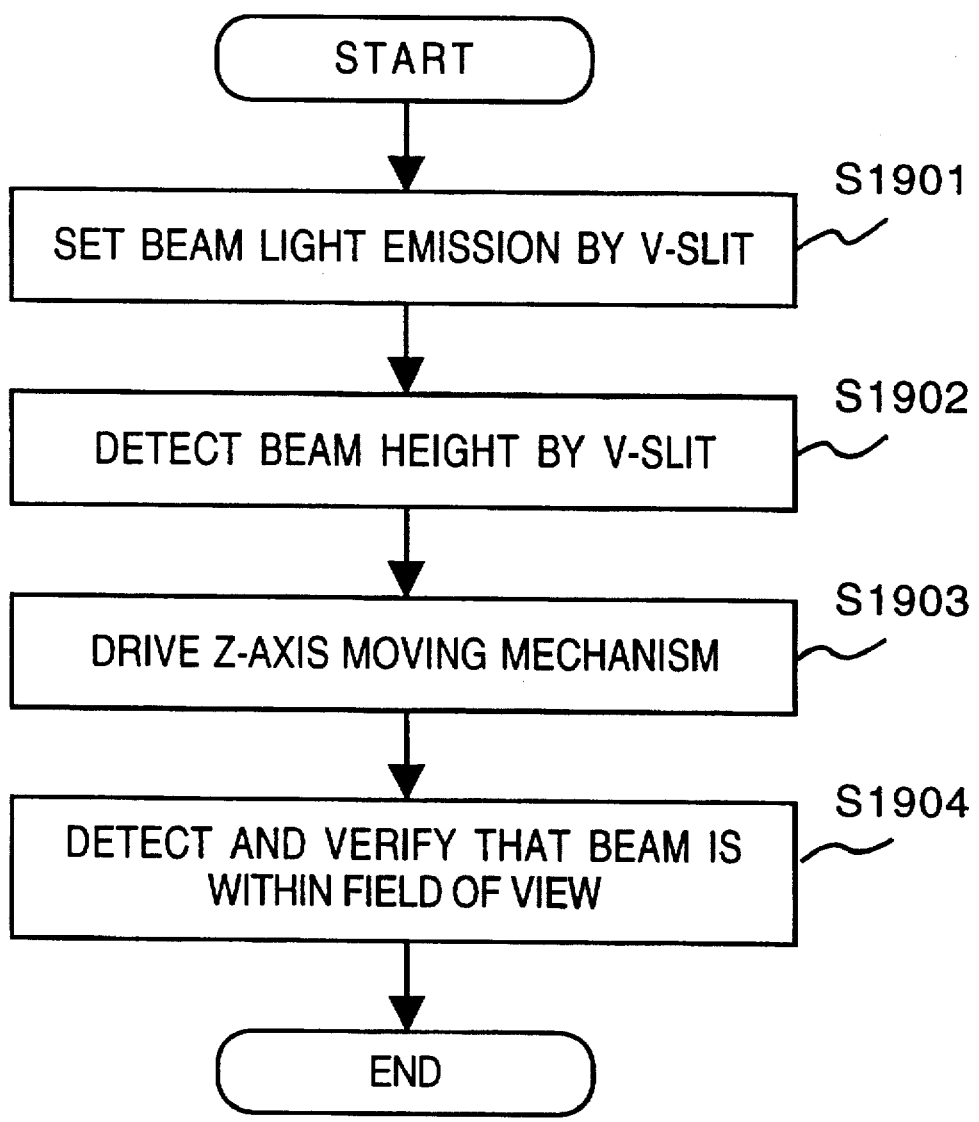
FIG. 19 is a flowchart showing a processing routine (Main Step No. 3) for driving the center of the optic axis to a +A position in an embodiment of the invention.

FIG. 19 is a flowchart showing a processing routine (Main Step No. 6) for driving the center of the optic axis to the +A position in the embodiment of the invention. This flowchart illustrates the details of the processing of step S1507 in FIG. 15.

The light-receiving mechanism 207, the optical system 209, the image sensing device 211 and the Z-axis moving mechanism 213 are moved to a predetermined position along the X axis at step S1901. The height of the beam from the position at which the beam crosses the V-shaped slit 502 is detected at step S1902. This is followed by step S1903, at which the Z-axis drive mechanism 213 is driven to move the light-receiving mechanism 207, the optical system 209 and the image sensing device 211 to the position detected at step S1902. Next, at step S1904, the beam image captured by the camera 211 is accepted following image processing and it is verified that the image falls within the field of view of the camera 211.

Figure 20:
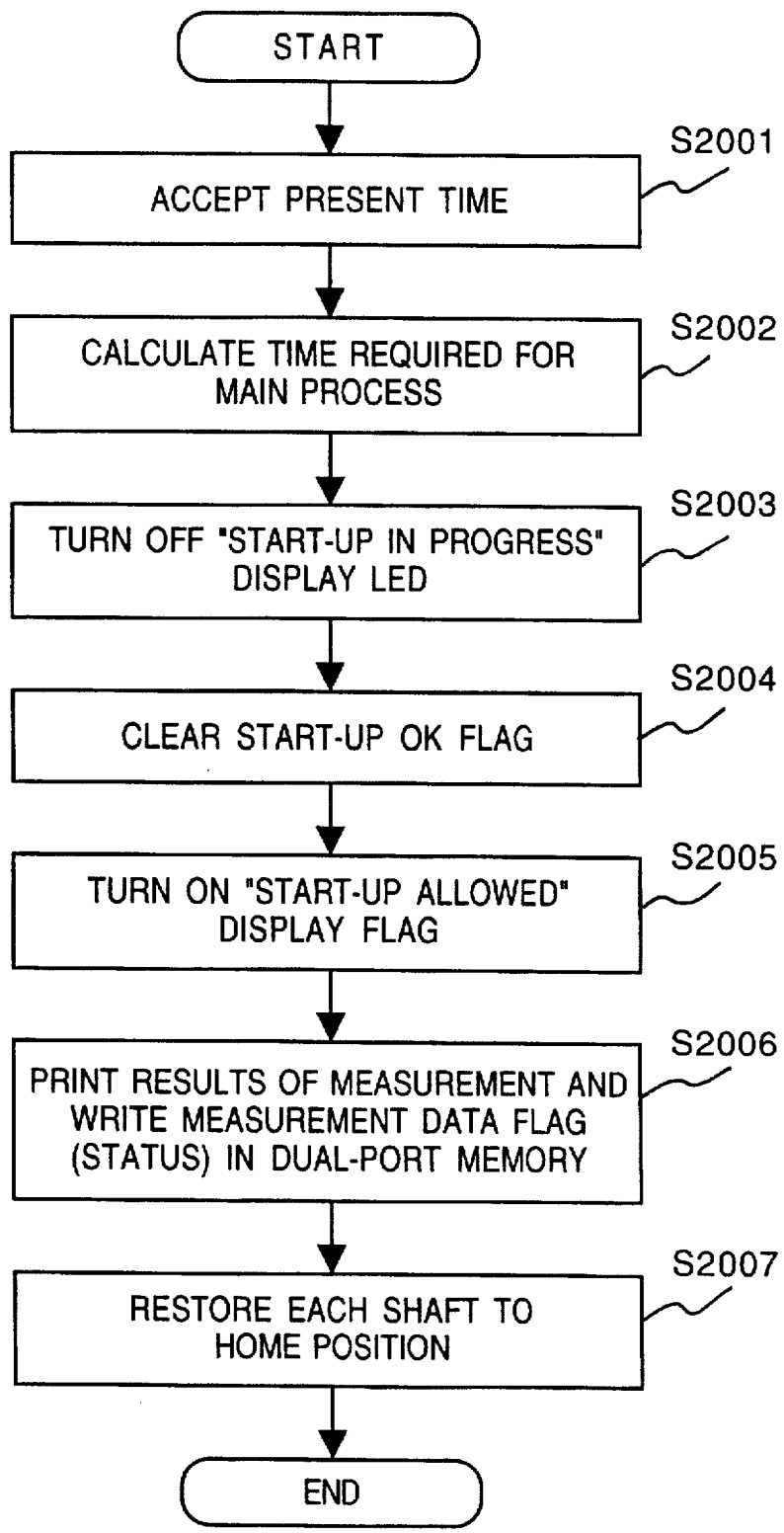
FIG. 20 is a flowchart showing an on-line post-processing step in an embodiment of the invention.

FIG. 20 is a flowchart showing the first on-line post-processing step in the embodiment of the invention. This flowchart illustrates the details of the processing of step S830 in FIG. 8B.

The present time is read in at step S2001 in FIG. 20. The difference between time read in at step S1401, which is the step for reading in start-up time, and the time read in at step S2001 is calculated, the time required for the main processing is obtained and this is written in a prescribed variable memory at step S2002. The LED indicating that start-up is in progress is extinguished at step S2003, the start-up OK flag is cleared at step S2004, and the LED display indicating that start-up is allowed is turned on at step S2005. Next, at step S2006, the results of measurement are printed out by the printer and, at the same time, data representing the final results of measurement and a flag indicating that one sequence (one workpiece) has ended are written in the status register of the dual-port memory 4501. Each shaft is then restored to its home position at step S2007.

Figure 21:
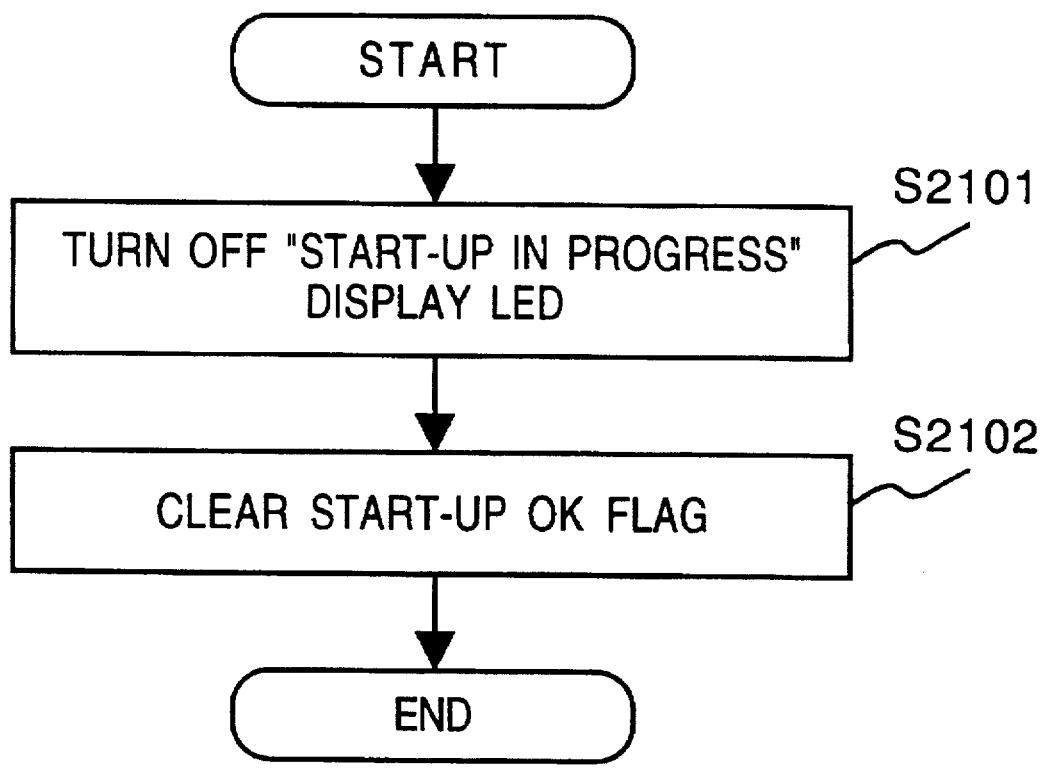
FIG. 21 is a flowchart showing an on-line post-processing step in an embodiment of the invention.

FIG. 21 is a flowchart showing the second on-line post-processing step in the embodiment of the invention. This flowchart illustrates the details of the processing of step S833 in FIG. 8B.

The LED indicative of the fact that start-up is in progress is extinguished at step S2101 in FIG. 21, and the start-up OK flag is cleared at step S2102.

2.2 Software architecture of monitor computer 701

The architecture of the software executed in the monitor computer 701 according to the embodiment of the invention will be described with reference to FIGS. 22–39 and FIGS. 49–64.

First, an overview of the flow of processing of the program executed in the monitor computer 701 will be described with reference to FIG. 22.

Figure 22:
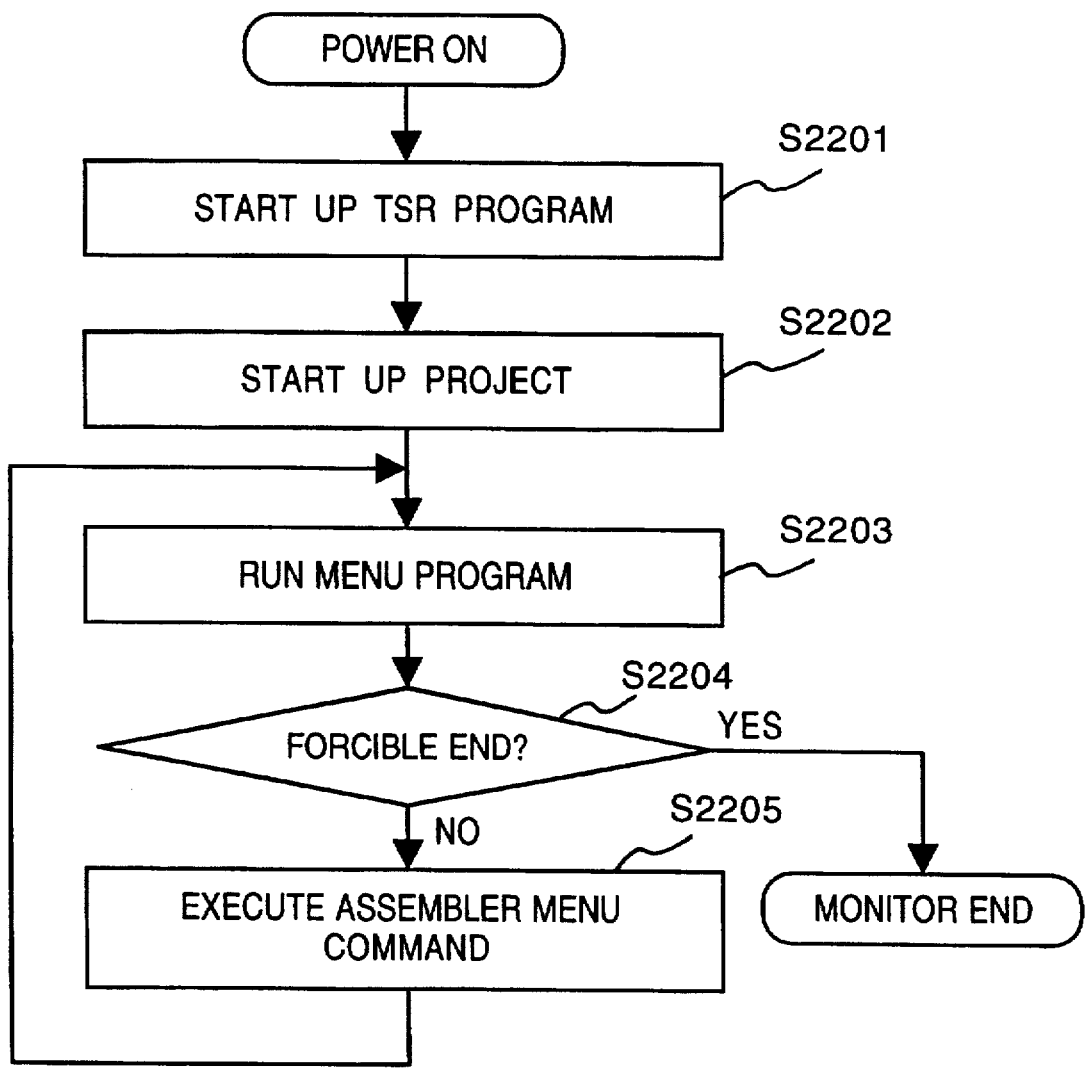
FIG. 22 is a flowchart showing the software of a monitor computer in an embodiment of the invention.

FIG. 22 is a flowchart showing the software of the monitor computer 101 (701) in an embodiment of the invention.

Step S2201 in FIG. 22 is for TSR program start-up processing. Specifically, step S2201 starts up a resident program (initial setting program) for starting up a program desired to be given residence in a memory in advance or for executing a program that performs each of the initial settings. This is followed by step S2202, at which project start-up processing is executed so that a user may start up a special-purpose project in conformity with the particular apparatus. Menu program processing for displaying a menu is performed at step S2203. It is determined at step S2204 whether the monitor computer program is to be terminated. If the answer is "YES" at step S2204, the program is terminated. If the answer is "NO" at step S2204, then command execution processing for executing a command is performed at step S2205 and the processing returns to step S2203.

Figure 23:
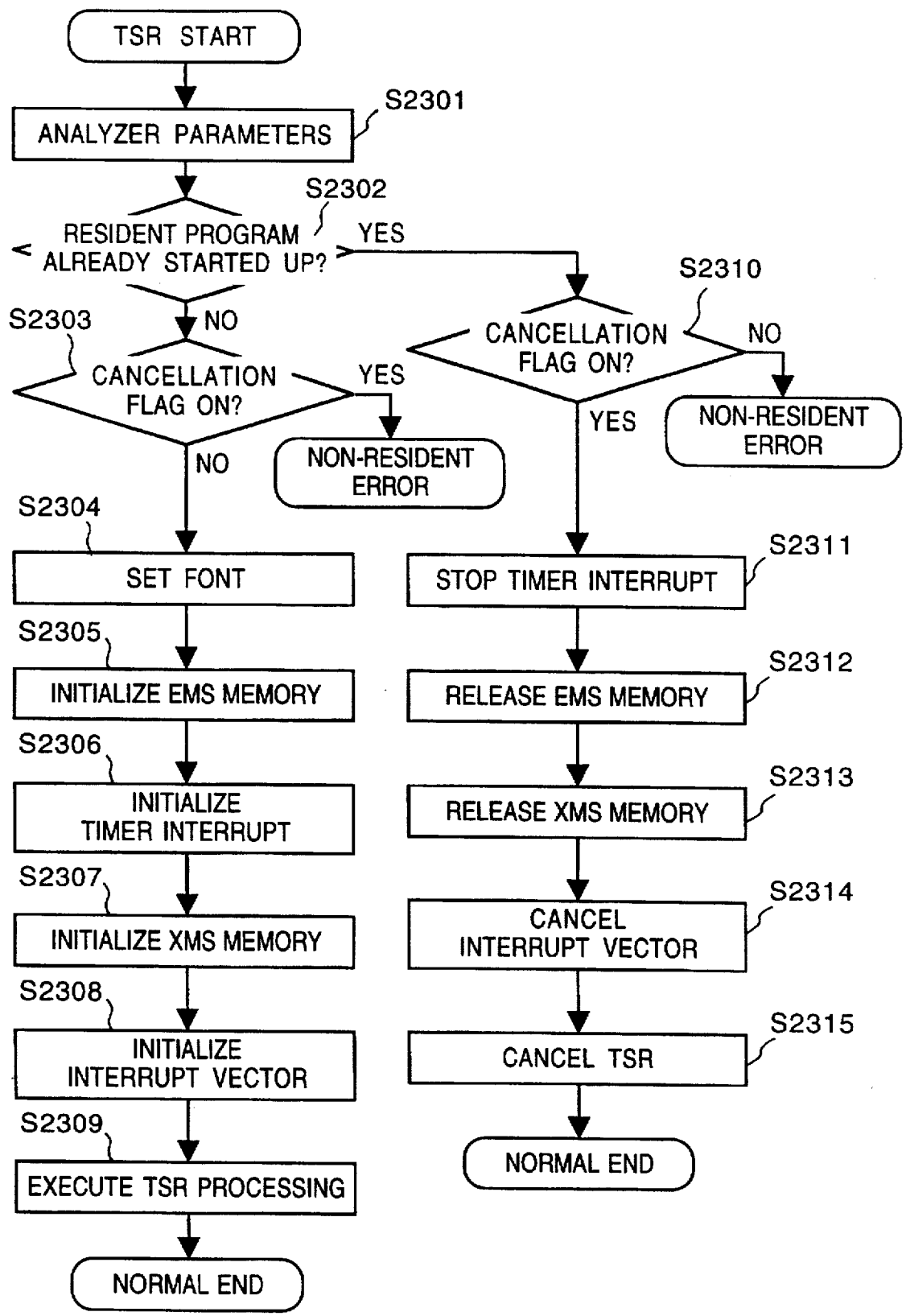
FIG. 23 is a flowchart of TSR program start-up processing for starting up a resident program in an embodiment of the invention.

FIG. 23 is a flowchart of TSR program start-up processing for starting up the resident program in the embodiment of the invention. This flowchart illustrates the details of the processing of step S2201 in FIG. 22.

The current set status of parameters is read at step S2301 in FIG. 23. It is determined at step S2302 whether the resident program has already been started up. If the answer is "NO" at step S2302, it is determined at step S2303 whether the initial settings should be canceled. If the answer is "YES" at step S2303, processing is terminated. If the answer is "NO" at step S2303, a font setting is performed at step S2304, an EMS memory is initialized at step S2305, timer-interrupt initialization is performed at step S2306, an XMS memory is initialized at step S2307, an interrupt vector for setting a destination address to which processing jumps at interrupt is initialized at step S2308, and TRS processing for reading in the program to be made resident is performed at step S2309. In a case where the resident program has already been started up at step S2302, it is determined at step S2310 whether the initial settings should be canceled. If the answer is "NO" at step S2310, processing is terminated. If the answer is "YES" at step S2310, timer interrupt is halted at step S2311, the EMS memory is released at step S2312, the XMS memory is released at step S2313, an interrupt vector for canceling the interrupt destination address is canceled at step S2314, and TRS cancellation processing for canceling the resident program is performed at step S2315.

Figure 24A:
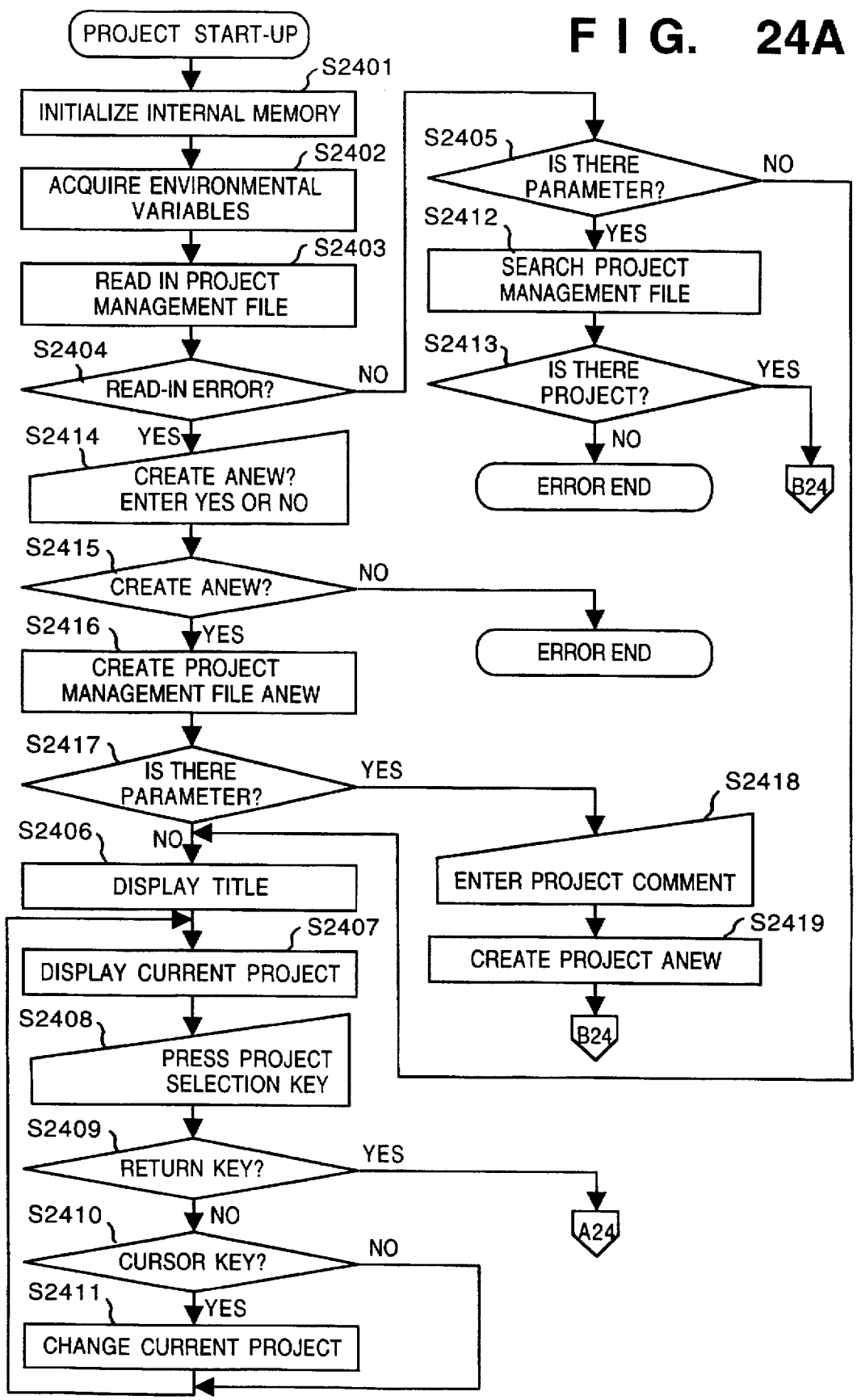
FIGS. 24A and 24B are flowcharts of project start-up processing in an embodiment of the invention.
Figure 24B:
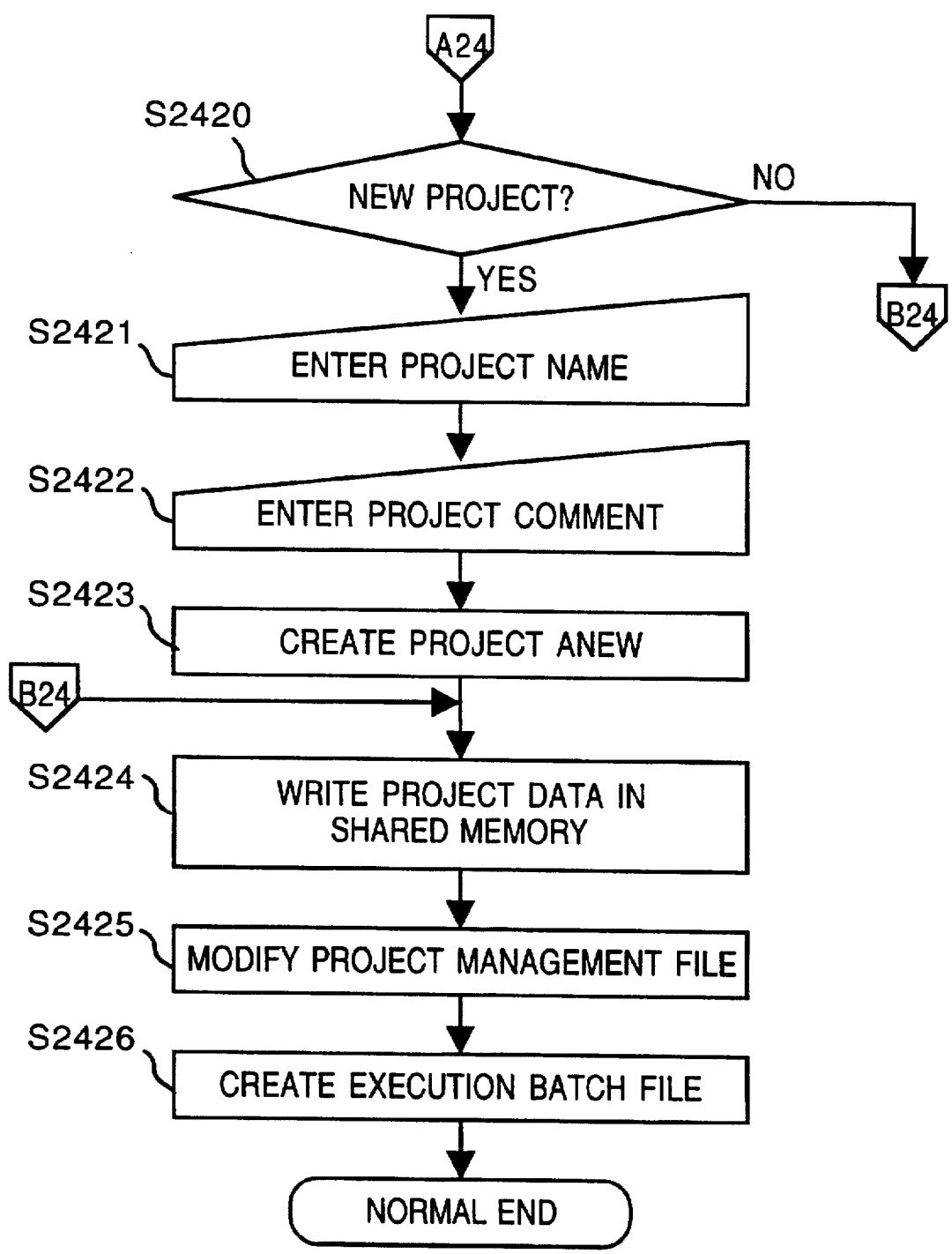

FIGS. 24A and 24B are a flowchart of project start-up processing in an embodiment of the invention. This flowchart illustrates the details of the processing of step S2202 in FIG. 22.

A memory shared by applications is initialized at step S2401 in FIG. 24A, and environmental variables such as FIS, FINC, TMP and ML are obtained at step S2402. Next, at step S2403, setting data is read in from a file dedicated to the apparatus. It is determined at step S2404 whether an error has occurred at read-in of the project management file at step S2403. If the answer is "YES" at step S2404, processing is proceeded to step S2414. If the answer is "NO" at step S2404, it is determined at step S2405 whether there is a project file parameter. When there is a project file parameter at step S2405, the project management file is searched to find project at step S2412. After that, it is determined at step S2413 whether there is a project. When there is no project at step S2413, processing is terminated. On the other hand, when there is a project at step S2413, processing proceeds to step S2424. When there is not a project file parameter at step S2405, a title is displayed on a monitor at step S2406, and the presently existing project name is displayed at step S2407.

Steps S2408 to S2411 constitute a project selection routine. It is required to press a project selection key at step S2408. It is determined at step S2409 whether the return key is pressed at step S2408. If the answer is "YES" at step S2409, processing proceeds to step S2420. If the answer is "NO" at step S2409, it is determined at step S2410 whether the cursor key is pressed at step S2408. If the answer is "NO" at step S2410, processing returns to step S2407. If the answer is "YES" at step S2410, the presently existing project is changed at step S2411 and processing returns to step S2407.

Processing from step S2414 onward is a routine for creating a project anew. Specifically, whether a project is to be created anew is entered at step S2414. It is determined at step S2415 whether a project is to be created anew. If the answer is "NO" at step S2415, processing is terminated. If the answer is "YES" at step S2415, the file for the new project is created anew at step S2416. It is determined at step S2417 whether there is a project file parameter. When there is a project file parameter at step S2417, it is required to enter a project comment at step S2418. After a project comment is entered at step S2418, a new project is created at step S2419, and processing proceeds to step S2424. On the other hand, when there is no project file parameter at step S2417, processing proceeds to step S2406.

It is determined whether the project is a new project at step S2420. If the answer is "NO" at step S2420, processing proceeds to step S2424. If the answer is "YES" at step S2420, the name of the new project is entered at step S2421, and a project comment is entered at step S2422. A new project is created at step S2423 based upon the entered data. The data of the selected project are written in the internal memory at step S2424, the data file for managing the project is updated at step S2425, and a batch file for executing the menu program is created at step S2426.

Figure 25:
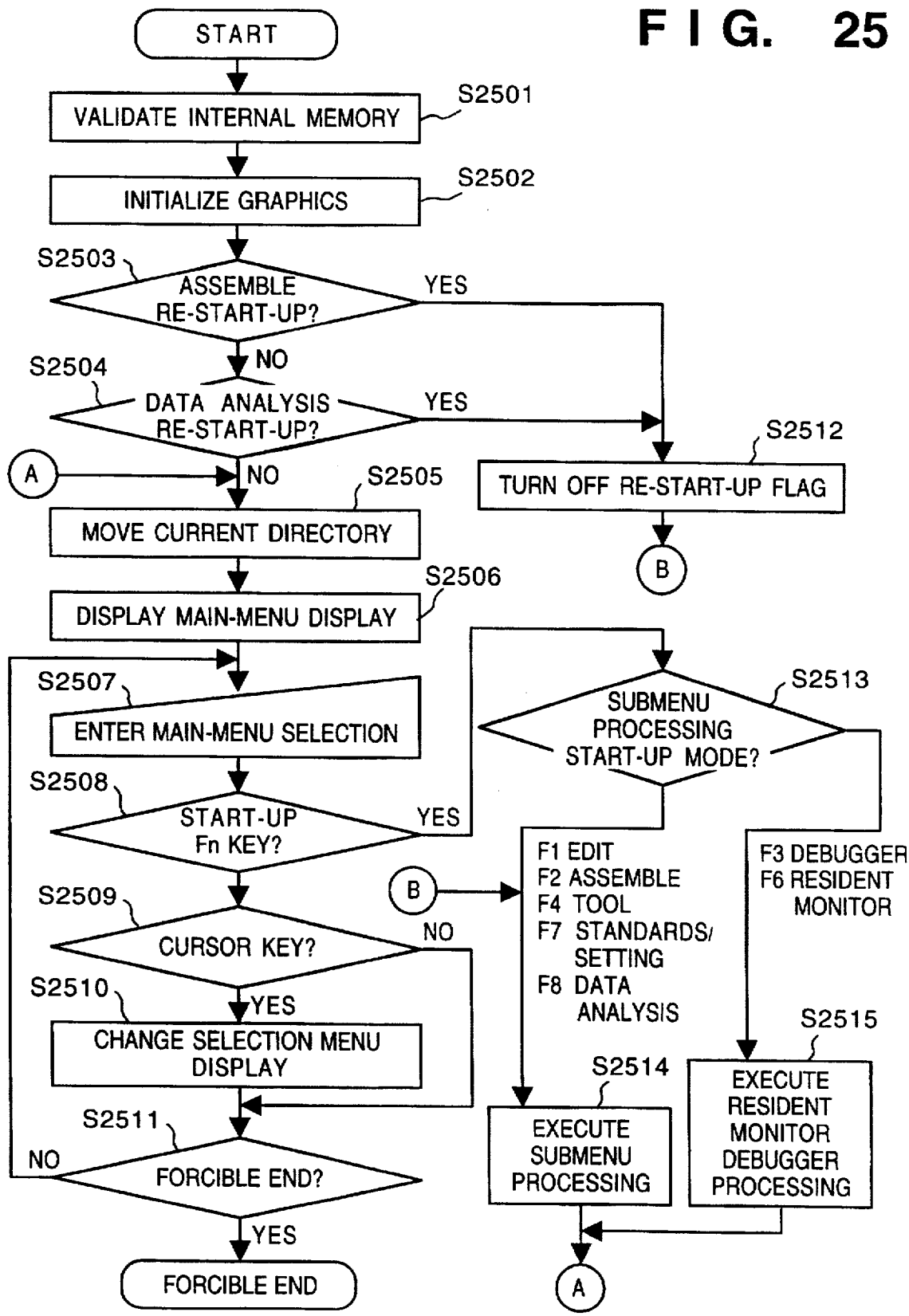
FIG. 25 is a flowchart showing a menu program in an embodiment of the invention.

FIG. 25 is a flowchart showing the menu program according to the embodiment of the invention. This flowchart illustrates the details of the processing of step S2203 in FIG. 22.

Step S2501 in FIG. 25 calls for it to be so arranged that a shared memory can be used between applications. A graphics file is read in a VRAM at step S2502, and it is determined at step S2503 whether assemble processing is to be started up. If the answer is "NO" at step S2503, it is determined at step S2504 whether data analysis processing is to be started up. A re-start-up flag is turned OFF at step S2512 in a case where the assemble processing of step S2503 or the data analysis processing of step S2504 is started up. If the answer is "NO" at step S2504, processing moves to the current directory at step S2505. A main menu is displayed on the screen of the monitor (102) at step S2506.

Processing from step S2507 onward is a main-menu selection routine. A menu display is presented on the screen at step S2506 and a selection input from the main menu is accepted at step S2507. It is determined at step S2508 whether a start-up key (return key) has been pressed. If the answer is "YES" at step S2508, the program proceeds to step S2513. If the answer is "NO" at step S2508, it is determined at step S2509 whether a cursor key has been pressed. If the answer is "NO" at step S2509, processing proceeds to step S2511. If the answer is "YES" at step S2509, a change selection menu is displayed on the screen of the monitor (102) at step S2510. If, during execution of the loop of steps from S2507 to S2511, forcible termination is designated at step S2511, the processing program of the monitor computer 701 is terminated. If a "NO" decision is rendered at step S2511, then the program returns to step S2507.

Depending upon the type of function key selected, it is determined at step S2513 whether to execute submenu processing or monitor processing and debugger processing for notifying the control computer 702. Submenu processing is executed at step S2514. This is processing for starting up editing of a special-purpose language program, assembling, setting of standards and the like, data analysis and tools for achieving these tasks. Step S2515 calls for execution of monitor processing to monitor the operation of the control computer 702 and debugger processing to debug the execution of processing by the control computer 702.

Figure 26A:
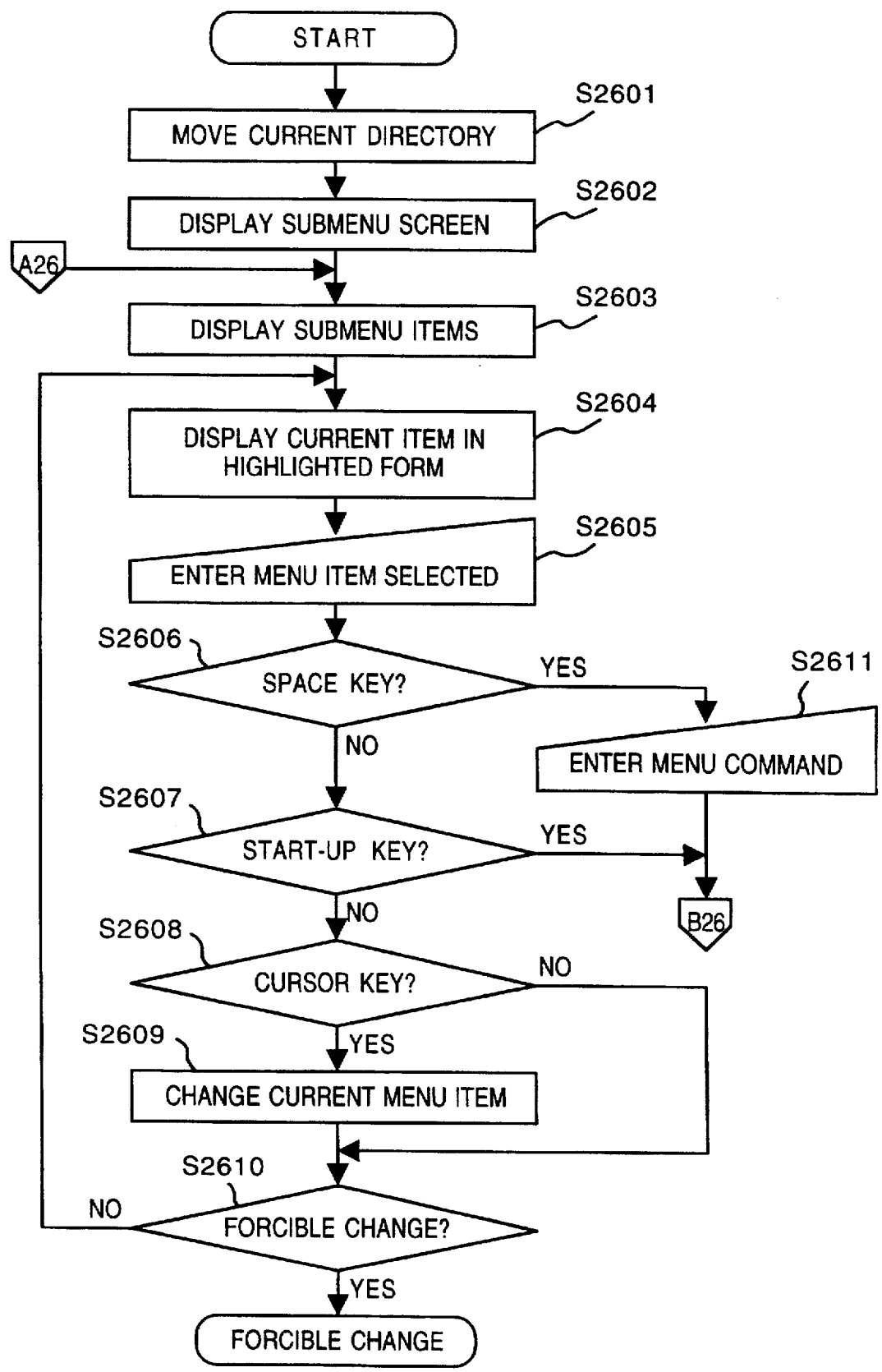
FIGS. 26A and 26B are flowcharts showing a submenu program in an embodiment of the invention.
Figure 26B:
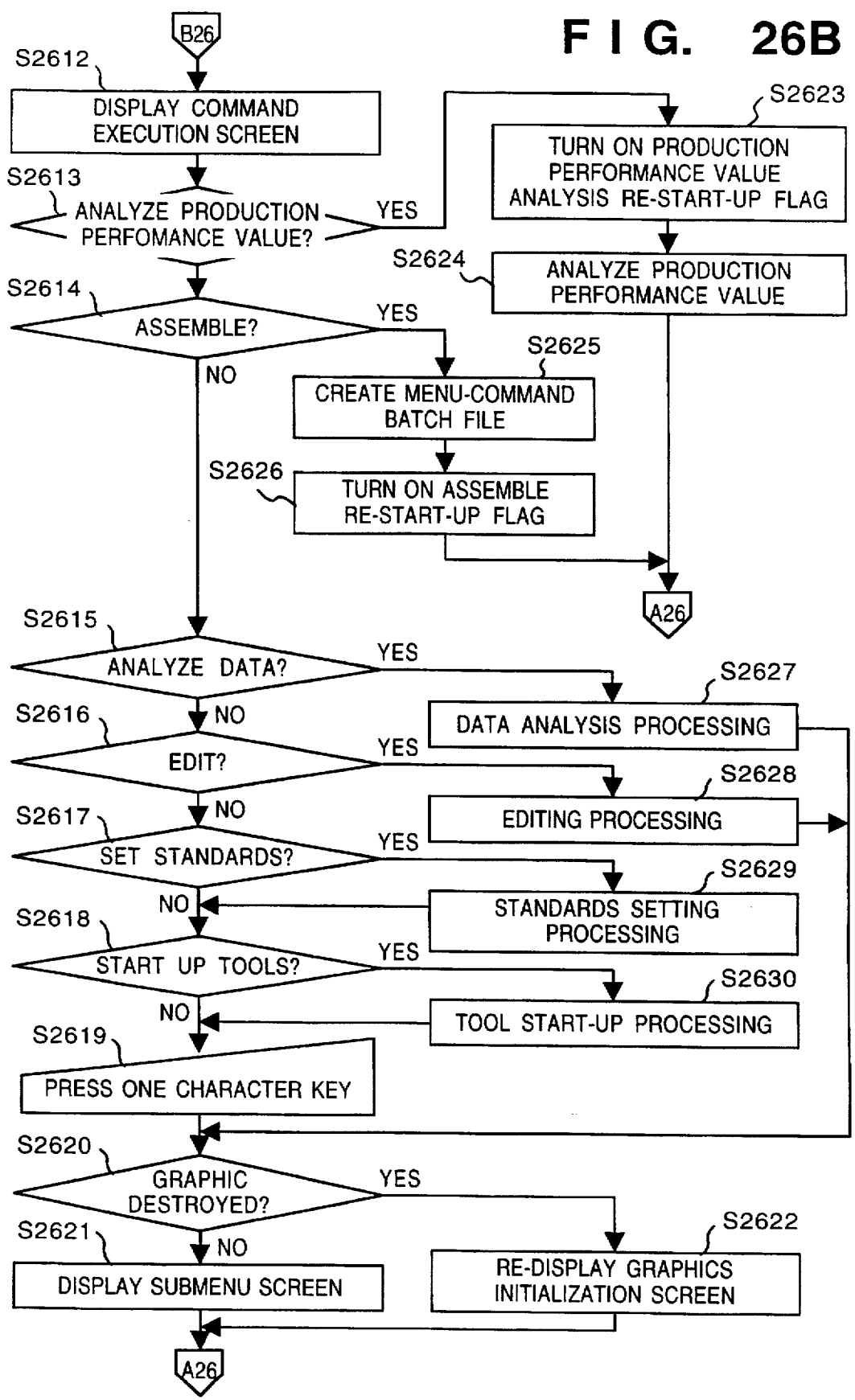

FIGS. 26A, 26B are flowcharts showing the submenu program according to this embodiment of the invention. This flowchart illustrates the details of the processing of step S2514 in FIG. 25.

Processing moves to the current directory at step S2601. Graphic data is read in the VRAM and a submenu screen display is presented at step S2602. Submenu items are displayed at step S2603. The display of a current item is highlighted at step S2604. A submenu item is selected at step S2605. It is determined at step S2606 whether a space key has been pressed. If the space key has not been pressed at step S2606, it is determined at step S2607 whether a start-up key (e.g., the return key) has been pressed. If the start-up key has been pressed at step S2607, a screen for executing the command is displayed at step S2612. If the start-up key has not been pressed at step S2607, it is determined at step S2608 whether a cursor key has been pressed. If the cursor key has not been pressed at step S2608, the program is proceeded to step S2610. If the cursor key has been pressed at step S2608, the menu item is updated at step S2609. It is determined at step S2610 whether the program of the monitor computer 701 is to be terminated. If the space key has been pressed at step S2606, a command input is accepted at step S2611, and a screen for executing the command is displayed at step S2612.

Steps from S2613 to S2618 constitute a routine for selecting a command to be executed. Specifically, a selection is made among analysis of production performance values, assemble execution, execution of data analysis, editing processing, setting of standards and tool program (software available on the market or software created by the user). The items selected at steps S2623 through S2630 are executed. The production performance value is used below as a generic expression of data relating to the production performance of the production line, such as the success rate (number) of manufactured articles, the failure rate (number) of the manufactured articles and the rate of operation of the production line.

If an item for analyzing the production performance value has been selected from the menu at step S2613, i.e., a "YES" decision is rendered at step S2613, the re-start-up flag is turned on at step S2623 and a program for computing the production performance value and for displaying the screen is read in at step S2624. After that, the program returns to step S2603.

If a "NO" decision is rendered at step S2613, and an item for assembling has been selected from the menu at step S2614, a menu-command batch file is created at step S2625 and the re-start-up flag is turned on at step S2626. After that, the program returns to step S2603. On the other hand, if an item for assembling has not been selected from the menu at step S2614, the program proceeds to step S2615.

If an item for analyzing data has been selected from the menu at step S2615, data analysis processing is executed at step S2627, and the program proceeds to step S2620.

If the item for the analyzing data has not been selected from the menu at step S2615 and an item for editing has been selected from the menu at step S2616, editing processing is executed at step S2628, and the program proceeds to step S2620.

If the item for the editing has not been selected from the menu at step S2616 and an item for setting standards has been selected from the menu at step S2617, standards setting processing is executed at step S2629, and the program proceeds to step S2618.

If the item for the setting standards has not been selected from the menu at step S2617 and an item for start-up tool has been selected from the menu at step S2618, tool start-up processing is executed at step S2630, and the program proceeds to step S2619.

If the item for the start-up tool has not been selected from the menu at step S2618 and one of any character key is pressed at step S2619, the program proceeds to step S2620.

It is determined at step S2620 whether a displayed graphic is being destroyed. If the answer is "YES", then the graphic screen is initialized and the screen is re-displayed at step S2622. If the answer is "NO," a submenu is displayed at step S2621.

Figure 27:
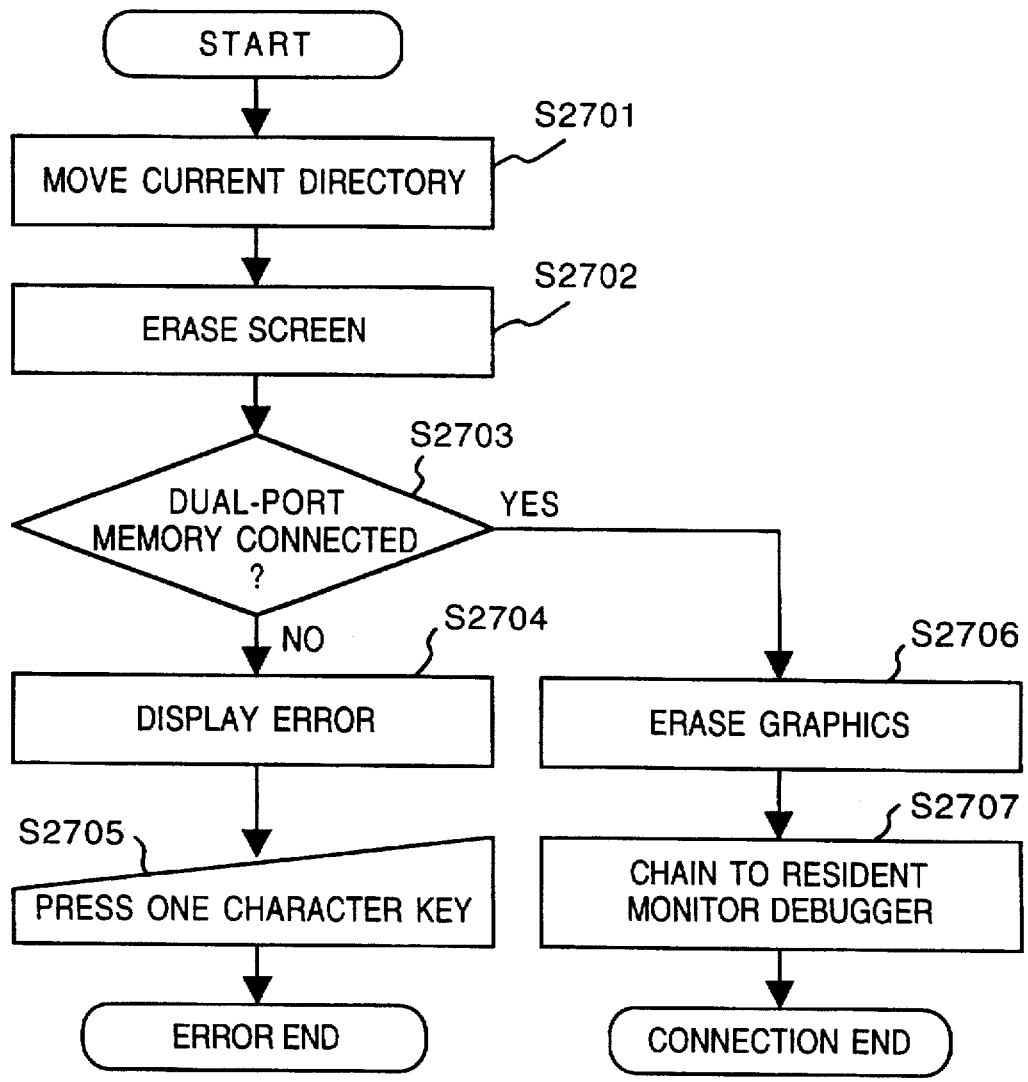
FIG. 27 is a flowchart showing a program for starting up a resident monitor debugger in an embodiment of the invention.

FIG. 27 is a flowchart showing a program for starting up a resident monitor debugger according to an embodiment of the invention. This flowchart illustrates the details of the processing of step S2515 in FIG. 25.

At step S2701, processing moves to a current directory that has already been selected. The screen is erased at step S2702.

It is determined at step S2703 whether the dual-port memory 4501 is connected. If it is determined that the dual-port memory 4501 has been connected at step S2703, the program proceeds to step S2706, at which the graphics are erased, and then to step S2707, at which the processing for starting up the resident monitor and debugger program is executed for executing monitor processing of the control computer 702 and for performing debugging of processing execution of the control computer 702. After that, the connection to the dual-port memory 4501 is ended. On the other hand, if it is determined that the dual-port memory 4501 has not been connected at step S2703, error is displayed on the monitor at step S2704, and key input processing is executed to correct the error at step S2705. After that, the processing is terminated.

Figure 28:
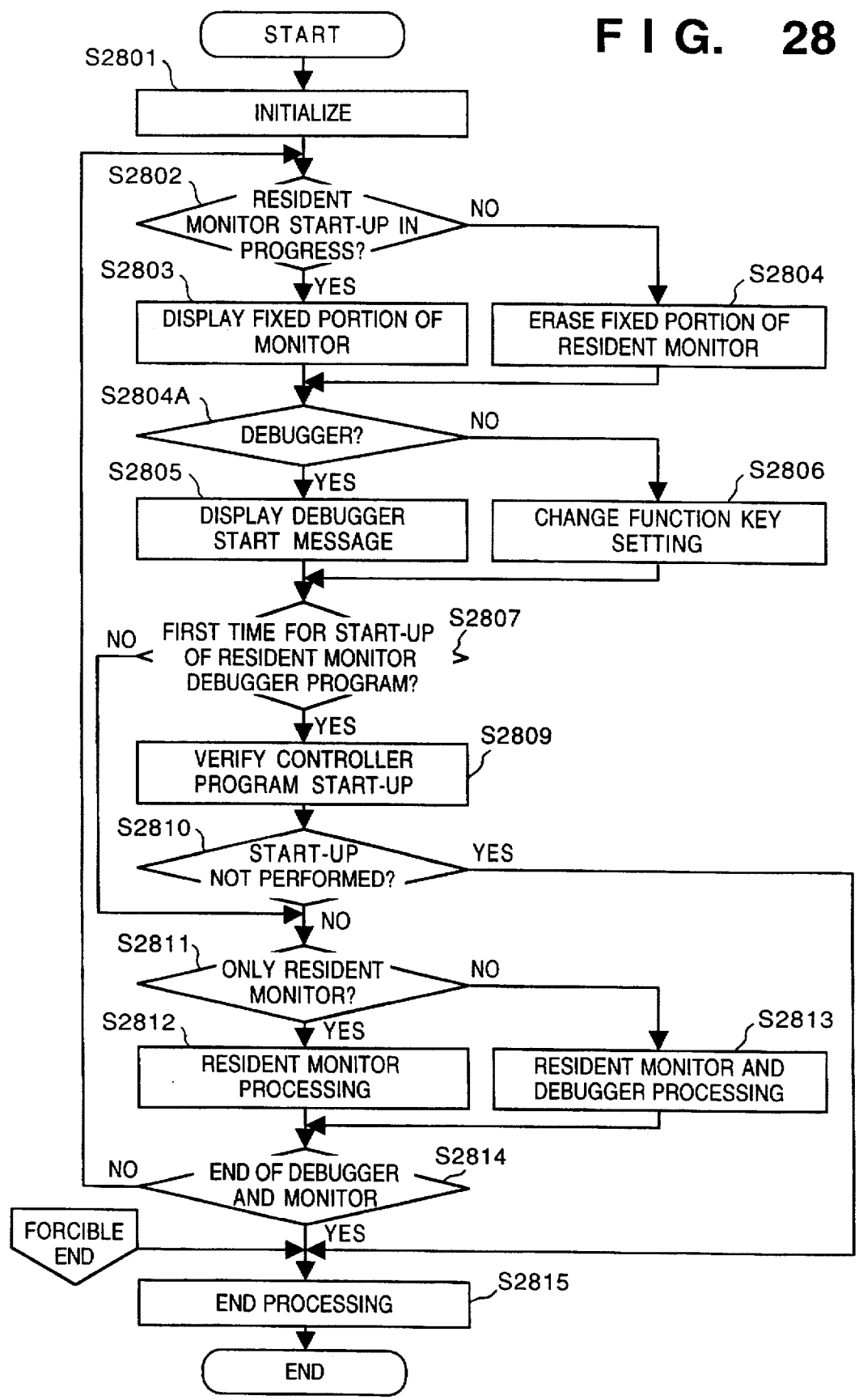
FIG. 28 is a main flowchart showing processing for starting up the resident monitor debugger in an embodiment of the invention.

FIG. 28 is a main flowchart showing processing for starting up the resident monitor debugger processing in the embodiment of the invention. This is a program started up by the processing of step S2707 in FIG. 27.

Initialization for preparing for start-up of the resident monitor debugger program is performed at step S2801. Steps S2802 to S2814 constitute a routine for starting up the resident monitor debugger program.

After the initialization at step S2801, it is determined whether the resident monitor program for performing monitor processing of the control computer 702 has been started up in memory at step S2802. If the answer is "YES" at step S2802, then the fixed display portion of the resident monitor is displayed at step S2803 and the sequence proceeds to step S2804A. If the answer is "NO" at step S2802, the fixed display portion of the resident monitor is erased at step S2804 and the sequence proceeds to step S2804A.

Debugger processing is executed and it is determined whether the program for performing debugger processing to debug the processing execution of the control computer 702 has been started up in memory at step S2804A. If the answer is "YES" at step S2804A, then display processing for beginning debugging is executed at step S2805 and the sequence proceeds to step S2807. If the answer is "NO" at step S2804A, the settings of the function keys are changed at step S2806 and the sequence proceeds to step S2807.

It is determined at step S2807 whether this is the first time the resident monitor debugger program has been started up since introduction of power. If the answer is "NO" at step S2807, the sequence proceeds to step S2811. If the answer is "YES" at step S2807, start-up of the program (referred to as a "controller program" below) for controlling the control computer 702 is verified at step S2809.

The sequence proceeds to step S2810, at which it is determined whether connection to the control computer 702 was verified at step S2809. If the program has not been started-up, i.e., if the answer is "YES" at step S2810, processing is terminated at step S2815. If the answer is "NO" at step S2810, it is determined at step S2811 whether only processing by the resident monitor program is executed or both the resident monitor program and the debugger processing. If only resident monitor processing is executed at step S2811, the sequence proceeds to step S2812. Execution of resident monitor processing is the main role of the monitor computer 701 at step S2812. The sequence then proceeds to step S2814. If both resident monitor processing and debugger processing is executed, the sequence proceeds to step S2813. Execution of resident monitor processing and debugger processing is the main role of the monitor computer 701 at step S2813. The sequence then proceeds to step S2814.

It is determined at step S2814 whether it is the end of the resident monitor processing and the debugger processing. If the answer is "NO" at step S2814, the sequence returns to step S2802. If the answer is "YES" at step S2814, end processing for terminating the resident monitor debugger program is executed at step S2815. Forcible termination of the resident monitor debugger program during execution of the start-up routine also is possible.

Figure 29:
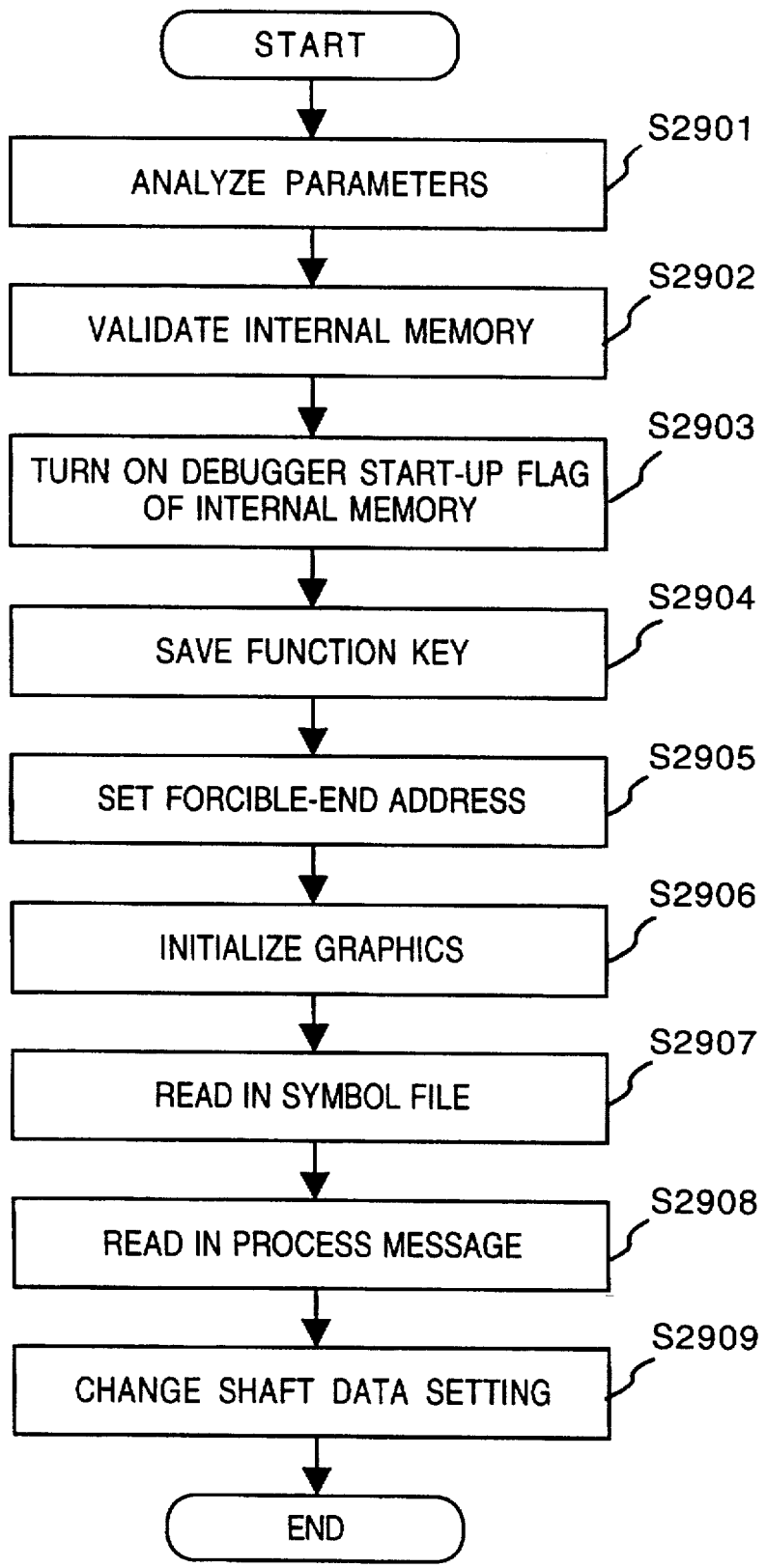
FIG. 29 is a flowchart showing initialization processing in a resident monitor debugger program according to an embodiment of the invention.

FIG. 29 is a flowchart showing initialization processing in the resident monitor debugger program according to the embodiment of the invention. This flowchart illustrates the details of the processing of step S2801 in FIG. 28.

The parameters of the status of execution of the resident monitor debugger program are analyzed at step S2901 in FIG. 29. A memory for shared use within an application is rendered effective at step S2902. A flag indicating that debugger start-up is in progress is turned ON at step S2903. This flag indicates that the resident monitor debugger program is using the internal memory. The setting of function keys is saved at step S2904, and a forcible-end address is set at step S2905. Initialization of graphics is performed at step S2906. A symbol file is read in at step S2907. The corresponding memory addresses of labels and variables defined in the special-purpose language program are written in the symbol file. A message file for every set defined in the special-purpose language program is read in at step S2908. Data is accepted from the control computer 702 through the dual-port memory 4501 at step S2909.

Figure 30:
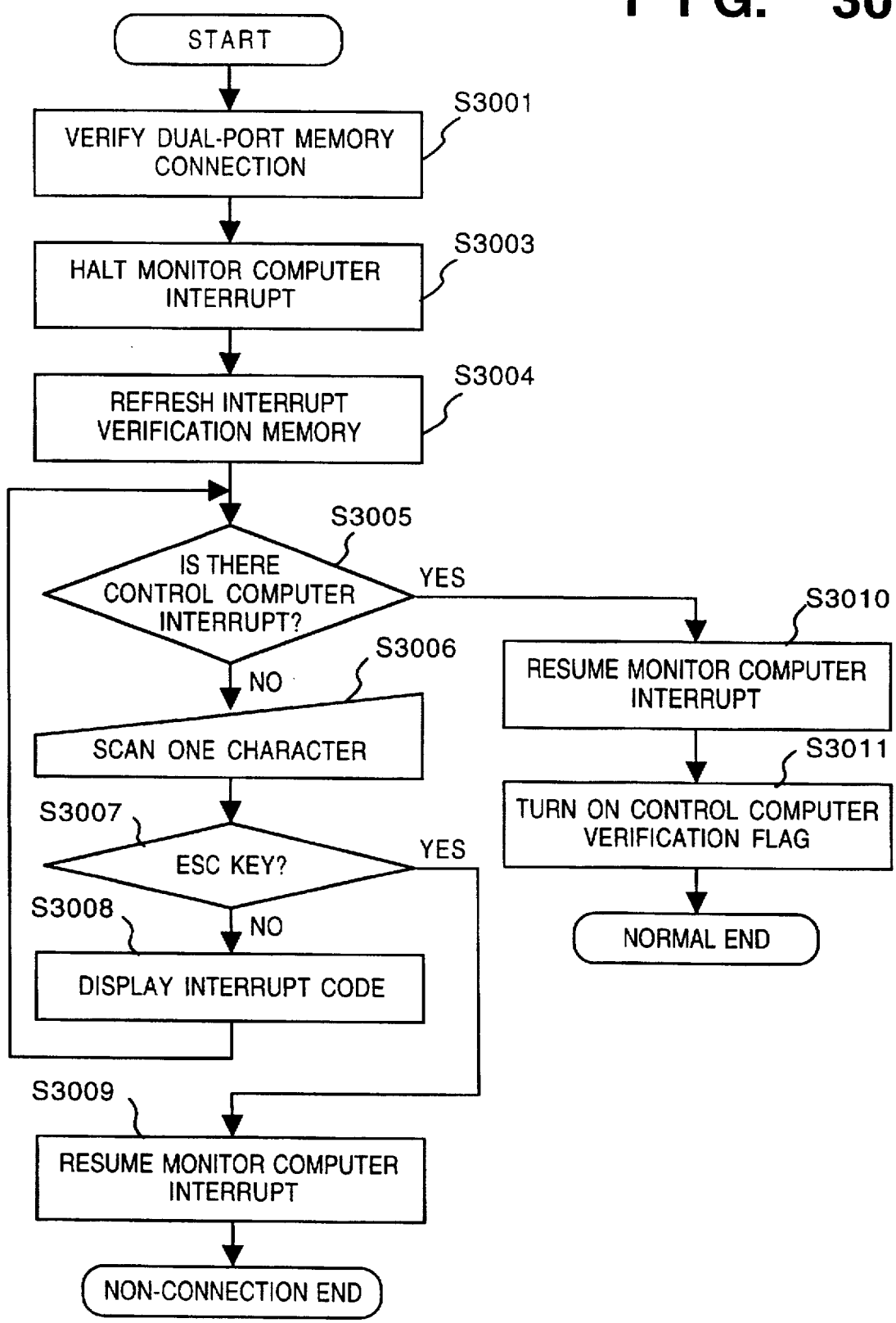
FIG. 30 is a flowchart showing start-up confirmation processing in a control computer according to an embodiment of the invention.

FIG. 30 is a flowchart showing start-up confirmation processing of the control computer according to the embodiment of the invention. This flowchart illustrates the details of the processing of step S2809 in FIG. 28.

It is confirmed at step S3001 that the connection to the dual-port memory 4501 has been made. Access to the dual-port memory 4501 by timer-interrupt executed by the monitor computer 701 is halted at step S3003 and an interrupt verification memory area of the dual-port memory 4501 is refreshed at step S3004. Steps S3005 through S3011 constitute a routine for confirming start-up of the control computer 702. It is determined at step S3005 whether the control computer 702 has made interrupt access to the dual-port memory 4501. If there is no interrupt at step S3005, access to the dual-port memory 4501 by timer interrupt of the monitor computer 701 is resumed. That is, if a "NO" decision is rendered at step S3005, the loop composed of steps S3005–S3008 is traversed until a "YES" decision is rendered at step S3005. If the ESC key is pressed at step S3006, a "YES" decision is rendered at step S3007, the program proceeds to step S3009, interrupt of the monitor computer 701 is resumed and the sequence is ended. If there is an interrupt at step S3005, access to the dual-port memory 4501 by timer interrupt of the monitor computer 701 is resumed by reason of the fact that start-up of the control computer 702 could not be confirmed at step S3010. After that, the flag for verifying start-up of the control computer 702 is turned ON at step S3011 and this sequence is ended.

Figure 31:
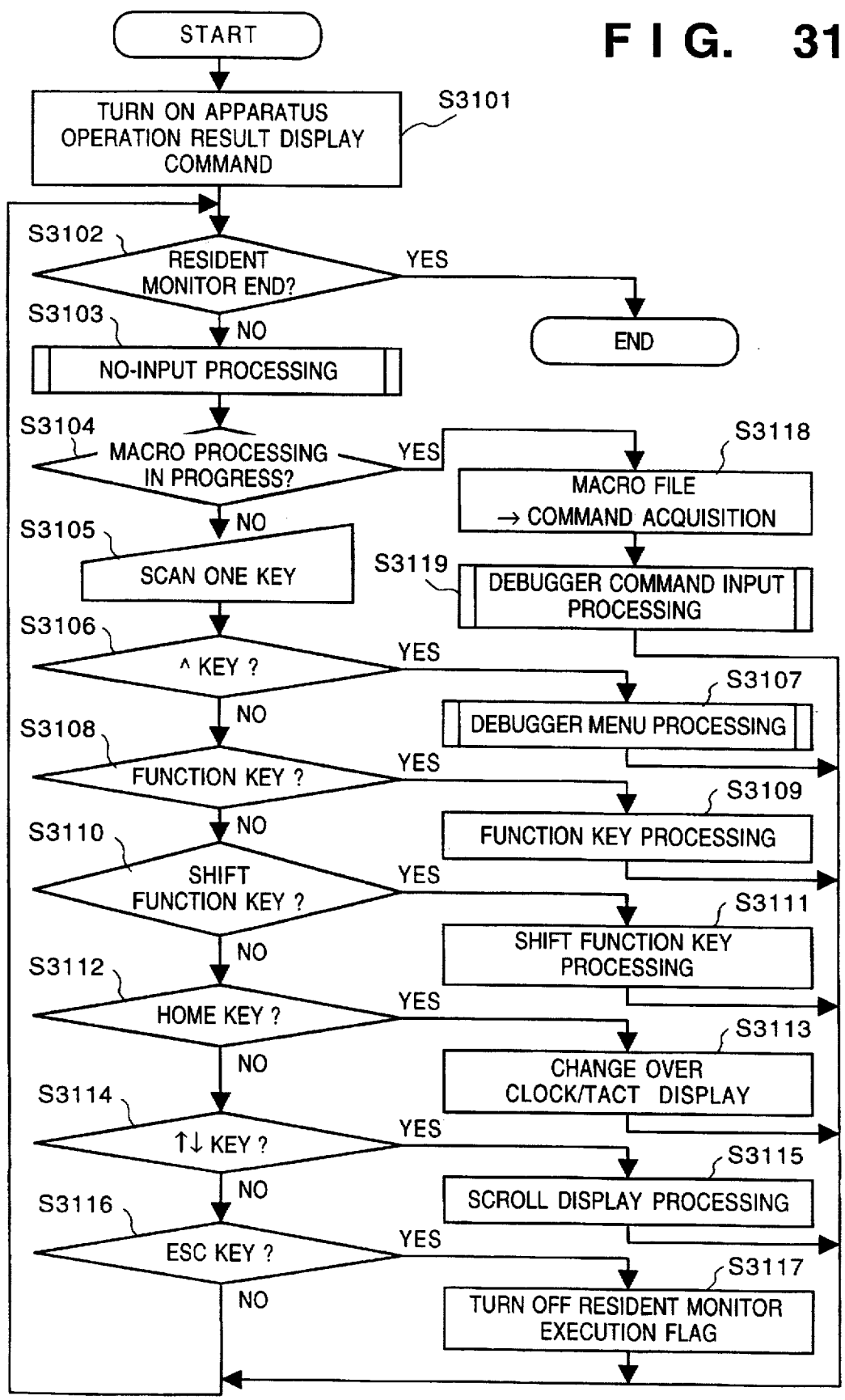
FIG. 31 is a flowchart showing resident monitor processing in an embodiment of the invention.

FIG. 31 is a flowchart showing resident monitor processing according to the embodiment of the invention. This flowchart illustrates the details of the processing of step S2812 in FIG. 28.

Before resident monitor processing starts, a command for displaying the results of operating the adjusting/measuring apparatus 713 is turned ON at step S3101. Steps from S3102 to S3119 constitute a resident monitor processing routine. It is determined at step S3102 whether the resident monitor processing is ended. If a "YES" decision is rendered at step S3102, the sequence is ended. If a "NO" decision is rendered at step S3102, no-input processing is performed at step S3103.

After the no-input processing at step S3103, it is determined at step S3104 whether a macro is being executed. If the macro is not being executed at step S3104, it is determined whether a predetermined key has been pressed at step S3105.

If the key has been pressed, the corresponding processing is executed (step S3106 to step S3116). After the processing, the sequence is returned to step S3102. That is, If the "←" key has been pressed at step S3106, debugger menu processing is executed at step S3107. If the function key has been pressed at step S3108, function key processing is executed at step S3109. If the shift function key has been pressed at step S3110, shift function processing is executed at step S3111. If the "HOME" key has been pressed at step S3112, clock/tact display is changed over at step S3113. If the "↑" or "↓" key has been pressed at step S3114, scroll display processing is executed at step S3115. If the "ESC" key has been pressed at step S3116, resident monitor executing flag is turned off at step S3117.

In the case where the macro is being executed at step S3104, macro file is stored as a command acquisition at step S3118 and debugger-command input processing is executed at step S3119. After the execution of the debugger-command input processing at step S3119, the sequence is returned to step S3102.

Figure 32:
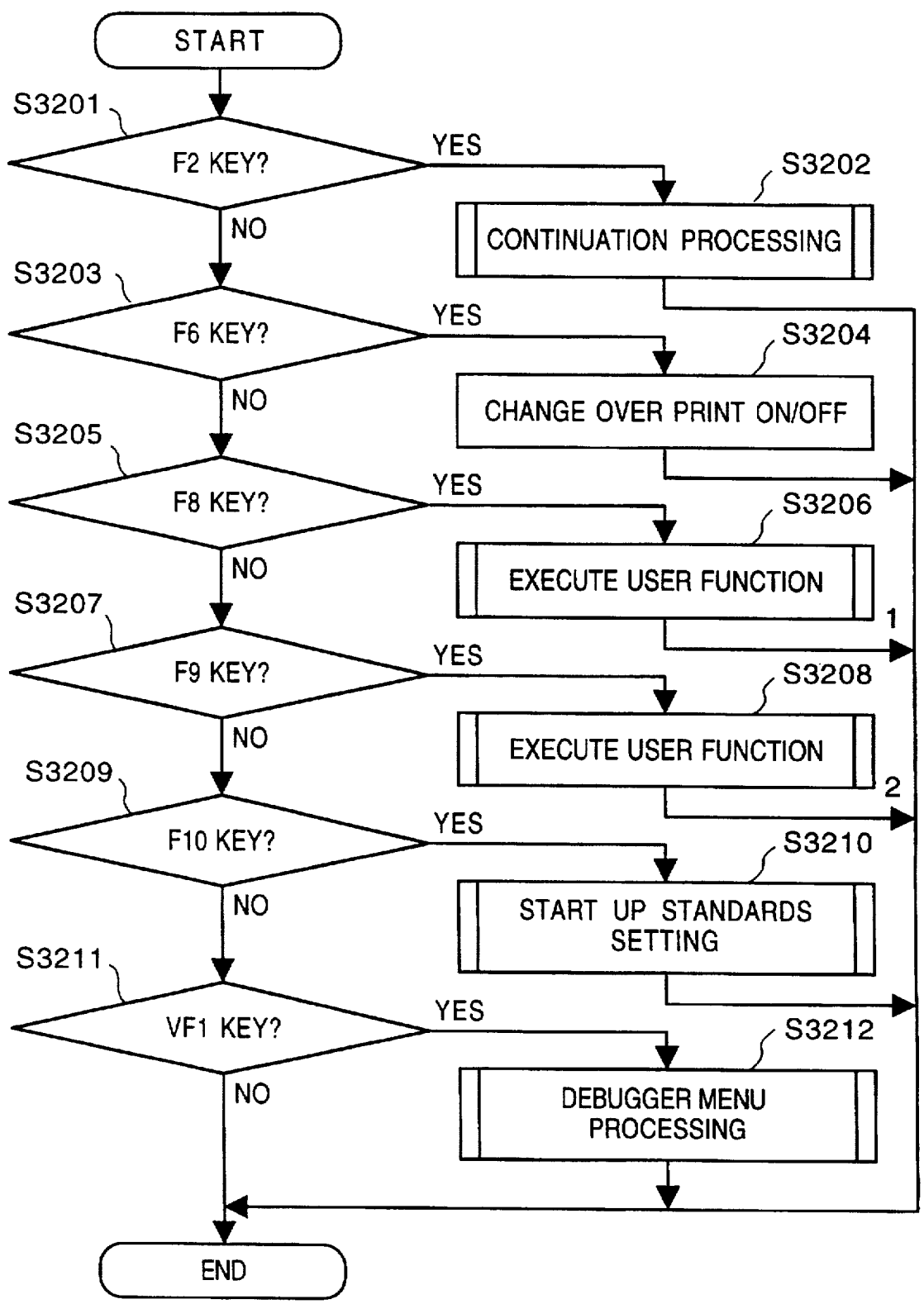
FIG. 32 is a flowchart showing processing associated with the function keys of the resident monitor in an embodiment of the invention.

FIG. 32 is a flowchart showing processing associated with the function keys of the resident monitor in the embodiment of the invention. This flowchart illustrates the details of the processing of step S3109 in FIG. 31.

Steps from S3201 to S3212 in FIG. 32 constitute a resident monitor function key processing routine. It is determined at steps S3201, S3203, S3205, S3207, S3209, and S3211 whether a prescribed function key has been pressed. If a key has been pressed at steps S3201, S3203, S3205, S3207, S3209, or S3211, the corresponding processing is executed at steps S3202, S3204, S3206, S3208, S3210, or S3212. After the processing, the processing is terminated and the sequence is returned to step S3102 in FIG. 31. That is, If the "F2" key has been pressed at step S3201, the processing is continued at step S3202. If the "F6" key has been pressed at step S3203, on/off condition of printing is changed over at step S3204. If the "F8" key has been pressed at step S3205, user function (1) is executed at step S3206. If the "F9" key has been pressed at step S3207, user function (2) is executed at step S3208. If the "F10" key has been pressed at step S3209, standards setting is started up at step S3210. If the "VF1" key has been pressed at step S3211, debugger menu processing is executed at step S3212.

Figure 33:
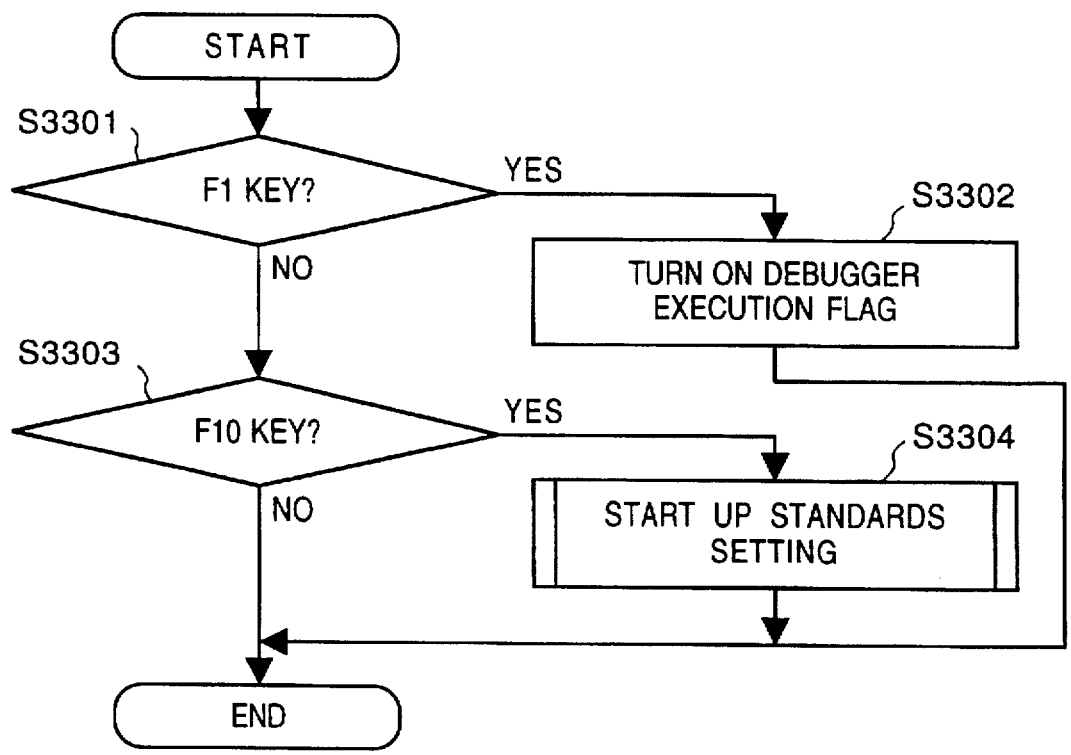
FIG. 33 is a flowchart showing processing associated with the shift function keys of the resident monitor in an embodiment of the invention.

FIG. 33 is a flowchart showing processing associated with the shift function keys of the resident monitor in an embodiment of the invention. This flowchart illustrates the details of the processing of step S3111 in FIG. 31.

Steps from S3301 to S3304 in FIG. 33 constitute a resident monitor shift function key processing routine. It is determined at steps S3301 and S3303 whether a prescribed function key has been pressed. If a key has been pressed at steps S3301 or S3303, the corresponding processing is executed at steps S3302 and S3304. After the processing, the processing is terminated and the sequence is returned to step S3102 in FIG. 31. That is, If the "F1" key has been pressed at step S3301, a debugger execution flag is turned on at step S3202. If the "F10" key has been pressed at step S3303, standards setting is started up on at step S3204.

Figure 34A:
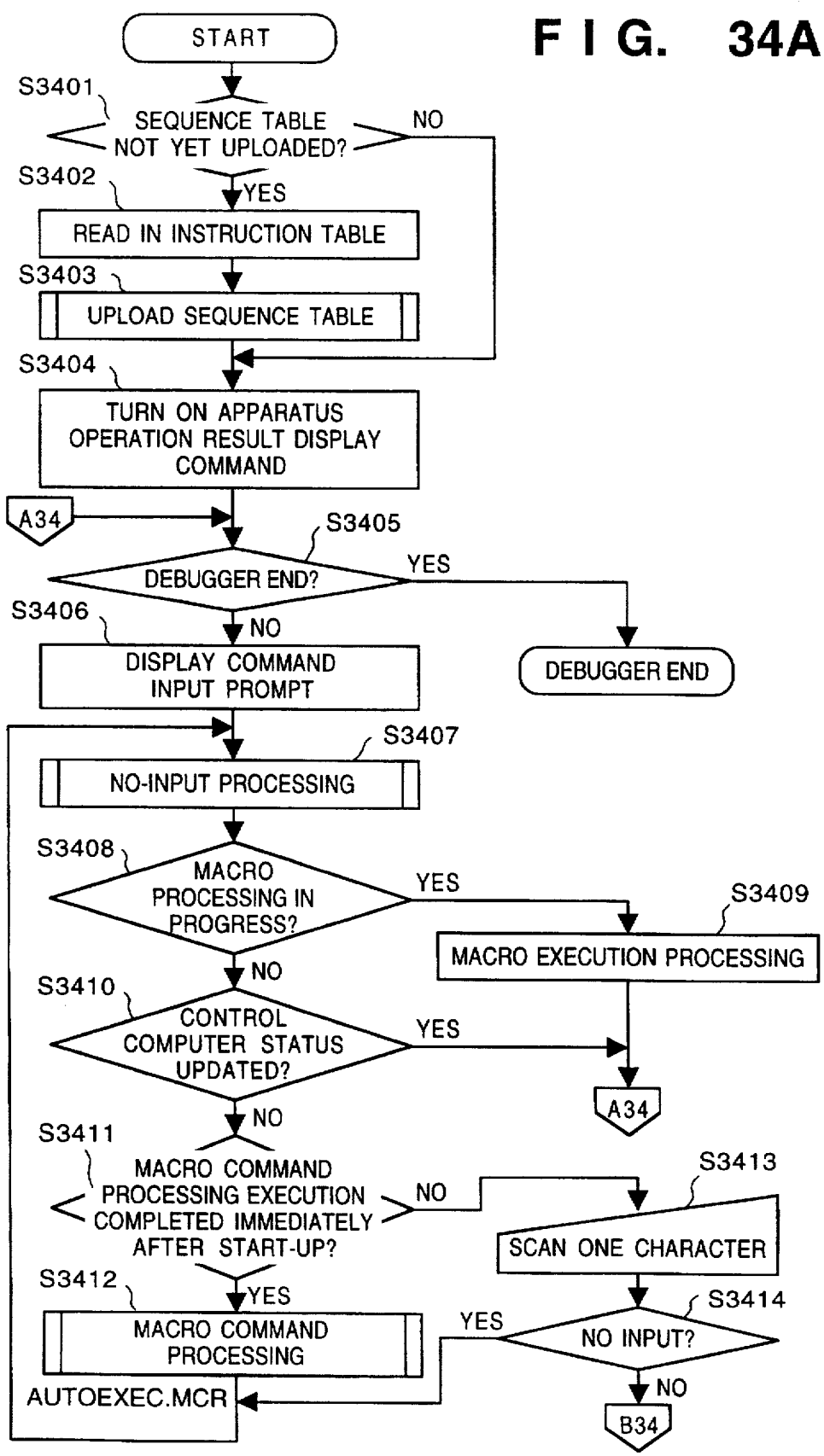
FIGS. 34A and 34B are flowcharts showing a resident monitor program and debugger processing in an embodiment of the present invention.
Figure 34B:
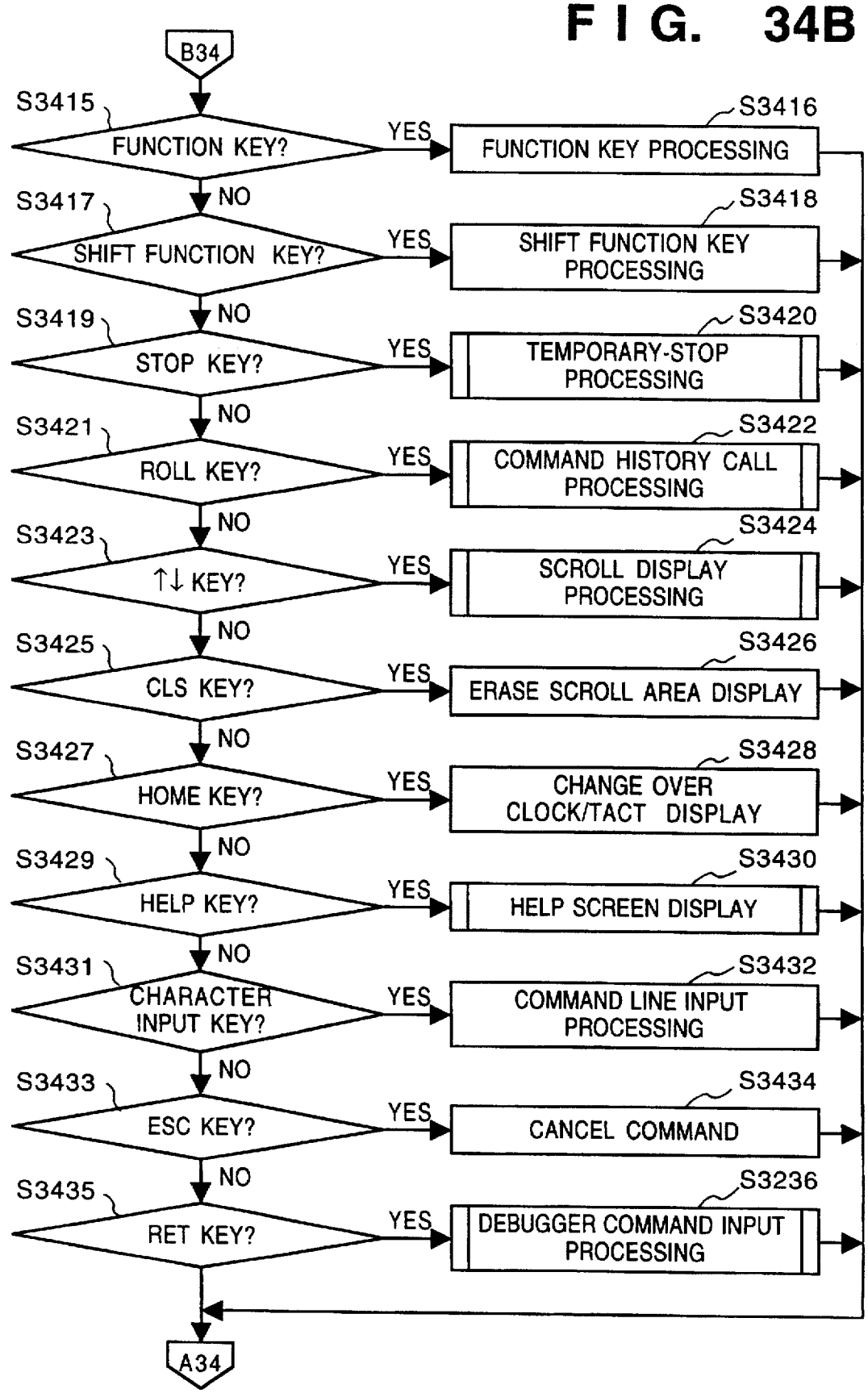

FIGS. 34A and 34B are flowcharts showing a resident monitor program and debugger processing in the embodiment of the present invention. This flowchart illustrates the details of the processing of step S2813 in FIG. 28.

Steps S3401 through S3404 represent sequence-table upload processing. Here sequence data described by a special-purpose language program are read in. It is determined at step S3401 whether the executable format data of the special-purpose language program has been read out of the control computer 702. If the data have not been read in at step S3401, a sequence table is read out at step S3402 and the execution format data of the special-purpose language program are read out of the control computer 702 at step S3403. If the data have be read in at step S3401, then the routine proceeds to step S304. A display command for displaying the results of operating the apparatus is turned ON at step S3404.

It is determined at step S3405 whether the debugger program is to be ended. Macro commands conforming to command inputs from the keyboard are executed at steps S3406 through S3414. If the answer is "YES" at step S3405, the routine is ended. If the answer is "NO" at step S3405, a prompt for accepting entry of the command is displayed on the screen of monitor 102 at step S3406. Processing for monitoring the status of the control computer 702 is performed as resident monitoring mainly in the no-input processing of step S3407.

After the no-input processing of step S3407, it is determined at step S3408 whether a macro is to be processed. If the answer is "YES" at step S3408, the macro is executed at step S3409 and the sequence returns to step 3405. If the answer is "NO" at step S3408, the sequence proceeds to step S3410 and it is determined whether the status of the control computer 702 has been updated. If the status has been updated at step S3410, the sequence returns to step S3405 and processing is continued. If it is found at step S3410 that the status of the control computer 702 has not been updated at step S3410, the sequence proceeds to step S3411 and it is determined whether this sequence is being executed immediately following start-up. If the answer is "YES" at step S3411, a macro command for initial settings is executed at step S3412 and the program returns to step S3407. If the answer is "NO" at step S3411, scanning of a processed character entered from the keyboard is performed at step S3413. It is determined at step S3414 that a character has not been entered. If there is no character input from the keyboard at step S3414, the sequence returns to step S3407. If there is a character input from the keyboard at step S3414, the sequence proceeds to the decision processing of steps S3415, S3417, S3419, S3421, S3423, S3425, S3427, S3429, S3431, S3433 and S3435, where it is determined whether specific keys on the keyboard have been pressed. By repeating this loop, the macro can be executed in accordance with the character scanned at step S3413.

In FIG. 34B, steps S3415–S3436 call for a determination as to whether prescribed key inputs have been made and for execution of the corresponding processing if the prescribed key has been pressed. At steps S3415 to S3436 in FIG. 34B, if a key has been pressed, the corresponding processing is executed. After the processing, the program returns to step S3405. That is, if the function key has been pressed at step S3415, function key processing is executed at step S3416. If the shift function key has been pressed at step S3417, shift function key processing is executed at step S3418. If the "STOP" key has been pressed at step S3419, temporary-stop processing is executed at step S3420. If the "ROLL" key has been pressed at step S3421, command history call processing is executed at step S3422. If the "↑" or "↓" key has been pressed at step S3423, scroll display processing is executed at step S3424. If the "CLS" key has been pressed at step S3425, scroll area is erased at step S3426. If the "HOME" key has been pressed at step S3427, clock/tact display is changed over at step S3428. If the "HELP" key has been pressed at step S3429, help screen is displayed at step S3430. If the character input key has been pressed at step S3431, command line input processing is executed at step S3432. If the "ESC" key has been pressed at step S3433, command is canceled at step S3434. If the "RETURN" key has been pressed at step S3435, debugger command input processing is executed at step S3436.

Figure 35:
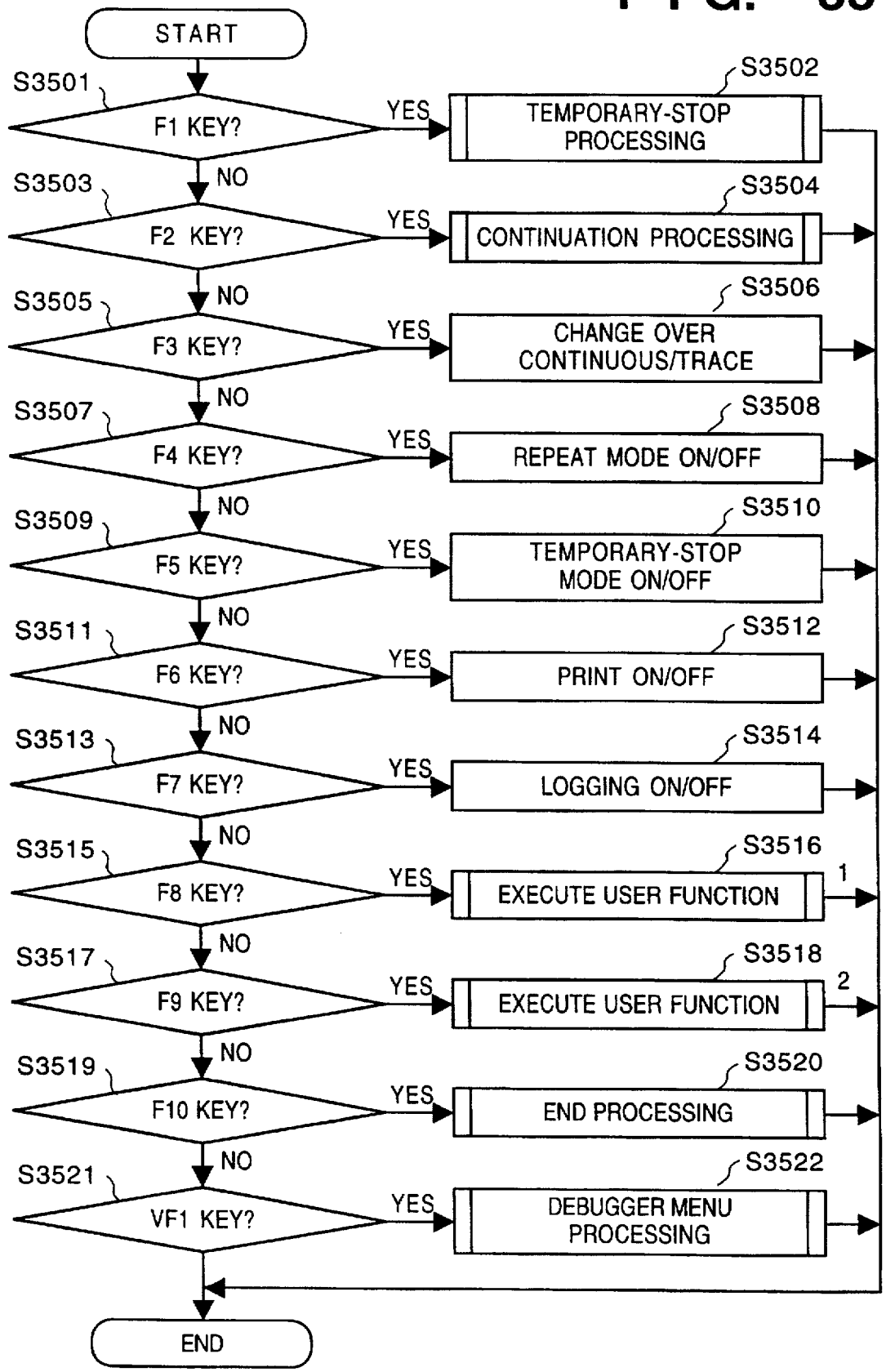
FIG. 35 is a flowchart of processing, which is associated with function keys, in a resident monitor debugger program according to an embodiment of the invention.

FIG. 35 is a flowchart of processing, which is associated with function keys, in the resident monitor debugger program according to the embodiment of the invention. This flowchart illustrates the details of the processing of step S3416 in FIG. 34B.

Steps from S3501 to S3522 in FIG. 35 constitute a function-key processing routine in the resident monitor program and debugger processing. It is determined at steps S3501, S3503, S3505, S3507, S3509, S3511, S3513, S3515, S3517, S3519, and S3521 whether a prescribed function key has been pressed. If a key has been pressed at steps S3501, S3503, S3505, S3507, S3509, S3511, S3513, S3515, S3517, S3519, or S3521, the corresponding processing is executed. After the processing, the program returns to step S3405 in FIG. 34A. That is, if the "F1" key has been pressed at step S3501, temporary-stop processing is executed at step S3502. If the "F2" key has been pressed at step S3503, the processing is continued at step S3504. If the "F3" key has been pressed at step S3505, sequence mode (continuous, trace) is changed over at step S3506. If the "F4" key has been pressed at step S3507, repeat mode is changed (on, off) at step S3508. If the "F5" key has been pressed at step S3509, temporary-stop mode is changed (on, off) at step S3510. If the "F6" key has been pressed at step S3511, printing mode is changed (on, off) at step S3512. If the "F7" key has been pressed at step S3513, logging mode is changed (on, off) at step S3514. If the "F8" key has been pressed at step S3515, user function (1) is executed at step S3516. If the "F9" key has been pressed at step S3517, user function (2) is executed at step S3518. If the "F10" key has been pressed at step S3519, end processing is executed at step S3520. If the "VF1" key has been pressed at step S3521, debugger menu processing is executed at step S3522.

Figure 36:
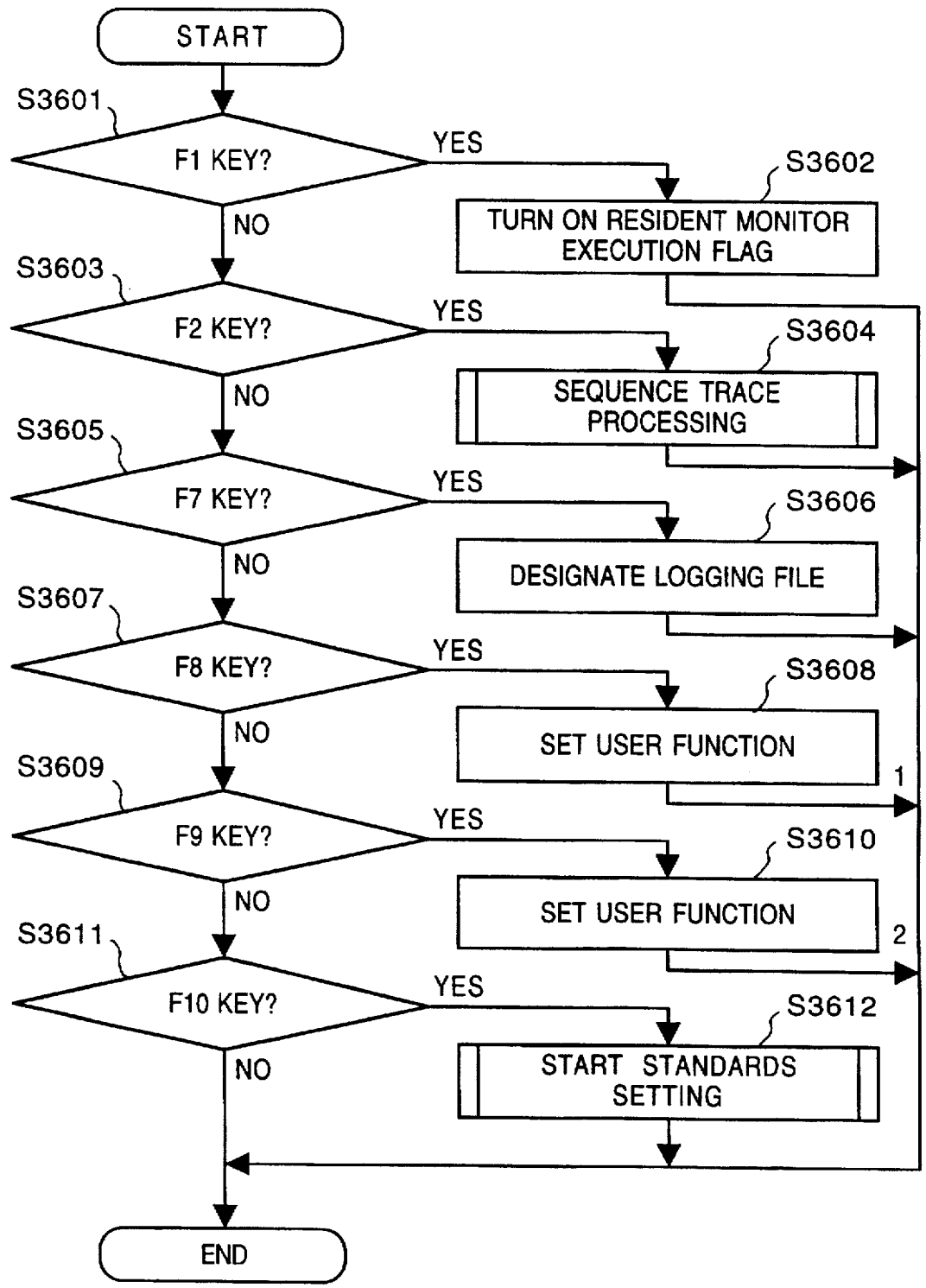
FIG. 36 is a flowchart of processing, which is associated with shift function keys, in a resident monitor debugger program according to an embodiment of the invention.

FIG. 36 is a flowchart of processing, which is associated with shift function keys, in a resident monitor debugger program according to the embodiment of the invention. This flowchart illustrates the details of the processing of step S3418 in FIG. 34B.

Steps from S3601 to S3612 in FIG. 35 constitute a shift function-key processing routine in the resident monitor program and debugger processing. It is determined at steps S3601, S3603, S3605, S3607, S3609, and S3611 whether a prescribed function key has been pressed. If a key has been pressed at steps S3601, S3603, S3605, S3607, S3609, or S3611, the corresponding processing is executed. After the processing, the program returns to step S3405 in FIG. 34A. That is, If the "F1" key has been pressed at step S3601, a resident monitor execution flag is turned on at step S3602. If the "F2" key has been pressed at step S3603, sequence trace processing is executed at step S3604. If the "F7" key has been pressed at step S3605, a logging file is designated at step S3606. If the "F8" key has been pressed at step S3607, a user function (1) is set at step S3608. If the "F9" key has been pressed at step S3609, a user function (2) is set at step S3610. If the "F10" key has been pressed at step S3611, standards setting is started at step S3612.

FIGS. 37A–37D are flowcharts of command input processing in the resident monitor debugger program according to the embodiment of the invention. These flowcharts illustrate the details of the processing of step S3436 in FIG. 34B.

A command line displayed on the display of the monitor computer 701 is erased at step S3701. It is determined whether macro is designated at step S3702. If the answer is "YES" at step S3702, processing is proceeded to at step S3706. If the answer is "NO" at step S3702, one command is acquired at step S3703. It is determined whether the command line is ended at step S3704. If the answer is "YES" at step S3704, a command-line buffer is cleared at step S3705 and processing is terminated. If the answer is "NO" at step S3704, parameter is analyzed at step S3706.

Steps from S3702 to S3778 constitute a command input processing routine in the resident monitor debugger processing program. A predetermined command entered from the keyboard is accepted, an accepted command and the parameter accompanying it are analyzed and the processing corresponding to the command is executed.

That is, If the accepted command is "B" command at step S3707, processing corresponding to a temporary-stop point setting command is executed at step S3715. If the accepted command is "C" command at step S3708, processing corresponding to a direct execution command is executed at step S3716. If the accepted command is "D" command at step S3709, processing corresponding to a memory dump command is executed at step S3717. If the accepted command is "E" command at step S3710, processing corresponding to a data input command is executed at step S3718. If the accepted command is "F" command at step S3711, processing corresponding to a memory fill command is executed at step S3719. If the accepted command is "G" command at step S3712, processing corresponding to a direct execution command is executed at step S3720. If the accepted command is "H" command at step S3713, processing corresponding to a sequence history display command is executed at step S3721. If the accepted command is "I" command at step S3714, processing corresponding to a I/O port input command is executed at step S3722.

Figure 37A:
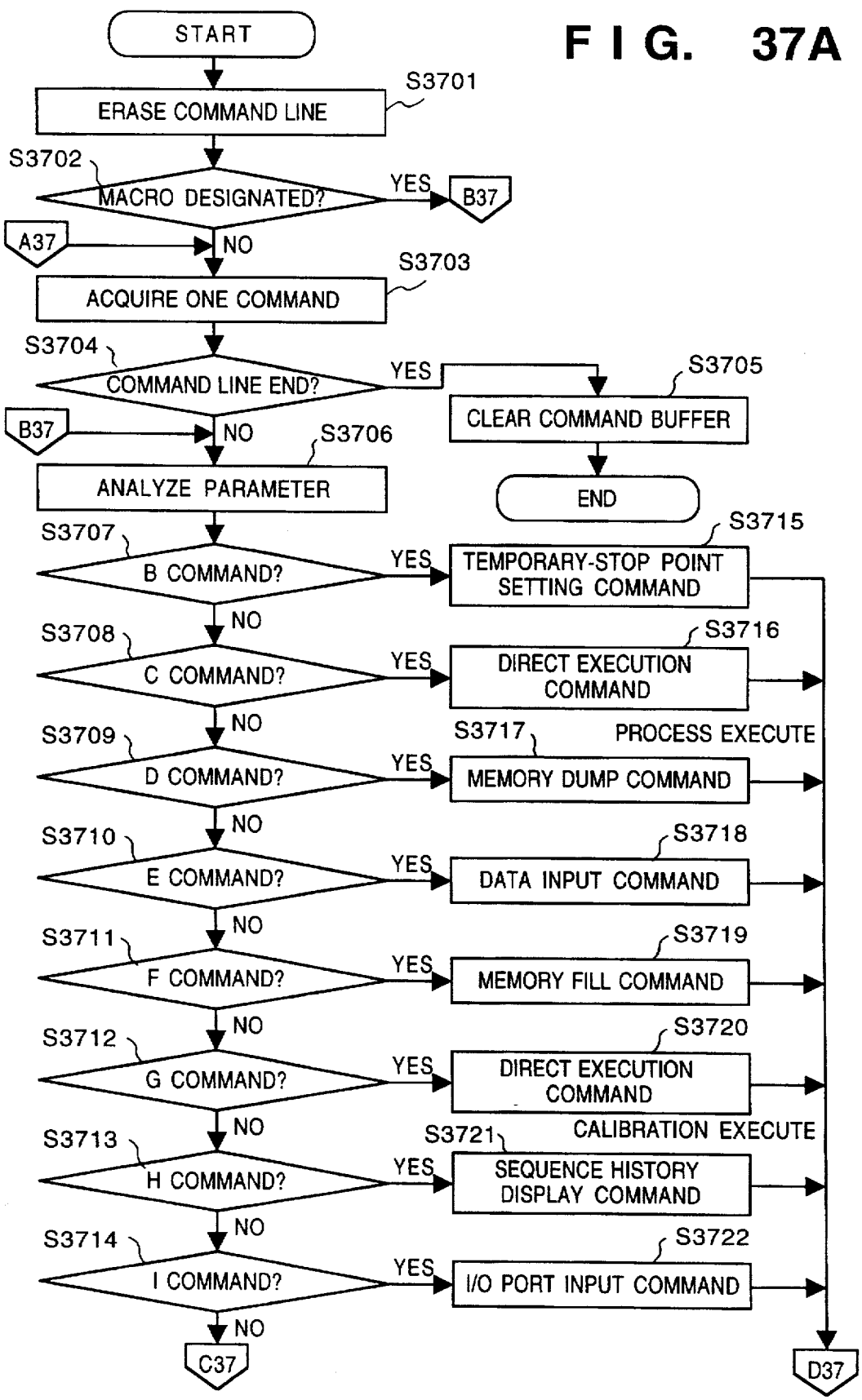
FIGS. 37A to 37D are flowcharts of command input processing in a resident monitor debugger program according to an embodiment of the invention.
Figure 37B:
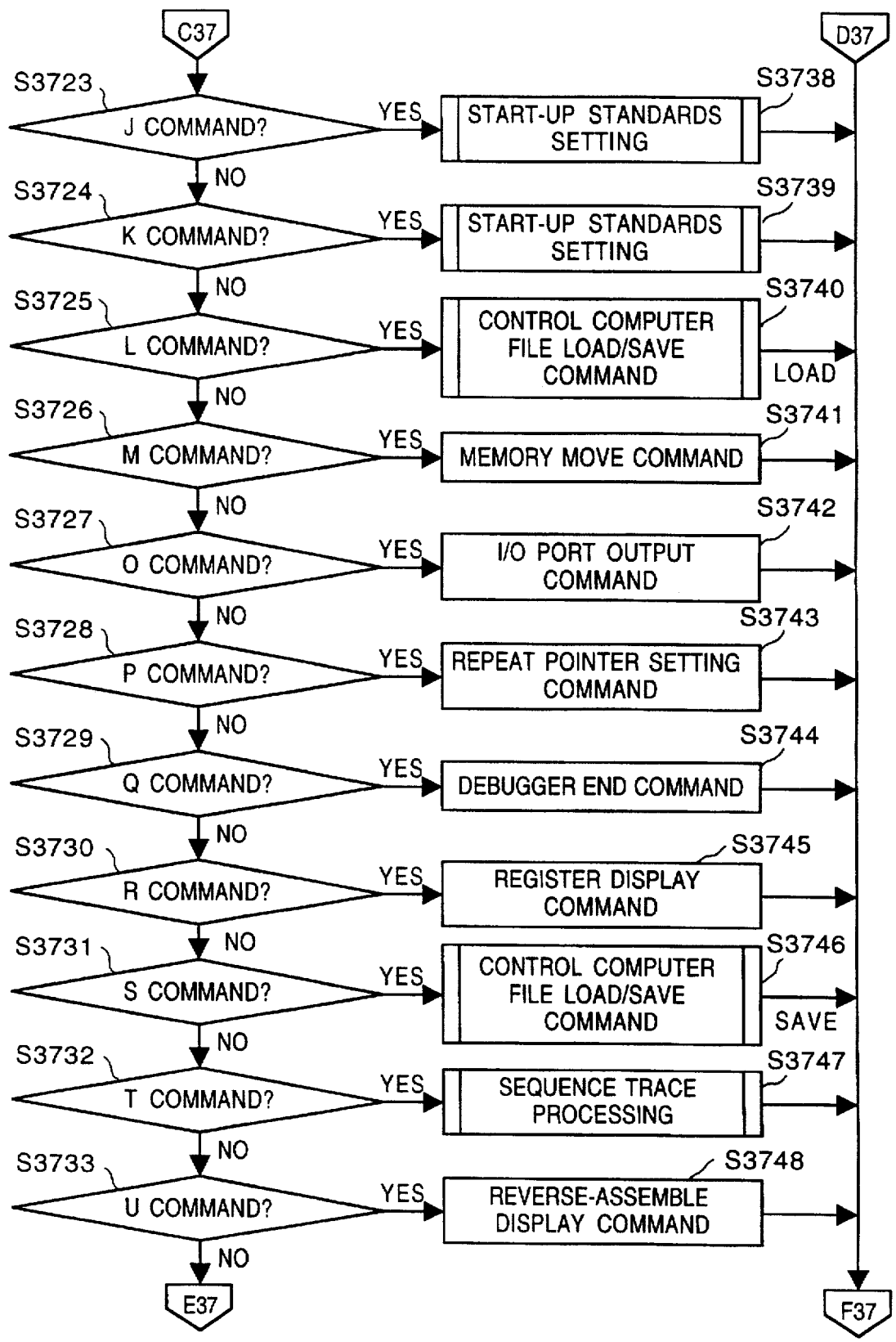

Further, in FIG. 37B, If the accepted command is "J" command at step S3723, standards setting processing is started up at step S3738. If the accepted command is "K" command at step S3724, standards setting processing is started up at step S3739. If the accepted command is "L" command at step S3725, processing corresponding to a control computer file load/save command is executed at step S3740. If the accepted command is "M" command at step S3726, processing corresponding to a memory move command is executed at step S3741. If the accepted command is "O" command at step S3727, processing corresponding to a I/O port output command is executed at step S3742. If the accepted command is "P" command at step S3728, processing corresponding to a repeat pointer setting command is executed at step S3743. If the accepted command is "Q" command at step S3729, processing corresponding to a debugger end command is executed at step S3744. If the accepted command is "R" command at step S3730, processing corresponding to a register display command is executed at step S3745. If the accepted command is "S" command at step S3731, processing corresponding to a control computer file load/save command is executed at step S3746. If the accepted command is "T" command at step S3732, sequence trace processing is executed at step S3747. If the accepted command is "U" command at step S3733, processing corresponding to a reverse-assemble display command is executed at step S3748.

Figure 37C:
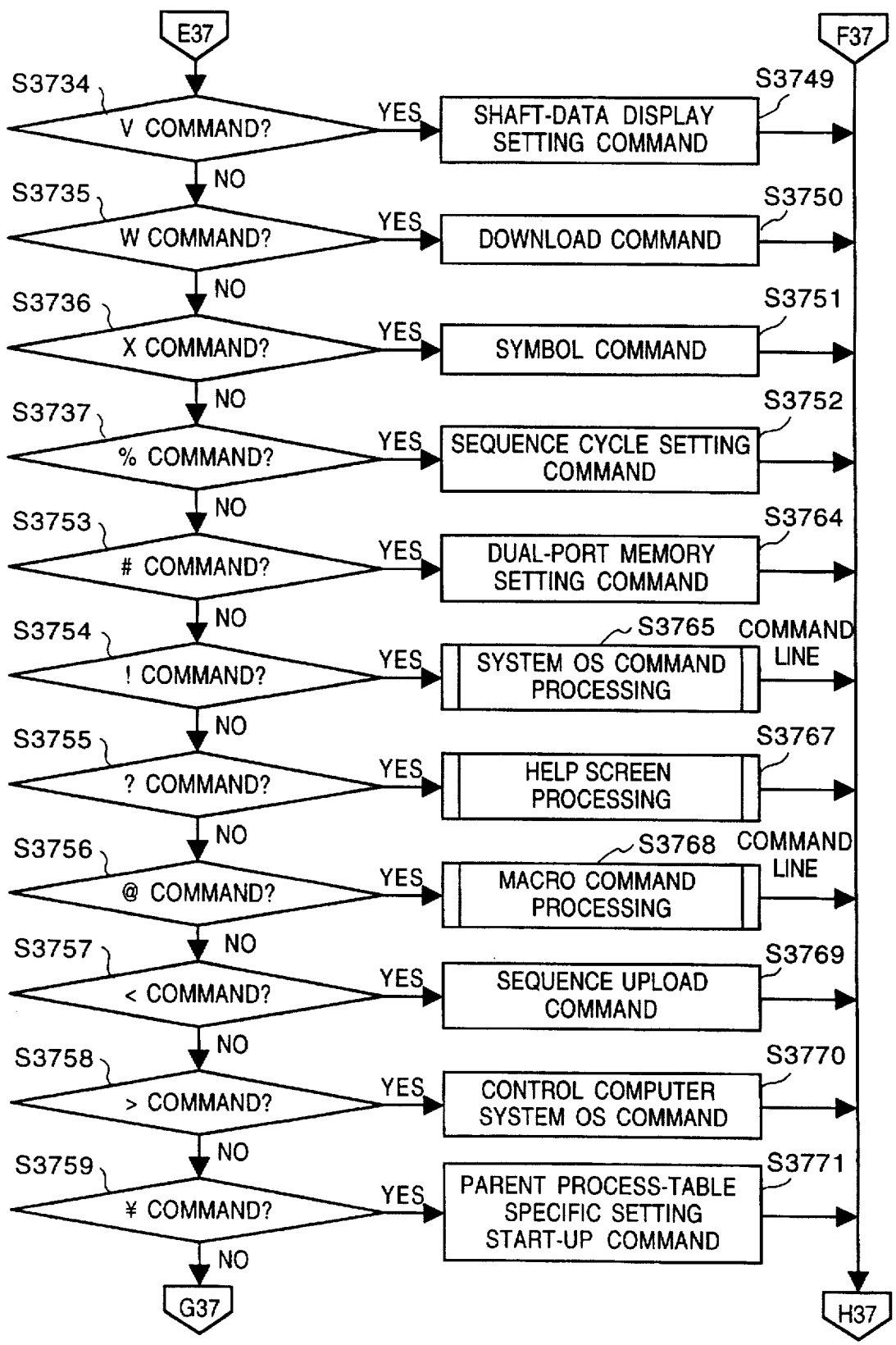

Further, in FIG. 37C, If the accepted command is "V" command at step S3734, processing corresponding to a shaft-data display setting command is executed at step S3749. If the accepted command is "W" command at step S3735, processing corresponding to a download command is executed at step S3750. If the accepted command is "X" command at step S3736, processing corresponding to a symbol command is executed at step S3751. If the accepted command is "%" command at step S3737, processing corresponding to a sequence cycle setting command is executed at step S3752. If the accepted command is "#" command at step S3753, processing corresponding to a dual-port memory setting command is executed at step S3764. If the accepted command is "!" command at step S3754, system OS command processing is executed at step S3765. If the accepted command is "?" command at step S3755, help screen processing is executed at step S3767. If the accepted command is "@" command at step S3756, macro command processing is executed at step S3768. If the accepted command is "<" command at step S3757, processing corresponding to a sequence upload command is executed at step S3769. If the accepted command is ">" command at step S3758, processing corresponding to a control computer system OS command is executed at step S3770. If the accepted command is "¥" command at step S3759, processing corresponding to a present process-table specific setting start-up command is executed at step S3771.

Figure 37D:
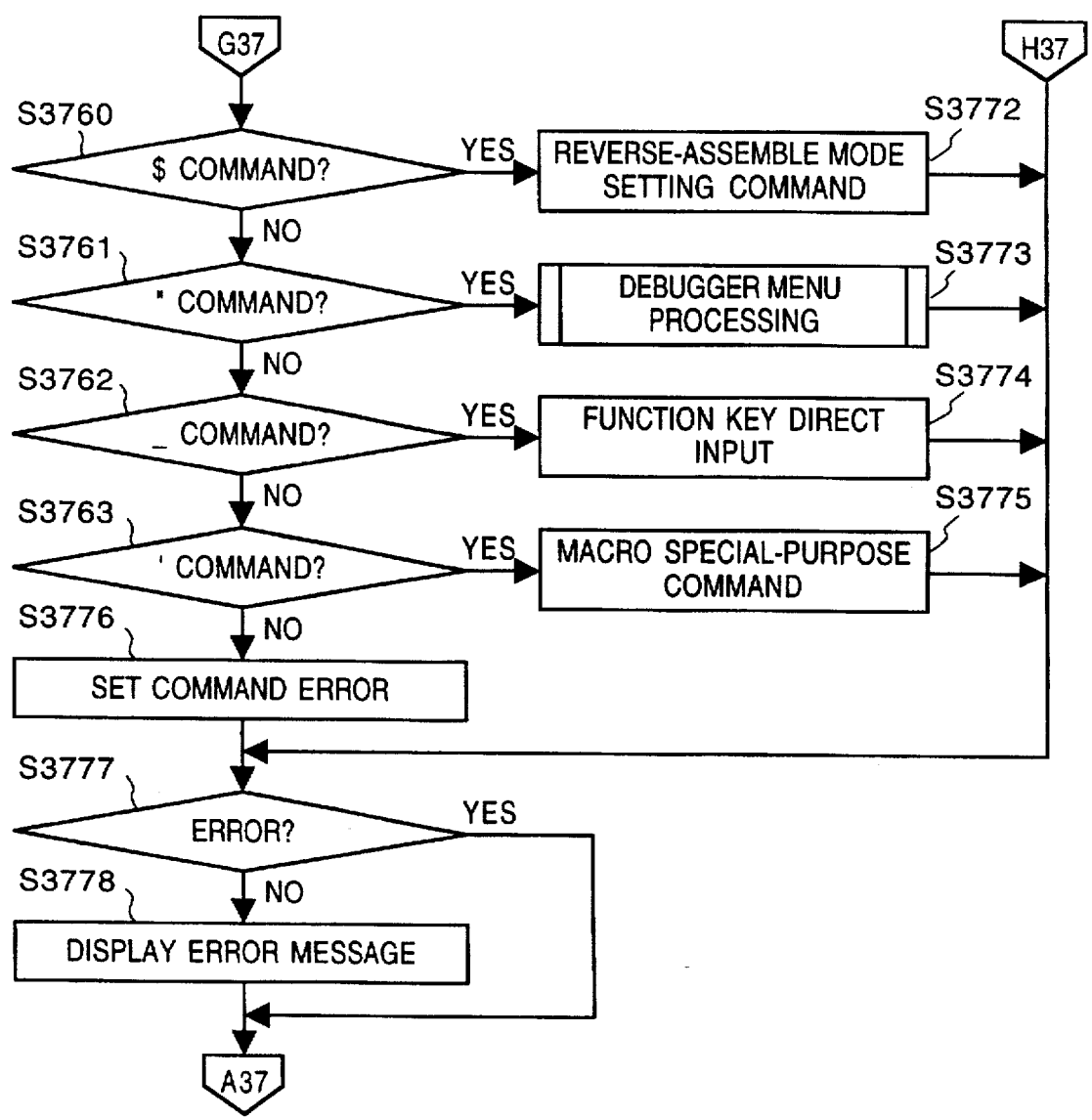

Further, in FIG. 37D, if the accepted command is "$" command at step S3760, processing corresponding to a reverse-assemble mode setting command is executed at step S3772. If the accepted command is " " " command at step S3761, debugger menu processing is executed at step S3773. If the accepted command is "_" command at step S3762, direct input from function keys is accepted at step S3774. If the accepted command is " ' " command at step S3763, processing corresponding to a macro special-purpose command is executed at step S3775.

If the prescribed key input is not the command determined above steps S3707–S3714, S3723–S3737, and S3753–S3763, then an error code representing an occurrence of command input error is set at step S3776. It is determined at step S3777 whether the error code is set. If the answer is "YES" at step S3777, processing is returned to step S3703. If the answer is "NO" at step S3777, an error message corresponding to the error code is displayed on the display of the monitor computer 701 at step S3778 and processing is returned to step S3703.

Figure 38:
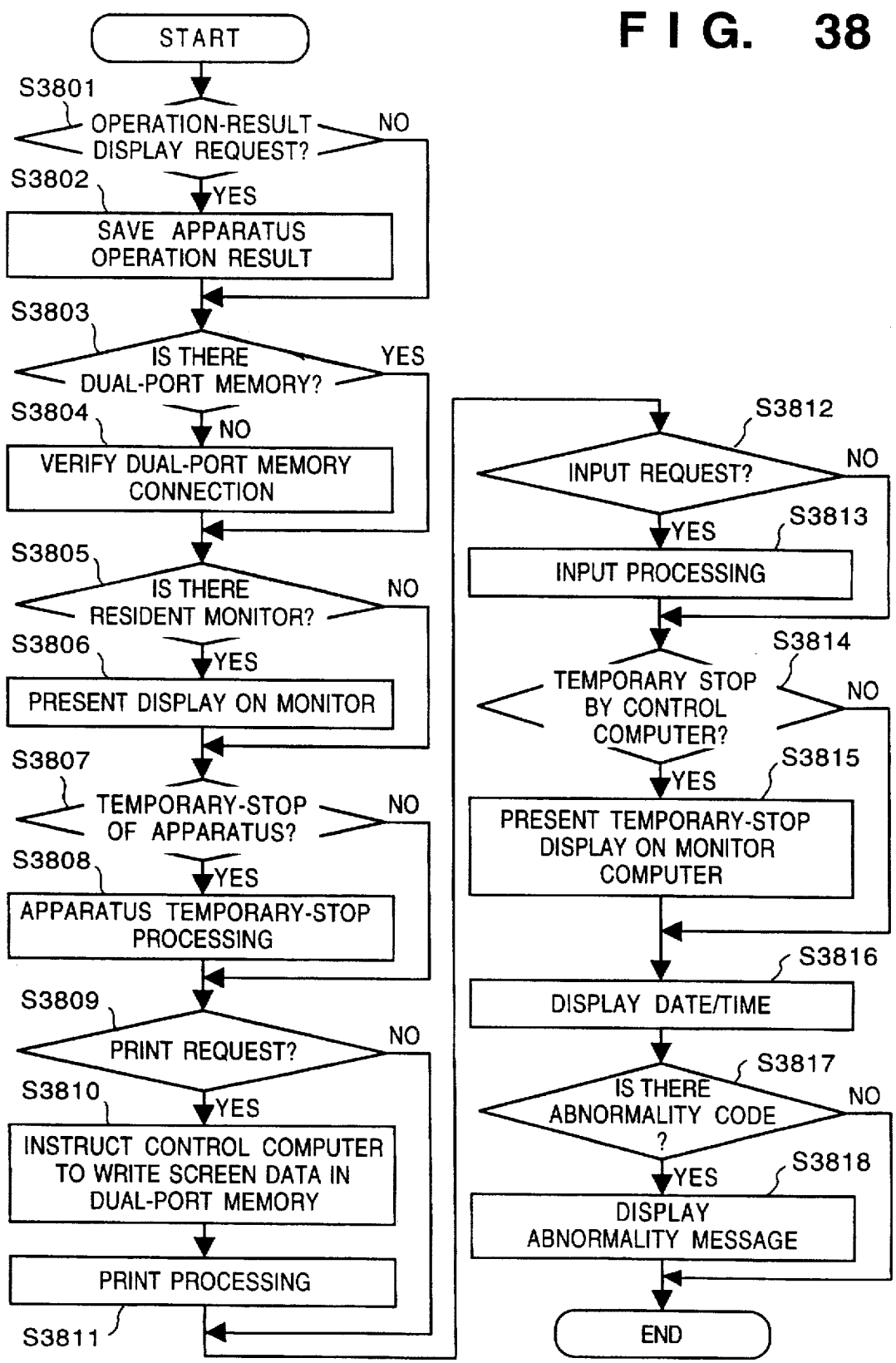
FIG. 38 is a flowchart of no-input processing in a resident monitor debugger program according to an embodiment of the invention.

FIG. 38 is a flowchart of no-input processing in the resident monitor debugger program according to this embodiment of the invention. This flowchart illustrates the details of the processing of step S3103 in FIG. 31, step S3407 in FIG. 34A, step S5111 in FIG. 51 and step S5207 in FIGS. 52A and 52B.

It is determined at step S3801 in FIG. 38 whether has been a request for data display from the control computer 702. If the answer is "NO" at step S3801, processing is proceeded to step S3803. If the answer is "YES" at step S3801, data is read in from the control computer 702 through the dual-port memory 4501 (the memory shared by the control computer 702 and monitor computer 701) at step S3802.

It is determined at step S3803 whether the dual-port memory 4501 exists. If the answer is "YES" at step S3803, processing is proceeded to step S3805. If the answer is "NO" at step S3803, connected to the dual-port memory 4501 is confirmed at step S3804.

It is determined at step S3805 whether the resident monitor program processing is to be executed. If the answer is "NO" at step S3805, processing is proceeded to step S3807. If the answer is "YES" at step S3805, a display is presented on the monitor (102 in FIG. 1) of the monitor computer 701 by resident monitor program processing at step S3806.

It is determined at step S3807 whether sequence processing of the control computer 702 is to be temporarily stopped (also referred to as "temporary break") under prescribed conditions set in advance. If the answer is "NO" at step S3807, processing is proceeded to step S3809. If the answer is "YES" at step S3807, a command for temporary stop is sent to the control computer 702 at step S3808.

It is determined at step S3809 whether a print instruction has been requested by the sequence of the control computer 702. If the answer is "NO" at step S3809, processing is proceeded to step S3812. If the answer is "YES" at step S3809, data to be printed is read in from the dual-port memory 4501 at step S3810 and printed by the printer (103 in FIG. 1) in response to a print instruction from the control computer 702 at step S3811.

It is determined at step S3812 whether an input instruction has been requested in the sequence of the control computer 702. If the answer is "NO" at step S3812, processing is proceeded to step S3814. If the answer is "YES" at step S3812, data entered by the input instruction from the control computer 702 is written in the dual-port memory 4501 at step S3813.

It is determined at step S3814 whether the control computer 702 has been halted by temporary stop. If the answer is "NO" at step S3814, processing is proceeded to step S3816. The contents of the dual-port memory 4501 prevailing when the control computer 702 has been temporarily stopped are read in the monitor computer 701 and displayed at step S3815. Date and time are displayed at step S3816.

It is determined at step S3817 whether the data read in from the control computer 702 through the dual-port memory 4501 contains an abnormality code. If the answer is "NO" at step S3817, processing is terminated. If the answer is "YES" at step S3817, an abnormality message is displayed on the monitor 102 at step S3818 and processing is terminated.

Figure 39:
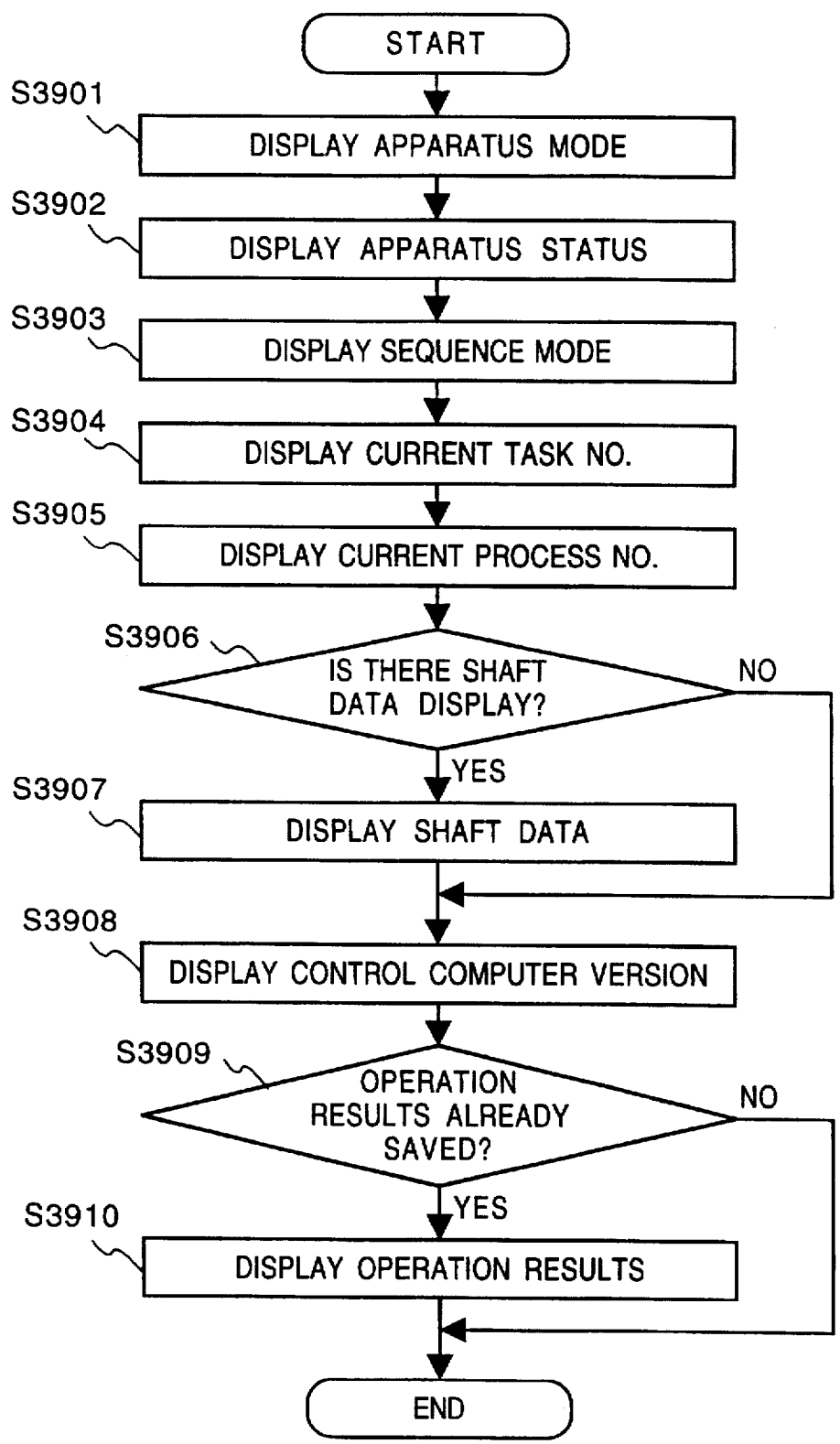
FIG. 39 is a flowchart of monitor display processing in an embodiment of the invention.

FIG. 39 is a flowchart of monitor display processing in the embodiment of the invention. This flowchart illustrates the details of the processing of step S3806 in FIG. 38.

The mode of the adjusting/measuring apparatus 713 is read in from the control computer 702 via the dual-port memory 4501 and displayed at step S3901. The status of the adjusting/measuring apparatus 713 is read in from the control computer 702 via the dual-port memory 4501 and displayed at step S3902. The sequence mode is read in from the control computer 702 via the dual-port memory 4501 and displayed at step S3903. The task number is read in from the control computer 702 via the dual-port memory 4501 and displayed at step S3904. The process number is read in from the control computer 702 via the dual-port memory 4501 and displayed at step S3905. It is determined at step S3906 whether a shaft data display to be presented. If the answer is "NO" at step S3906, processing is proceeded to step S3908. If the answer is "YES" at step S3906, the shaft data is read in from the control computer 702 via the dual-port memory 4501 and displayed at step S3907. The program version of the control computer 702 is read in from the control computer 702 via the dual-port memory 4501 and displayed at step S3908.

It is determined at step S3909 whether operation results have already saved. If the answer is "NO" at step S3909, processing is terminated. If the answer is "YES" at step S3909, the data is read in from the control computer 702 via the dual-port memory 4501 and displayed at step S3910 and processing is terminated.

FIG. 49 is a flowchart showing pause processing for a temporary stop according to the embodiment of the invention. This flowchart illustrates the details of the processing of step S3420 in FIG. 34B, step S3502 in FIG. 35 and step S5106 in FIG. 51.

This pause processing is used in a case where the control computer 702 is forcibly brought to a temporary stop by the monitor computer 701.

It is determined at steps S4901, S4902 whether the control computer 702 has already been brought to a temporary stop. A temporary-stop command is set in the dual-port memory 4501 at step S4903 in order to send the control computer 702 a command to inform it of temporary stop. Break waiting processing for verifying the temporary-stop state is performed at step S4904.

Figure 50A:
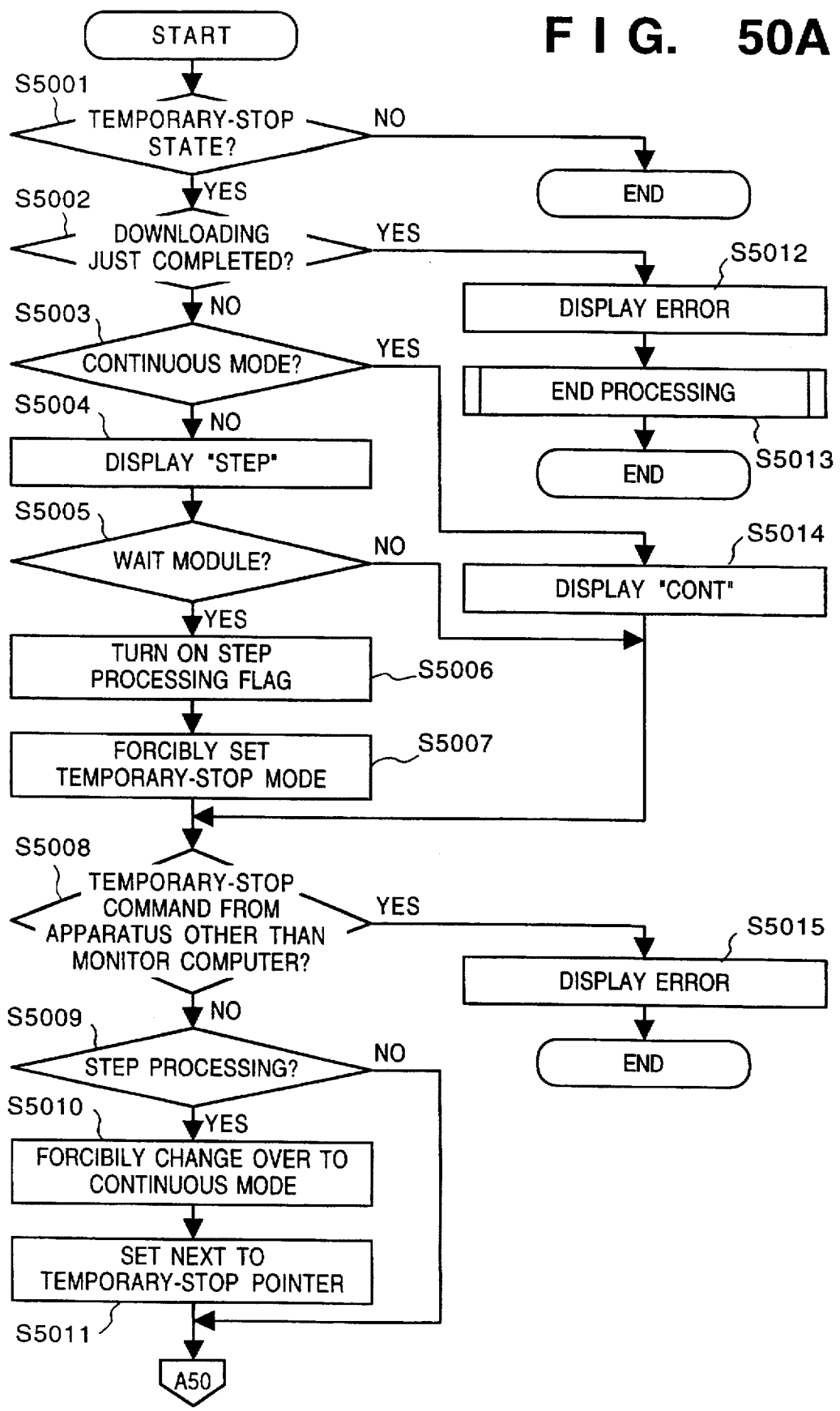
FIGS. 50A and 50B are flowcharts showing temporary-stop cancellation or step processing in a trace mode according to an embodiment of the invention.
Figure 50B:
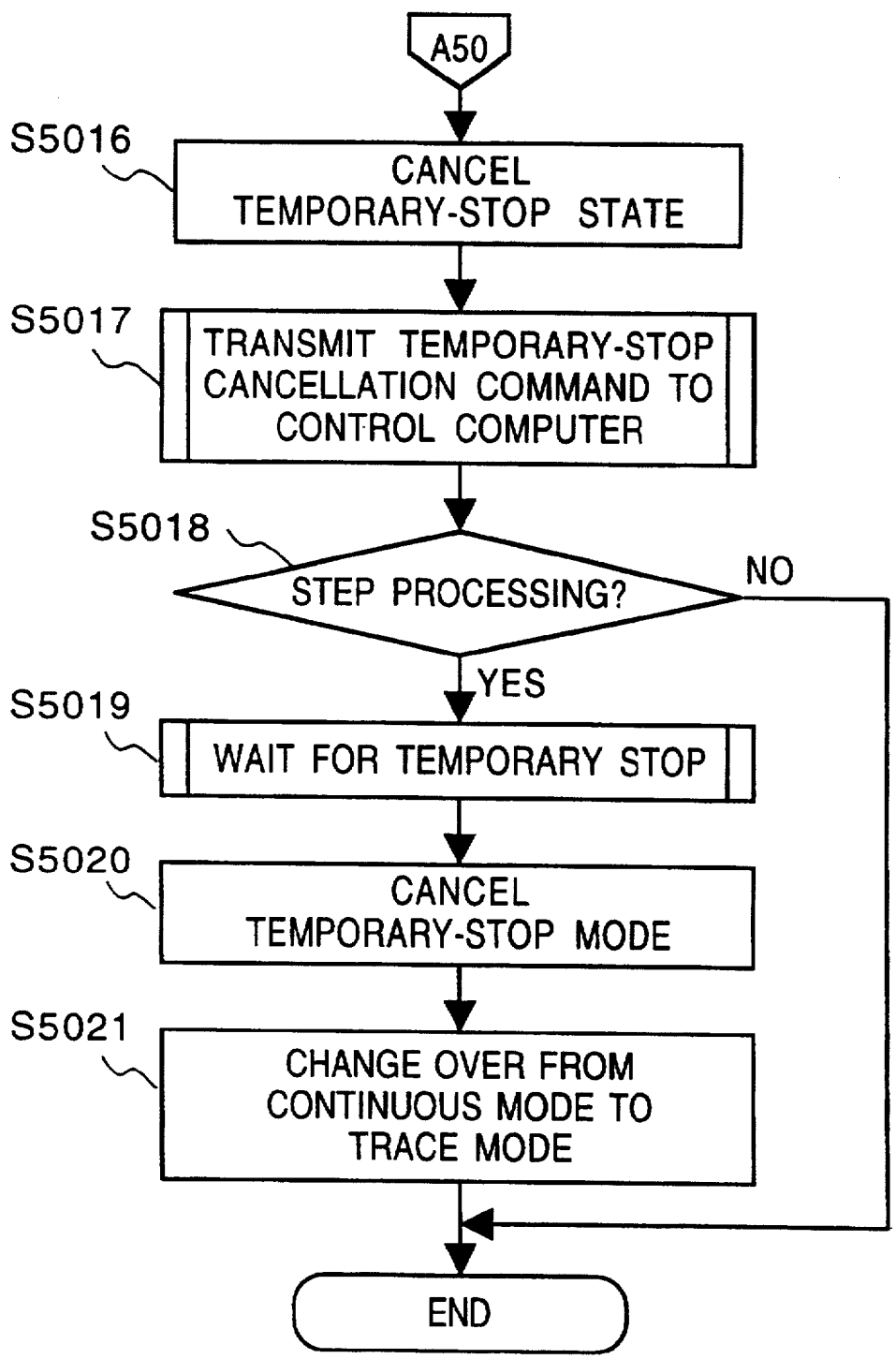

FIGS. 50A and 50B are flowcharts showing temporary-stop cancellation or step processing in a trace mode according to the embodiment of the invention.

It is determined at step S5001 whether the control computer 702 is in the temporarily stopped state. If the answer is "NO" at step S5001, processing is terminated. If the answer is "YES" at step S5001, it is determined at step S5002 whether the present time is a time immediately after the setting of the temporary-stop command in the control computer 702. If the answer is "YES" at step S5002, error message is displayed at step S5012 and end processing is performed at step S5013. If the answer is "NO" at step S5002, it is determined at step S5003 whether the execution mode of the sequence is a continuous mode. If the answer is "YES" at step S5003, "CONT" is displayed at step S5014 and the sequence proceeds to step S5008. If the answer is "NO" at step S5003, "STEP" is displayed at step S5004 and the program proceeds to step S5005. At step S5005, it is determined whether the instruction executed next in the sequence of the control computer 702 is an instruction for advancing the sequence to a deep hierarchical layer by the structure of the program, as in the manner of an instruction for jumping to a subroutine, or repeating processing until certain conditions are met when this instruction is executed. If the answer is "NO", and the sequence proceeds to step S5008.

If the answer is "YES" at step S5005, a step processing flag is turned ON at step S5006 and a break mode is forcibly set at step S5007. It is verified at step S5008 that a temporary-stop instruction has not been issued from a device other than the monitor computer. If the answer is "YES" at step S5008, error message is displayed at step S5015. If the answer is "NO" at step S5008, the program proceeds to step S5009. It is determined at step S5009 whether step processing is to be executed. If the answer is "NO" at step S5009, the sequence proceeds to step S5016. If the answer is "YES" at step S5009, a forcible changeover to the continuous mode is made at step S5010. After the forcible changeover at step S5010, the break point is set in the next sequence at step S5011 and the sequence proceeds to step S5016.

Temporary stop is canceled at step S5016 and a temporary-stop cancel command is sent to the control computer 702 at step S5017. It is determined at step S5018 whether step processing is to be executed, and attainment of the temporary-stop state is verified at set S5019. Cancellation of the temporary-stop state is performed at step S5020. Changeover from the continuous mode to the trace mode is performed at step S5021.

Figure 51:
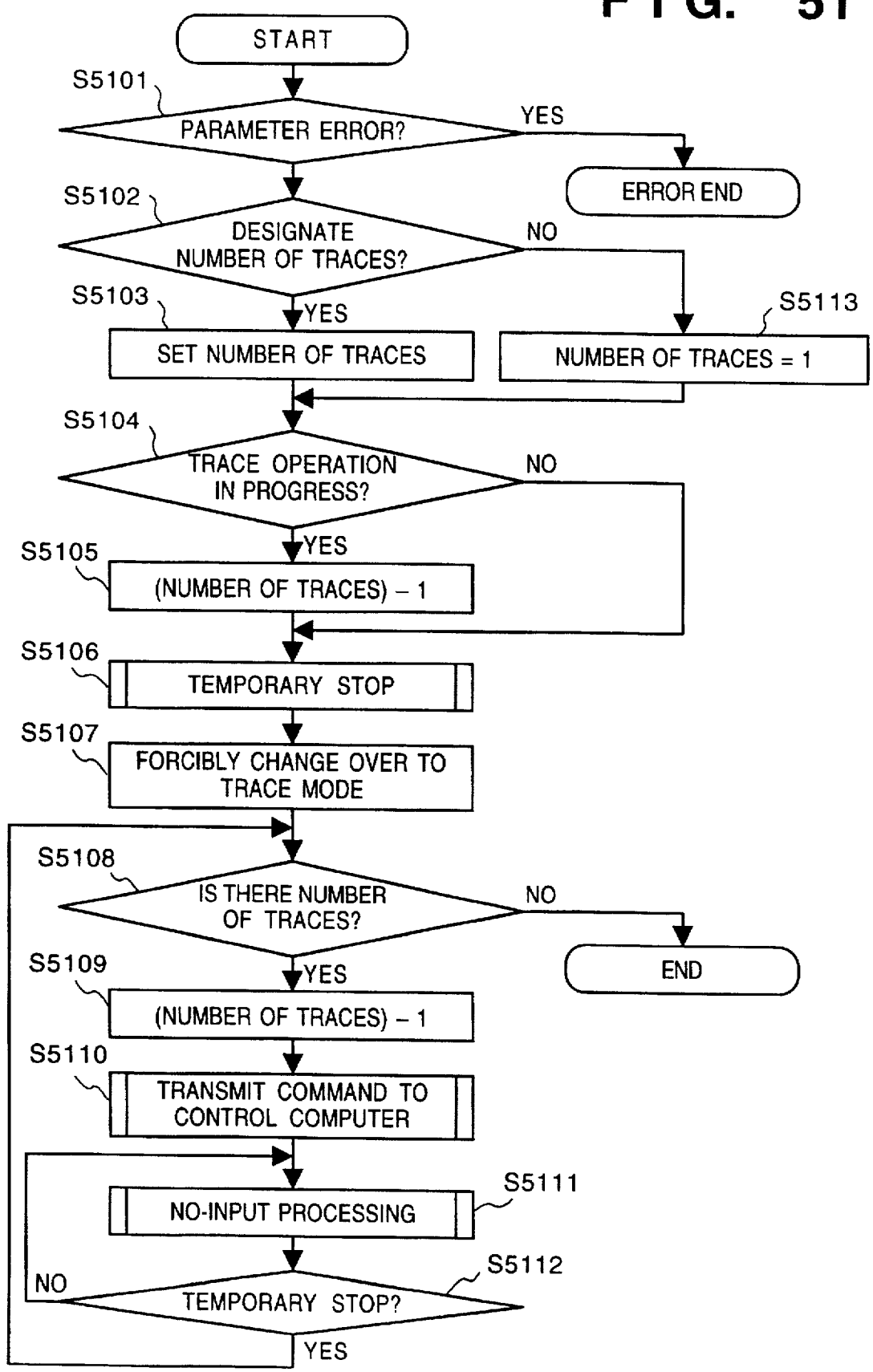
FIG. 51 is a flowchart illustrating sequence trace processing according to an embodiment of the invention.

FIG. 51 is a flowchart illustrating sequence trace processing according to this embodiment of the invention. This flowchart illustrates the details of the processing of step S3604 in FIG. 36.

According to this sequence trace processing, sequence flow information of the control computer 702 described by the special-purpose language program is read via the dual-port memory 4501 as a trace point and displayed on the monitor 102 of the monitor computer 701 as sequence flow information.

It is determined at step S5101 whether a parameter error has occurred. If the answer is "YES" at step S5101, the processing is terminated. If the answer is "NO" at step S5101, it is determined at step S5102 whether the number of traces is to be designated. If there is no designation at step S5102, one is set as the number of traces at step S5113. If there is a designation at step S5102, the number of traces is set at step S5103. It is determined at step S5104 whether a tracing operation is in progress. If the answer is "YES", the number of traces is decremented at step S5105. The control computer 702 is brought to a temporary stop at step S5106. The sequence mode of the control computer 702 is changed over to the trace mode at step S5107. The steps from S5108 to S5112 constitute a trace execution routine. It is determined at step S5108 whether there is a number of traces remaining. If the answer is "NO" at step S5108, the program is terminated. If the answer is "YES" at step S5108, the program proceeds to step S5109 and the number of traces is decremented. By writing the sequence execution command in the dual-port memory 4501, the execution command is transmitted and execution is resumed at step S5110. After that, no-input processing is executed at step S5111. It is determined at step S5112 whether an execution of the control computer 702 is temporarily stopped. If the answer is "YES" at step S5112, the flowchart returns to step S5108. If the answer is "NO" at step S5112, the flowchart returns to step S5111. This sequence is performed until the number of traces becomes zero.

Figure 52A:
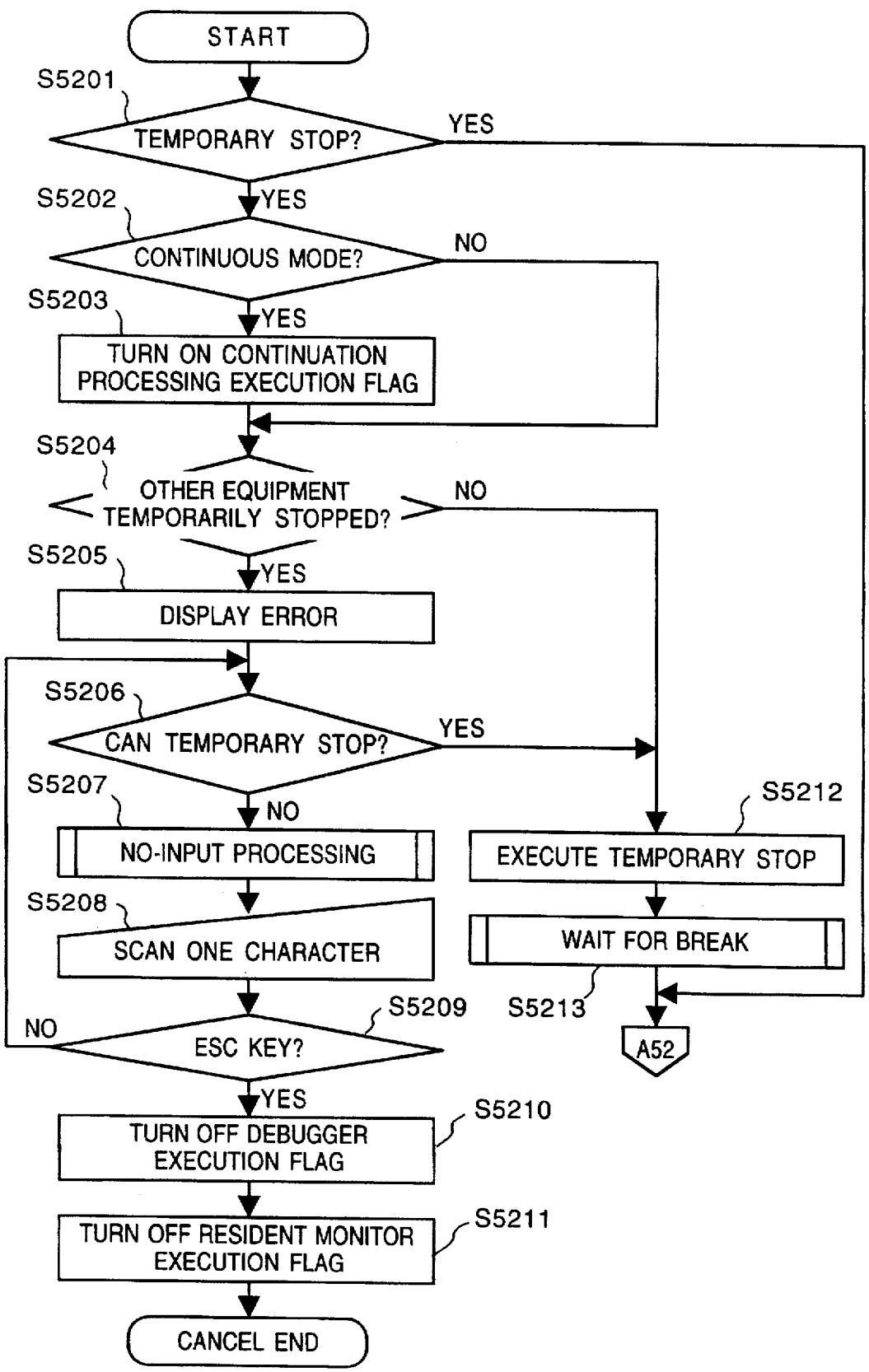
FIGS. 52A and 52B are flowcharts of processing for uploading a sequence table according to an embodiment of the invention.
Figure 52B:
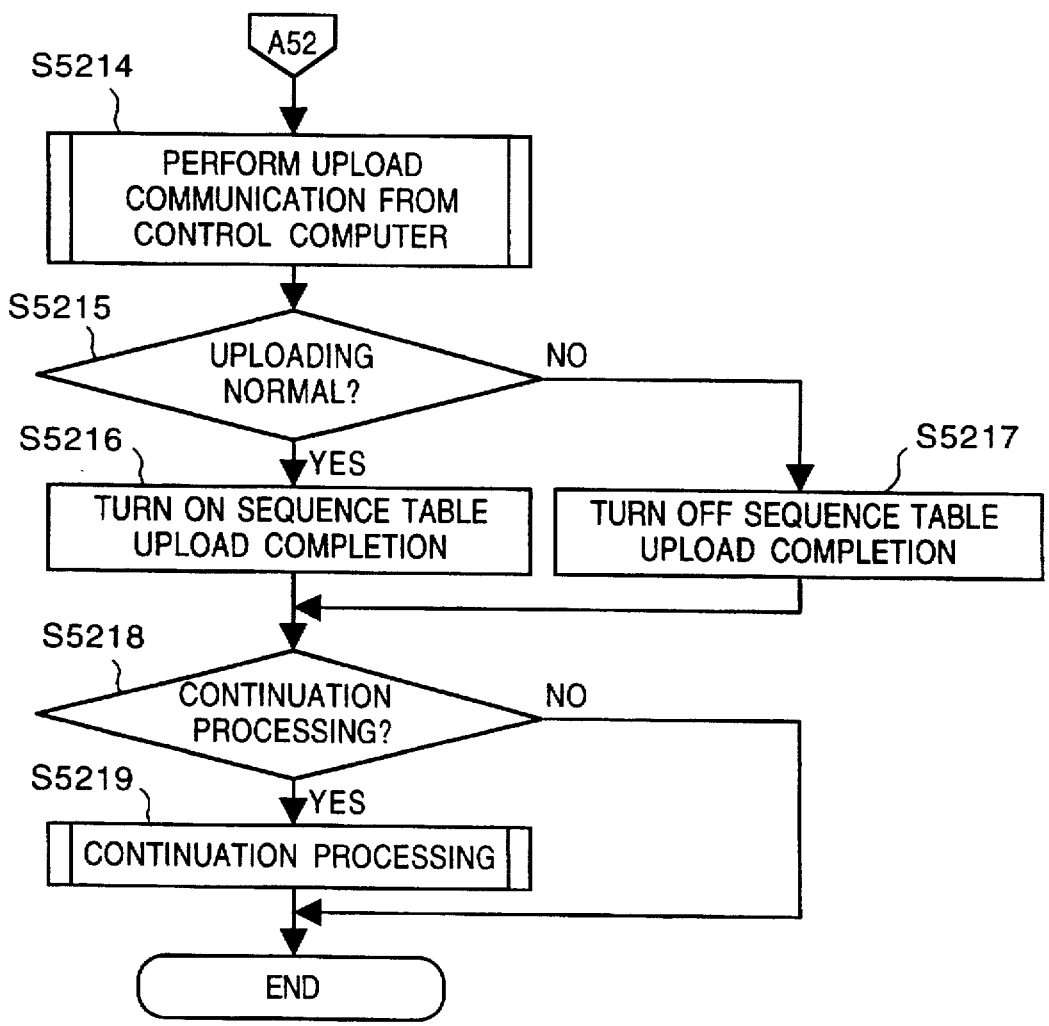

FIGS. 52A and 52B are flowcharts of processing for uploading a sequence table according to the embodiment of the invention. This flowchart illustrates the details of the processing of step S3403 in FIG. 34A.

According to this uploading processing, the sequence program of the control computer 702 described by the special-purpose language program is read from the control computer 702 in advance, and the program is made data for displaying the execution sequence of the control computer 702 in the monitor computer 701 at the time of sequence tracing, etc.

It is determined at step S5201 whether the control computer 702 has been temporarily stopped. If the answer is "YES", processing proceeds to uploading from step S5214 onward. If the answer is "NO", it is determined at step S5202 whether the sequence execution mode of the control computer 702 is the continuous mode or not. If the answer is "YES," a flag for executing continuation processing is set at step S5203. If the answer is "NO," the program proceeds to step S5204. It is determined at step S5204 whether another item of connected equipment is in the temporary-stop state. If the answer is "YES" an error code is displayed at step 5205. If the answer is "NO," a temporary stop is executed at step S5212. Whether the control computer 702 is in the temporary-stop state is verified at step S5213. At step S5206 it is determined whether the equipment can be temporarily stopped. If the answer is "YES," the program proceeds to step S5212. If the answer is "NO," no-impart processing is performed at step S5207. A character is scanned at step S5208. If the ESC key is pressed a "YES" decision is rendered at step S5209 and the program proceeds to steps S5210 and S5211 where the debugger and monitor execution flags, respectively, are turned off and processing is terminated. If the ESC key is not pressed, the program traverses the loop of steps S5206–S5209 until either the ESC is pressed or the equipment is able to stop.

The sequence program is read in from the control computer 702 at step S5214. It is determined at step S5215 whether read-in was performed normally. If the answer is "YES," the sequence table for upload completion is turned on at step S5216. If the answer is "NO," the sequence table for upload completion is turned off at step S5217. It is determined at step S5218 whether a flag for performing continuous processing has been set. If the answer is "YES", the temporary-stop state is canceled and the sequence is resumed at step S5219. If the answer is "NO," the routine is terminated.

Figure 53:
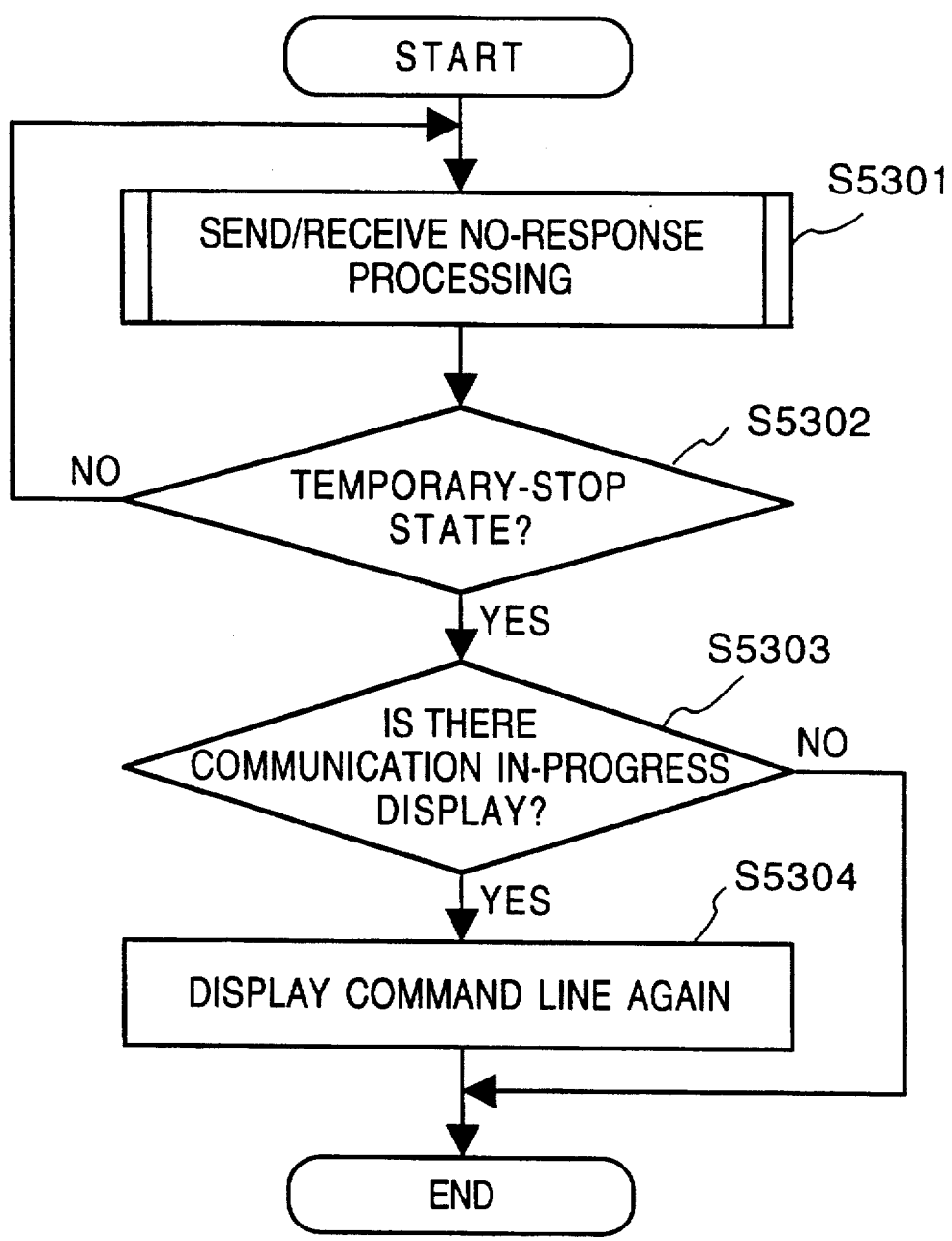
FIG. 53 is a flowchart of temporary-stop wait processing according to an embodiment of the invention.

FIG. 53 is a flowchart of temporary-stop wait processing according to the embodiment of the invention. This flowchart illustrates the details of the processing of step S4904 in FIG. 49, step S5019 in FIG. 50B and step S5213 in FIG. 52A.

Temporary-stop wait processing involves verifying whether the control computer 702 was stopped temporarily when the temporary-stop command was sent from the monitor computer 701 to the control computer 702.

Step 5301 in FIG. 53 is no-response processing for when there is no response from the control computer 702. It is determined at step S5302 whether the control computer 702 has been temporarily stopped. It is determined at step S5303 whether there is an indication indicating communication in-progress on the display of the monitor computer 701. If the answer is "YES" at step S5303, command line is displayed on the display of the monitor computer 701 at step S5304 and processing is ended. If the answer is "NO" at step S5303, processing is ended.

Figure 54:
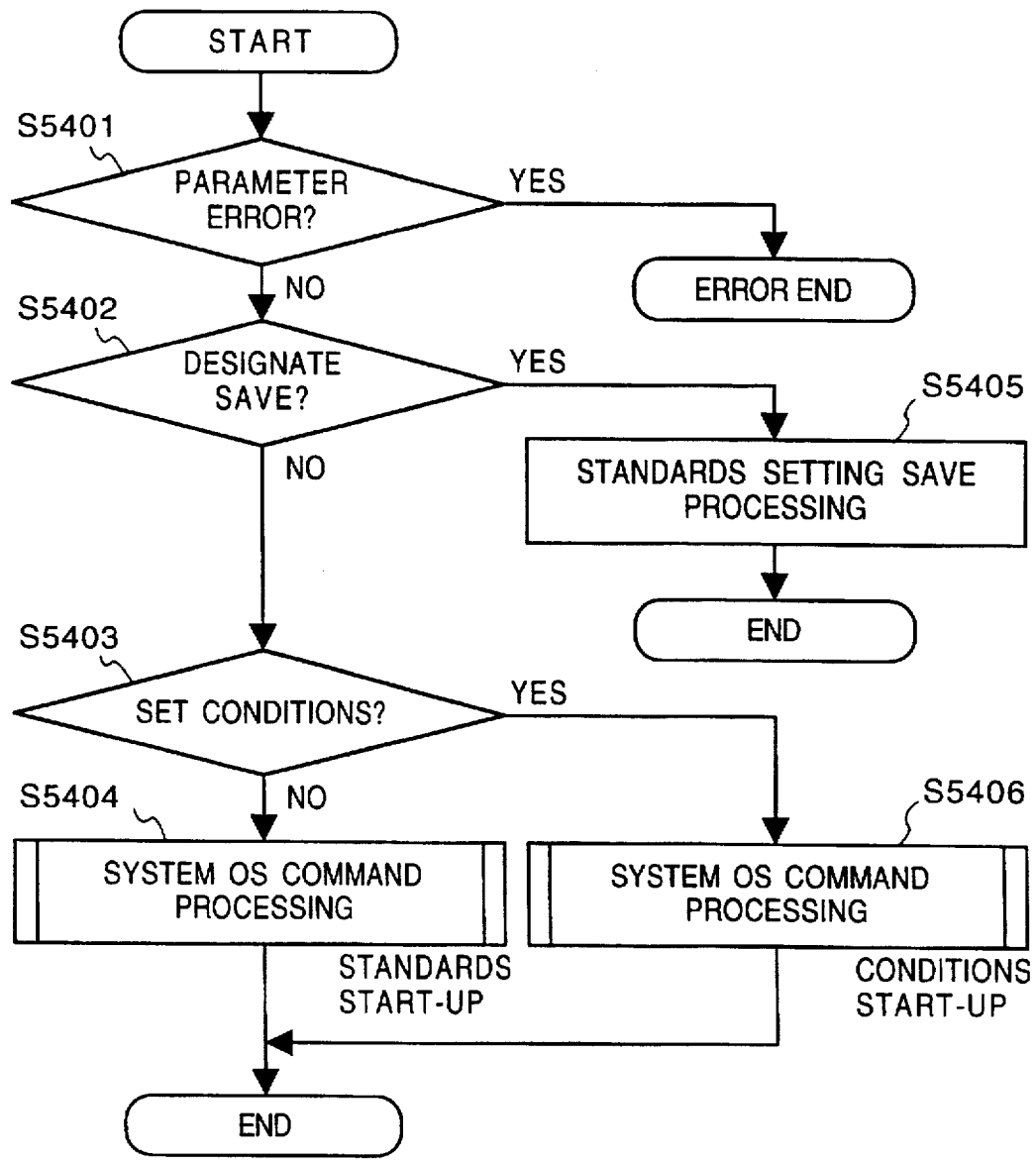
FIG. 54 is a flowchart showing standards setting processing for setting standards data in an embodiment of the invention.

FIG. 54 is a flowchart showing standards setting processing for setting standards data in the embodiment of the invention. This flowchart illustrates the details of the processing of step S3210 in FIG. 32, step S3304 in FIG. 33 and step S3612 in FIG. 36.

It is determined at step S5401 whether there is parameter error. If there is a parameter error at step S5401, processing is terminated. If there is no parameter error at step S5401, it is determined at step S5402 whether standards data of the control computer 702 are to be read in and saved. If the data is to be saved at step S5402, then save processing is executed at step S5405 and processing is terminated. If the data is not to be saved at step S5402, it is determined at step S5403 whether to set conditions or to set standards. If the answer is "NO" at step S5403, a system command is utilized and standards data is edited by a general-purpose editor at step S5404. If the answer is "YES" at step S5403, a system command is utilized and condition data is edited by a general-purpose editor at step S5406.

Figure 55:
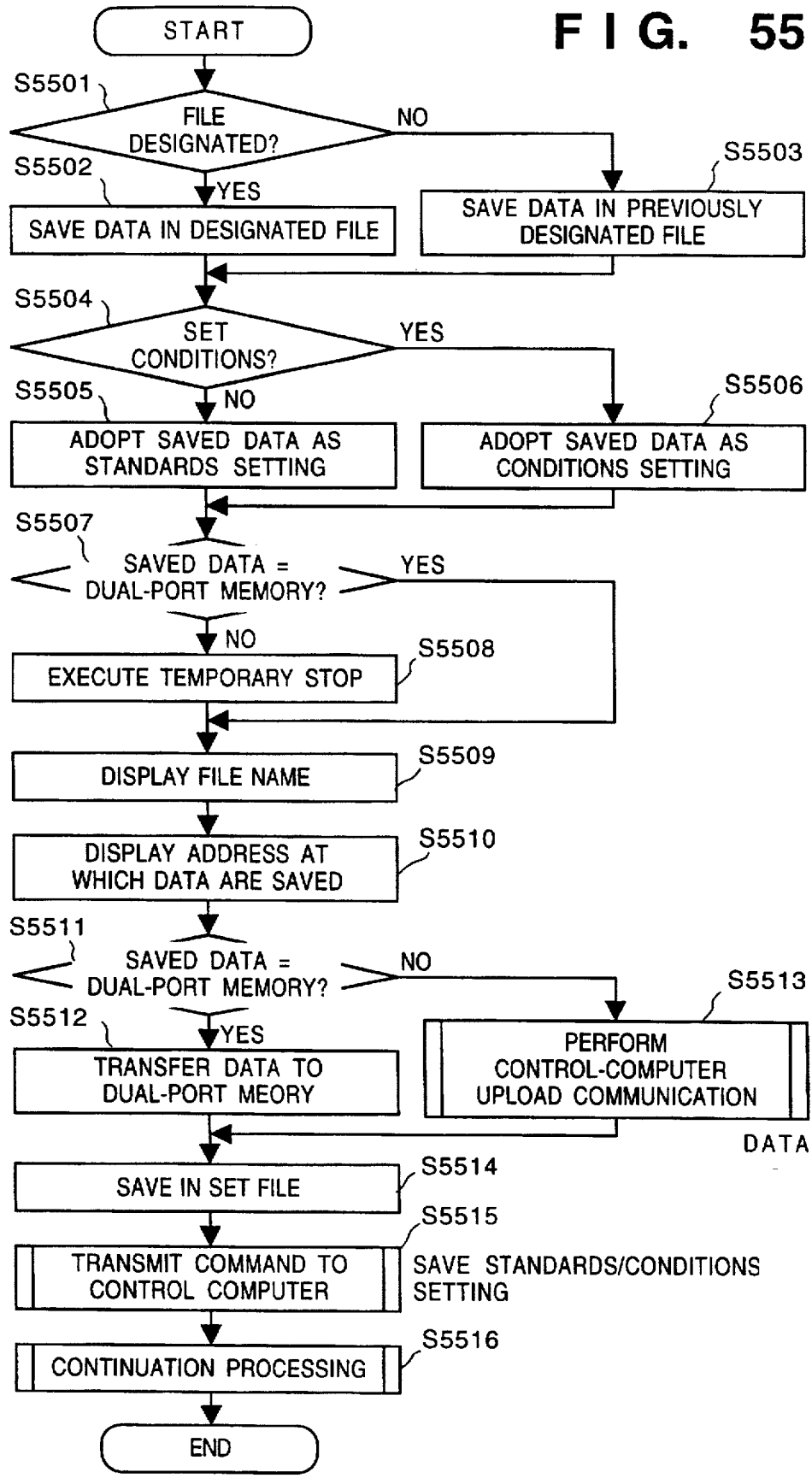
FIG. 55 is a flowchart of processing for saving standards data in an embodiment of the invention.

FIG. 55 is a flowchart of processing for saving standards data in this embodiment of the invention. This flowchart illustrates the details of the processing of step S5405 in FIG. 54.

Processing for saving standards data involves reading standards data of the control computer 702 in the monitor computer 701 and saving the data.

It is determined at step S5501 whether a save file has been designated. If the answer is "YES" at step S5501, the data is saved in the designated file at step S5502. If the answer is "NO" at step S5501, the data is saved in a previously designated file at step S5503. It is determined at step S5504 whether to make the saved data the condition data or the standards data. If the answer is "NO" at step S5504, the saved data is adopted as standards setting data at step S5505. If the answer is "YES" at step S5504, the saved data is adopted as conditions setting data at step S5506.

It is determined at step S5507 whether the memory in which data is saved is the dual-port memory 4501. If the answer is "YES" at step S5507, processing is proceeded to step S5509. If the answer is "NO" at step S5507, then the control computer 702 is temporarily stopped at step S5508. The file name is displayed at step S5509 and the address of the memory in which the data is saved is displayed at step S5510. It is determined at step S5511 whether the memory in which data is saved is the dual-port memory 4501. If the answer is "YES" at step S5511, the data in the dual-port memory 4501 are read in the monitor computer 701 at step S5512. If the answer is "NO" at step S5511, then communication of data from the control computer 702 is performed at step S5513. The data is written in the designated file at step S5514. A data save command is transmitted to the control computer 702 at step S5515. Continuation processing for releasing the control computer 702 from the temporary-stop state is performed at step S5516.

Figure 56:
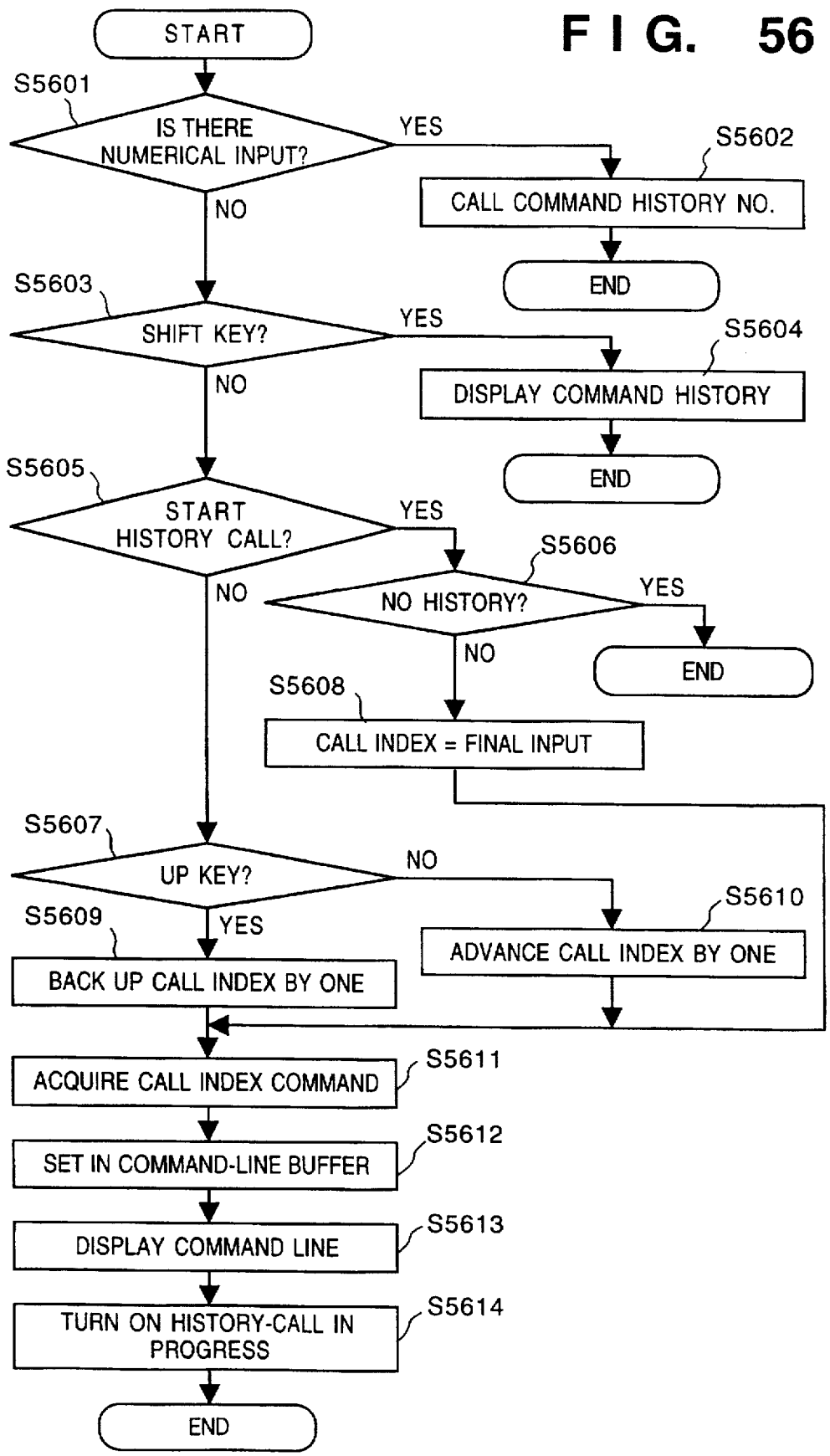
FIG. 56 is a flowchart of processing for command history call processing according to an embodiment of the invention.

FIG. 56 is a flowchart of processing for command history call processing according to this embodiment of the invention. This flowchart illustrates the details of the processing of step S3422 in FIG. 34B.

It is determined at step S5601 whether a numerical value has been entered. If the answer is "YES" at step S5601, then a command corresponding to the numerical value is called at step S5602. If the answer is "NO" at step S5601, it is determined at step S5603 whether command history call while the shift key is being pressed is to be carried out. If the answer is "YES" at step S5603, then the entire command history is displayed at step S5604. If the answer is "NO" at step S5603, it is determined at step S5605 whether call of command history is to be started. If the answer is "NO" at step S5605, processing is proceeded to step S5607. If the answer is "YES" at step S5605, it is determined at step 5606 whether there is a command history. If the answer is "YES" at step S5606, processing is terminated. If there is a command history at step 5606, then the call index of the command entered last is accepted at step S5608.

It is determined at step S5607 whether the UP key among the keyboard cursor keys has been pressed.

If the UP key has been pressed at step S5607, the call index is backed up by one at step S5609. If the UP key has not been pressed at step S5607, the call index is advanced by one at step S5610.

The command corresponding to the call index is acquired at step S5611. The called command is set in a command-line buffer at step S5612, and the commands are displayed on the command line at step S5613. After that, the history-call in progress is turned on the display at step S5614.

Figure 57:
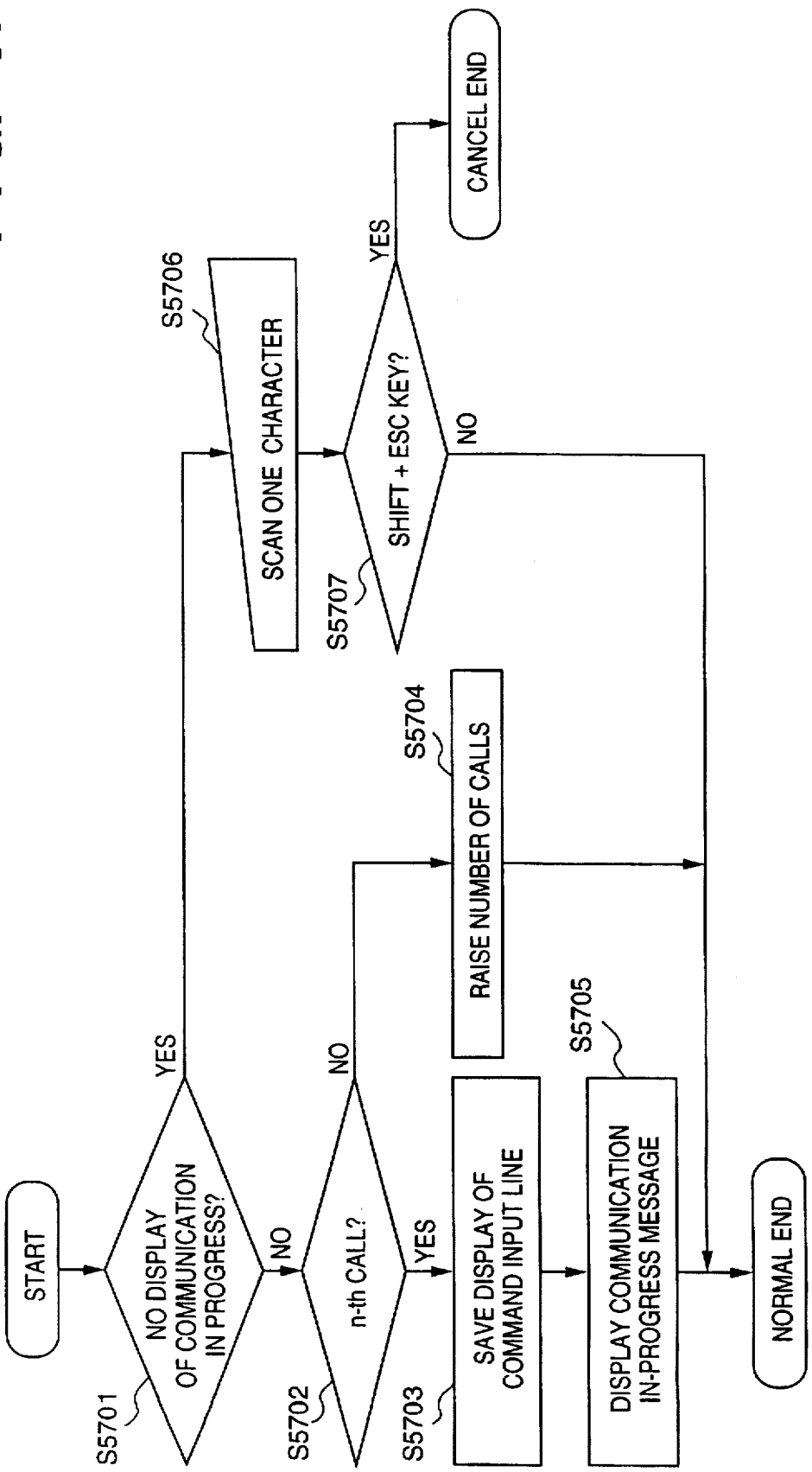
FIG. 57 is a flowchart of send/receive no-response processing according to an embodiment of the invention.

FIG. 57 is a flowchart of send/receive no-response processing according to this embodiment of the invention. This flowchart illustrates the details of the processing of step S5301 in FIG. 53.

Send/receive no-response processing is processing according to which a response is awaited in a case where the monitor computer 701 sends and receives signals to and from the control computer 702.

It is determined at step S5701 whether there is no indication indicating communication in-progress on the display of the monitor computer 701. If the answer is "YES" at step S5701, the program scans one character at step S5706. If the SHIFT and ESC keys are pressed, a "YES" decision is rendered at step S5707 and no response processing is cancelled. If the answer is "NO" at step S5701, it is determined at step S5702 whether a set number of calls ("n") have been made to the control computer 702. If the answer is "NO" at step S5702, the number of calls is raised at step S5704. If the answer is "YES" at step S5702, the display of the command input line is saved at step S5703 and a communication in-progress message is displayed at step S5705.

Figure 58:
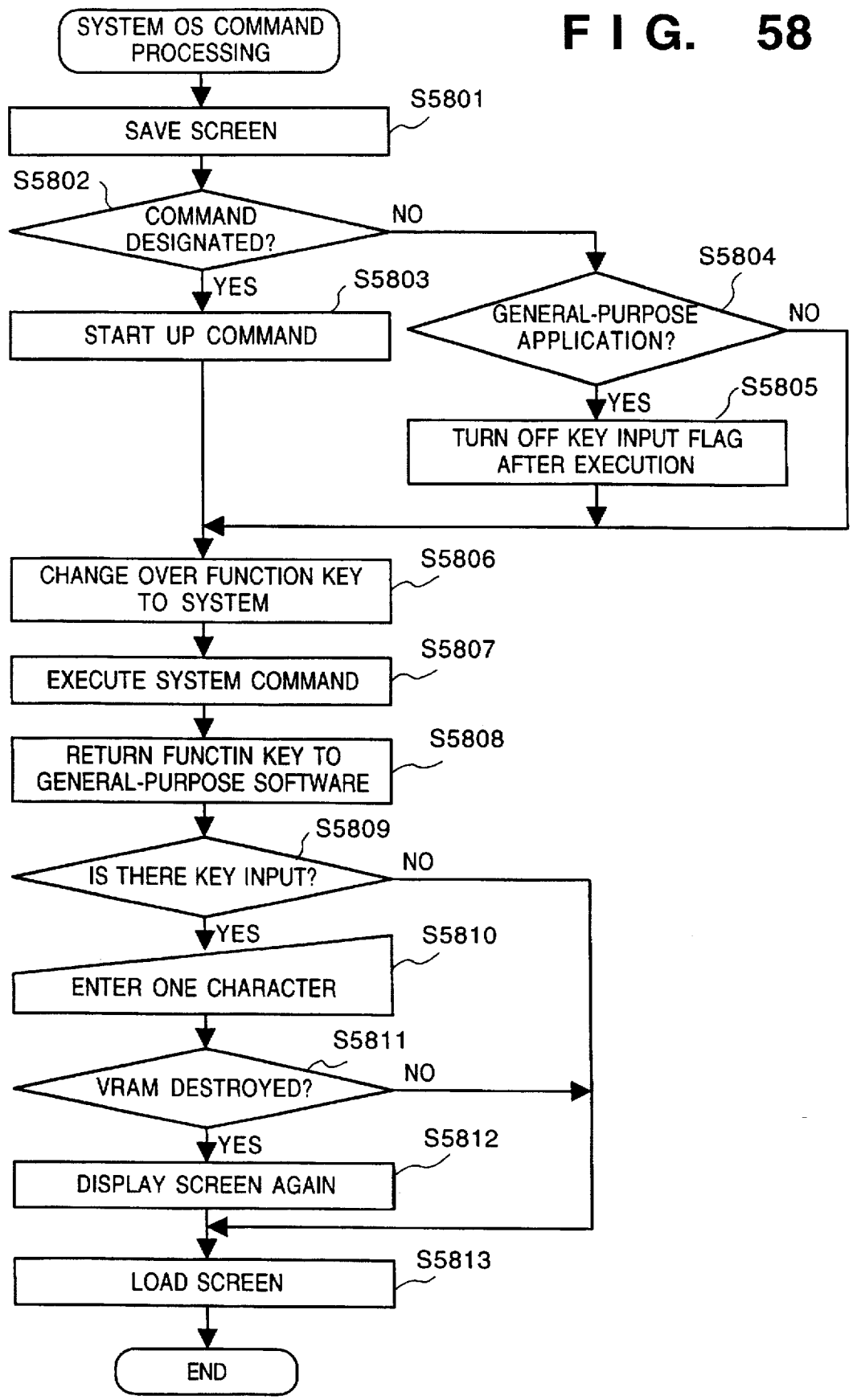
FIG. 58 is a flowchart of command processing in a system OS according to an embodiment of the invention.

FIG. 58 is a flowchart of command processing in a system OS according to the embodiment of the invention. This flowchart illustrates the details of the processing of step S3765 in FIG. 37C and steps S5404, S5406 in FIG. 54.

The current screen is stored at step S5801 in FIG. 58. It is determined at step S5802 whether a command for returning to the system OS has been designated. If the answer is "YES" at step S5802, a command for returning to the system OS is started up at step S5803. If the answer is "NO" at step S5802, it is determined at step S5804 whether a special-purpose application is to be started up. If the answer is "NO" at step S5804, processing is proceeded to step S5806. If the answer is "YES" at step S5804, a key input flag is turned off after the special-purpose application determined at step S5804 is executed at step S5805.

Designation of the function key is changed over to the system OS at step S5806, and the command of the system OS is executed at step S5807. Designation of the function key of monitor computer 701 is returned to what has been designated by the software of the monitor computer 701 at step S5808. It is determined whether there is a key input at step S5809. If the answer is "NO" at step S5809, processing proceeds to step S5813. If the answer is "YES" at step S5809, scanning the key input entered from the keyboard is performed at step S5810.

It is determined at step S5811 whether the memory for the screen display has been destroyed or not. If the answer is "NO" at step S5811, processing proceeds to step S5813. If the answer is "YES" at step S5811, the screen is displayed again at step S5812 and the screen saved at step S5801 is read in at step S5813.

Figure 59:
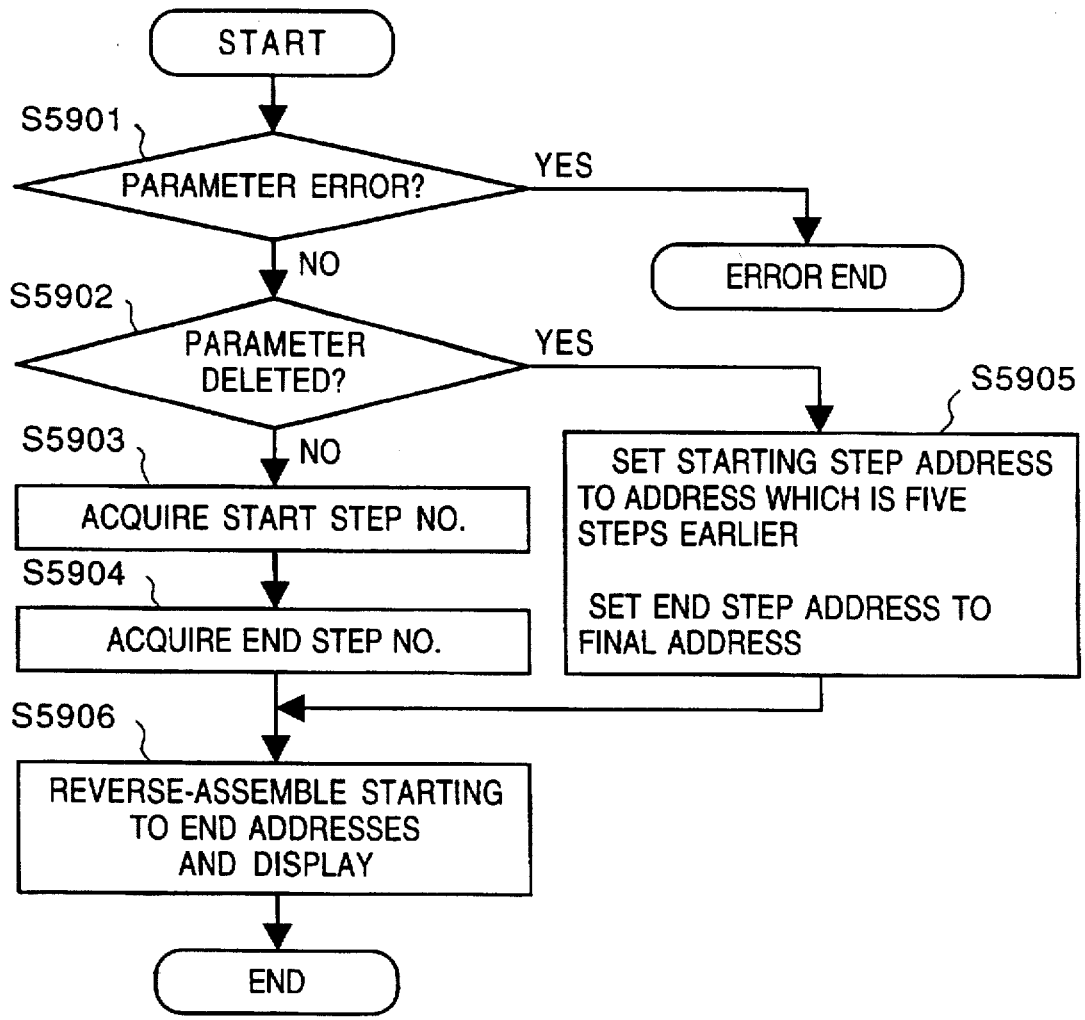
FIG. 59 is a flowchart of processing for displaying sequence history according to an embodiment of the invention.

FIG. 59 is a flowchart of processing for displaying sequence history according to the embodiment of the invention. This flowchart illustrates the details of the processing of step S3721 in FIG. 37A.

It is determined at step S5901 whether an error is present in the parameter accompanying a command for displaying sequence history. If the answer is "YES" at step S5901, processing is terminated. If the answer is "NO" at step S5901, it is determined at step S5902 whether the parameter has been deleted. If the answer is "NO" at step S5902, the first step and the last step for displaying the sequence history are read via the dual-port memory 4501 at steps S5903 and S5904. If the answer is "YES" at step S5902, the starting step address is made an address which is five steps earlier, and the final step address is made the very last address of the sequence at step S5905. The sequence between the starting step address and the final step address is assembled in reverse and the sequence history is displayed at step S5906.

Figure 60:
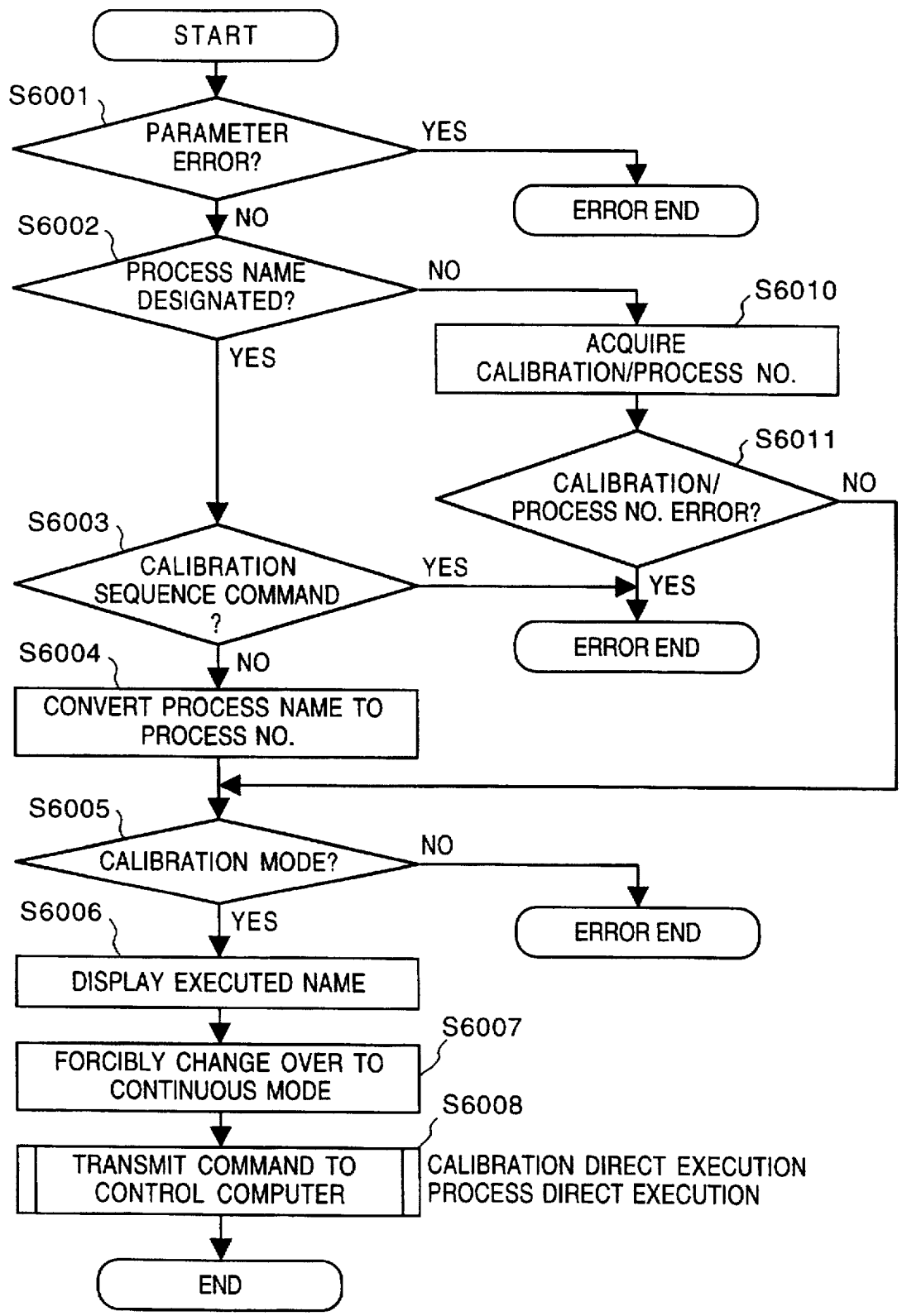
FIG. 60 is a flowchart of processing for a direct execute command in an embodiment of the invention.

FIG. 60 is a flowchart of processing for a direct execute command in the embodiment of the invention. This flowchart illustrates the details of the processing of step S3716 in FIG. 37A.

The direct execute command is processing according to which the control computer 702 is made to perform the sequence operation of a process by issuance of a command from the monitor computer 701.

It is determined at step S6001 whether the parameter accompanying the command has an error. If there is an error at step S6001, processing is terminated. If the answer is "NO" at step S6001, it is determined at step S6002 whether the name of the process has been designated. If the answer is "YES" at step S6002, processing is proceeded to step S6003. If there is no designation at step S6002, then process NO is accepted at step S6010. It is determined at step S6011 whether process NO has an error. If the answer is "NO" at step S6011, processing is proceeded to step S6005. If the answer is "YES" at step S6011, processing is terminated.

It is determined at step S6003 whether the command is the command of a calibration sequence. If the answer is "NO" at step S6003, the name of the process is converted to the process number at step S6004. If the answer is "YES" at step S6003, processing is terminated.

It is determined at step S6005 whether the sequence mode is the calibration mode. If the answer is "NO" at step S6005, processing is terminated. If the answer is "YES" at step S6005, the name of the sequence to be executed is displayed at step S6006. The mode is changed over to the continuous mode at step S6007. Command transmission processing for sending a command by which the control computer 702 is made to execute the process directly is performed at step S6008.

Figure 61:
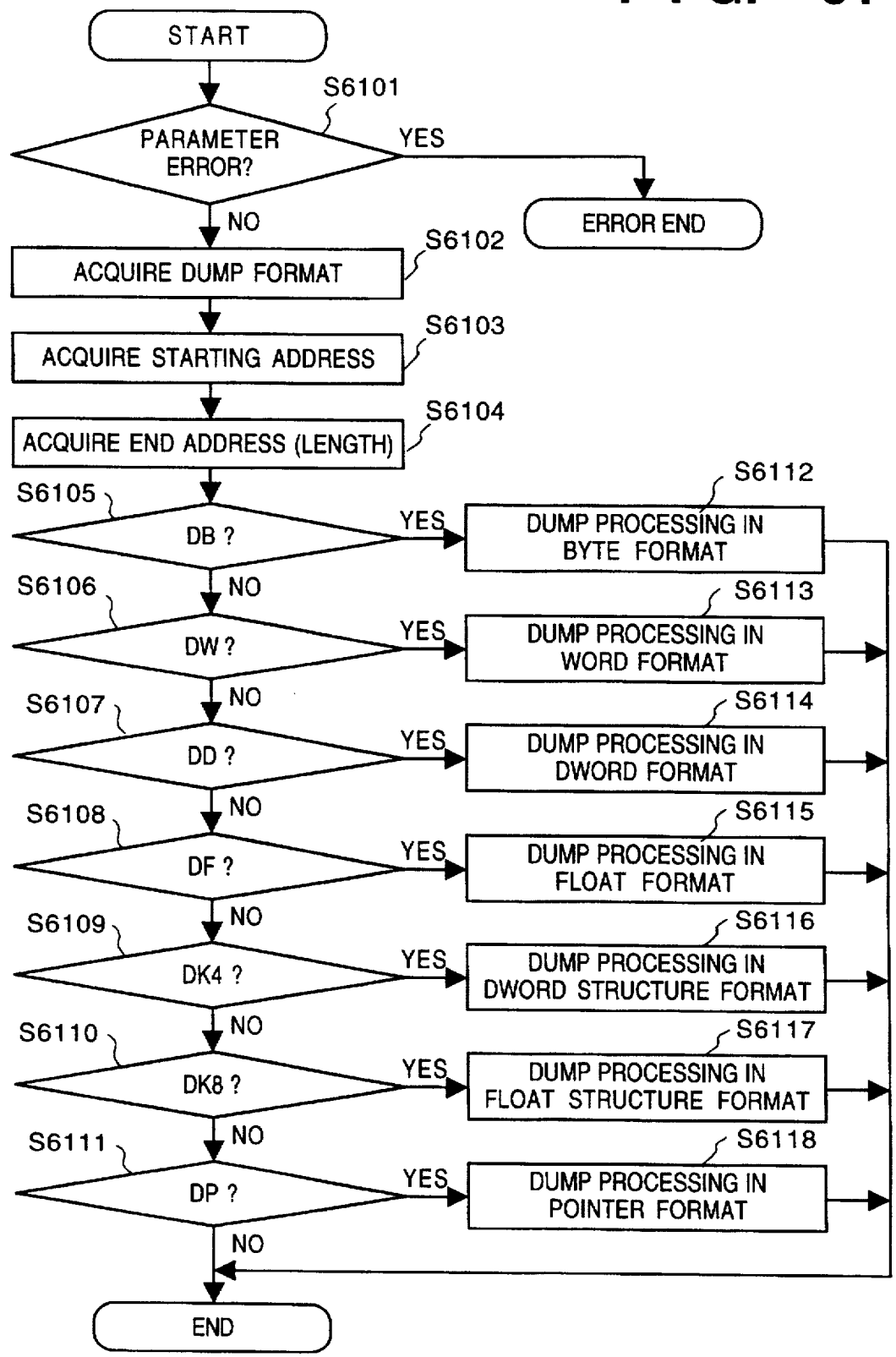
FIG. 61 is a flowchart of processing for a memory-dump command in an embodiment of the invention.

FIG. 61 is a flowchart of processing for a memory-dump command in this embodiment of the invention. This flowchart illustrates the details of the processing of step S3717 in FIG. 37A.

The memory dump command is processing for reading in the contents of the memory of the control computer 702 via the dual-port memory 4501.

It is determined at step S6101 whether the parameter accompanying the command has an error. If there is an error at step S6101, processing is terminated. If the answer is "NO" at step S6101, the format of data read in is acquired at step S6102, the starting address of read-in is acquired at step S6103, and the final address (or length) is acquired at step S6104.

At steps S6105 to S6111, the type of format acquired at step S6102 is determined. At steps S6112 to S6118, the corresponding processing is executed in accordance with the particular data format determined at any one of steps S6105 to S6111. After the processing, the processing is terminated and the sequence is returns to step S3777 in FIG. 37D.

That is, if the acquired type of format is "DB" at step S6105, dump processing in BYTE format is executed at step S6112. If the acquired type of format is "DW" at step S6106, dump processing in WORD format is executed at step S6113. If the acquired type of format is "DD" at step S6107, dump processing in DWORD format is executed at step S6114. If the acquired type of format is "DF" at step S6108, dump processing in FLOAT format is executed at step S6115. If the acquired type of format is "DK4" at step S6109, dump processing in DWORD structure format is executed at step S6116. If the acquired type of format is "DK8" at step S6110, dump processing in FLOAT structure format is executed at step S6117. If the acquired type of format is "DP" at step S6111, dump processing in POINTER format is executed at step S6118.

Figure 62:
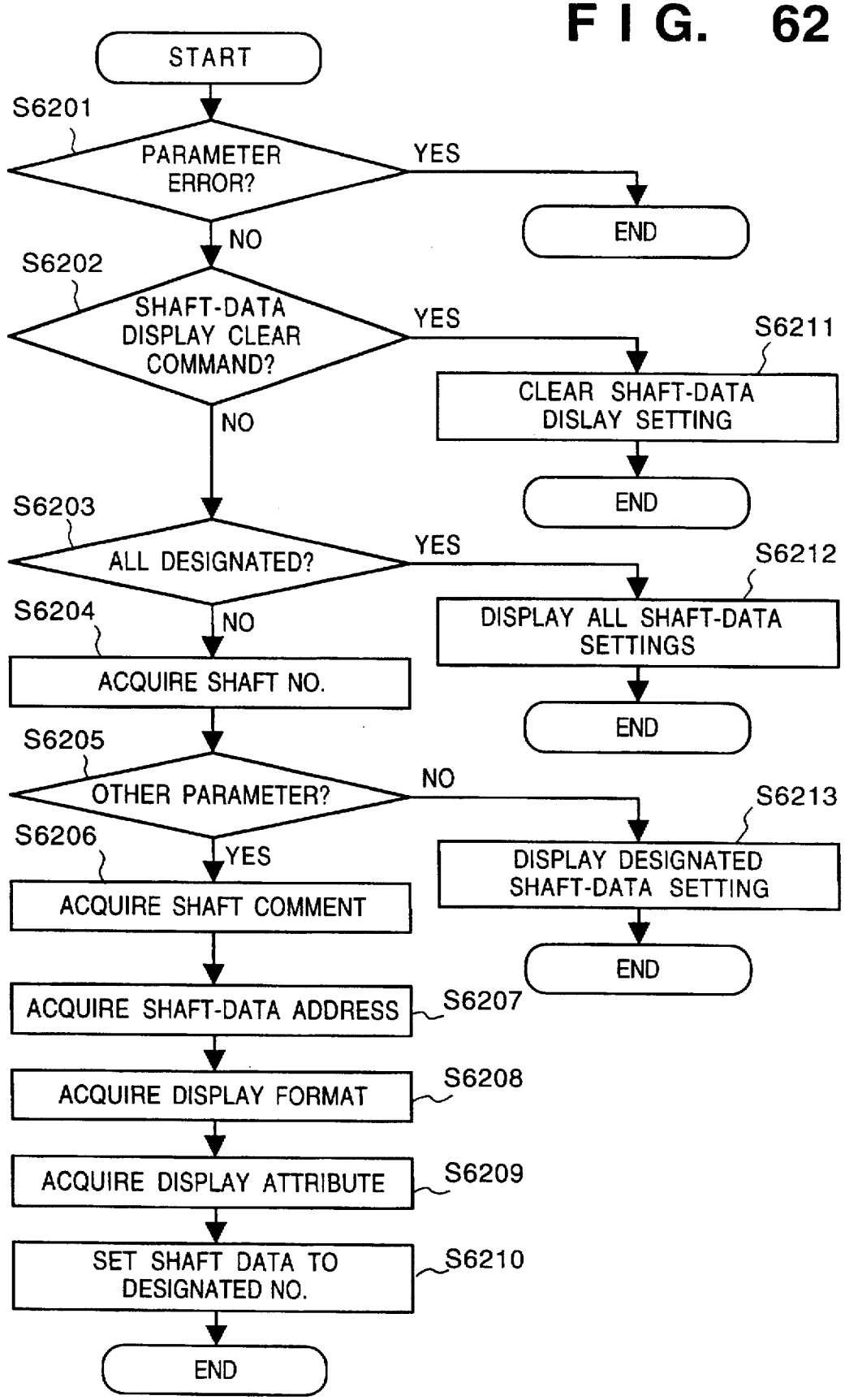
FIG. 62 is a flowchart of processing for a display set command for setting a display of shaft data in an embodiment of the invention.

FIG. 62 is a flowchart of processing for a display set command for setting the display of shaft data in the embodiment of the invention. This flowchart illustrates the details of the processing of step S3749 in FIG. 37C.

It is determined at step S6201 whether the parameter accompanying the command has an error. If there is an error at step S6201, processing is terminated. If the answer is "NO" at step S6201, it is determined at step S6202 whether the command is one for clearing the display of shaft data. If the answer is "YES" at step S6202, then the shaft-data display setting is cleared at step S6211 and processing is terminated. If the answer is "NO" at step S6202, it is determined at step S6203 whether all shafts have been designated. If the answer is "YES" at step S6203, all shaft data is displayed at step S6212 and processing is terminated. If the answer is "NO" at step S6203, shaft NO. is accepted at step S6204.

It is determined at step S6205 whether there is another parameter. If there is no other parameter at step S6205, the designated shaft data is displayed and set at step S6213 and processing is ended. If there is another parameter at step S6205, shaft comments to be displayed are acquired at step S6206 and the addresses of the displayed shafts are acquired at step S6207. After that, display format is acquired at step S6208 and display attribution is acquired at step S6209. Further, a shaft-data display setting is set at the designated location at step S6210.

Figure 63:
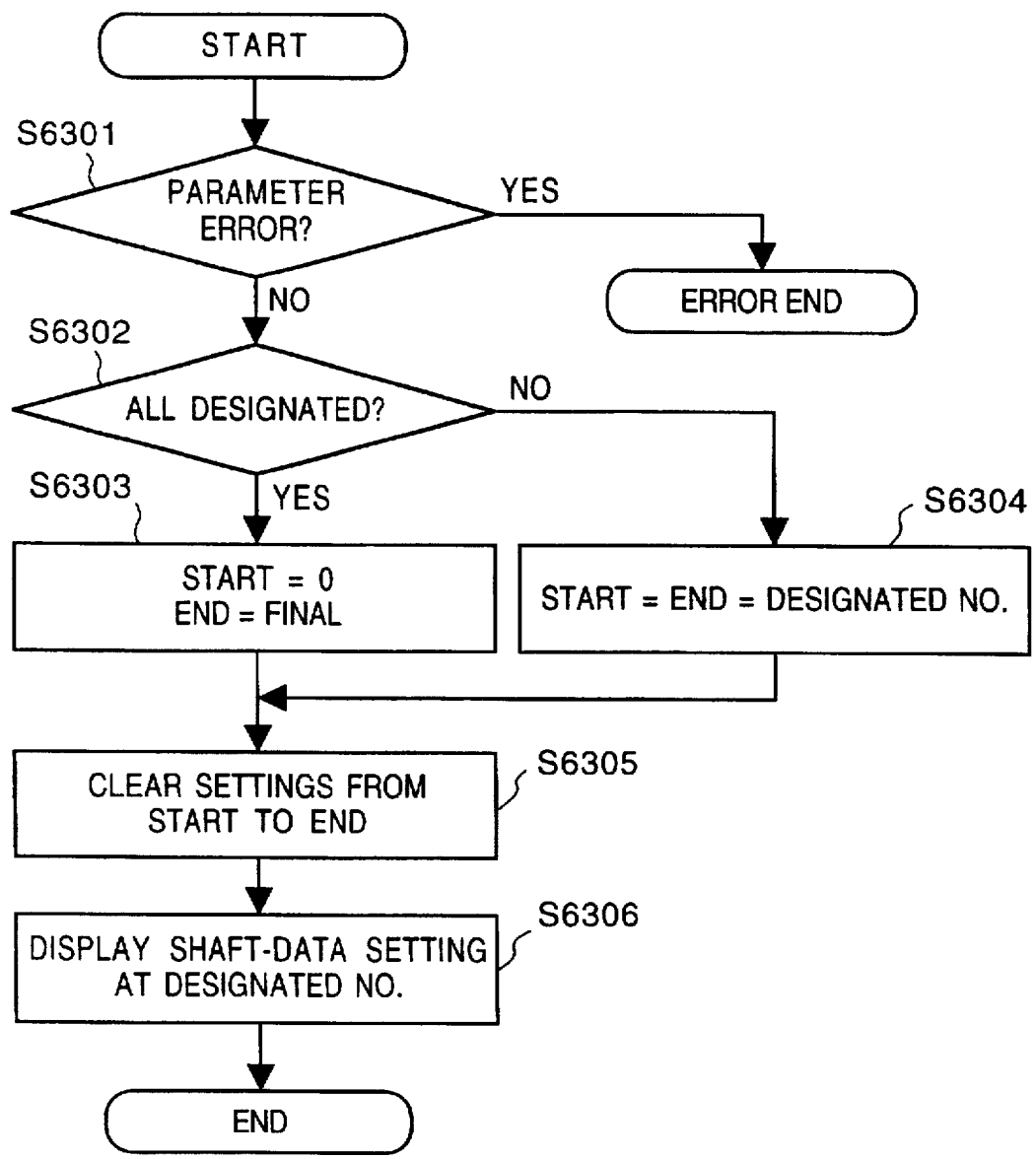
FIG. 63 is a flowchart of processing for clearing the display setting of shaft data in an embodiment of the invention.

FIG. 63 is a flowchart of processing for clearing the display setting of shaft data in the embodiment of the invention. This flowchart illustrates the details of the processing of step S6211 in FIG. 62.

It is determined at step S6301 whether the parameter accompanying the command has an error. If there is an error at step S6301, processing is terminated. If the answer is "NO" at S6301, it is determined at step S6302 whether all shafts have been designated. If the answer at step S6302 is "NO", the start and end settings are set at a designated number at step S6304. If the answer is "YES" at step S6302, the start setting is set at 0 and the end setting is set at final at step S6303. At step S6305 all shaft-data display settings are cleared and at step S6306 the shaft-data setting is displayed at the designated number.

Figure 64:
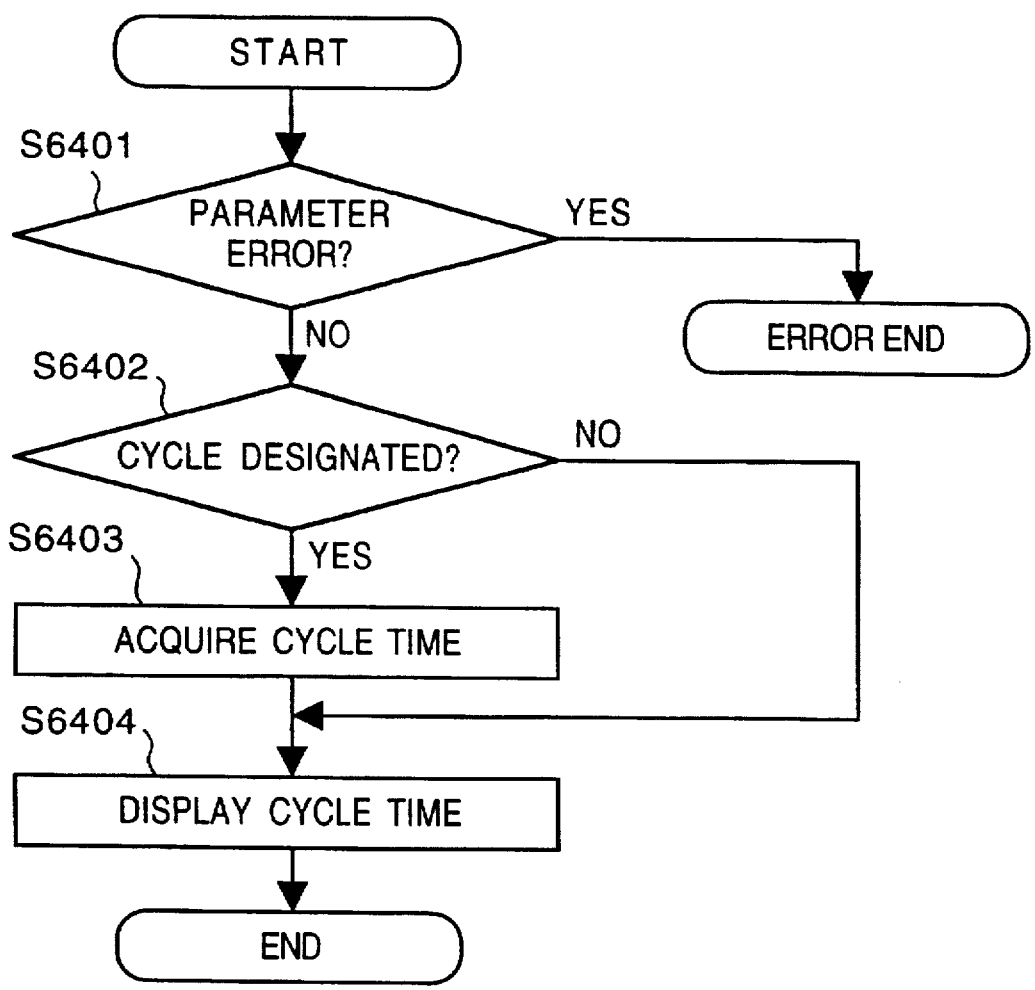
FIG. 64 is a flowchart of command processing for setting the execution cycle (processing speed) of a sequence in an embodiment of the invention.

FIG. 64 is a flowchart of command processing for setting the execution cycle (processing speed) of a sequence in this embodiment of the invention. This flowchart illustrates the details of the processing of step S3752 in FIG. 37C.

It is determined at step S6401 in FIG. 64 whether the parameter accompanying the command has an error. If there is an error at step S6401, processing is terminated. If the answer is "NO" at step S6401, it is determined at step S6402 whether a cycle has been designated. If the answer is "YES" at step S6402, cycle time is accepted at step S6403. If the answer is "NO" at step S6402, processing is proceeded to step S6404. Cycle time is displayed at step S6404.

3. Description of operation

The operation of this embodiment of the invention will be described in the order of processing with reference to FIGS. 40–43, 44, 46–48.

FIGS. 40–43 show examples of displays (fixed displays) of screens at the time of resident monitor execution according to the embodiment of the invention.

Figure 44:
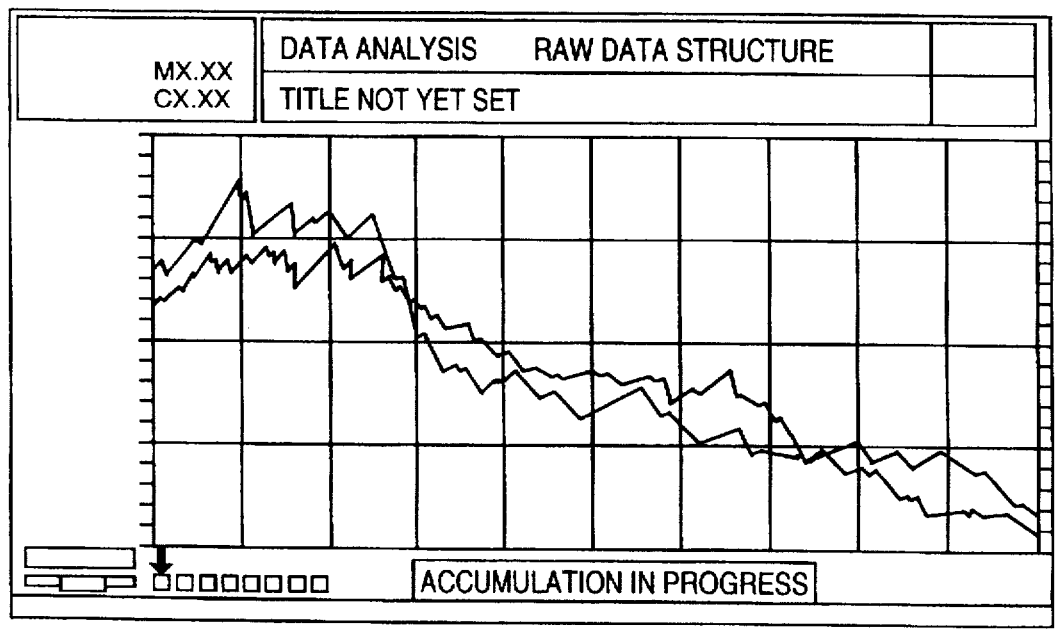
FIG. 44 is a diagram showing an example of a display on a screen for data analysis processing at execution of a resident monitor in an embodiment of the invention.

FIG. 44 is a diagram showing an example of a display on a screen at the time of resident monitor execution according to the embodiment of the invention (i.e., when data analysis processing is executed).

Figure 46:
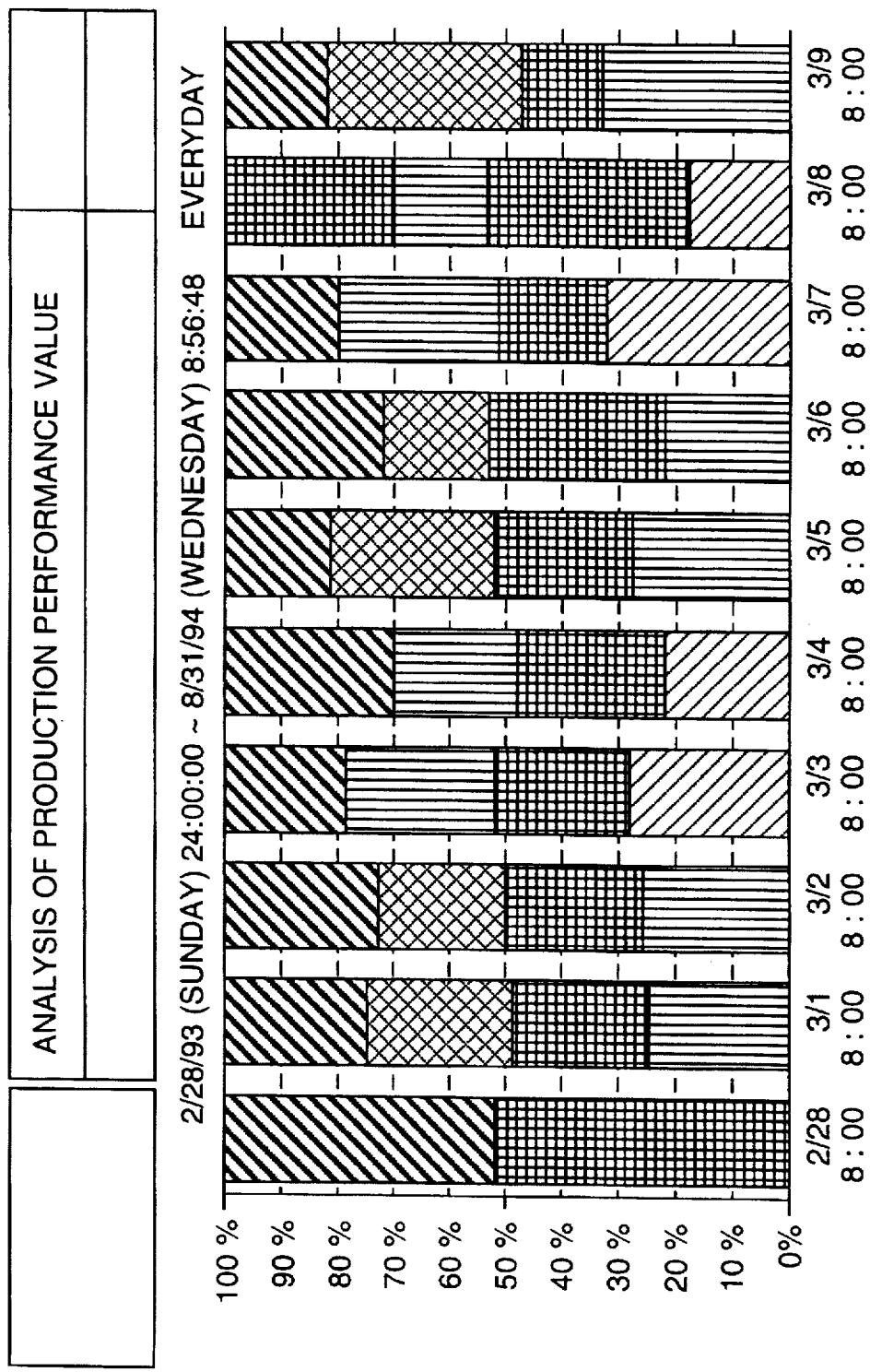
FIG. 46 is a diagram showing an example of a display on a screen representing a distribution of faulty items on the basis of length of time in an embodiment of the invention (when a value indicative of production performance is analyzed)
Figure 47:
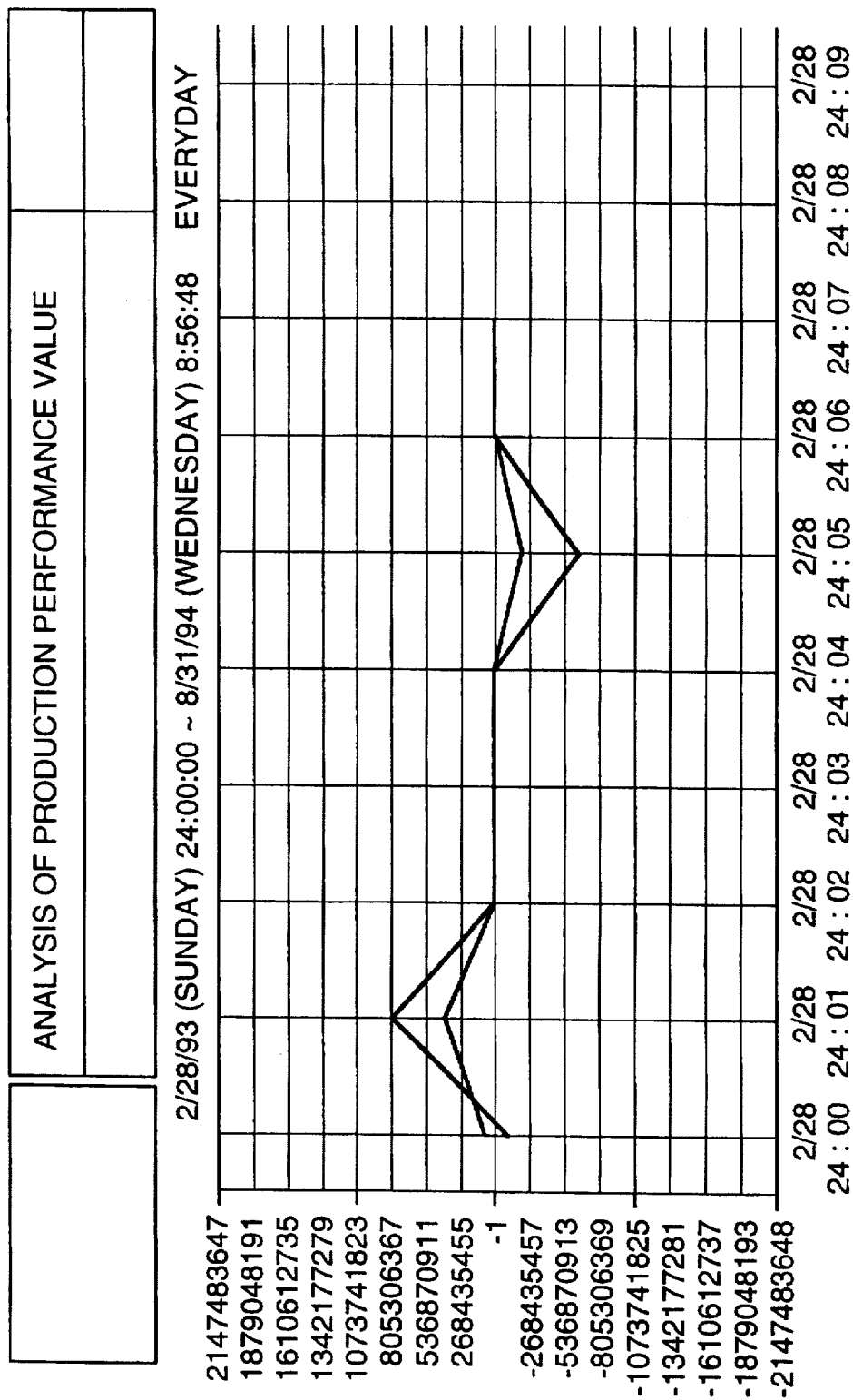
FIG. 47 is a diagram showing an example of a display on a screen representing a designated-data displacement distribution by workpiece in an embodiment of the invention (when a value indicative of production performance is analyzed)
Figure 48:
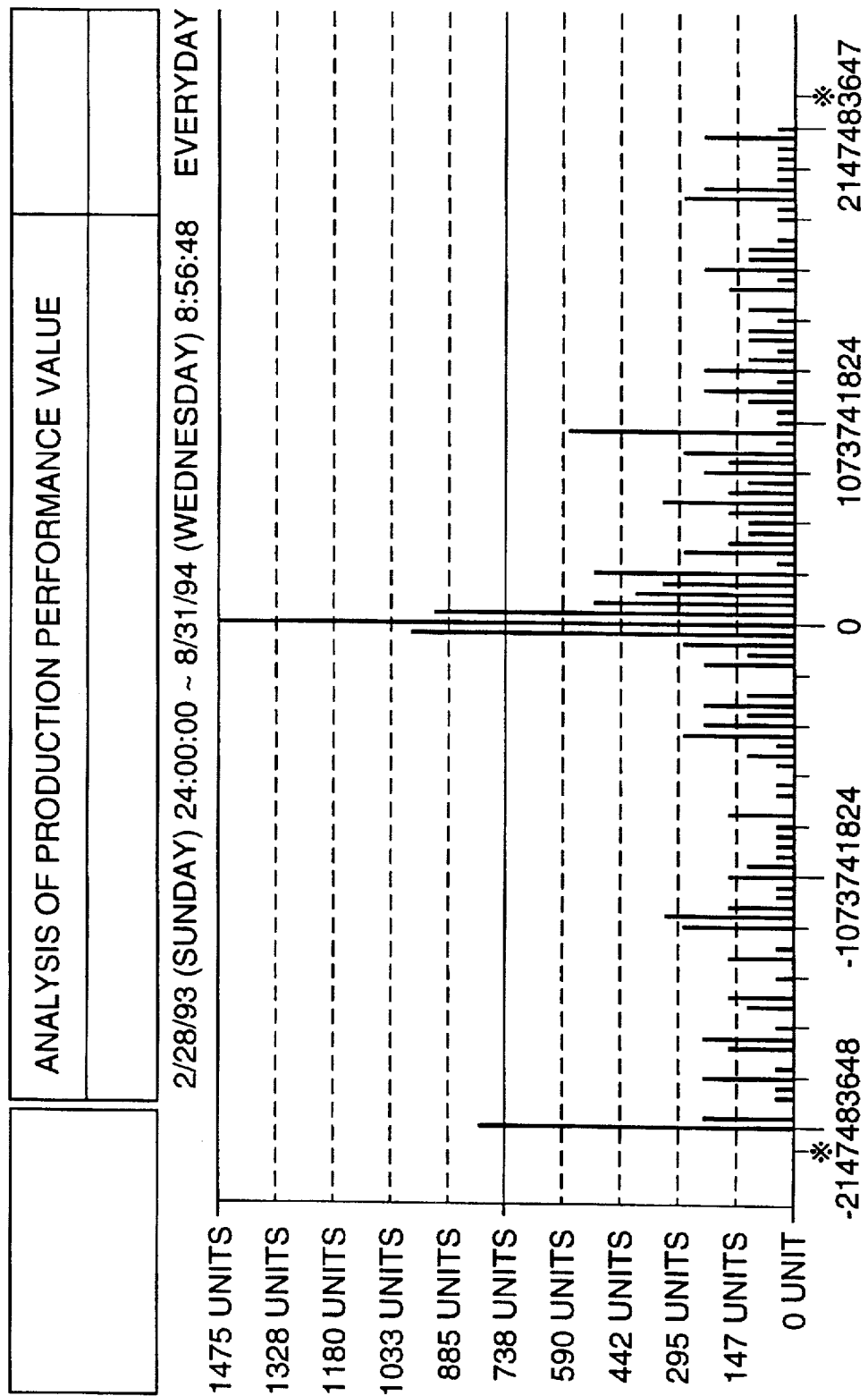
FIG. 48 is a diagram showing an example of a display on a screen representing adjustment process performance illustrating the degree of deviation from a standard value according to an embodiment of the invention.

FIGS. 46–48 are diagrams showing examples of a display on a screen at execution of a submenu according to this embodiment of the invention (i.e., at analysis of production performance values).

First, in FIGS. 8A–8D showing the operating sequence of the control computer 702 (105), the computer system per se is initialized at step S802 when power is introduced. Step S804 is the routine for initializing the apparatus. This routine is decoded and executed at step S803, which is the translation program of the special-purpose language program. The control computer 702 accepts the states of the switches on the control panel at step S810. If the operation mode switch 601 on the control panel is in the on-line automatic mode position, the program proceeds in the "YES" direction at step S817. If the start-up flag has been set from, say, the conveyor of an automated line (not shown) or a central command computer, the answer is "YES" at step S820 and the program proceeds to step S821. If the start-up flag has not been set, the answer is "NO" at step S820 and the program jumps to step S832 and returns to step S805 so that this loop is traversed again. If a workpiece from the conveyor of the automatic line is placed in position automatically (the placing apparatus is not shown) and start-up is applied, the program proceeds from step S820 to step S821. Processing is executed at step S822 while step S823, which is the pre-processing sequence, is translated. The processing of the kind shown in FIG. 14 is executed in order at step S823. Next, the sequence proceeds to the main processing of step S828. This processing also is executed while translation is performed at step S827. In FIG. 15, which is the content of processing of the main processing step S828, the sequence proceeds in accordance the sequence of the special-purpose language program. During each step shown in FIG. 15, the translation execution step S827 of the control computer 702 performs monitoring to determine whether an error or defect has occurred in the processing of the step. At the moment a defect occurs, main processing from this point onward is not executed, the program proceeds to the defect occurrence step S824 and the defect process step S826 is executed.

Several sequences in execution of main processing shown in FIG. 15 will be described. In focusing processing (FIG. 16), which is Main Step No. 1, the cylinders 403 and 408 are driven at step S1601 to clamp the optical system 409 using the clamping mechanism 401 and to embrace the optical system 409 from the front and back by means of the embracing mechanism 405. Image processing is initially set at step S1602. Next, the optical system 409 is moved by moving the drive shaft 404 a predetermined amount at step S1603. As a result, the amount of light is measured and data indicative of position and of the amount of light are stored in memory. The memory in this case may be the dual-port memory 4501. Next, it is determined at step S1604 whether movement has been performed over the predetermined stroke. If the answer is "NO" at step S1604, then the program returns to step S1603 so that movement and measurement are performed again. This processing is repeated until a "YES" decision is rendered at step S1604. Filter processing is applied to each light-quantity array in step S1605. The position at which the largest amount of light is obtained is calculated at step S1606 from the obtained series of data representing position and amount of light. After backlash is corrected at step S1607, the shaft is moved to the position, decided at step S1606, at step S1608. Finally, the clamping mechanism 401 and embracing mechanism 405 are released at step S1609, thereby ending Main Step No. 1, namely the adjustment of focus.

Next, adjustment of the beam scan to the standard position at Main Step No. 2 is performed. Specifically, in FIG. 17, before the bit 301 is inserted into the adjusting groove (not shown) of the mirror, the bit is rotated to a position at which insertion is possible. The cylinder 304 is then driven to insert the bit 301 at step S1701. Next, at step S1702, the motor 302 is driven to rotate the bit 301 and move the laser reflecting mirror to the initial position. The predetermined maximum number of adjustments is set as the number of adjustments at step S1703. This is followed by an adjustment routine. First, the polygon (the laser scanning mirror) (not shown) is rotated, the time required for the beam to scan from the reference position to a predetermined position is measured and the time is stored in memory at step S1705. It is determined at step S1705 whether this time falls within the standard of a predetermined time. If the time does fall within the standard time, the program proceeds to "YES" and processing is terminated. If the answer is "NO" at step S1705, the number of adjustments is decremented at step S1706 and it is determined at step S1707 whether the number of adjustments has exceeded the number set at step S1703. (Since subtraction is performed in this case, it is determined whether the number of adjustments has become a negative number.) If the answer is "YES" at step S1707, a defect flag is set at step S1708. If the answer is "NO" at step S1707, the difference between the scanning time measured at step S1704 and a target time is calculated at step S1709 and this is converted to amount of movement of the laser reflecting mirror for adjustment of scanning. At step S1710, the motor 302 is driven by the amount of movement calculated at step S1709, thereby adjusting the laser reflecting mirror for scanning adjustment. Thereafter, the program returns to step S1704 and beam scanning time is measured again. This loop is terminated at completion of adjustment at step S1705 or when the number of adjustments exceeds the predetermined value at step S1707. In this process, the beam scanning time measured at step S1704 and the amount of drive performed at step S1710 can be written in the dual-port memory 4501.

Next, beam position and diameter at the center of the optic axis are measured at Main Step No. 3. Specifically, at step S1801, beam position and diameter are measured by image processing. Here a certain time is decided in sync with the scanning of the beam while the beam is being scanned, and at this time an image is accepted by the high-speed camera 211 instantaneously as a still picture. The results of the beam position and diameter measurement based upon image processing are written in memory (the dual-port memory 4501). The measurement data is accepted at step S1801 and compared to a standard value at step S1802. A defect flag is raised at step S1803 if the position and diameter of the beam do not fall within the standard. In this embodiment, a similar measurement is performed to move the camera in the main processing. In a case where the defect flag has been raised as at step S1708 during execution of main processing, the program jumps to step S824 and main processing from this point onward is not executed.

When step S828 ends, the on-line post-processing of step S830 is executed. In FIG. 20, the present time is accepted at step S2001 and the difference between the time accepted at step S1401 and the time accepted at step S2001 is calculated at step S2002 so that the time (tact) necessary to execute the main processing can be computed. The result is stored in memory (the dual-port memory 4501). A display indicating that start-up is in progress is extinguished at step S2003, the start-up OK flag is cleared at step S2004 and the display indicating that start-up is allowed is lit at step S2005. Next, at step S2006, the results of measurement and adjustment are printed out by the printer and, at the same time, data indicative of the final result of measurement and a flag indicating that one sequence (workpiece) has ended are written in the status register of the dual-port memory 4501. Adjustment shafts such as the bit 301 are returned to their home positions at step S2007, thereby ending on-line post-processing. Depending upon whether the result is OK or NG, the respective LEDs are lit at step S831, on-line post-processing is executed at step S833 and the sequence returns to step S805, thereby ending the first cycle of the measurement loop. If the next workpiece has been prepared, the start-up flag is raised again at step S820 and automatic adjustment and measurement of the laser-beam printer are repeated.

Since the details of each step for controlling the adjustment and measurement operation of the adjusting/measuring apparatus 713 in the off-line mode are approximately the same as those at the time of the on-line mode, a description thereof is omitted. Further, the calibration mode is a mode for calibrating the adjusting/measuring apparatus 713 itself. In this embodiment a description of the details is omitted.

The processing of the apparatus for automatically adjusting and measuring a laser-beam printer according to this embodiment of the invention has been described in accordance with the sequence flowchart of the control computer 702.

As mentioned above, the monitor computer 701 (101) is not necessary if the apparatus of interest is merely to be adjusted or measured. Further, an entire sequence of the kind shown in FIGS. 8A–8D can be prepared in advance as the program of the control computer 702, and processing in line with the actual apparatus can be created freely at a later time by a special-purpose language program, as at step S828. As a result, a wide variety of automated equipment can be dealt with by minimal revision of the program.

The role of the monitor computer 701 according to this invention will now be described. The monitor computer 701 does not control the apparatus directly. Rather, the monitor computer 701 reads/writes the data, which are the result of measurement by the control computer 702, through a method in which the data can be read and written without interfering with the bi-directional CPU cycle, such as by using the dual-port memory 4501. The monitor computer 701 performs data analysis in place of the control computer 702. As a result, the control computer 702 does not have its time occupied by data analysis. Moreover, since two-way communication is performed via the dual-port memory 4501, it is possible to realize a processing sequence in which no time is wasted, such as time spent for communication or time spent waiting for another party to communicate.

When the monitor computer 701 is started up, an initial setting is made and start-up of the program resident in the monitor computer 701 is initiated at step S2201 in FIG. 11. Analysis of parameters is performed at step S2301 in FIG. 23. If the resident program has not yet started up and a resident cancellation flag has not been raised at steps S2302, S2303, a font setting is made at step S2304, the EMS memory is initialized at step S2305, timer-interrupt initialization is performed at step S2306, the XMS memory is initialized at step S2307, interrupt vector initialization processing for setting a jump destination address is executed at step S2308, and read-in of the resident program such as the timer-interrupt program is executed at step S2309, after which the program ends. When the flowchart has already been executed, a "YES" decision is rendered at step S2302 and it is determined at step S2310 whether initialization and the resident program are to be canceled. If the answer is "YES" at step S2310, then the various memories and the interrupt settings are canceled at steps S2311 through S2315, after which the program is terminated.

Next, the sequence of the program resident in the monitor computer 701 advances to step S2202, where the user executes start-up of a project for designating a file in which the standards conforming to the apparatus or the program of the control computer 702 have been stored. In FIG. 24A, the special-purpose project file is read in at step S2403, and a title display is presented on the screen at step S2406. If an error occurs at step S2404 and a "YES" decision is rendered at step S2415 or a "YES" decision is rendered at step S2420, a new project can be created at step S2419 or step S2423. Ordinarily, the return key is pressed at step S2409 and data is read in the memory at step S2424. The project file is updated at step S2425, an execution file is created at step S2426 and the flowchart for project start-up is terminated.

Next, step S2203 for menu program processing is executed. In FIG. 25, allocation of internal memory is performed at step S2501 and initialization of the graphics screen is performed at step S2502. If it is found at step S2503 that the assemble re-start-up has been raised, the program proceeds to step S2512. If it is found at step S2503 that the assemble re-start-up has not been raised and at step S2504 that the re-start-up flag of the data analysis program has been raised, the program proceeds to step S2512. The re-start-up flag is turned OFF at step S2512 and the program proceeds to submenu processing at step S2514.

If it is found at step S2503 that the assemble re-start-up has not been raised and at step S2504 that the re-start-up flag of the data analysis program has not been raised, the program proceeds to step S2505. Here a shift is made to the directory of the project which uses the directory of the file.

Next, a menu display is presented on the screen at step S2506 and a selection input from the main menu is accepted at step S2507. If the input is from a cursor key, then the program proceeds from step S2509 to step S2510 and the selected menu item is updated. If a "NO" decision is rendered at step S2511, then the program returns to step S2507. If it is found at step S2508 that the start-up key (return key) has been pressed, then the program proceeds to step S2513. In accordance with the item selected at main menu selection, the submenu processing step S2514 or the step S2515 for monitor processing and debugger processing is executed. If, during execution of the loop of steps from S2507 to S2511, forcible termination is designated at step S2511, the processing program of the monitor computer 701 is terminated.

Next, the program functions of the monitor computer 701 will be described, namely the function for monitoring the control computer 702 and the function for debugging the control computer program.

The debugger and resident monitor function is selected by the loop composed of steps S2507-S2511. When the loop is left at step S2508, the sequence proceeds from step S2513 to step S2515. In FIG. 27, the directory is moved at step S2701 and the item menu screen displayed thus far is erased at step S2702. It is determined at step S2703 whether the dual-port memory 4501 is connected. If it is determined that the dual-port memory 4501 has been connected, the program proceeds to step S2706, at which the graphics are erased, and then to step S2707, at which the processing for starting up the resident monitor and debugger program is executed. The program started up at step S2707 is the resident monitor debugger program of FIG. 28 and it is to this program that the sequence proceeds. The initialization processing step S2801 in FIG. 28 is executed first. At step S2801, the following steps are executed in successive fashion: step S2901 for parameter analysis, step S2902 for sharing the internal memory, step S2903 for turning ON the flag in the internal memory indicating that debugger start-up is in progress, step S2904 for saving the settings of function keys, step S2905 for setting a forcible-end address, step S2906 for graphics initialization, step S2907 for reading in a symbol file, step S2908 for reading in a process message, and step S2909 for updating the setting of shaft data. Next, it is determined at step S2802 whether the program of the resident monitor has been started up. If the answer is "YES" at step S2802, then the fixed display portion of the resident monitor is displayed at step S2803 (see FIG. 40). If the answer is "NO", the fixed display portion of the resident monitor is erased at step S2804. Next, the sequence proceeds to step S2804A, debugger processing is executed and it is determined whether the program has started up in memory. If the answer is "NO" at step S2804A, the settings of the function keys are changed at step S2806. If the answer is "YES" at step S2804A, display processing of step S2805 for beginning debugging is executed and it is determined at step S2807 whether this is the first start-up (i.e., whether this flowchart is being executed for the first time after the introduction of power or after resetting of the computer). If a "NO" answer is obtained at step S2807, then the sequence proceeds to step S2811. If a "YES" decision is rendered at step S2807, the sequence proceeds to step S2809, at which start-up of the control computer 702 is verified.

In FIG. 30, connection of the dual-port memory 4501 is verified at step S3001 and interrupt of the monitor computer is halted at step S3003. It is determined at step S3005 whether interrupt access from the dual-port memory 4501 has been initiated from the control computer 702. If the answer is "YES" at step S3005, interrupt of the monitor computer 701 is resumed at step S3010, the flag for verifying start-up of the control computer 702 is turned ON at step S3011 and this sequence is ended. In this case, start-up of the control computer 702 is verified. If a "NO" decision is rendered at step S3005, the loop composed of steps S3005-S3008 is traversed until a "YES" decision is rendered at step S3005. If the ESC key is pressed at step S3006, a "YES" decision is rendered at step S3007, the program proceeds to step S3009, interrupt of the monitor computer 701 is resumed and the sequence is ended. In this case, connection of the control computer 702 could not be confirmed. The sequence proceeds to step S2810, at which it is determined whether connection to the control computer 702 was verified at step S2809. If start-up could not be performed, the program proceeds to step S2815. When connection to the control computer 702 could be verified, the program proceeds to step S2811, at which it is determined whether only resident monitor processing is executed or both the resident monitor processing and debugger processing. If only resident monitor processing is executed, the sequence proceeds to step S2812. If both resident monitor processing and debugger processing is executed, the sequence proceeds to step S2813. Execution of resident monitor processing and debugger processing is the main role of the monitor computer 701. Since resident monitor processing at step S2812 is functionally included in the debugger processing of step S2813, the processing of step S2813 will be described below (starting with FIG. 34A).

It is determined at step S3401 in FIG. 34A whether the executable format data of the special-purpose language program has been read out of the control computer 702. If the data have not be read in, a sequence table is read out at step S3402 and the execution format data of the special-purpose language program are read out of the control computer 702 at step S3403. A display command for displaying the results of operating the apparatus is turned ON at step S3404. It is determined at step S3405 whether the debugger processing routine is to be ended. If the answer is "YES" at step S3405, the routine is ended. If the answer is "NO" at step S3405, a prompt for accepting entry of the command is displayed on the screen of monitor 102 at step S3406. When resident monitor processing and debugger processing is executed in the monitor computer 701, the processing is executed while the processing loop from step S3405 to step S3435 is repeatedly traversed. Processing for monitoring the status of the control computer 702 is performed as resident monitoring mainly in the no-input processing of step S3407.

In FIG. 38, the status register of the dual-port memory 4501 is read and whether a request for displaying the results of operation has been issued by the control computer 702 is verified at step S3801. Specifically, the content of the status register of dual-port memory 4501 written at step S2006 in the flowchart of the control computer 702 is read in. If the flag indicative of completion of measurement has been in the status register of the dual-port memory 4501 at step S2006, a "YES" decision is rendered at step S3801, the data indicative of results of measurement are read in from the dual-port memory 4501 at step S3802 and the data is saved in the internal memory of the control computer 702 or in the internal or external storage device 104. Next, whether the dual-port memory 4501 has been connected is verified at step S3803. If the answer is "NO" at step S3803, connection of the dual-port memory 4501 is verified at step S3804. In other words, the data is read in first and whether the data is valid or not is checked later. As a result, as long as the data is read in first, the next item of data can be written in immediately even if writing of the data occurs frequently. In a case where resident monitor processing is executed at step S3805, the resident monitor display is executed at step S3806.

Figure 40:
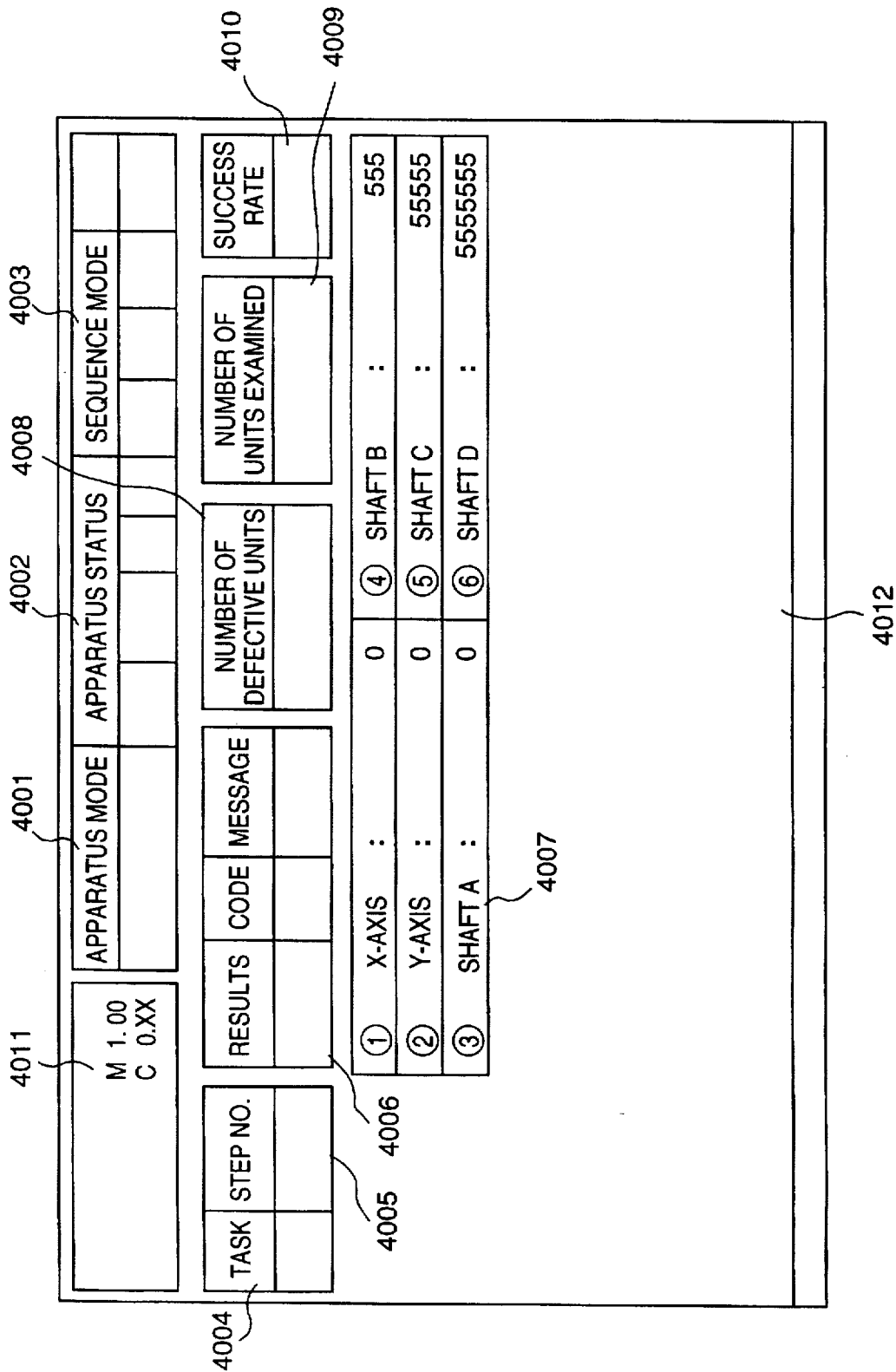
FIG. 40 is a diagram showing an example of a display on a screen (a fixed display) at execution of a resident monitor in an embodiment of the invention.
Figure 43:
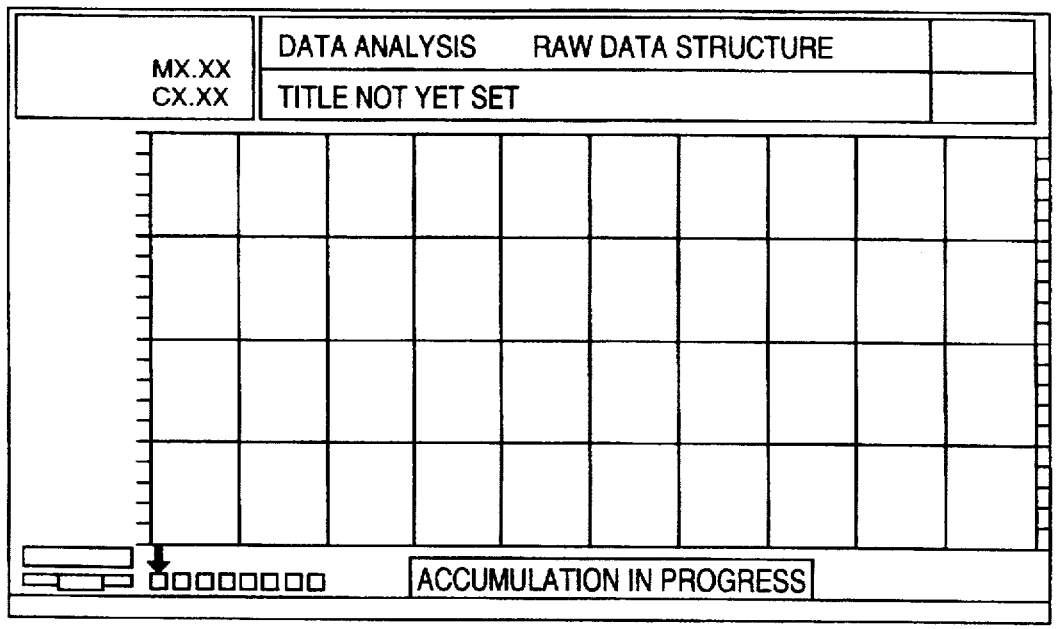
FIG. 43 is a diagram showing an example of a display on a screen (a fixed display) at execution of a resident monitor in an embodiment of the invention.

In FIG. 39, the apparatus mode is displayed in field 4001 in FIG. 40 at step S3901, the apparatus status is displayed in field 4002 at step S3902, the sequence mode is displayed in field 4003 at step S3903, the current task number is displayed in field 4004 at step S3904, and the current step number is displayed in field 4005 at step S3905. Next, it is determined at step S3906 whether to display the shaft data. If the answer is "YES" at step S3906, the shaft data is displayed in field 4007 at step S3907. If the answer is "NO" at step S3906, processing is proceeded to step S3908. The version of the program of control computer 702 is displayed in field 4011 at step S3908. It is determined at step S3909 whether the data read into the control computer 702 through the dual-port memory at step S3802 has been accepted correctly. If the answer is "YES" at step S3909, the results of measurement are displayed in field 4006, the number of defective units is displayed in field 4008, the number of units examined is displayed in field 4009 and the failure rate is displayed in field 4010 at step S3910. In this embodiment, the items ordinarily displayed by the resident monitor are as described above. However, if the item of the result data is changed, the allocation of the status register of dual-port memory 4501 is changed and the screen display of FIG. 40 is changed, data other than those indicated can be added to the usual monitor screen.

Next, based upon the contents of the status register read at step S3802, it is determined at step S3807 whether the control computer 702 has attained a state set in advance (e.g., whether the process being executed by the control computer 702 has reached a certain set process) or whether certain data have attained a set value, thereby determining whether a temporary-stop instruction is to be sent to the control computer 702. If the answer is "YES" at step S3807, the monitor computer 701 executes processing at step S3808 to write a temporary-stop command in the control register of the dual-port memory 4501, thereby temporarily halting the control computer 702. As a result of this function, a temporary-stop instruction need not be written in the program of the control computer 702 each time. Or, when it is desired to halt processing of the control computer 702 and temporarily stop the apparatus in the event of occurrence of a certain phenomenon, the control computer 702 and adjusting/measuring apparatus 713 can be stopped merely by making a setting from the monitor computer 701. Next, at step S3809, whether the control computer 702 has requested the monitor computer 701 for a screen print instruction is determined by reading the status from the status register of the dual-port memory. If the answer is "YES" at step S3809, the program proceeds to step S3810. If data to be displayed are written in a print display data area of the status register of the dual-port memory in advance by a screen print instruction from the control computer 702 at step S3810, the monitor computer 701 reads in the written data at step S3811 and displays the data on the screen area 4012 of FIG. 40. It is determined at step S3812 whether an input instruction (an input from the keyboard, etc.) has been applied by the control computer 702. If the answer is "YES" at step S3812, data is entered from the monitor computer 701 and the data is written in the dual-port memory 4501 at step S33813. If, after the input instruction is issued, the control computer 702 reads in the data that has been written in the dual-port memory 4501, a function the same as the input instruction of an ordinary program can be achieved by writing/reading the dual-port memory 4501. Next, the sequence proceeds to step S3814, at which it is now determined, unlike at step S3807, whether a temporary-stop instruction has been executed in the program of control computer 702. If the answer is "YES" at step S3814, the fact that the control computer 702 is in the temporary-stop state is displayed on the monitor computer 701 at step S3815. The date and time are displayed at step S3816, and it is determined at step S3817 whether a flag indicating the fact that an abnormality has occurred in control computer 702 has been raised or not. In case of an abnormality, a message indicative of the abnormality is displayed on the screen at step S3818. If there is no abnormality, step S3818 is skipped and the flowchart of no-input processing is terminated.

Thus, adjustment/measurement results from the apparatus and status and mode of the apparatus are communicated by writing the data in the dual-port memory 4501. As a result, time is not wasted waiting for communication and hand-shaking processing between two computers ordinarily need not be performed.

After the no-input processing of step S3407, it is determined at step S3408 whether a macro is to be processed. If the answer is "YES", the macro is executed at step S3409 and the sequence returns to step 3405. If the answer is "NO" at step S3408, the sequence proceeds to step S3410 and it is determined whether the status of the control computer 702 has been updated. If the status has been updated, the sequence returns to step S3405 and processing is continued. If it is found at step S3410 that the status of the control computer 702 has not been updated, the sequence proceeds to step S3411 and it is determined whether this sequence is being executed immediately following start-up. If the answer is "YES" at step S3411, a macro command for initial settings is executed at step S3412 and the program returns to step S3407. If the answer is "NO" at step S3411, scanning of a processed character entered from the keyboard is performed at step S3413. If there is no character input from the keyboard, the sequence returns to step S3407. By repeating this loop, the macro can be executed in accordance with the character scanned at step S3413. In a case where it is determined at step S3414 that a character has been entered, the sequence proceeds to the decision processing of steps S3415, S3417, S3419, S3421, S3423, S3425, S3427, S3429, S3431, S3433 and S3435, where it is determined whether specific keys on the keyboard have been pressed. If there is no input from the keyboard, the sequence returns to step S3405. Steps S3405–S3435 are repeated and monitoring of the control computer 702 is continued as long as the resident monitor and debugger processing is not terminated at step S3405.

Next, a sequence for temporarily stopping the execution of the sequence of control computer 702 and the operation of the adjusting/measuring apparatus 713 by sending the temporary-stop instruction from the keyboard to the control computer 702 during execution of the program of resident monitor debugging processing by the monitor computer 701 will be described, as well as sequence for canceling the temporarily stopped state.

When function key F1 is pressed during execution of the resident monitor and debugger processing loop in FIGS. 34A and 34B, the sequence proceeds to step S3416 at step S3415. A "YES" decision is rendered at step S3501 in FIG. 35 and step S3502 is executed. In FIG. 49 showing the details of step S3502, it is determined at step S4901 whether the control computer 702 is already in the temporarily stopped state. If the answer is "YES" at step S4901, then processing is executed without performing any further operation. If it is found at step S4901 that the temporary-stop state has not yet been attained, the program proceeds to step S4902, where it is determined whether or not a temporary stop is being applied from a device other than the monitor computer 701. If the answer is "YES" at step S4902, then an error display is presented at step S4905 and processing is terminated. If the answer is "NO" at step S4902, a command instructing the control computer 702 to come to a temporary stop is written in the control register of the dual-port memory 4501 at step S4903. Processing for waiting for the temporary stop is then executed at step S4904.

In FIG. 53 showing the processing for waiting for the temporary stop, send/receive no-response processing at step S5301 and the processing of step S5302 for determining whether the control computer 702 has attained the temporary-stop state is repeated. If the control computer 702 attains the temporary-stop state, temporary-stop wait processing is terminated through the processing of steps S5302 and S5304 for displaying a screen on the monitor 102. The loop of steps S5301 and S5302 is repeated until the control computer 702 is brought to a temporary stop. Thus, processing executed by the control computer 702 can be stopped temporarily by manipulating the monitor computer 701. The sequence for temporarily stopping execution is a special-purpose language program in the control computer 702. The processing routine that applies comprises steps S804, S808, S812, S816, S819, S823, S826, S828, S830, S833, S836, S840, S843, S845, S847, S850, S855, S856, S860 and S861 in FIGS. 8A through 8D. This system program in the control computer 702, namely steps S803, S807, S811, S815, S818, S822, S825, S827, S829, S832, S835, S839, S842, S844, S846, S849, S854 and S859 in FIGS. 8A through 8D, continues being executed. Accordingly, reading and writing of the dual-port memory 4501 from the control computer 702 continues even though the sequence is temporarily stopped. In order to release the control computer 702 from the temporarily stopped state, the function key F2 is pressed during execution of the resident monitor and debugger processing loop in FIGS. 34A and 34B. As a result, the sequence proceeds to step S3416 at step S3415, a "YES" decision is rendered at step S3503 in FIG. 35 and step S3504 is executed. The details of step S3504 are shown in FIGS. 50A and 50B.

It is determined at step S5001 in FIG. 50A whether the control computer 702 is in the temporarily stopped state. Processing is ended if the answer is "NO" at step S5001. If the answer is "YES" at step S5001, however, the program proceeds to step S5002, at which it is determined whether the command for continued processing has just been downloaded to the control computer 702. If the answer is "NO" at step S5002, it is determined at step S5003 whether the control computer 702 was operating in the ordinary continuous mode. If the answer is "YES" at step S5003, then the program proceeds to step S5008 via step S5014. It is verified at step S5008 that a temporary-stop instruction has not been issued from a device other than the monitor computer, after which the program proceeds to step S5009. If the prevailing mode is the usual continuous mode, then this is not step processing. Accordingly, a "NO" decision is rendered at step S5009, a temporary-stop cancellation flag is set at step S5016 and the flag is written in the control register of the dual-port memory 4501 at step S5017. If the prevailing mode is the continuous mode, then this is not the step mode, a "NO" decision is rendered at step S5018 and the sequence of FIG. 50B is terminated. The control computer 702 reads the control register of the dual-port memory 4501, which was written at step S5017, by the system program and resumes execution of the sequence.

Described next will be sequence tracing and step processing, namely a mode in which execution of the sequence of control computer 702 is performed one line of the program at a time by operating the monitor computer 701, and only the designated line is executed.

When function key F2 is pressed during execution of the resident monitor and debugger processing loop in FIGS. 34A and 34B, the sequence proceeds to step S3418 at step S3417, a "YES" decision is rendered at step S3603 in FIG. 36 and step S3604 is executed. If there is no parameter error at step S5101 in FIG. 51, which shows the details of step S3604, it is determined at step S5102 whether the number of traces has been designated. If the number of traces has not been entered as a parameter, a "NO" decision is rendered and one is set as the number of traces at step S5113. If the continuous usual sequence mode was being executed, a "YES" decision is rendered at step S5104 and the number of traces is decremented at step S5105. Next, the control computer 702 is temporarily stopped by the pause processing of step S5106. The mode is changed over to the trace mode at step S5017 and the program proceeds to step S5108. Here it is determined whether there is a number of traces remaining. Since the single trace set at step S5113 is decremented by one at step S5105 so that the count is zero, a number of traces no longer remains and a "NO" decision is rendered, thereby ending this sequence. In other words, when sequence trace is executed while the sequence is being executed continuously, the temporarily stopped state is attained. If the function key F2 is pressed again while the shift key is held depressed under these conditions, the flowchart is executed in the above-described manner until step S5104. Now since the operation is not continuous at step S5104, step S5105 is skipped and the program proceeds to steps S5106 and S5107 described above. Since the number of traces at step S5108 is now one, the program proceeds to step S5109 and the number of traces is decremented. Next, at step S5110, only one line of the sequence of control computer 702 is executed and step S5111 is traversed. If execution of the control computer 702 is ended at step S5112 and the temporarily stopped state is attained again, the flowchart returns to step S5108. Since the number of traces is now zero, the flowchart is ended. From this point onward, therefore, each time the function key F2 is pressed while the shift key is held depressed, the sequence of the control computer 702 is executed one line at a time.

Next, a case where the number of traces has been set as a parameter will be described. First, when the number of traces is entered from the keyboard and the function key F2 is pressed while shift is held depressed with the control computer 702 is the temporarily stopped state, the flowchart is executed up to step S5102 in the manner described above. Since it is found at step S5102 that the number of traces has been designated, the program proceeds to step S5103 and the number of traces is set. Since continuous operation is not being performed at step S5104, the program jumps to step S5106 and proceeds to step S5108 via step S5107. Since there is a trace number at step S5108, the program proceeds to step S5109 where the number of traces is decremented, only one line of the sequence of the control computer 702 is executed at step S5110 and step S5111 is traversed. If execution by control computer 702 is ended at step S5112 and the temporarily stopped state is attained again, the flowchart returns to step S5108. If there is still a number of traces at step S5108, the flow from step S5109 to step S5112 is repeated again. When it is found at step S5108 that the number of traces has vanished, the sequence is ended with the temporarily stopped state remaining in effect. When the designated number of lines (number of traces) is executed, the result is that the temporarily stopped state is attained. This function makes it possible to achieve temporary stop upon executing any number of lines of the program. In a case where sequence tracing is utilized, all instructions are executed one line at a time. This means that when the sequence trace is continued at a deep hierarchical layer as in the manner of an instruction for executing a subroutine, the key must be pressed continuously until a return from the subroutine is achieved. Accordingly, a sequence of the control computer 702 when a continue command (temporary-stop cancellation command) has been outputted in the sequence tracing mode while temporary stop is in effect will now be described. In this embodiment, key operation is the same as that in the case where temporary stop is applied in the above-described continuous sequence and the continuous sequence is started again. When the function key F2 is pressed during execution of the resident monitor and debugger processing loop in FIGS. 34A and 34B when the temporary-stop state is in effect in the sequence tracing mode, the sequence proceeds to step S3416, a "YES" decision is rendered at step S3503 in FIG. 35 and step S3504 is executed. If the temporary-stop state is found at step S5001 in FIG. 50A, which shows the details of step S3504, the program proceeds to step S5002. If a "NO" decision is rendered here, the program proceeds to step S5003. Since the mode is not the continuous mode at step S5003, STEP is displayed at step S5004 and the program proceeds to step S5005. Here it is determined whether the instruction executed next in the sequence of the control computer 702 is an instruction for advancing the sequence to a deep hierarchical layer by the structure of the program, as in the manner of an instruction for jumping to a subroutine, or repeating processing until certain conditions are met when this instruction is executed. If the answer is "YES" at step S5005, then a flag indicative of step processing is raised at step S5006 and the temporary-stop mode is set at step S5007. Next, it is verified at step S5008 that a temporary-stop instruction is not being issued by a device other than the monitor computer 701. The program then proceeds to step S5009. Since the step processing flag is raised at step S5006, a "YES" decision is rendered at step S5009 and the program proceeds to step S5010. The mode is forcibly changed over to the continuous mode at step S5010 and, at step S5011, a temporary-stop pointer is set to follow the above-mentioned subroutine jump instruction about to be executed. The temporary-stop cancellation flag is set at step S5016 and the flag is written in the control register of the dual-port memory 4501 at step S5017. Accordingly, the control computer 702 is released from the temporary-hold state in the continuous mode and, hence, the sequence is executed up to the temporary-stop pointer. Since step processing is found at step S5018, a "YES" decision is rendered at this step, the program proceeds to step S5019 and the system waits for the sequence of the control computer 702 to be temporarily stopped by the temporary-stop pointer. If the control computer 702 comes to a temporary stop, the temporary-stop mode is canceled and the step processing flag is cleared at step S5020. A return from the continuous mode to the trace mode is effected at step S5021 and the flowchart ends. By virtue of these processing operations, the instructions of subroutine jump and the like in the sequence tracing mode can be executed as one instruction one line at a time.

Described next will be the flowchart of sequence history display processing for displaying, on the monitor computer 701, the type of instructions executed thus far by the control computer. If, during execution of the resident monitor and debugger processing of FIGS. 34A and 34B, the "HOME" key on the keyboard of monitor computer 701 is pressed, the parameter is entered (if necessary) and the "return" key is pressed, the sequence proceeds to step S3436 at step S3435, a "YES" decision is rendered at step S3713 of FIG. 37A and step S3721 is executed. In FIG. 59, which shows the details of step S3721, it is determined at step S5901 whether parameters are correct. If there is no error, the program proceeds to step S5902. Here it is determined whether a parameter has been entered. If a parameter has been entered, the first line of the step of the sequence for displaying sequence history is set at step S5903, and the line of the last step is set at step S5904. In a case where it is found at step S5902 that a parameter has been omitted, the program proceeds to step S5905. Here the first step is set to a fixed step value (e.g., five steps) and the last step is set to the line of the final step executed by the control computer 702. Which line of the program is being executed by the sequence of the control computer 702 is accepted by the monitor computer at all times via the status register of the dual-port memory 4501. After the monitor computer is started up, therefore, sequence history is capable of being accepted to the extent allowed by memory capacity. Since acceptance of the sequence table (the execution program of the control computer 702) is performed at step S3403, the program between first and last steps is assembled in reverse while checking the sequence table, the result is displayed on the screen of the monitor 102 of monitor computer 701 and the flowchart is ended.

Thus, if a program is constructed in such a manner that the sequence table will represent the processes of the apparatus, it will be possible to ascertain the history of the operating processes of the apparatus. Furthermore, since the number of adjustments and the amount of shaft movement, which are the status data of the apparatus, as well as the results of image processing have been written in the dual-port memory 4501 at the same time as the information of the process being executed in the sequence program of the control computer 702, the status of the apparatus also can be accepted by the monitor computer and displayed as sequence history. In other words, by virtue of this function, it is possible to ascertain what is currently being executed by the control computer 702. In addition, even if the control computer 702 ceases operating because of a problem, it is possible to ascertain which program sequences were executed and how they were executed.

A case in which the sequence has proceeded up to the submenu processing step S2514 will now be described.

Submenu processing is for executing processing which edits the special-purpose language program, processing which assembles the special-purpose language program, processing which sets standards and data analysis processing. As a result, it is possible to start up a program completely different from the program of the monitor computer 701, such as an editor program generally available on the market for the purpose of describing a program, or a table computation program for analyzing data. It is also possible to prepare programs as subprograms of the monitor computer 701. In a case where the program is too large to be put together with the program of the monitor computer 701 as a subprogram, even if the program is one created for the monitor computer 701 and is not one available on the market, it is possible to prepare the program as a separate program, as in the manner of a program available on the market. In the flowchart of submenu processing shown in FIG. 26A, an initial selection item is decided at step S2601 from among editing, assembling tools, standards setting and data analysis in accordance with the item selected at step S2507 or step S2510. The basic screen of the submenu is displayed at step S2602, the item prepared so as to be selected by the submenu is displayed at step S2603 and the item currently selected is highlighted at step S2604. An input from the keyboard is awaited at step S2605. If the space key is pressed, a "YES" decision is rendered at step S2606 and a command input is directly accepted at step S2611. If a cursor key is pressed, a "YES" decision is rendered at step S2608, the selected item changes at step S2609 and a different item is highlighted at step S2604. If the input at step S2605 is the start-up key (return key), a "YES" decision is rendered at step S2607 and the program proceeds to steps S2613–S2618 for discriminating the item started up via the step S2612 using the information of the item selected. For example, if an item for analyzing the production performance value has been selected from the menu (step S2613), a "YES" decision is rendered at step S2613, the re-start-up flag is turned on at step S2623 and a program for computing the production performance value and for displaying the screen is read in at step S2624. The program for analyzing the production performance value may be read in the memory of the monitor computer 701 as a subroutine. If the program is large, however, it is possible to temporarily change over the program of the monitor computer 701. In this case, the re-start-up flag is raised at step S2623. Therefore, when the program for analyzing the production performance value is terminated, the program of the monitor computer 701 is read in automatically and the flow returns immediately after step S2624 of FIG. 26B. The data indicative of the production performance value are read out and processed as results of measurement stored at step S3802, which is contained in step S3407, during the traversing of the loop of the resident monitor and debugger processing of FIGS. 34A and 34B. The manner in which the data is stored at this time is as described above.

FIGS. 46 through 48 are examples in which production performance value is analyzed and graphed.

FIG. 46 is a diagram showing a distribution of faulty items on the basis of length of time, in which day-to-day fault details are displayed item by item.

FIG. 47 is a diagram showing a designated-data displacement distribution by workpiece, in which a transitional change in the designated data of a certain workpiece is shown at time intervals.

FIG. 48 is a diagram showing adjustment process performance, in which deviation from a standard value in a predetermined period of time of a certain adjustment process is shown for each deviation, with the number of workpieces being plotted along the vertical axis.

In addition to these, other displays (not shown) include a display of acceptable-item production performance values on the basis of length of time, in which success rate is represented at time intervals, a distribution of cumulative faulty item occurrence frequency over a designated period of time, in which the frequency of occurrence of faulty items accumulated over a period of time is represented, and an average tact display every hour, in which the average tact of the apparatus is represented.

The next case is that of data analysis. If data analysis is selected through the flowcharts of FIGS. 26A and 26B by a sequence similar to that described above, a "YES" decision is rendered at step S2615 and the program proceeds to step S2627. Here the data accepted during execution of the measurement sequence of the control computer 702 is accepted through the dual-port memory 4501 in advance. For example, data measured by the loop of steps S1603 and S1604 in focus adjustment processing in Main Step 1 of FIG. 16 are written in the buffer of dual-port memory 4501. By reading the data in at step S2627, processing and graphical display become possible. If this data is read in without suspending the processing executed by the control computer 702, the latest data can be displayed whenever step S2627 is executed. FIG. 44 is an example of display of the above-mentioned data. This graph is displayed on the screen of monitor 102 by step S2627.

In the system of this embodiment of the invention, the system is composed of one line computer and one control computer. However, it goes without saying that the invention is applicable also to a system comprising a plurality of these units. A system composed of a plurality of these units is advantageous in terms of backing up the data in the event of a problem and in terms of providing a fail-safe function such as measures for recovery.

The present invention can be applied to a system constituted by a plurality of devices (e.g., a host computer, an interface, a reader, a printer) or to an apparatus comprising a single device.

Further, the object of the present invention can also be achieved by providing a storage medium storing program codes for performing the aforesaid processes in a system or apparatus, reading the program codes using a computer (e.g., CPU, MPU) of the system or apparatus from the storage medium, and then executing the program.

In this case, the program codes read out of the storage medium implement the functions of the embodiment, and the storage medium storing the program codes constitutes the invention.

Further, the storage medium, such as a floppy disk, hard disk, optical disk, magneto-optical disk, CD-ROM, CD-R, magnetic tape, non-volatile memory card or ROM, can be used to provide the program codes.

Furthermore, besides the case where the aforesaid functions of the embodiments are implemented by executing the program codes read by the computer, the present invention covers a case where an operating system (OS) or the like working on the computer performs a part of or the entire process in accordance with the designation of program codes and implements the functions according to the embodiment.

Furthermore, the present invention further covers a case where, after the program codes read from the storage medium are written in a function extension card inserted into the computer or in a memory provided in a function extension unit connected to the computer, a CPU or the like contained in the function extension card or function extension unit performs a part of or the entire process in accordance with the designation of program codes and implements the functions of the above embodiment.

Effects of this Embodiment (1) By splitting the functions of the automated system between the monitor computer 701 and the control computer 702, the monitoring and analyzing operation can be separated from the inspecting and adjusting operation.

(2) By means of the menu program possessed by the monitor computer 701, the monitor computer 701 is provided with the functions for data analysis processing, editing of the special-purpose language program, assembling, setting of standards, monitor processing for monitoring the operation of the control computer 702 and debugger processing for debugging execution of processing by the control computer 702. Since selection can be made using a menu format, the operator can be provided with an environment, in which operation is facilitated, that is independent of the inspecting and adjusting operation performed by the control computer 702

(3) The dual-port memory 4501 is used as the communication means of the monitor computer 701 and control computer 702 and is employed as one internal memory of the control computer 702. This makes possible the transmission of facility information to the monitor computer 701 at a timing independent of sequence control of the control computer 702.

(4) By using the dual-port memory 4501 as the communication means of the monitor computer 701 and control computer 702, real-time data acquisition and analysis is possible by the monitor computer 701 utilizing the facility information.

(5) By placing the dual-port memory 4501 on the side of the control computer 702, it is possible to construct a decentralized automated system in which sequence processing of the control computer 702 will not be affected if the monitor computer 701 shuts down because of a problem or if power is interrupted. When the monitor computer 701 is restored to operation, acquisition of the data in the file of the monitor computer 701 can be realized with ease. Furthermore, if the monitor computer 701 is unnecessary after sequence operation of the line is established, the monitor computer 701 can be removed.

(6) In the on-line post-processing step (FIG. 20), a method is adopted in which data representing the time (tact) needed for execution of main processing, number of adjustments and amount of shaft movement and results of measurement and adjustment, such as the results of image processing, are written in the status register of the dual-port memory 4501 on a per-sequence (per-workpiece) basis. As a result, if the apparatus ceases operating owing to a malfunction or problem in the software, the steps or sequence executed up to the halt in operation can be verified with ease and the cause of the failure can be traced.

(7) By using the dual-port memory 4501, the CPUs of the monitor computer 701 and control computer 702 can be freed from use in processing for maintaining communication, i.e., hand-shaking.

(8) The dual-port memory 4501 is used upon allocating the memory, function by function, to a status register, control register, hand-shake register and buffer. As a result, monitoring and control of the system can be executed in simple fashion in a command format.

(9) In the architecture of the software of control computer 702, programs (special-purpose language) described by a combination of an instruction group prepared beforehand for exclusive control of the automated system are used in partial fashion and the programs are partitioned into a plurality of steps. As a result, it is possible to create general-purpose software in which the invention can be applied in simple fashion to an automated system other than that of the invention merely by making a partial change.

(10) In execution of the sequence in the control computer 702, a portion described by a special-purpose language program is run while being translated to an executable format. As a result it is possible to construct software exhibiting excellent operating efficiency in which it is unnecessary to perform compiling whenever there is a modification in software in a case where a debugging operation or partial modification of operation is performed before sequence operation of the line is established.

(11) By virtue of (9) and (10) mentioned above, it is possible for a user not accustomed to dealing with general-purpose software language or for the direct supervisor of a manufacturing line to modify and adjusting the system on site in a short period of time.

(12) In a trace mode in which sequence flow information of the control computer 702 described by a special-purpose language program is read via the dual-port memory 4501 as trace points and is displayed on the monitor 102 of the monitor computer 701 as sequence flow information, namely information such as the task, step or program line being executed, the sequence can be visually confirmed wholly or partially on the monitor 102 of the control computer 702.

(13) In the continuous mode/step mode in the resident monitor debugger function of the monitor computer 701, the sequence control operation of the control computer 702 can be wholly or partially executed, temporarily stopped and monitored from the monitor computer 701.

(14) By virtue of the architecture of the software of the adjusting/measuring apparatus 713 and control computer 702, a laser-beam printer can be not only assembled but also adjusted and measured automatically. As a result, adjustments such as increase or decrease in the production of a production line, preparation of plans and inspection and adjustment following assembly can be carried out.

(15) Owing to the architecture of the software of the laser reflecting mirror adjusting mechanism 206 of the workpiece provided in the adjusting/measuring apparatus 713 and the software of the control computer 702, it is possible to automatically adjust the laser reflecting mirror which causes the luminous flux of the pulse-width modulated light beam to scan the photoreceptor.

(16) By virtue of the architecture of the software of the optical system 409 of the laser light source provided in the adjusting/measuring apparatus 713 and the software of the control computer 702, it is possible to automatically adjust the focus of the luminous flux of the pulse-width modulated light beam.

(17) By virtue of the architecture of the software of the high-speed shutter camera 719 provided in the adjusting/measuring apparatus 713 and the software of the control computer 702, it is possible to automatically adjust the scanning position of the light beam and the center of the optic axis.

The present invention is not limited to the above embodiments and various changes and modifications can be made within the spirit and scope of the present invention. Therefore, to appraise the public of the scope of the present invention, the following claims are made.

What is claimed is:

1. An automated system having a monitor computer, which is for remote monitoring and/or analysis of control information from an input/output control device connected to a production facility which performs at least adjustment of a workpiece, and a control computer for controlling the processes of operation of the production facility via the input/out control device, said system comprising information transmission means capable of transmitting the control information between the monitor computer and the control computer at a timing that is independent of control of the processes of operation, wherein said workpiece is an image forming apparatus which forms an image by exposing a photoreceptor material to a pulse-width modulated light beam, wherein the production facility has adjusting means which includes an optical system, for adjusting a reflective mirror to adjust scanning position when the light beam of said image forming apparatus scans the photoreceptor material.

2. The system according to claim 1, wherein said information transmission means is a cycle stealing system for accessing a memory, with which said control computer or said monitor computer is provided, in accordance with a CPU clock of said control computer or said monitor computer.

3. The system according to claim 1, wherein said adjusting means for adjusting said reflective mirror includes:

moving means for moving the optical system, which is interior to or exterior to said production facility, within a predetermined range; and photometric means for measuring quantity of light obtained by moving said optical system;

wherein said optical system is moved to the position at which the quantity of light is maximized.

4. The system according to claim 1, wherein said adjusting means includes:

varying means for varying a reflecting angle of said reflective mirror of said production facility;

timekeeping means for measuring time required for the pulse-width modulated light beam to scan the predetermined range owing to rotation of a scan mirror provided in the image forming apparatus;

comparison means for comparing the time required with the predetermined value; and calculating means which, if the time required is outside a predetermined range, calculates amount of varying of the reflecting angle of the reflective mirror from the difference between the time required and the predetermined value;

wherein the reflecting angle of said reflective mirror is varied in dependence upon the amount of varying of the reflecting angle calculated.

5. The system according to claim 1, wherein said information transmission means has a dual-port memory capable of real-time reading/writing to/from all or part of a memory provided within said control computer or said monitor computer.

6. The system according to claim 5, wherein all or part of the software in said control computer is described by a combination of a group of instructions prepared in advance exclusively for control of automated systems.

7. The system according to claim 6, wherein in execution of control of said control computer, the portion of the program described by the combination of the group of instructions prepared in advance exclusively for control of automated systems is run by said control computer while it is being translated to an executable format.

8. The system according to claim 7, wherein said dual-port memory is comprised in said control computer.

9. The system according to claim 8, wherein said automated system is a system for adjusting/measuring a laser-beam printer, which is said image forming apparatus, wherein a value relating to production performance of said laser-beam printer is analyzed based upon data relating to said laser-beam printer stored in said memory.

10. The system according to claim 5, characterized by non-resident software of said monitor computer for displaying all or part of the processes of operation of said control computer by said monitor computer.

11. The system according to claim 10, characterized by non-resident software of said monitor computer for executing, temporarily stopping and re-starting the entirety of operation of said control computer, or of a designated part thereof, from said monitor computer.

12. The system according to claim 11, wherein said dual-port memory is comprised in said control computer.

13. The system according to claim 12, wherein said automated system is a system for adjusting/measuring a laser-beam printer, which is said image forming apparatus, wherein a value relating to production performance of said laser-beam printer is analyzed based upon data relating to said laser-beam printer stored in said memory.

14. An automated system having a monitor computer, which is for remote monitoring and/or analysis of control information from an input/output control device connected to a production facility which performs at least adjustment of a workpiece, and a control computer for controlling the processes of operation of the production facility via the input/output control device, said system comprising:

data communication means for communicating data relating to said workpiece, which data have been acquired by said control computer via the input/output control device, to said monitor computer; and storage means for storing the data relating to said workpiece, which data have been acquired by said data communication means, at said monitor computer, wherein said workpiece is an image forming apparatus which forms an image by exposing a photoreceptor material to a pulse-width modulated light beam, wherein the production facility has adjusting means, which includes an optical system, for adjusting a reflective mirror to adjust scanning position when the light beam of said image forming apparatus scans the photoreceptor material.

15. The system according to claim 14, wherein said information transmission means has a dual-port memory capable of real-time reading/writing to/from all or part of a memory provided within said control computer or said monitor computer.

16. The system according to claim 14, wherein said adjusting means for adjusting said reflective mirror includes:

moving means for moving the optical system, which is interior to or exterior to said production facility, within a predetermined range; and photometric means for measuring quantity of light obtained by moving said optical system;

wherein said optical system is moved to the position at which the quantity of light is maximized.

17. The system according to claim 14, wherein said adjusting means includes:

varying means for varying a reflecting angle of said reflective mirror of said production facility;

timekeeping means for measuring time required for the pulse-width modulated light beam to scan the predetermined range owing to rotation of a scan mirror provided in the image forming apparatus;

comparison means for comparing the time required with a predetermined value; and calculating means which, if the time required is outside the predetermined range, calculates amount of varying of the reflecting angle of the reflective mirror from the difference between the time required and the predetermined value;

wherein the reflecting angle of said reflective mirror is varied in dependence upon the amount of varying of the reflecting angle calculated.

18. The system according to claim 14, wherein said data communication means performs communication at a timing that is independent of the monitoring/analysis operation of said monitor computer or of the control operation of said control computer.

19. The system according to claim 18, wherein said data communication means transmits the data related to said image forming apparatus to said monitor computer, on a per-image forming apparatus basis, when one process in the operation of the production facility ends.

20. The system according to claim 18, wherein said data communication means transmits the data related to said image forming apparatus to said monitor computer, on a per-image forming apparatus basis, when all processes in the operation of the production facility are completed.

21. The system according to claim 18, wherein said automated system is a system for adjusting/measuring a laser-beam printer, which is said image forming apparatus, wherein a value relating to production performance of said laser-beam printer is analyzed based upon data relating to the laser-beam printer stored in said memory means.

22. An automated system having a monitor computer, which is for remote monitoring and/or analysis of control information from an input/output control device connected to a production facility which performs at least adjustment of workpieces, and a control computer for controlling the processes of operation of the production facility via the input/output control device, said system comprising memory means which, when each process in the production facility ends, stores data representing the process ended in said control computer per each workpiece of said workpieces, wherein said workpiece is an image forming apparatus which forms an image by exposing a photoreceptor material to a pulse-width modulated light beam, wherein the production facility has adjusting means, which includes an optical system, for adjusting a reflective mirror to adjust scanning position when the light beam of said image forming apparatus scans the photoreceptor material.

23. The system according to claim 22, wherein said adjusting means for adjusting said reflective mirror includes:

moving means for moving the optical system, which is interior to or exterior to said production facility, within a predetermined range; and photometric means for measuring quantity of light obtained by moving said optical system;

wherein said optical system is moved to the position at which the quantity of light is maximized.

24. The system according to claim 22, wherein said adjusting means includes:

varying means for varying a reflecting angle of said reflective mirror of said production facility;

timekeeping means for measuring time required for the pulse-width modulated light beam to scan the predetermined range owing to rotation of a scan mirror provided in the image forming apparatus;

comparison means for comparing the time required with the predetermined value; and calculating means which, if the time required is outside a predetermined range, calculates amount of varying of the reflecting angle of the reflective mirror from the difference between the time required and the predetermined value;

wherein the reflecting angle of said reflective mirror is varied in dependence upon the amount of varying of the reflecting angle calculated.

25. The system according to claim 22, further comprising communication means for communicating the data representing the process ended to said monitor computer;

wherein the data acquired by said communication means is displayed on said monitor computer.

26. The system according to claim 25, wherein said communication means performs communication at a timing that is independent of the monitoring/analysis operation of said monitor computer or of the control operation of said control computer.

27. The system according to claim 26, wherein said automated system is a system for adjusting/measuring a laser-beam printer, which is said image forming apparatus, wherein a value relating to production performance of said laser-beam printer is analyzed based upon data relating to said laser-beam printer stored in said memory means.

28. An automated system having a monitor computer, which is for remote monitoring and/or analysis of control information from an input/output control device connected to a production facility which performs at least adjustment of workpieces, and a control computer for controlling the processes of operation of the production facility via the input/output control device, said system comprising memory means which, when sequence processing in said control computer ends, stores data representing the sequence process ended in said control computer per each workpiece of said workpieces, wherein said workpiece is an image forming apparatus which forms an image by exposing a photoreceptor material to a pulse-width modulated light beam, wherein the production facility has adjusting means, which includes an optical system, for adjusting a reflective mirror to adjust scanning position when the light beam of said image forming apparatus scans the photoreceptor material.

29. The system according to claim 28, wherein said adjusting means for adjusting said reflective mirror includes:

moving means for moving the optical system, which is interior to or exterior to said production facility, within a predetermined range; and photometric means for measuring quantity of light obtained by moving said optical system;

wherein said optical system is moved to the position at which the quantity of light is maximized.

30. The system according to claim 28, wherein said adjusting means includes:

varying means for varying a reflecting angle of said reflective mirror of said production facility;

timekeeping means for measuring time required for the pulse-width modulated light beam to scan the predetermined range owing to rotation of a scan mirror provided in the image forming apparatus;

comparison means for comparing the time required with the predetermined value; and calculating means which, if the time required is outside a predetermined range, calculates amount of varying of the reflecting angle of the reflective mirror from the difference between the time required and the predetermined value;

wherein the reflecting angle of said reflective mirror is varied in dependence upon the amount of varying of the reflecting angle calculated.

31. The system according to claim 28, further comprising communication means for communicating the data representing the sequence processing ended to said monitor computer;

wherein the data acquired by said communication means is displayed on said monitor computer.

32. The system according to claim 31, wherein said communication means performs communication at a timing that is independent of the monitoring/analysis operation of said monitor computer or of the control operation of said control computer.

33. The system according to claim 32, wherein said automated system is a system for adjusting/measuring a laser-beam printer, which is said image forming apparatus, wherein a value relating to production performance of said laser-beam printer is analyzed based upon data relating to said laser-beam printer stored in said memory means.

34. An automated system having a monitor computer, which is for remote monitoring and/or analysis of control information from an input/output control device connected to a production facility which performs at least adjustment of a workpiece, and a control computer for controlling the processes of operation of the production facility via the input/output control device, said system comprising: information transmission means capable of transmitting the control information between the monitor computer and the control computer at a timing that is independent of control of the processes of operation, wherein said monitor computer has an editor program for creating the software of said monitor computer and/or said control computer, a compiler program for compiling the software of said monitor computer and/or said control computer, a debugger program for debugging the software of said monitor computer and/or said control computer, a data analyzing program for analyzing the data of the input/output control device, and a menu program for managing start-up/shut-down of a monitoring program which monitors operation of said control computer, and said workpiece is an image forming apparatus which forms an image by exposing a photoreceptor material to a pulse-width modulated light beam, wherein the production facility has adjusting means, which includes an optical system, for adjusting a reflective mirror to adjust scanning position when the light beam of said image forming apparatus scans the photoreceptor material.

35. The system according to claim 34, wherein said information transmission means performs communication at a timing that is independent of the monitoring/analysis operation of said monitor computer or of the control operation of said control computer.

36. The system according to claim 34, wherein said adjusting means for adjusting said reflective mirror includes:

moving means for moving the optical system, which is interior to or exterior to said production facility, within a predetermined range; and photometric means for measuring quantity of light obtained by moving said optical system;

wherein said optical system is moved to the position at which the quantity of light is maximized.

37. The system according to claim 34, wherein said adjusting means includes:

varying means for varying a reflecting angle of said reflective mirror of said production facility;

timekeeping means for measuring time required for the pulse-width modulated light beam to scan the predetermined range owing to rotation of a scan mirror provided in the image forming apparatus;

comparison means for comparing the time required with a predetermined value; and calculating means which, if the time required is outside the predetermined range, calculates amount of varying of the reflecting angle of the reflective mirror from the difference between the time required and the predetermined value;

wherein the reflecting angle of said reflective mirror is varied in dependence upon the amount of varying of the reflecting angle calculated.

38. The system according to claim 34, wherein said information transmission means is a dual-port memory capable of real-time reading/writing to/from all or part of a memory provided within said control computer or said monitor computer.

39. The system according to claim 38, wherein all or part of the program managed in said menu program is a program described by a combination of a group of instructions prepared in advance exclusively for control of automated systems.

40. The system according to claim 39, wherein functions possessed by the program managed in said menu program are assigned in advance to a plurality of keys provided on data input means possessed by said monitor computer.

41. The system according to claim 40, wherein said automated system is a system for adjusting/measuring a laser-beam printer, which is image forming apparatus, wherein a value relating to production performance of said laser-beam printer is analyzed based upon data relating to said laser-beam printer, said data has been acquired by said information transmission means.

* * * * *

UNITED STATES PATENT AND TRADEMARK OFFICE
CERTIFICATE OF CORRECTION

PATENT NO. : 5,896,292
DATED : April 20, 1999
INVENTOR(S) : Kotaro Hosaka et al.

It is certified that error appears in the above-identified patent and that said Letters Patent is hereby corrected as shown below:

IN THE DRAWINGS

Figure 8A:
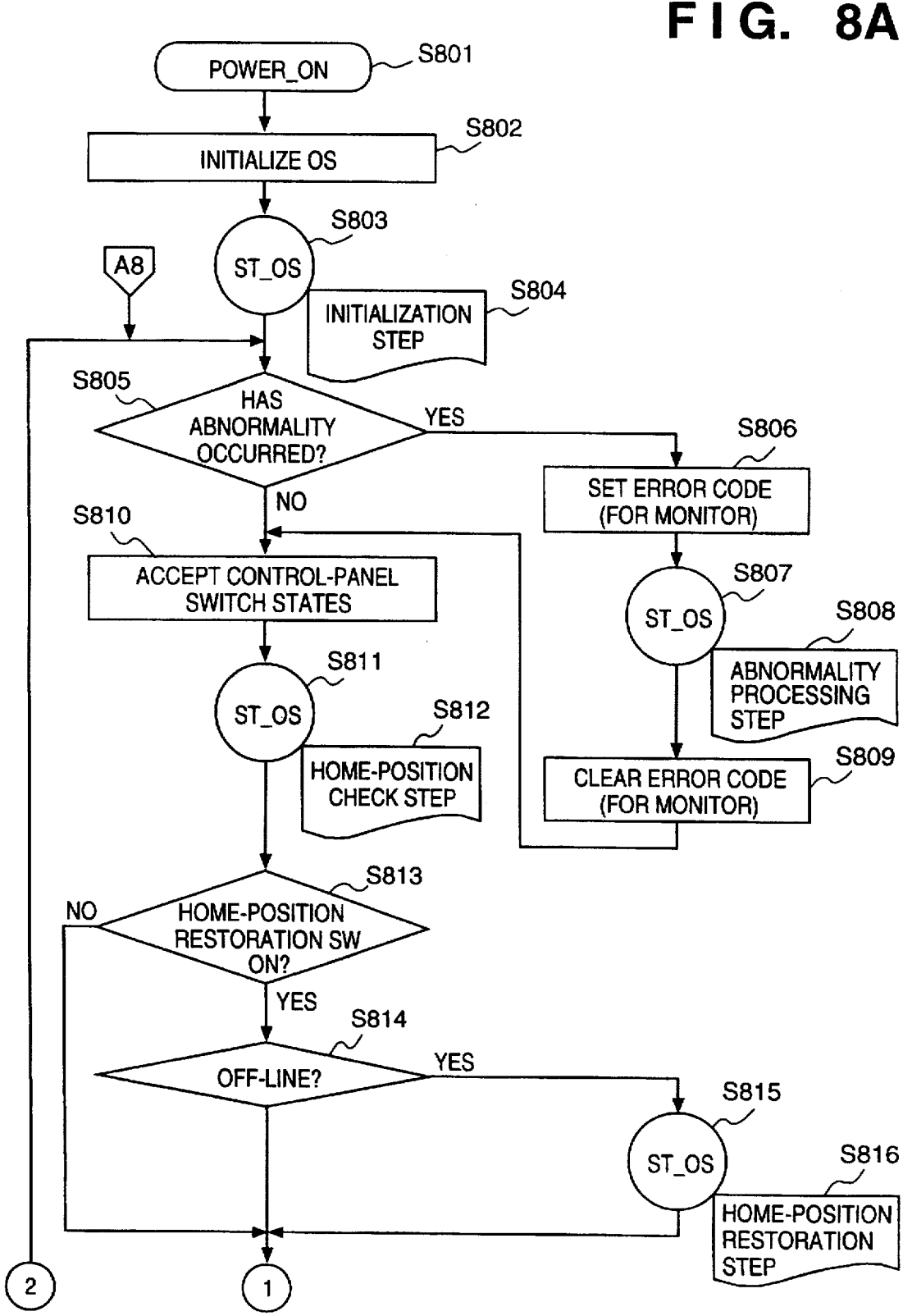
FIGS. 8A to 8D are main flowcharts of the software of a control computer in an embodiment of the present invention.
Figure 8B:
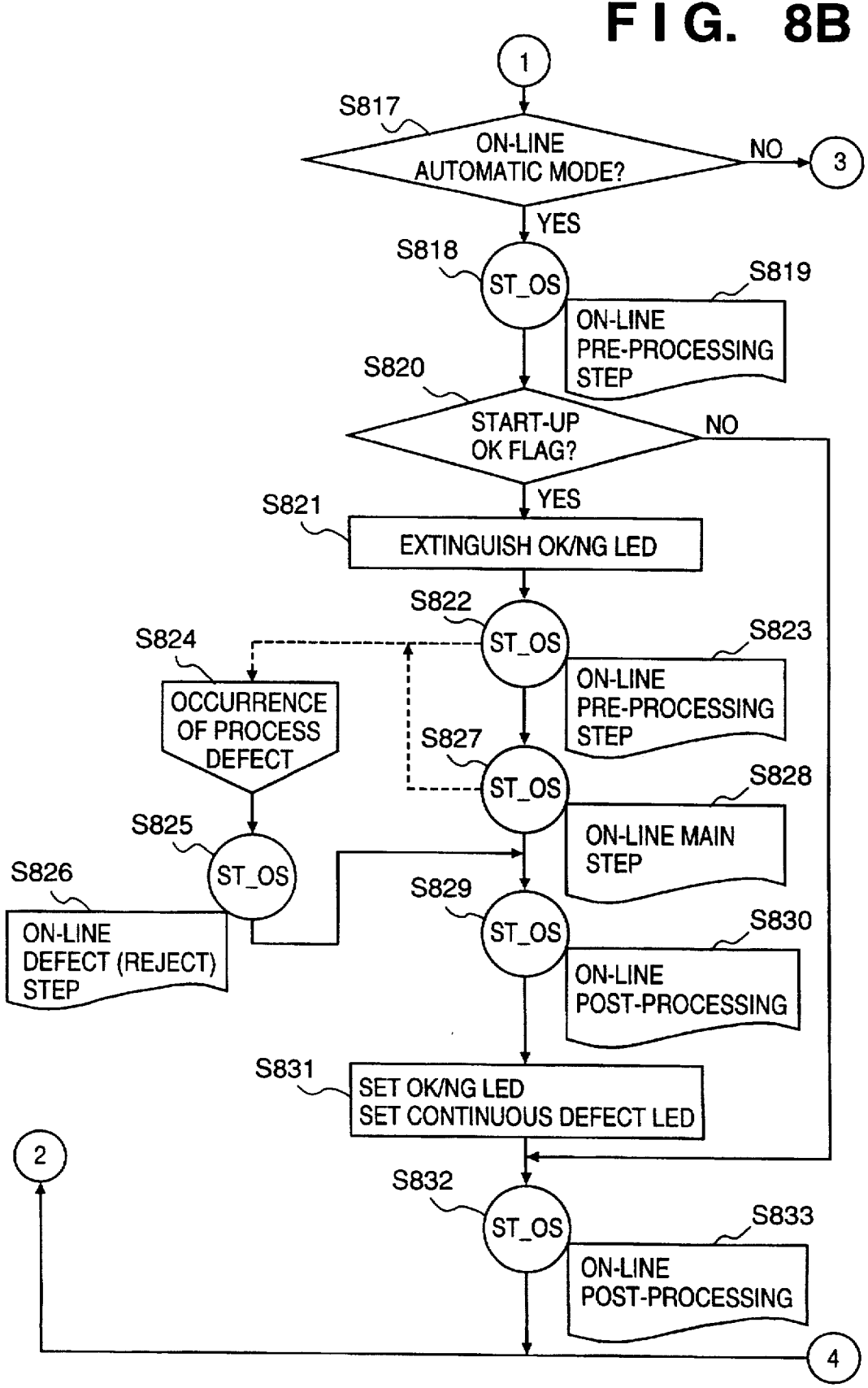
Figure 8C:
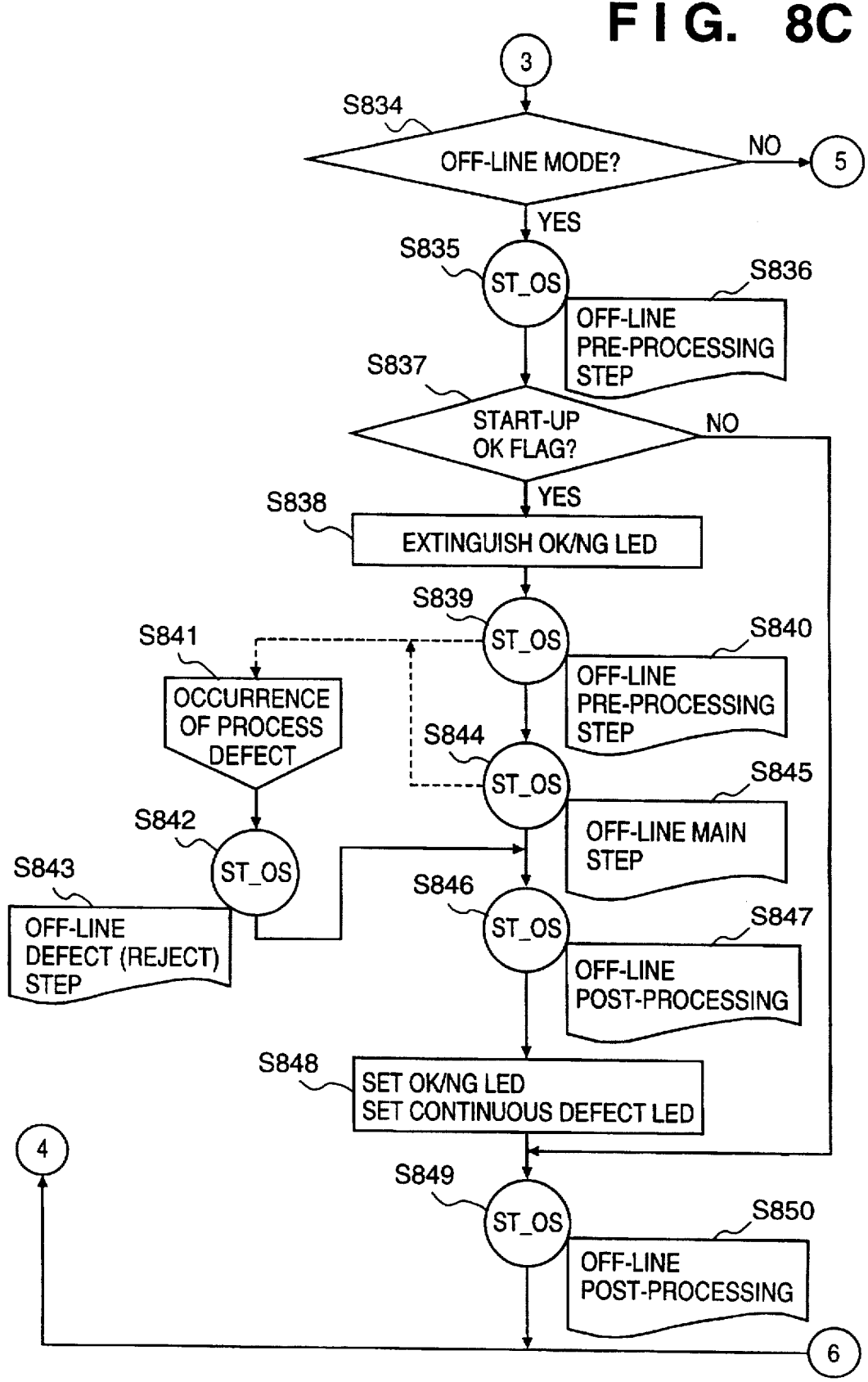
Figure 8D:
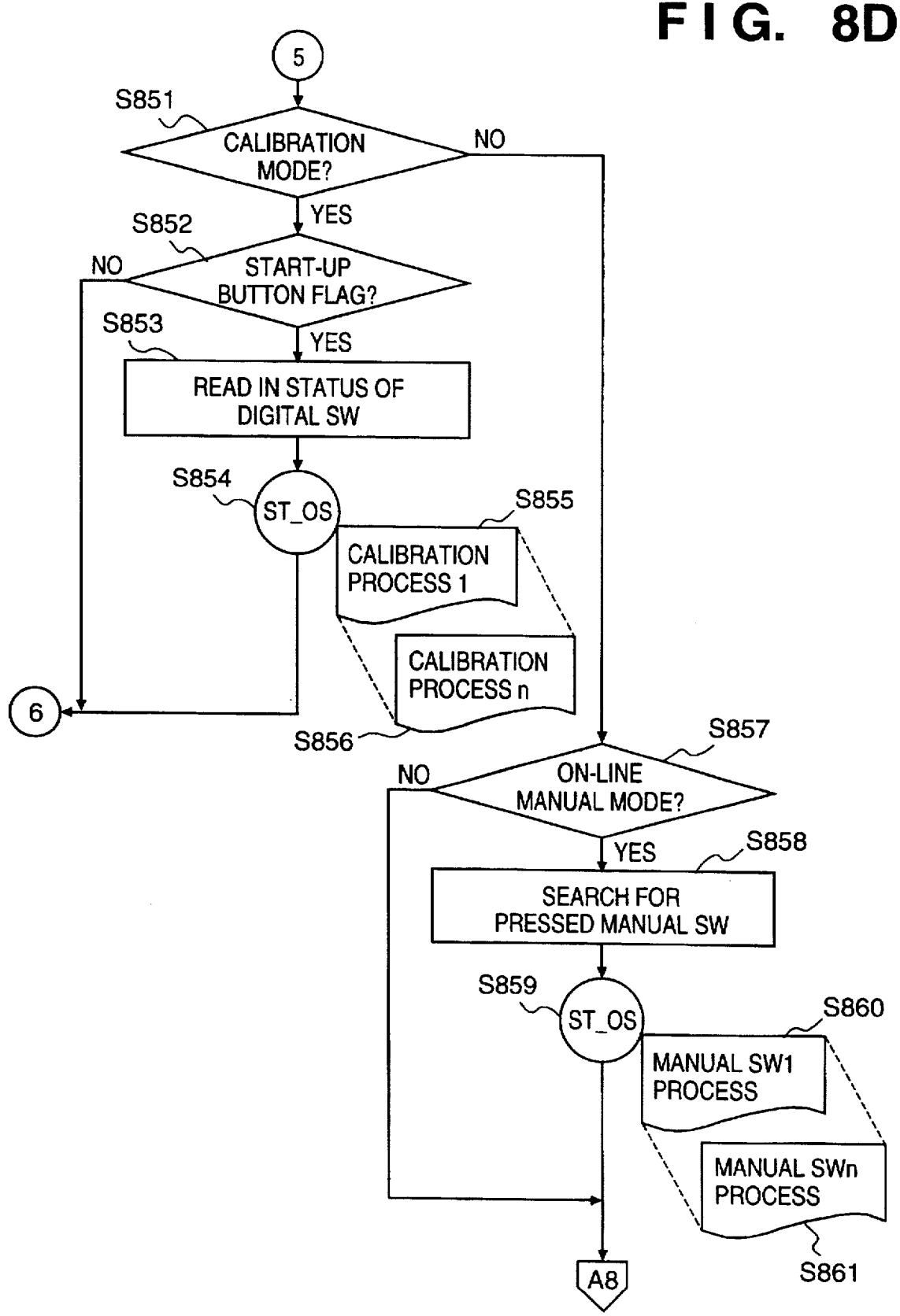

Fig. 8A, insert "NO" adjacent to line extending from bottom of box S814.
Fig. 25, insert "NO" adjacent to down arrow extending from bottom of box S2508.
Fig. 26B, insert "NO" adjacent to down arrow extending from bottom of box S2613.
Fig. 34B, insert "NO" adjacent to down arrow extending from bottom of box S3435.

Fig. 34B, delete "S3236 and insert --S3436-- legend to box on bottom right identified "Debugger Command Input Processing."

Fig. 35, insert "NO" adjacent down arrow extending from bottom of box S3521.
Fig. 51, insert "NO" adjacent down arrow extending from bottom of box S5102.
Fig. 52A, delete "YES" adjacent to down arrow extending from box 5201 and insert --NO--.
Fig. 54, insert -- SAVE STANDARDS DATA -- in box S5402 and delete "DESIGNATE SAVE".

Fig. 58, insert -- Special Purpose Application?" in box S5804 and delete "General Purpose Application."

Figure 66:
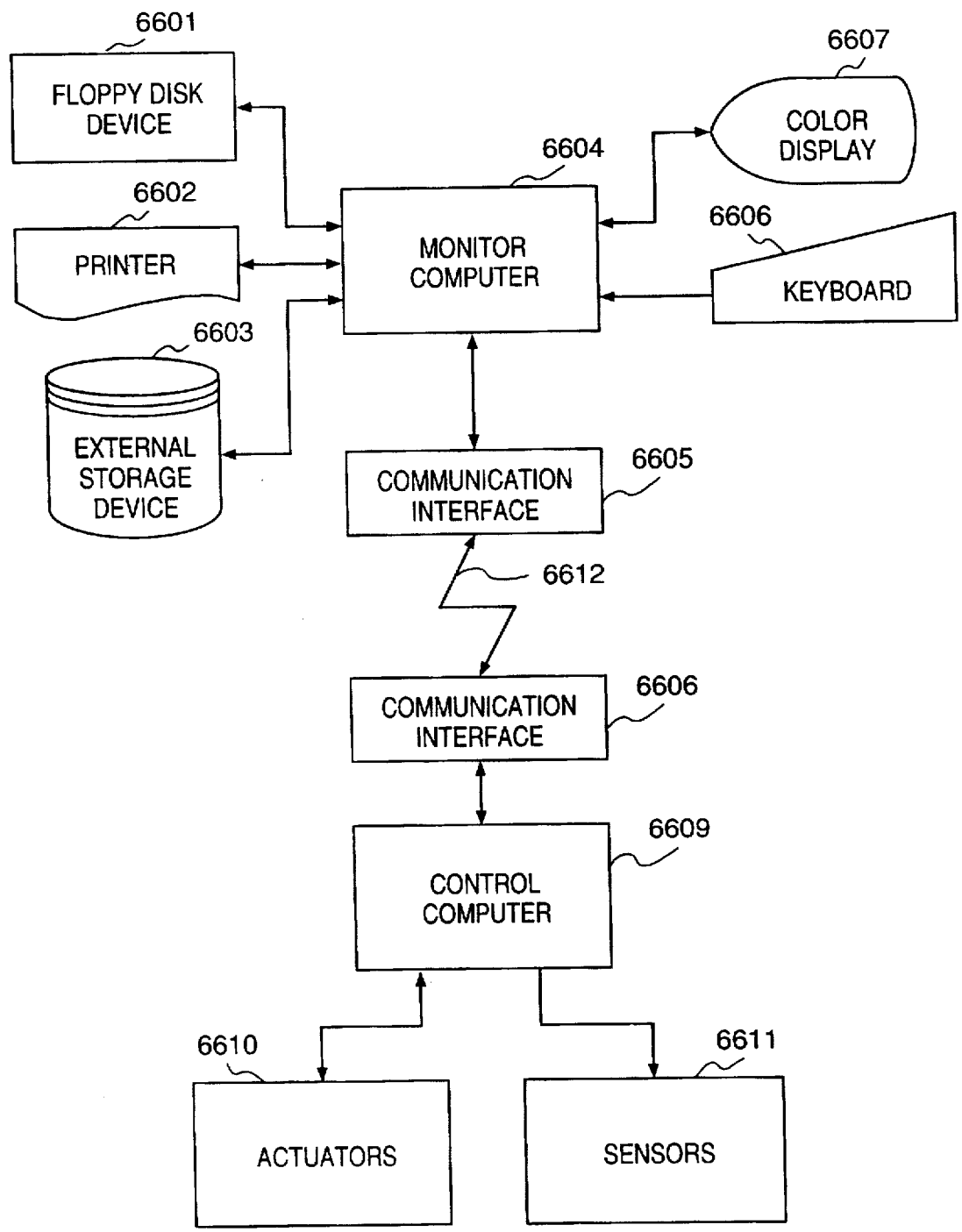
FIG. 66 is a block diagram showing an overview of the architecture of an automated system according to the prior art.

Fig. 66, insert -- PRIOR ART -- legend at top of figure.
Fig. 66, delete "6606" legend at "Communication Interface" box and insert -- 6608 --.

Signed and Sealed this

Eleventh Day of April, 2000

Attest:

Q. TODD DICKINSON

Attesting Officer

Director of Patents and Trademarks